(12) United States Patent
Motsinger et al.

(10) Patent No.: US 7,373,524 B2
(45) Date of Patent: May 13, 2008

(54) METHODS, SYSTEMS AND COMPUTER PROGRAM PRODUCTS FOR MONITORING USER BEHAVIOR FOR A SERVER APPLICATION

(75) Inventors: David Lee Motsinger, Raleigh, NC (US); David Byron Logan, Chapel Hill, NC (US); Kenneth Robert Gramley, Cary, NC (US); Garth Douglas Somerville, Cary, NC (US); Albert Ming Choy, Raleigh, NC (US); Douglas Wayne Hester, Cary, NC (US); Virgil Montgomery Wall, Jr., Apex, NC (US); Byron Lee Hargett, Apex, NC (US)

(73) Assignee: Covelight Systems, Inc., Cary, NC (US)

( * ) Notice: Subject to any disclaimer, the term of this patent is extended or adjusted under 35 U.S.C. 154(b) by 629 days.

(21) Appl. No.: 10/785,132

(22) Filed: Feb. 24, 2004

(65) Prior Publication Data

US 2005/0188423 A1 Aug. 25, 2005

(51) Int. Cl.
*G06F 9/00* (2006.01)
(52) U.S. Cl. ...................... 713/194; 713/188; 713/189; 713/193
(58) Field of Classification Search ................ 713/194, 713/188, 189, 193
See application file for complete search history.

(56) References Cited

U.S. PATENT DOCUMENTS

| | | | |
|---|---|---|---|
| 5,956,709 A | 9/1999 | Xue | |
| 6,052,730 A | 4/2000 | Felciano et al. | |
| 6,240,450 B1 | 5/2001 | Sharples et al. | |
| 6,281,790 B1 | 8/2001 | Kimmel et al. | |
| 6,286,046 B1 | 9/2001 | Bryant | |
| 6,405,318 B1 | 6/2002 | Rowland | |
| 6,549,208 B2 | 4/2003 | Maloney et al. | |
| 6,609,246 B1 | 8/2003 | Guhr et al. | |
| 2001/0037358 A1 | 11/2001 | Clubb et al. | |
| 2001/0044309 A1 | 11/2001 | Bar et al. | |

(Continued)

FOREIGN PATENT DOCUMENTS

CA 2383431 3/2001

(Continued)

OTHER PUBLICATIONS

Lam et al., "Multivariate Data Analysis Software for Enhancing System Security," J. Systems Software, p. 267-275 (1995).

(Continued)

*Primary Examiner*—Thomas R. Peeso
(74) *Attorney, Agent, or Firm*—Jenkins, Wilson, Taylor & Hunt, P.A.

(57) ABSTRACT

Methods, systems and computer program products are disclosed for monitoring user behavior for a server application in a computer network. The methods, systems, and computer program products can monitor communication data between a server application and a client. The methods, systems, and computer program products can also include applying one or more detectors to the communication data to identify a variety of predetermined activity. Further, the methods, systems, and computer program products can include generating a threat score associated with the predetermined activity by comparing the identified predetermined activity with a security threshold criteria.

54 Claims, 98 Drawing Sheets

U.S. PATENT DOCUMENTS

| | | |
|---|---|---|
| 2002/0023108 A1 | 2/2002 | Daswani et al. |
| 2002/0032725 A1 | 3/2002 | Araujo et al. |
| 2002/0032731 A1 | 3/2002 | Qian et al. |
| 2002/0035498 A1 | 3/2002 | Kehoe et al. |
| 2002/0042821 A1 | 4/2002 | Muret et al. |
| 2002/0046350 A1 | 4/2002 | Lordemann et al. |
| 2002/0059528 A1 | 5/2002 | Dapp |
| 2002/0066035 A1 | 5/2002 | Dapp |
| 2002/0078382 A1 | 6/2002 | Sheikh et al. |
| 2002/0093527 A1 | 7/2002 | Sherlock et al. |
| 2002/0103896 A1 | 8/2002 | Lemon |
| 2002/0124047 A1 | 9/2002 | Gartner et al. |
| 2002/0124075 A1 | 9/2002 | Venkatesan |
| 2002/0137524 A1 | 9/2002 | Bade et al. |
| 2002/0143813 A1 | 10/2002 | Jellum et al. |
| 2002/0143931 A1 | 10/2002 | Smith et al. |
| 2002/0144156 A1 | 10/2002 | Copeland, III |
| 2002/0147570 A1 | 10/2002 | Kraft et al. |
| 2002/0152284 A1 | 10/2002 | Cambray et al. |
| 2002/0162017 A1 | 10/2002 | Sorkin et al. |
| 2002/0165954 A1 | 11/2002 | Eshghi et al. |
| 2002/0174174 A1 | 11/2002 | Ramraj et al. |
| 2002/0188864 A1 | 12/2002 | Jackson |
| 2003/0036886 A1 | 2/2003 | Stone |
| 2003/0060212 A1 | 3/2003 | Thomas |
| 2003/0074400 A1 | 4/2003 | Brooks et al. |
| 2003/0088663 A1 | 5/2003 | Battat et al. |
| 2003/0135509 A1 | 7/2003 | Davis et al. |
| 2003/0135759 A1 | 7/2003 | Kim et al. |
| 2003/0135865 A1 | 7/2003 | Jung |
| 2003/0139990 A1 | 7/2003 | Greco |
| 2003/0149887 A1 | 8/2003 | Yadav |
| 2003/0149888 A1 | 8/2003 | Yadav |
| 2003/0163730 A1 | 8/2003 | Roskind et al. |
| 2003/0195803 A1 | 10/2003 | Ketonen |
| 2003/0204719 A1 | 10/2003 | Ben-Itzhaki |
| 2003/0208533 A1 | 11/2003 | Farquharson et al. |

FOREIGN PATENT DOCUMENTS

| | | |
|---|---|---|
| CA | 2352110 | 4/2001 |
| CA | 2388389 | 5/2001 |
| CA | 2441230 | 9/2002 |
| EP | 1139221 | 4/2001 |
| GB | 2357679 | 6/2001 |
| GB | 2357680 | 6/2001 |
| GB | 2360608 | 9/2001 |
| JP | 10254732 | 9/1998 |
| JP | 10333940 | 12/1998 |
| JP | 11355759 | 12/1999 |
| JP | 2000172607 | 6/2000 |
| JP | 2000250844 | 9/2000 |
| JP | 2001125853 | 5/2001 |
| JP | 2001218192 | 8/2001 |
| JP | 2001312429 | 11/2001 |
| JP | 2001325680 | 11/2001 |
| JP | 2002034029 | 1/2002 |
| JP | 2002049537 | 2/2002 |
| JP | 2002158995 | 5/2002 |
| JP | 2002163161 | 6/2002 |
| JP | 2002183853 | 6/2002 |
| JP | 2002197564 | 7/2002 |
| JP | 2002259237 | 9/2002 |
| JP | 2002262371 | 9/2002 |
| JP | 2002268733 | 9/2002 |
| JP | 2002281573 | 9/2002 |
| JP | 2003005837 | 1/2003 |
| JP | 2003067330 | 3/2003 |
| JP | 2003114812 | 4/2003 |
| TW | 05/32010 | 5/2003 |
| WO | 99/18532 | 4/1999 |
| WO | 00/27088 | 5/2000 |
| WO | 00/60467 | 10/2000 |
| WO | 01/16912 | 3/2001 |
| WO | 01/20503 | 3/2001 |
| WO | 01/24475 | 4/2001 |
| WO | 01/25896 | 4/2001 |
| WO | 01/31852 | 5/2001 |
| WO | 01/48505 | 7/2001 |
| WO | 01/71498 | 9/2001 |
| WO | 01/80494 | 10/2001 |
| WO | 02/01381 | 1/2002 |
| WO | 02/50703 | 6/2002 |
| WO | 02/075547 | 9/2002 |
| WO | 02/077867 | 10/2002 |
| WO | 02/077869 | 10/2002 |
| WO | 00/54458 | 3/2003 |
| WO | 03/056430 | 7/2003 |

OTHER PUBLICATIONS

Wu et al., "SpeedTracer: A Web Usage Mining and Analysis Tool," IBM Systems Journal, vol. 37, No. 1, p. 89-105, (1998).

Iguchi et al., "Network Surveillance for Detecting Intrusions," IEEE, p. 99-106 (1999).

Ko, "Logic Induction of Valid Behavior Specifications for Intrusion Detection," IEEE, p. 142-153 (2000).

Seleznyov et al., "Learning Temporal Regularities of User Behavior for Anomaly Detection," Information Assurance in Computer Networks, p. 143-152. (2001).

Bauer et al., "Detecting Anamalous Behavior: Optimization of Network Traffic Parameters Via an Evolution Strategy", IEEE, p. 34-39 (2001).

Singh et al., "Investigating and Evaluating Behavioural Profiling and Intrusion Detection Using Data Mining," Information Assurance in Computer Networks, p. 153-158 (2001).

Wenhui, "A Novel Intrusion Detection System Model for Securing Web-based Database Systems", IEEE, p. 249-254 (2001).

Ganger, "Position Summary: Authentication Confidences", IEEE Workshop on Hot Topics in Operating Systems HOTOS 8th, p. 169 (May 2001).

Wei-Min et al., "The Intrusion Detection Based on Genetic Algorithms," Journal of Shanghai University, vol. 5, Suppl. p. 66-69 (Sep. 2001).

Cansian et al., "An Attack Signature Model to Computers Security Intrusion Detection," IEEE, p. 1368-1373, (2002).

Mukkamala et al., "Intrusion Detection Using Neural Networks and Support Vector Machines", IEEE, p. 1702-1707 (2002).

Chauhan, "Blocking Attacks on Applications," SC Magazine (May 2003).

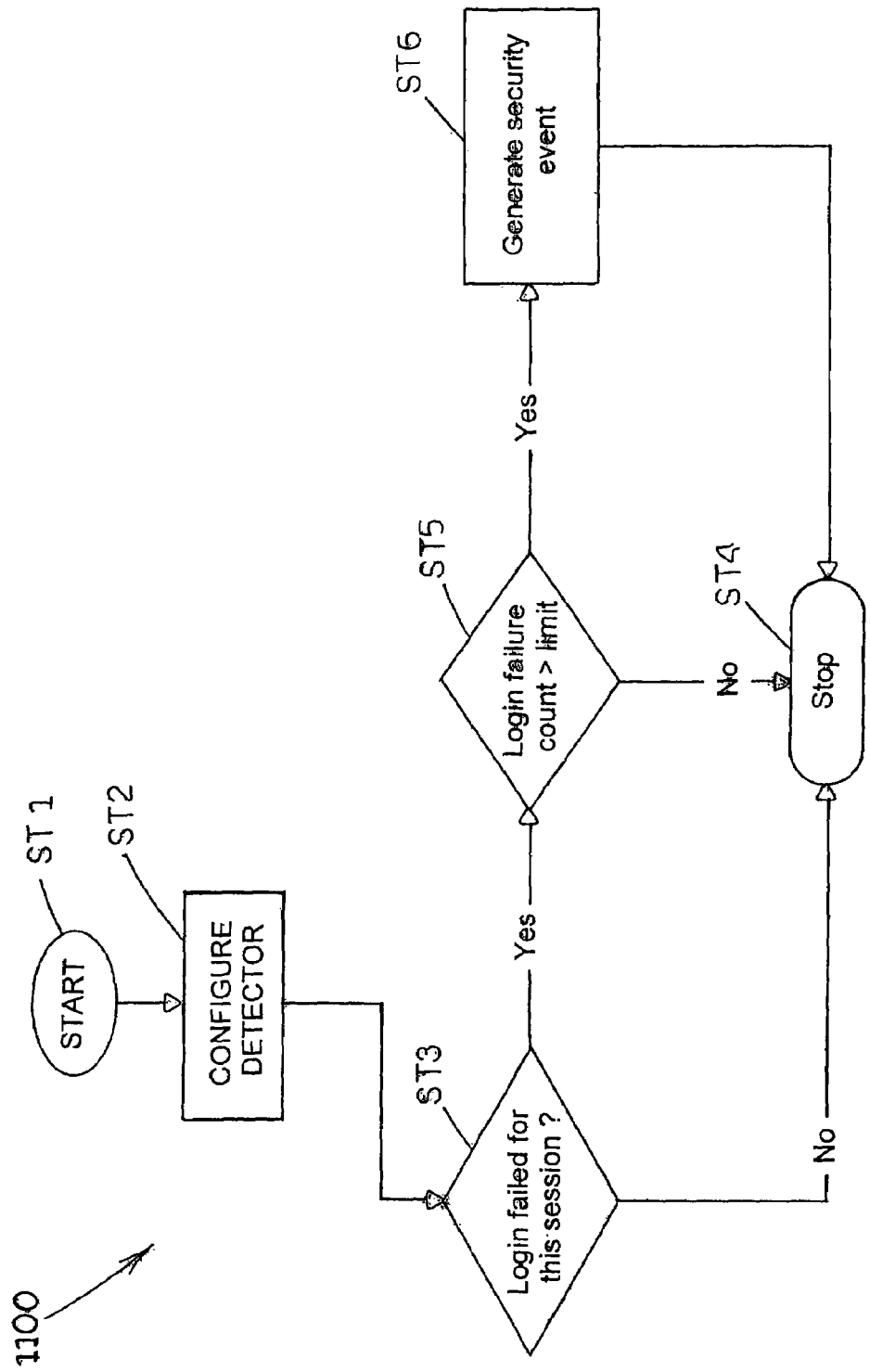

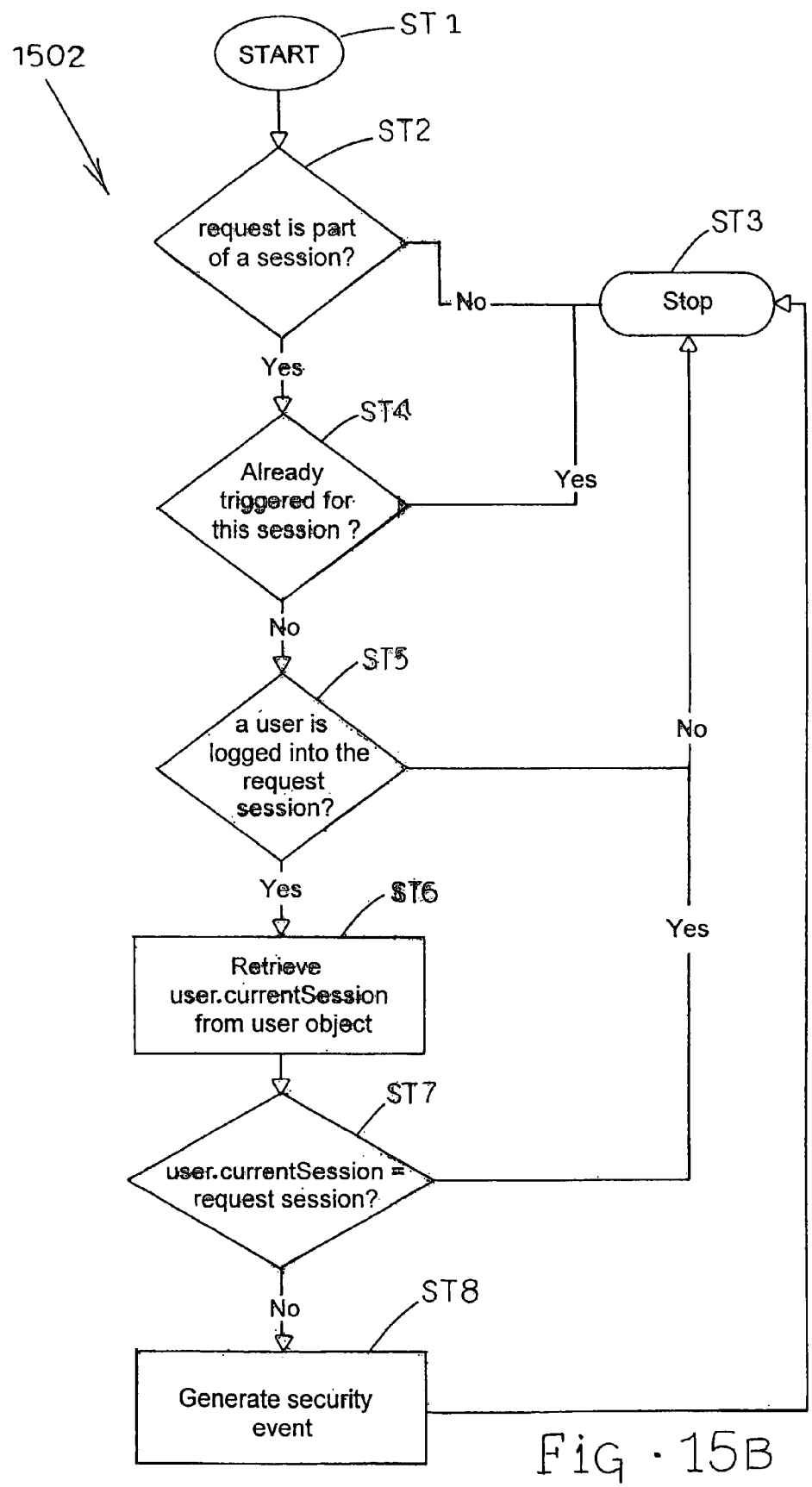
FIG · 15B

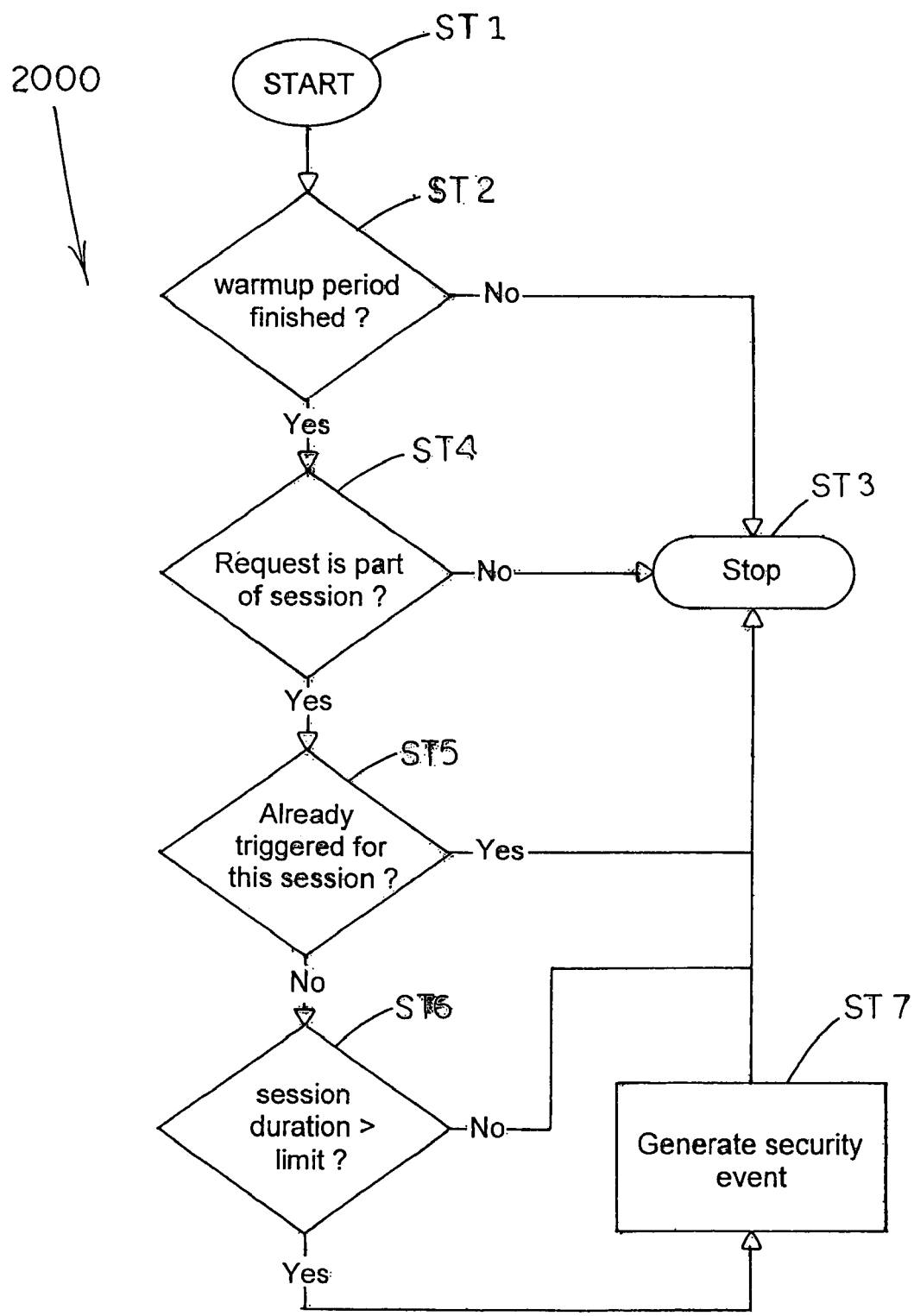
FIG · 20A

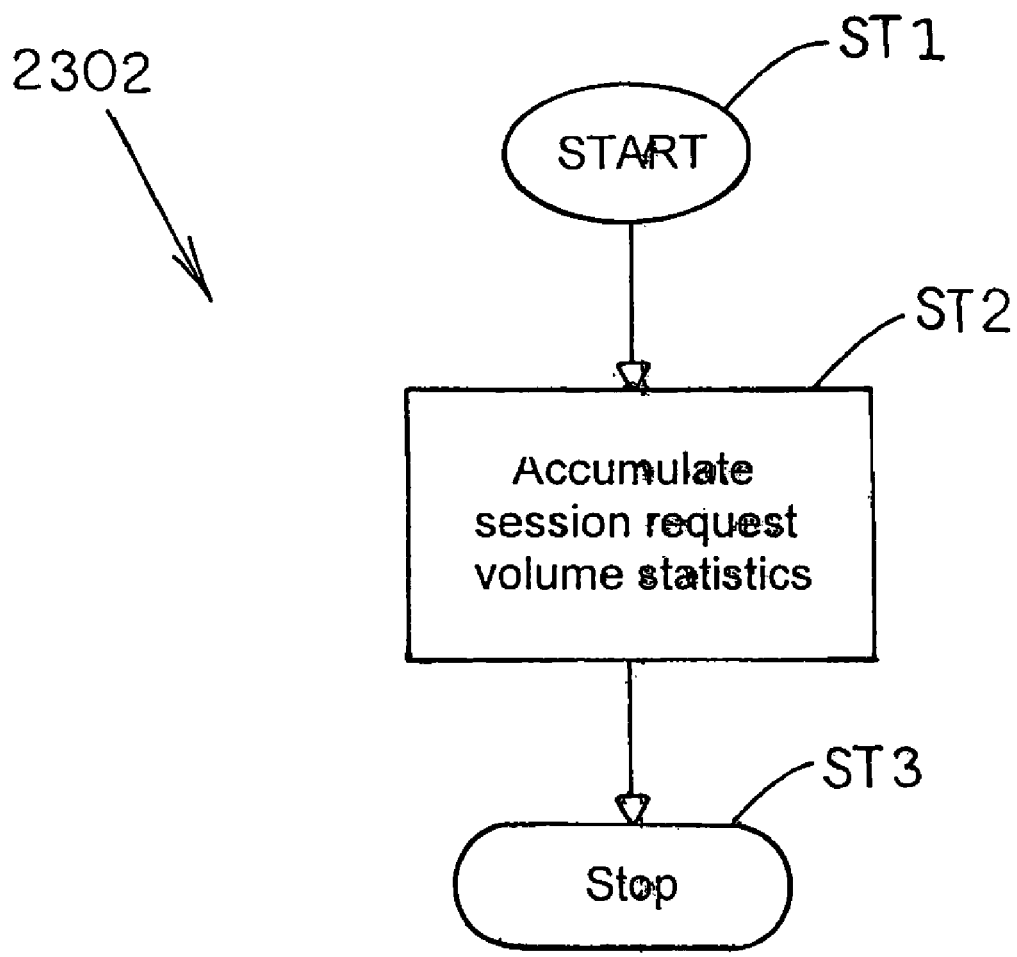
FiG · 23B

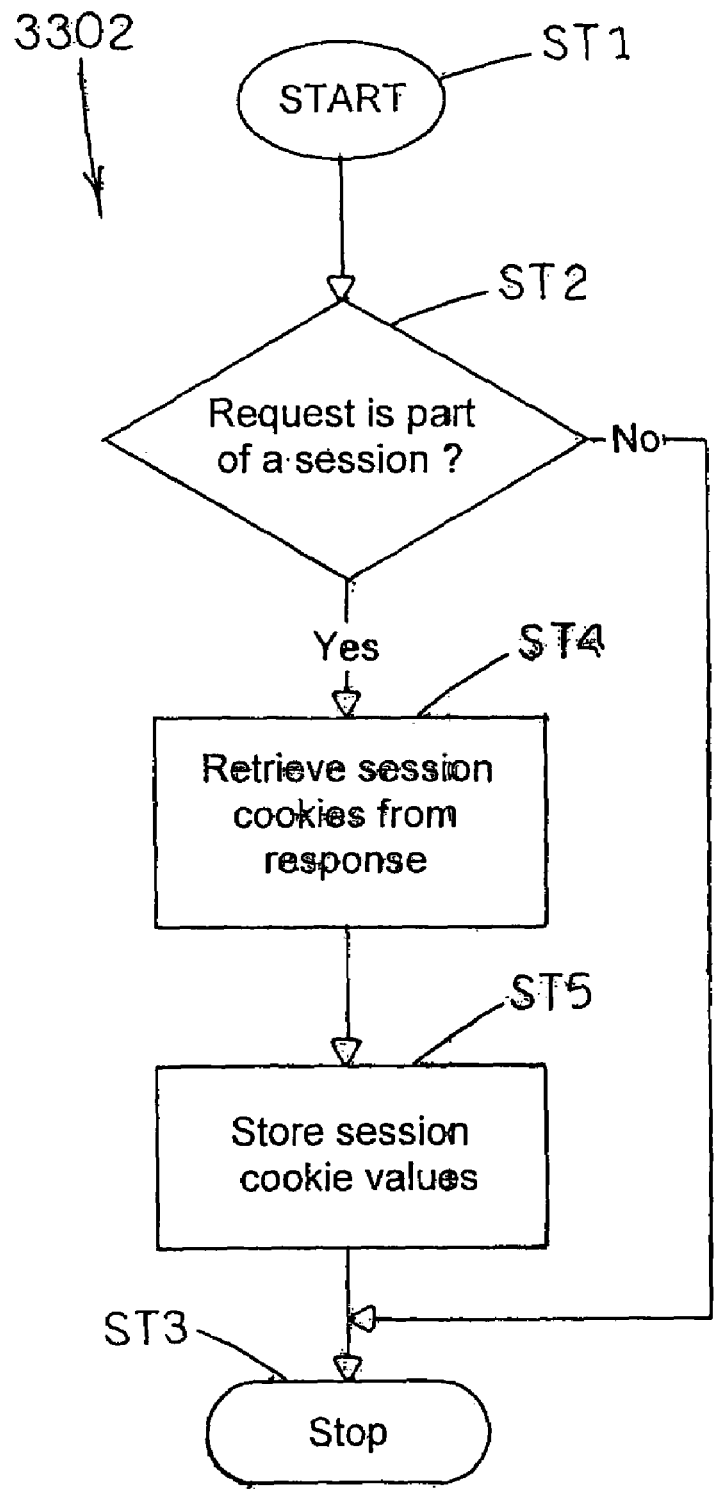
FIG · 33B

| Name ▲ | Category | Score | Status |
|---|---|---|---|
| Abnormal node error rate | Application Errors | 10 | Working |
| Abnormal session duration | Application Misuse | 10 | Learning |
| Abnormal user session duration | Application Misuse | 10 | Working |
| Application request rate too high | Usage Policy | 70 | Working |
| Consecutive login failures | Authentication | 30 | Working |
| Disallowed IP address | Access Policy | 10 | Disabled |
| Encoded 8-bit character | URL Encoding | 5 | Working |
| Excessive individual HTTP errors | HTTP Protocol | 40 | Working |
| Excessive login failures | Authentication | 10 | Learning |
| Excessive total HTTP errors | HTTP Protocol | 40 | Working |
| Flagged user login | Access Policy | 50 | Working |
| HTTP buffer overflow | HTTP Protocol | 80 | Working |
| HTTP parsing error | HTTP Protocol | 80 | Working |
| Invalid % character | URL Encoding | 50 | Working |
| Invalid HTTP request | HTTP Protocol | 80 | Working |
| Invalid URL encoding | URL Encoding | 80 | Working |
| Invalid UTF-8 sequence | URL Encoding | 20 | Working |
| Invalid use of %% | URL Encoding | 60 | Working |

FIG. 67

METHODS, SYSTEMS AND COMPUTER PROGRAM PRODUCTS FOR MONITORING USER BEHAVIOR FOR A SERVER APPLICATION

RELATED APPLICATIONS

The disclosures of the following U.S. patent applications, commonly owned and simultaneously filed herewith, are all incorporated by reference herein: U.S. patent applications entitled "Methods, Systems and Computer Program Products for Monitoring a Server Application," U.S. patent application Ser. No. 10/785,242; "Methods, Systems and Computer Program Products for Geography and Time Monitoring of a Server Application User," U.S. patent application Ser. No. 10/785,799; "Methods, Systems and Computer Program Products for Monitoring User Login Activity for a Server Application," U.S. patent application Ser. No. 10/785,584; "Methods, Systems and Computer Program Products for Monitoring Usage of a Server Application," U.S. patent application Ser. No. 10/785,840; "Methods, Systems and Computer Program Products for Monitoring Protocol Responses for a Server Application," U.S. patent application Ser. No. 10/785,651; and "Methods, Systems and Computer Program Products for Monitoring User Access for a Server Application," U.S. patent application Ser. No. 10/785,843.

TECHNICAL FIELD

The subject matter disclosed herein relates generally to computer network security. More particularly, the subject matter disclosed herein relates to methods, systems and computer program products for monitoring user behavior for a server application.

BACKGROUND ART

The ease, accessibility, and convenience of the Internet have rapidly changed the way people use computers and access information. The World Wide Web (WWW), often referred to as "the web", is one of the most popular means for retrieving information on the Internet. The web gives users or clients access to an almost infinite number of resources such as interlinked hypertext documents or server documents retrieved via a hypertext transfer protocol (HTTP) from servers located around on the world. The web operates in a basic client-server format, wherein servers are dedicated computers or individual computer applications that execute resources in a certain matter, such as storing and transmitting web documents or binary objects, to client computers or web-enabled devices on the network. For example, a user or client can interact with a server, or web server, through a web browser on a web-enabled device in order to view retrieved information or to request an application on the web server to operate in a desired manner.

Documents on the web, referred to as web pages, are typically written in a hypertext markup language (HTML) or similar mark-up language, and identified by uniform resource locators (URLs) or uniform resource identifiers (URIs) that specify a particular computer and pathname by which a file or resource can be accessed. Codes, often referred to as tags, embedded in an HTML document associate particular words and images in the document with URLs so that a user or client can access another file or page by pressing a key or clicking a mouse button. These files generally comprise text, images, videos, and audio, as well as applets or other embedded software programs, written in for example, Java or ActiveX, that execute when the user or client activates them by clicking on a hyperlink. A user or client viewing a web page can also interact with components that, for example, forward requested information supplied by the client to a server through the use of forms, download files via file transfer protocol (FTP), facilitate user or client participation in chat rooms, conduct secure business transactions, and send messages to other users or clients via e-mail by using links on the web page.

A web server and surrounding network environment can be vulnerable to attack from malicious or irresponsible individuals via one or more web-enabled devices communicating with the web server. This is referred to as "web hacking" and generally involves taking advantage of mistakes or vulnerabilities in web design through a web application on the web server. Web hacking is different from traditional system or application hacking because an attack generally takes place via application layer protocols. Generally, the easier it is for clients to talk or interact directly to the server applications through a web page or any other suitable type of computer-readable data, the easier it is for someone to hack into those applications. Typical attacks include defacing a page by deleting graphics and replacing them with doctored, sometimes lurid, graphics; altering or stealing password files; deleting data files; pirating copyrighted works; tampering with credit and debit card numbers, or other customer information; publicizing private business information; accessing confidential or unauthorized information; searching through internal databases; data mining; using the web application as a vehicle to attack other users or clients; and denial of service attack. Thus, web hacking causes inconvenience and perhaps irreversible damage to users, clients, customers, businesses, and operators of the web server. Generally, conventional computer security methods fail to properly address or completely ignore web hacking concerns.

The International Standards Organization (ISO) developed a set of protocol standards designed to enable computers to connect with one another and to exchange information with as little error as possible. The protocols generally accepted for standardizing overall computer communications are designated in a seven-layer set of hardware and software guidelines known as the open systems interconnection (OSI) model. This protocol model forms a valuable reference and defines much of the language used in data communications. The application layer is the highest layer of standards in the OSI model. The OSI model also includes the data link layer, the physical layer, the session layer, and the transport layer.

Conventional security methods are typically implemented between either the data link layer and physical layer by using a firewall or the session and transport layers by using a secure socket layer (SSL) or public key infrastructure (PKI). A firewall is a type of security implementation intended to protect a trusted environment, network, or web server against external threats at the data link layer originating from another network, such as the Internet. A firewall prevents computers behind the firewall from communicating directly with computers external to the protected environment, network, or web server. Instead, all communications are routed through a proxy server outside of a trusted environment, network, or web server. The proxy server decides whether it is safe to let a particular message type or file type pass through, based on a set of filters, to the trusted environment, network, or web or application server.

SSL is an open standard developed by Netscape Communications Corporation of Mountain View, Calif., for establishing a secure and encrypted communications channel to prevent the interception of critical information, such as credit card information. The primary purpose of using SSL is to enable secure and encrypted electronic transactions on public networks, such as the web. A public key infrastructure or trust hierarchy is a system of digital certificates, certificate authorities, and other registration authorities that verify and authenticate each party involved in a communication session. PKIs are currently evolving and there is no single PKI nor even a single agreed-upon standard for setting up a PKI. One drawback of the above noted conventional technologies is that they do not perform an inspection of the application layer protocol, i.e., they do not scrutinize the application content of an incoming request. Therefore, these technologies cannot prevent web hacking attacks directed through the application content of an operation request.

Web hackers can easily attack computer systems by exploiting flaws and vulnerabilities in web design. For example, default scripts may allow files to be uploaded onto a web server; a web server's treatment of environmental variables may be exploited; and the existences of 'backdoors' or flaws in third party products allow unauthorized access. These techniques can be potent attacks and are generally difficult to defend against through conventional means. Each month new software vulnerabilities are discovered, but many system operators typically leave these holes unpatched and their systems open to preventable attacks. Major corporations and government agencies utilizing well configured firewalls, PKI, and SSL implementations have been infiltrated by hackers using known application layer intrusions. These intrusions typically involve illegal and harmful requests that are sent to an application forcing it to execute out of its intended or authorized scope of operation. This may exploit the application to damage itself, files, buffers, other applications, performance, or confidentiality of information.

Two conventional approaches attempt to address some of these problems. One technique involves tracking a server operating system to identify suspicious events such as deleting a file or formatting a disk. However, this type of reactionary technique typically activates only after damage has commenced or been completed. A second technique involves the installation of a network filter in front of an application and updating the filter database with known patterns that can affect the application. However, this technique is limited in that it is unable to identify patterns, which are not yet "known" by the filter database. In other words, the capability of this technique is directly related to the comprehensiveness of the filter database that it draws the patterns from. To increase capability, the filter database requires continual updating. Further, these techniques will not protect against manipulations of environmental variables or the application's implemented business process. These techniques also fail to account for and protect against vulnerabilities in the application itself such as input validation errors, authentication errors, authorization errors, and lack of usage policy enforcement.

In addition, conventional security solutions typically fail to address the increased hacking opportunities caused by the proliferation of electronic commerce (e-commerce), mobile, interactive television (iTV) applications, and web services applications. These applications generally require the combination of numerous components operating on different platforms all working together using different technologies. For example, a single application can comprise a plurality of components, such as, a web server application; transaction server application; database; and Java, ActiveX, and Flash applets all working together. Generally, conventional security solutions are unable to meet the unique security needs of each component in a multiple component system.

Based on the foregoing, it is apparent that it can be difficult to anticipate, recognize, or prevent all types of web or server hacking. Therefore, it is desirable to provide a system for monitoring communication between an application server and client application to alert operators to suspect activity. It is also desirable to provide a system for associating suspect activity with a particular web-enabled device, client, user name, or user session.

SUMMARY

Embodiments of methods, systems, and computer program products are disclosed for monitoring a server application in a computer network. The methods, systems, and computer program products can monitor communication data between a server application and a client. The methods, systems, and computer program products can also include applying one or more detectors to the communication data to identify a variety of predetermined activity. Further, the methods, systems, and computer program products can include generating a threat score associated with the predetermined activity by comparing the identified predetermined activity with a security threshold criteria.

Some embodiments of methods, systems, and computer program products disclosed herein can monitor login session activity for a client of a server application. The methods, systems, and computer program products can identify one geographic location of a client initiating a login session. The methods, systems, and computer program products can also identify another geographic location of the same client or a different client initiating another login session. The identified geographic locations can be analyzed to identify any geographic difference. A time interval between the initiation of the first login session and the second login session can be identified. The geographical difference and the time interval can be analyzed for determining whether to generate a threat score.

Some other embodiments of methods, systems, and computer program products disclosed herein can detect abnormal activity of a server application. The methods, systems, and computer program products can measure an activity of a server application user over a period of time to generate a measurement of the activity. Next, the methods, systems, and computer program products can measure the same activity of the server application user over another period of time to generate another measurement of the activity. Next, whether the first and second measurements deviate a predetermined amount in order to detect abnormal activity for the server application user can be determined. If abnormal activity is detected, a threat score can be generated.

Other embodiments of methods, systems, and computer program products disclosed herein can monitor user login activity for a server application. Communication data between a server application and a client can be received. User login failures between the server application and the client can be monitored during an established session. Further, when the number of user login failures exceeds a predetermined number can be detected. If the number of user login failures exceeds the predetermined number, a threat score can be generated.

Other embodiments of methods, systems, and computer program products disclosed herein can monitor server application. A predetermined activity can be identified from communication data between a server application and a client over a predetermined time. An activity measurement can be generated. The identified activity can be compared to a predetermined activity. Based on the comparison, a threat score can be generated.

Some other embodiments of methods, systems, and computer program products disclosed herein can monitor protocol response codes for a server application. Protocol response codes in communication data between a server application and a client during a session can be monitored. The number of protocol response codes during the session can be determined. Next, the number of protocol response codes can be compared to a set number. Based on the comparison, a threat score can be generated.

Other embodiments of methods, systems, and computer program products disclosed herein can flag a client of a server application. Whether an identified client is in data communication with a server application over a computer network can be determined. If the identified client is in data communication, the client can be flagged.

It is therefore an object to provide novel methods, systems, and computer program products for monitoring a server application. This and other objects are achieved, in whole or in part, by the subject matter disclosed herein.

BRIEF DESCRIPTION OF THE DRAWINGS

Exemplary embodiments of the subject matter will now be explained with reference to the accompanying drawings, of which:

FIG. 11 is a flow chart which illustrates an exemplary process for detecting when the number of login failures during a single session exceeds a predetermined number;

FIG. 15B is a flow chart illustrating a process for triggering when a user has logged in more than once at the same time;

FIGS. 23A and 23B illustrate flow charts of exemplary processes operating in combination for detecting and triggering when user activity deviates from expected user activity for a user;

FIGS. 33A and 33B are flow charts of exemplary processes operating in combination for detecting and triggering when a session cookie returned from the web application has been modified;

FIG. 67 is a screen display for listing installed detectors;

DETAILED DESCRIPTION

Figure 1A:
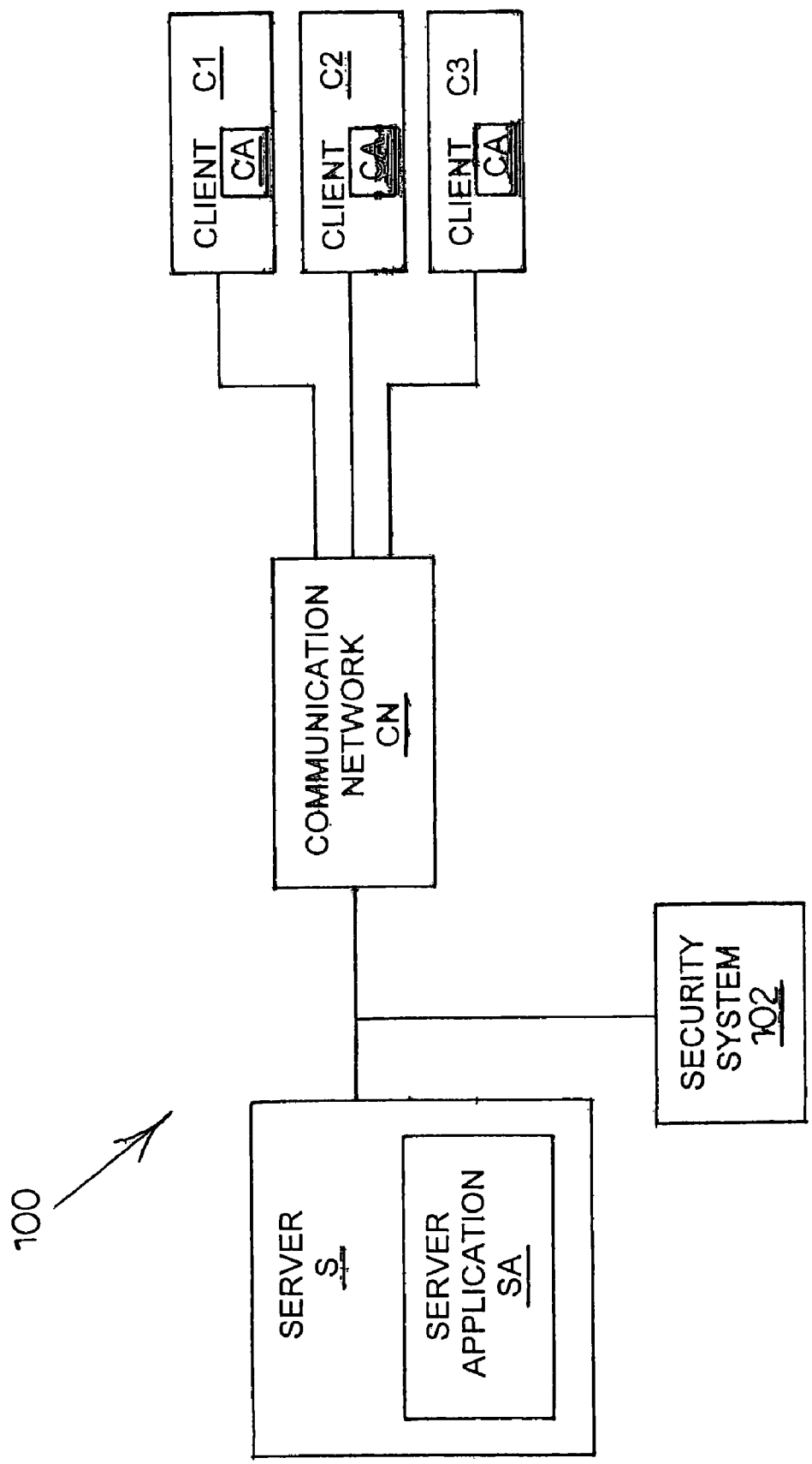
FIG. 1A is a schematic diagram of a communications network including a security system for monitoring a server application.

In accordance with the subject matter disclosed herein, systems and methods for monitoring web applications are provided. The systems and methods according to the subject matter disclosed herein will be explained in the context of flow charts, diagrams, and screen displays. It is understood that the flow charts, diagrams, and screen displays can be implemented in hardware, software, or a combination of hardware and software. Thus, the present subject matter can include computer program products comprising computer-executable instructions embodied in computer-readable media for performing the steps illustrated in each of the flow charts, implementing the machines illustrated in each of the diagrams, or generating screen displays. In one embodiment, the hardware and software for monitoring web applications is located in a computer operable to retrieve traffic from a network such as the Internet.

According to one embodiment, the subject matter disclosed herein can be employed in Internet, an intranet, a mobile communication network, an iTV network, a hybrid network, or any other application environment that uses application protocols, such as HTTP, HTTPS, file transfer protocol (FTP), IMAP, POP, simple object access protocol (SOAP), Web distributed authoring and versioning (WebDAV), web services, simple mail transfer protocol (SMTP), structured hypertext transfer protocol (STTP), wireless application protocol (WAP), web-mail protocols, and any other suitable protocol known to those of skill in the art. Further, the subject matter disclosed herein can be practiced in any type of communication system where information is exchanged between a web application and a web-enabled device.

The subject matter disclosed herein can monitor web activity and detect and alert an operator to suspicious activity of one or more application clients or users or a web-enabled device. The activity can be potentially harmful or unauthorized use of one or more web applications, a shared web application, or a distributed application or a request for the application to execute out of the intended scope of operation. A security method and system according to an embodiment of the subject matter disclosed herein can implement one or more security detection techniques for alerting an operator to potentially illegal or harmful communication or activity from a web application user or client. The security detection techniques can be implemented by detectors, either operating alone or in combination, comprising one or more security processes. On being alerted to the potentially harmful or unauthorized use, the operator can take measures to protect the web application. Thereby, preventing such applications from harming themselves, data files, buffers, other applications, server performance, or confidentiality of information. The detectors can also associate the suspicious activity with a particular object, such as a computer, IP address, web user and/or session, application, or server.

According to one embodiment, the security method and system can associate the potentially illegal or harmful communication or activity with a particular user session established between a server application and a client. A user session can refer to the session of activity that a client spends accessing a server application during a specified period of time. According to one embodiment, a user session can refer to a delimited set of user clicks across one or more web servers.

According to another embodiment, user sessions can be created with the exchange of HTTP requests and responses between a client and server application. An HTTP server can respond to each client request without relating that request to previous or subsequent requests. This, technique allows clients and servers that are operable for exchanging state information to place HTTP requests and responses within a larger context, which we term a "session". This context might be used to create, for example, a "shopping cart", in which client selections can be aggregated before purchase, or a magazine browsing system, in which a client's previous reading affects which offerings are presented. Sessions can have a beginning and an end. Sessions can be relatively short-lived. A client and/or server application can terminate a session. Data identifying the session can be included in the exchange of communication data.

According to one embodiment, the security method and system can associate the potentially illegal or harmful communication or activity with a particular login session established between a server application and a client. A login session can refer to a user session where the server application has been provided at least a user name and password. The user name can refer to the label identifying client or its operator. The password can refer to the secret series of characters that authenticate the operator or application of the client as the client or operator specified by the user name. The password can enable the client or operator to access a file, computer, or program associated with the server application. Typically, the password can be up to 127 characters in length and is case-sensitive.

I. Security System

According to one embodiment, a security system for monitoring a web application and detecting and alerting an application operator to suspicious activity of a web application user is positioned between a web user (or web-enabled device) and a web server comprising one or more web applications. The security system can receive network traffic transmitted between the web user and the web server for security analysis. The security system can associate active user sessions and login sessions with the network traffic. The security system can also apply one or more detectors to the received network traffic to analyze predetermined activity and generate a security threat score for the predetermined activity by comparing the analyzed predetermined activity with a security threshold criteria. Further, the security system can determine whether or not to generate an alert based upon the threat score associated with the detector. According to one embodiment, the security system can monitor network traffic and generate alerts in real-time.

Figure 1B:
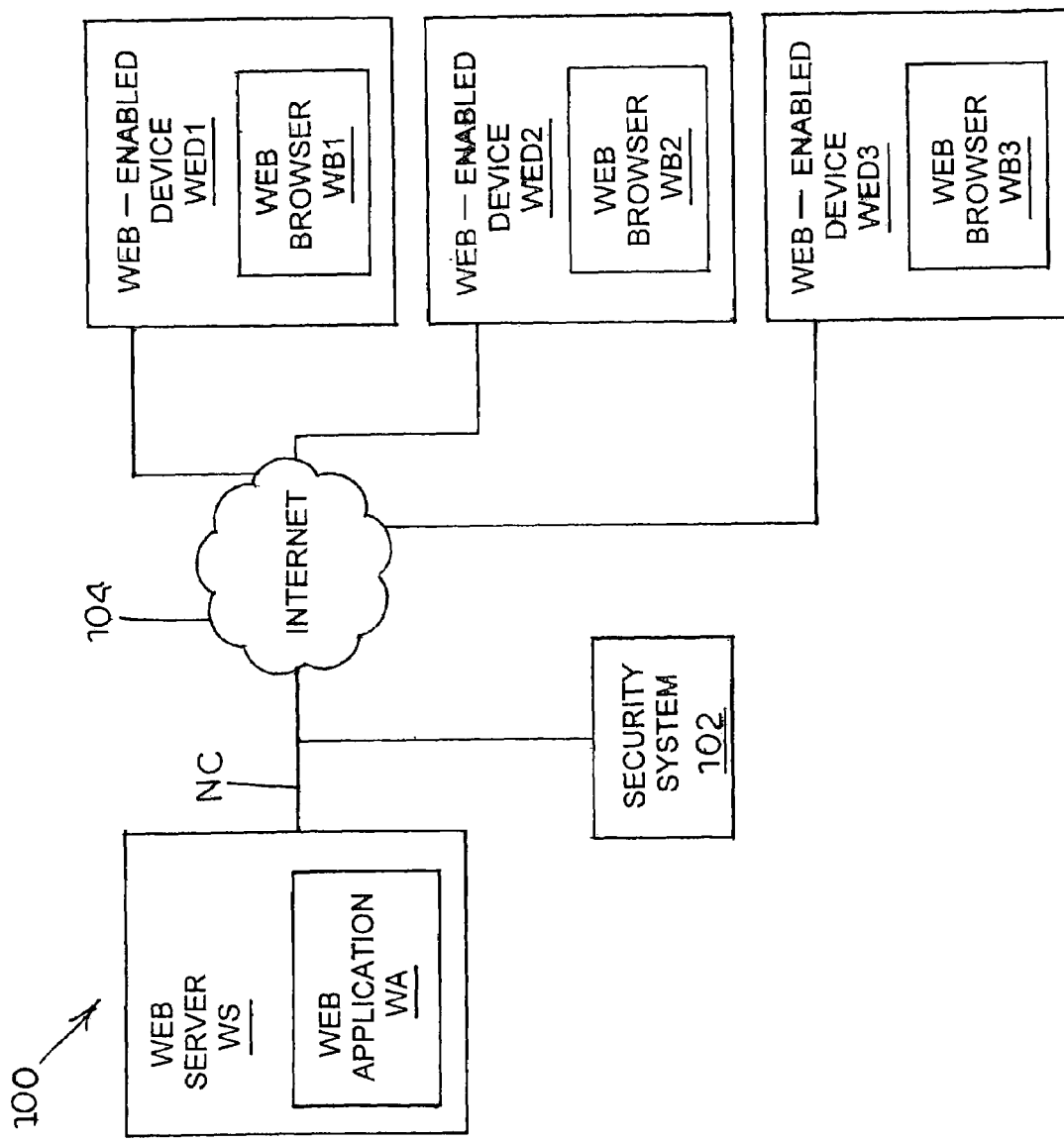
FIG. 1B is a schematic diagram of a network including a security system for monitoring a web application.

FIGS. 1A and 1B illustrate schematic diagrams of exemplary networks including a security system for monitoring a server application. Referring specifically to FIG. 1A, a schematic diagram of a communications network, generally designated 100, including a security system 102 for monitoring a server application SA. Security system 102 can monitor network traffic transmitted between server application SA and clients C1, C2, and C3. Server application SA and client C1, C2, and C3 can communication via a communication network CN.

Server S can comprise any suitable dedicated or shared server operable to implement server application SA for access by clients C1, C2, and C3. Clients C1, C2 and C3 can include network-enabled devices, such as a computer including a web browser, a mobile telephone, or a computer including programmed code for communicating with server application SA. Clients C1, C2, and C3 can include a client application CA operable to request and receive files or documents made available by server S. Client application CA can also cause server S to perform tasks that are undesired by the server operator.

FIG. 1B illustrates a schematic diagram of a network, generally designated 100, including a security system 102 for monitoring a web application WA. Network 100 can include a network connection NC and the Internet 104 for transmitting network traffic between a web server WS and one or more clients or web-enabled devices, such as web-enabled devices WED1, WED2, and WED3. A web-enabled device is also known as a client. According to one embodiment, security system 102 can transparently monitor network traffic transmitted between web application WA and web-enabled devices WED1, WED2, and WED3, i.e., without affecting the normal flow of network traffic. Web server WS can comprise any suitable dedicated or shared server operable to implement web application WA for access by web-enabled devices WED1, WED2, and WED3. Security system 102 can collect network traffic and reassemble the network traffic into package content provider (PCP) streams.

Security system 102 can also decrypt SSL traffic; understand HTTP connections; and parse a computer language or a mark-up language such as HTML, WML, or XML. Hyper Text Transfer Protocol (HTTP) is an example of an application-layer communications protocol for operating on top of TCP and underlies the World-Wide-Web. HTTP can provide a mechanism for clients to make requests of servers for named content, and for servers to deliver the requested content to clients. HTTP protocol is a stateless, request-response protocol that is well suited for delivering files and other content across the Internet. Hyper Text Markup Language (HTML) is an example document formatting language that allows documents comprised of text, images, tables, forms, other graphical objects, and interactive scripts to be described and displayed in a consistent manner on a wide variety of devices and computer systems. One principal use for HTTP in the world-wide-web is to deliver a mark-up language, such as HTML, based content from application servers to clients.

Web application WA can comprise resources, such as a mark-up language, graphics files, audio files, video files, web server software, common gateway interface ("CGI") scripts, Perl scripts, database information, or any other suitable type of information resource or executable program. Web application WA can be identified by URLs that identify web server WS and the pathname by which a file or resource can be accessed. An application path represents an application's resource location to execute a specific application task or command. According to one embodiment, web application WA can be implemented on a single server, or distributed throughout multiple servers. Web server WS can communicate various web application resources and administrative data, referred to herein as HTTP server responses, to web-enabled devices WED1, WED2, and WED3.

Web server WS and web-enabled devices WED1, WED2, and WED3 can be connected together in any suitable network. In this embodiment, web server WS and web-enabled devices WED1, WED2, and WED3 are connected together via the Internet 104 and network connection NC. Security system 102 can tap into network connection NC for receiving network traffic communicated between web server WS and web-enabled devices WED1, WED2, and WED3. Network traffic received by security system 102 can consist of IP packets for various protocols and services. Security system 102 must filter these packets and understand them in order to recover the desired HTTP conversations for monitoring.

Each web-enabled device WED1, WED2, and WED3 can include a unique Internet protocol (IP) address and web browsers WB1, WB2, and WB3, respectively, for communicating with web application WA. Web browsers WB1, WB2, and WB3 can comprise a software application operable to locate and display web pages made available by web application WA. Additionally, one or more clients can be configured to implement an attack on web server WS. Web-enabled devices WED1, WED2, and WED3 can transmit data packets over the Internet 104 and network connection NC to web server WS. The data packets can be in HTTP, WAP, or SMTP format and include a command and request to be performed by web server WS. For example, the commands and requests can direct web server WS to retrieve and transmit a particular web page or file.

Network connection NC can be a transmission path in one or more networks, such as a global area network (e.g., the Internet), wide area networks, local area networks, or wireless networks, through which data can be communicated between web server WS and one of web-enabled devices WED1, WED2, and WED3. Data can be communicated between web server WS and one of web-enabled devices WED1, WED2, and WED3 via HTTP over Transmission Control Protocol/Internet Protocol (TCP/IP), suite of communications protocols used to connect computers and servers on the Internet. According to one embodiment, all of the received packets are IP packets. Some of those IP packets represent traffic for TCP connections. Some of the TCP connections represent HTTP protocols monitored by security system 102.

Figure 2:
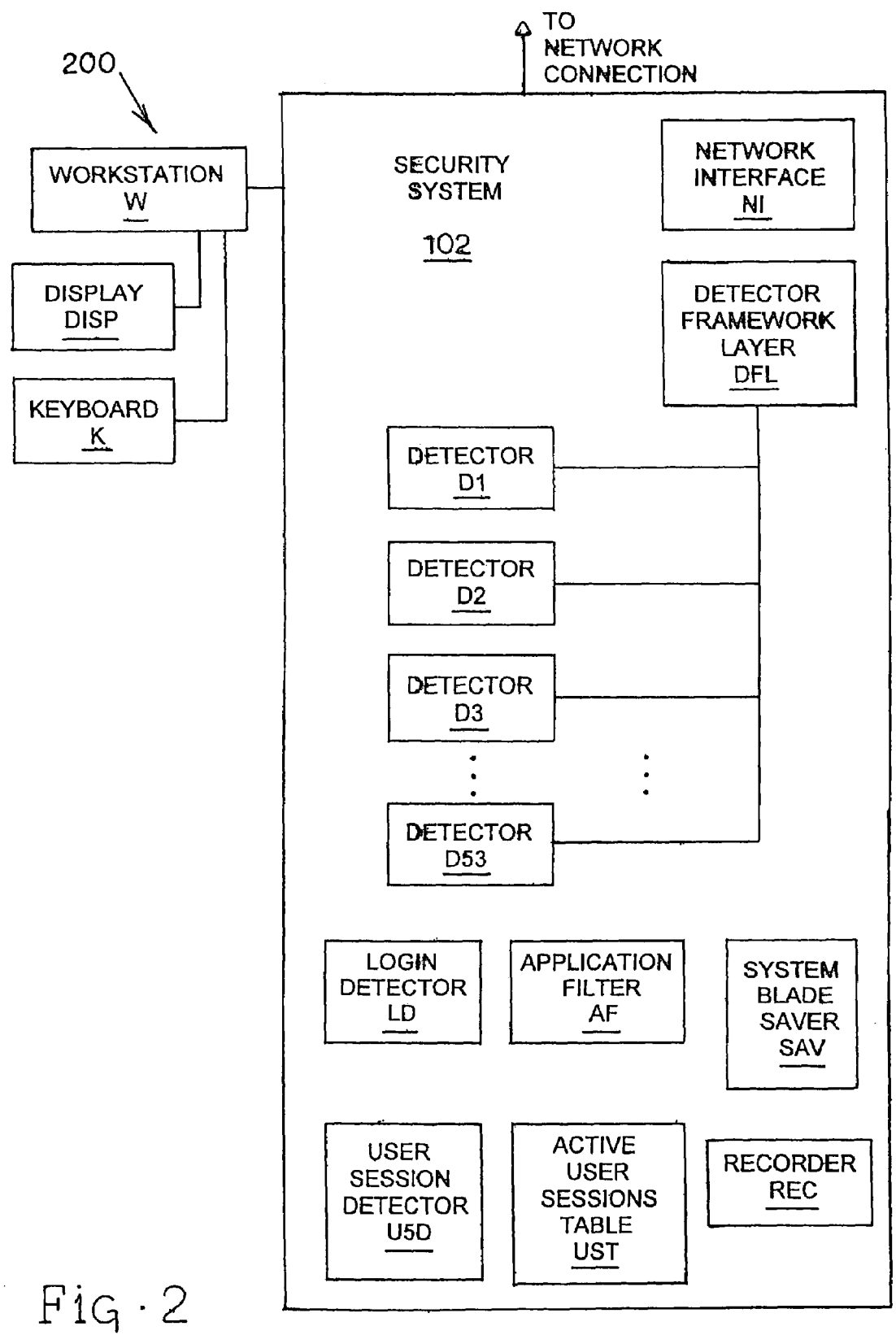
FIG. 2 is a schematic diagram of a security system according to one embodiment.

Referring to FIG. 2, a schematic diagram of security system 102 according to one embodiment is illustrated. Security system 102 can comprise a server computer connected to network connection NC and operable to receive network traffic communicated between web server WS and web-enabled devices WED1, WED2, and WED3. According to one embodiment, security system 102 is a computer server based on PC architecture and includes a central processing unit (CPU), such as the INTEL® XEON™ processor available from Intel Corporation of Santa Clara, Calif. Security system 102 can also include one or more memory components, such as random access memory (RAM) and a hard disk.

Security system 102 can include a network packet monitoring network interface NI operable to seamlessly and transparently receive and store network traffic communicated between web server WS and web-enabled devices WED1, WED2, and WED3. Network interface NI can include two 10/100/1000 Base-TX Ethernet network ports. According to one embodiment, security system 102 can also include management interfaces comprising a 10/100 Base-TX Ethernet port and a RS-232C serial interface port.

According to one embodiment, the components of security system 102 can be implemented in hardware, software, or a combination of hardware and software. For example, the components of security system 102 described herein can comprise computer program products comprising computer-executable instructions embodied in computer-readable media having instructions for performing the steps illustrated in each of the flow charts described herein, implementing the components of security system 102, or generating the screen displays described herein.

According to one embodiment, security system 102 can reassemble the network traffic received from network interface NI into one or more TCP data streams, including accounting for fragmented packets, out-of-order packets, retransmitted packets, and VLAN tagged packets. Security system 102 can include a detector framework layer DFL for parsing the data streams for information needed by one or more detectors D1-D53. Detectors D1-D53 can detect and alert an operator of web server WS or server S (FIGS. 1A and 1B, respectively) to suspicious activity of one or more web application users or clients of devices WED1, WED2, and WED3 that can indicate potentially harmful or unauthorized use of one or more web applications, a shared web application, or a distributed application from being requested to execute out of the intended scope of operation web application. Based on the parsed information, detectors D1-D53 can recognize and analyze a predetermined activity associated with web server WS and web-enabled devices WED1, WED2, and WED3. Detectors D1-D53 can each detect different types of network activity, application activity, or threats of potential interest to the operator. Detectors D1-D53 can also associate a detected activity or threat with particular user sessions and/or login sessions. Additionally, detectors D1-D53 can associate a detected activity or threat with an object such as an IP address, a client application, or URL.

Some of detectors D1-D53 can compare current activity for a web user or session to an observed behavior to determine whether the current activity deviates a predetermined amount from the observed behavior. Further, some of detectors D1-D53 can compare activity associated with an object, such as an IP address or a client application, to observed behavior to determine whether the current activity deviates from a predetermined amount from the observed behavior. Other detectors D1-D53 can compare current activity for a web user (or client) or session to a predetermined value to determine whether the current activity deviates a predetermined amount from the predetermined value. If the current activity deviates the predetermined amount, the associated detectors D1-D53 can trigger for generating a threat score. Threat scores can be associated with a page, an IP address, a user, user session and/or login session for alerting the operator to potential threats to web application WA or server application SA (FIGS. 1A and 1B, respectively). Exemplary embodiments and implementations of detectors D1-D53 are described in further detail herein.

Security system 102 can also be connected to a workstation W or computer comprising user interfaces, such as a display DISP and a keyboard K, for interfacing with an operator. Display DISP can provide various screen displays for indicating potential security threats, configuring system 102, and analyzing received network traffic. Keyboard K can receive operator input. Security system 102 can also include other suitable interface devices such as a printer or mouse.

Security system 102 can include one or more internal components, or system blades, arranged in a stack based on the order that they are executed. The order of execution can be determined dynamically by the relative priority assigned to each blade definition. The blade definition is an extensible mark-up language (XML) deployment descriptor that allows blades to be dynamically deployed into system 102. These priorities can account for dependencies among the blades. Blades can implement several APIs that are executed at certain times as security system 102 monitors network traffic. The callbacks or API functions can include a RequestListener, a ResponseListener, a TxnListener, a LoginListener, a SessionListener, a ThreatListener, and a TimerListener. The RequestListener can be called when security system 102 fully reads each incoming HTTP client request, but before the associated response from web server WS has been seen. The blade is provided all of the information from the HTTP client request. The ResponseListener can be called before the entire HTTP response has been received. The blade is provided all of the information from the client request and server response. The TxnListener can be called when security system 102 fully reads each outgoing HTTP server response, including the full content of the response. The blade is provided all of the information from the client request and the server response and can examine the content of the response. The LoginListener can be called whenever a user logs into the application or logs off. The SessionListener can be called when a session is created or destroyed. The ThreatListener can be called when any blade generates a security event. The TimerListener can be called periodically at intervals specified by the blade.

Figure 3A:
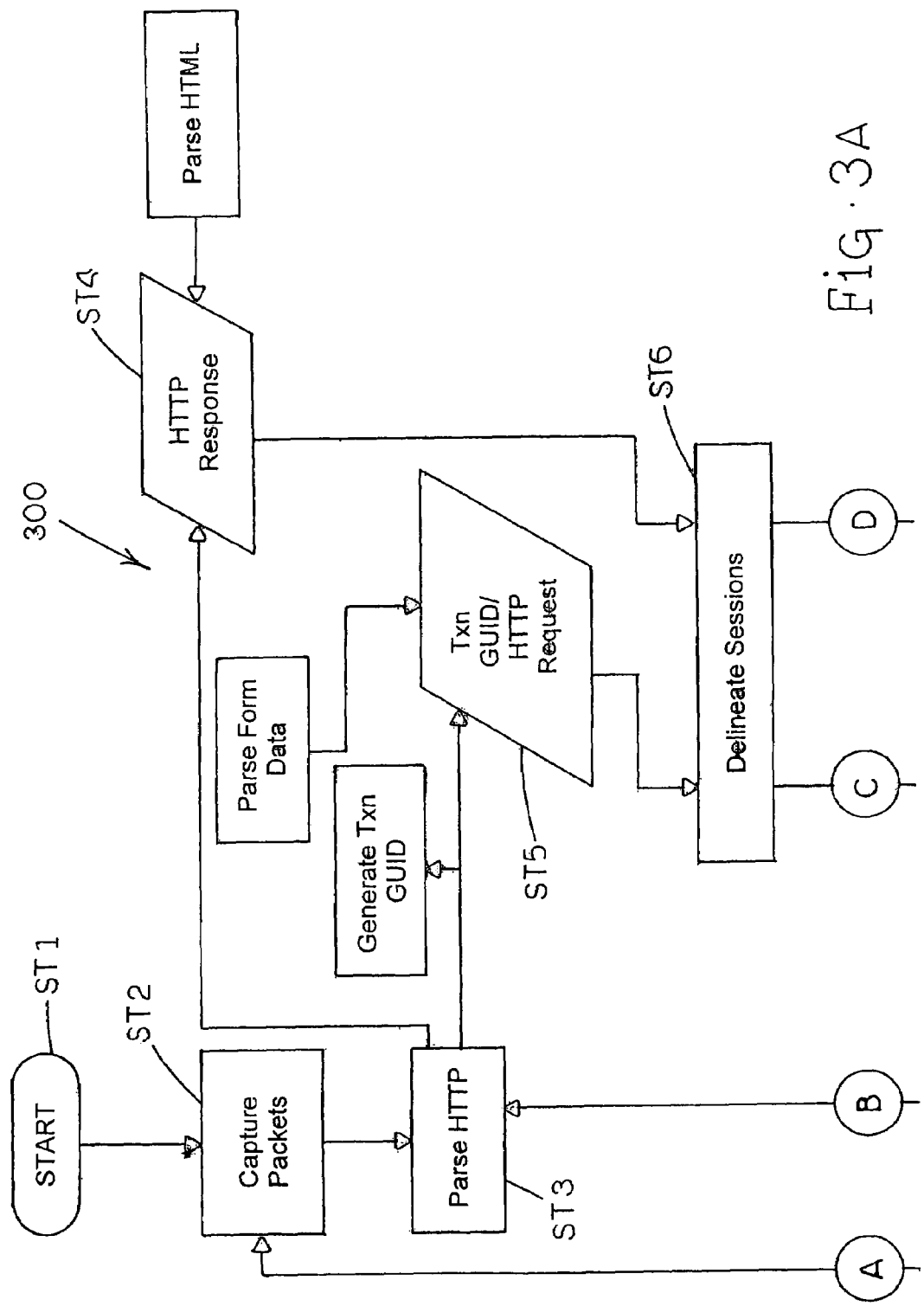
FIG. 3 is a flow chart which illustrates an exemplary process for executing the blades of a security system.
Figure 3B:
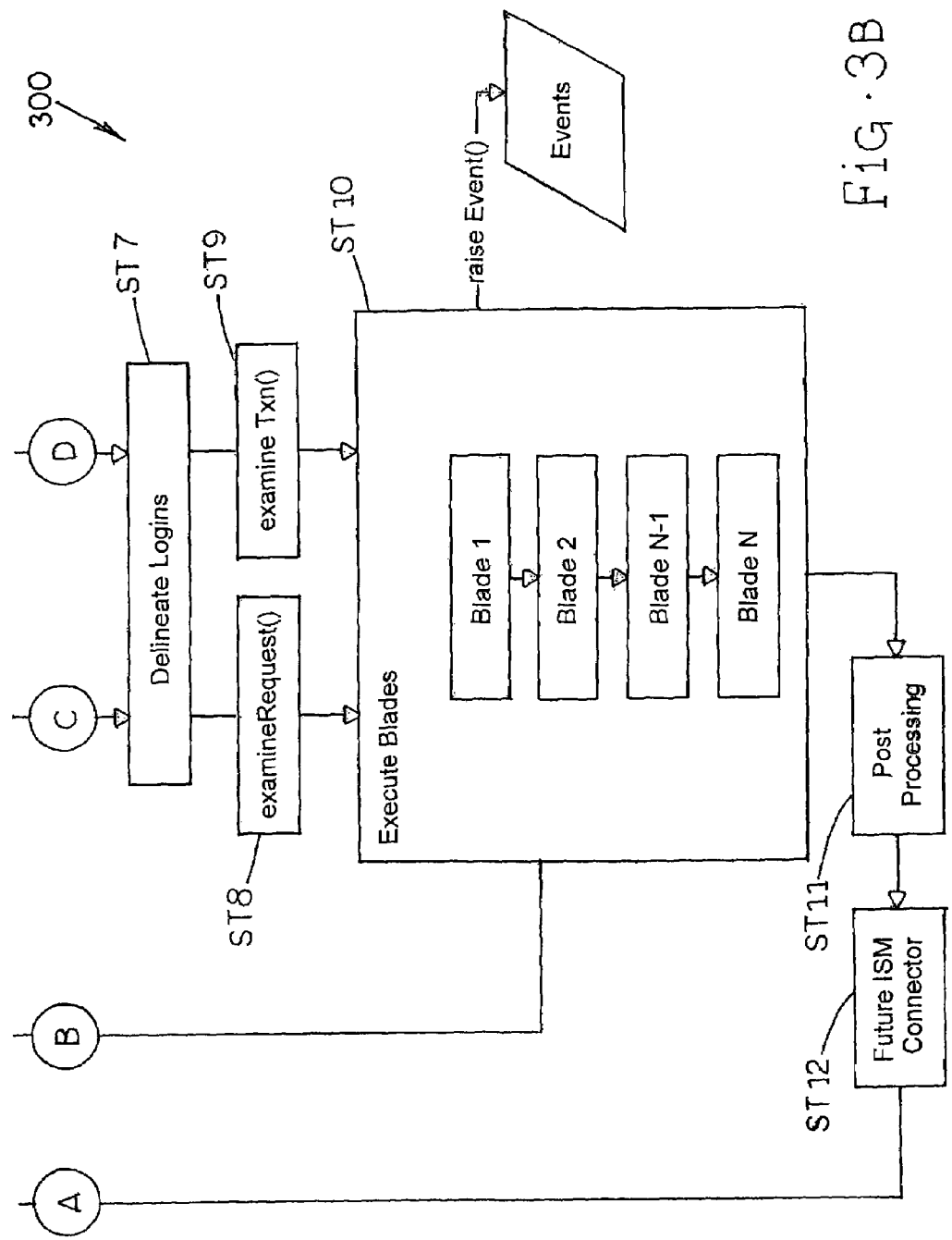

Referring to FIG. 3, a flow chart, generally designated 300, is provided which illustrates an exemplary process for executing the blades of security system 102 (FIGS. 1A, 1B, and 2). The process can begin at step ST1. Next, security system 102 can capture packets from network connection NC or communication network CN (FIGS. 1A and 1B, respectively) (step ST2). Security system 102 can assemble packets into an HTTP message and then further parse the message (step ST3). The process proceeds to step ST4 for handling HTTP responses and step ST5 for handling HTTP requests.

Referring to step ST4, the HTTP message can be parsed for HTML. Next, the process can proceed to step ST6. Referring to step ST5, the HTTP request can be parsed for form data and generate a transaction globally-unique-identifier (Txn GUID). A Txn GUID is generated for each transaction observed. This can allow any security event that is generated to refer specifically and un-ambiguously to the transaction that caused the alert (If applicable for that detector). During operation, this can allow the operator to view the specific transaction(s) associated with the threat.

Next, the process can proceed to step ST6. Referring to step ST6 of FIG. 3, sessions can be delineated with user session detector USD (FIG. 2). Logins can also be delineated with login detector LD (FIG. 2) (step ST7). Subsequently, examineRequest( ) and examineTxn( ) can be executed (steps ST8 and ST9, respectively). The detectors provide an implementation of the functions examineReques( ) and examineTxn( ). At the appropriate time, the framework can execute these functions, passing in all of the relevant parameters about the HTTP request or transaction. Thus, this step can be described as the "point of contact" between the framework and the detectors, or in other words it is the mechanism by which the framework communicates these high-level events (i.e. "a request has been made," or "a transaction has been completed") to the detectors which are authored and developed outside the framework itself. Next, the process can proceed to step ST10. Referring to step ST10 of FIG. 3, the blades can be executed in sequence. Additionally, raiseEvent( ) can be executed. The raiseEvent( ) API is provided by the framework for use by detectors to actually generate security events. Thus, the detectors may operate in various and unique ways to determine that a threat exists, but they use a common method to convey this determination to the framework, which then can take responsibility for storing, organizing, and displaying the security events to an operator in a consistent manner.

Next, security system 102 (FIGS. 1 and 2) can execute post processing procedures (step ST11). Step ST11 can refer to 1) storing a record of the transaction in a database and 2) taking any threats generated by the transaction and assigning the resulting threat score to the appropriate objects in the system. For example, if detector "X" determines that the current transaction represents an SQL-injection attempt and assigns a threat score of 100 to that threat, this post-processing step can (1) add 100 to the threat score of the user associated with the transaction, and (2) add 100 to the vulnerability score of the web page of the targeted transaction. Next, the ISM connector can provide a bridge between security system 102 and the ISM. This bridge can be a network connection between the products by which security system 102 communicates all activity to the ISM for additional analysis. Activity can refer to everything security system 102 is seeing or calculating: transactions, threats, users, pages, statistics, and scores. The process can then return to step ST2.

Figure 4A:
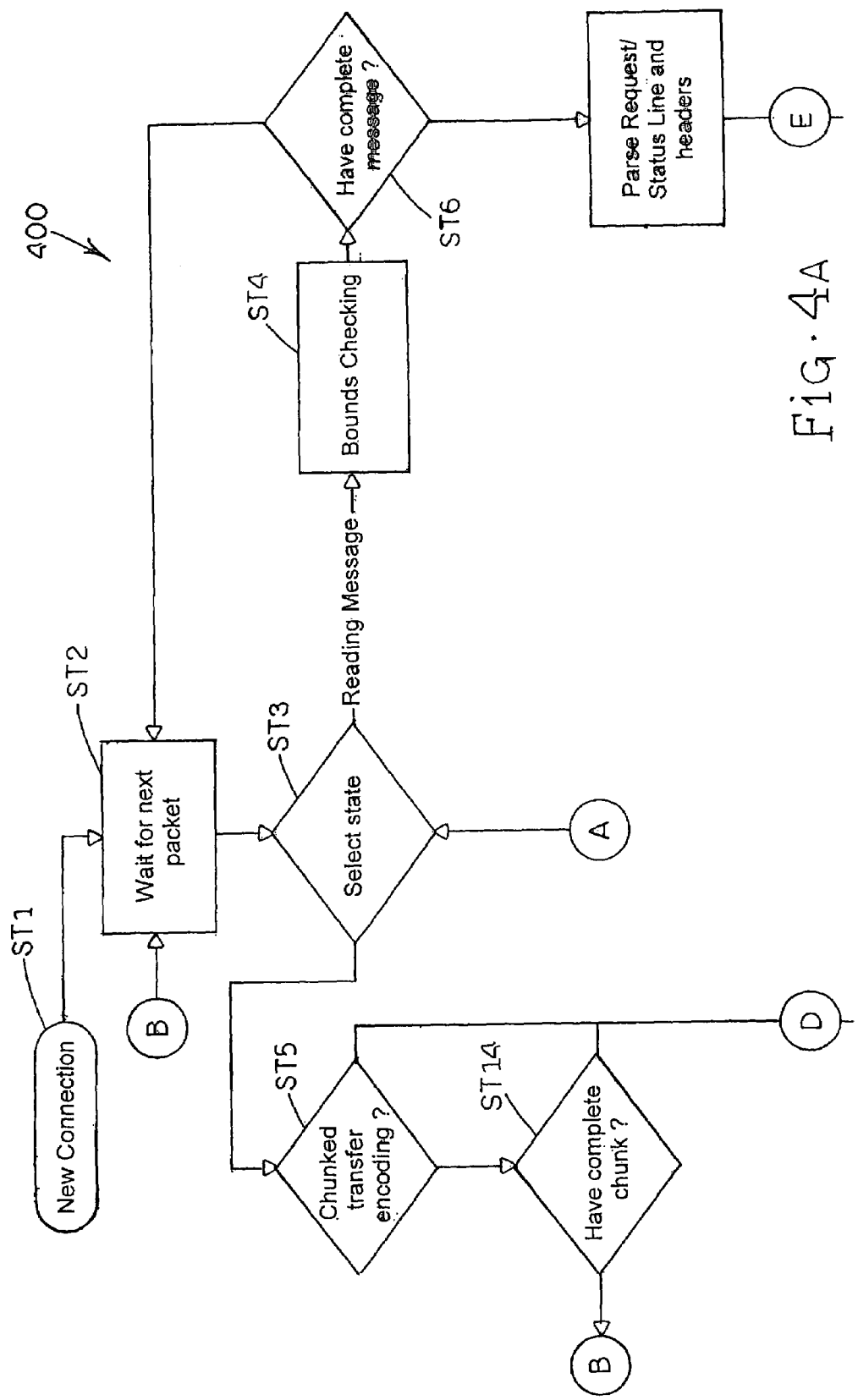
FIG. 4 is a flow chart which illustrates an exemplary process for parsing packets into HTTP requests and responses.
Figure 4B:
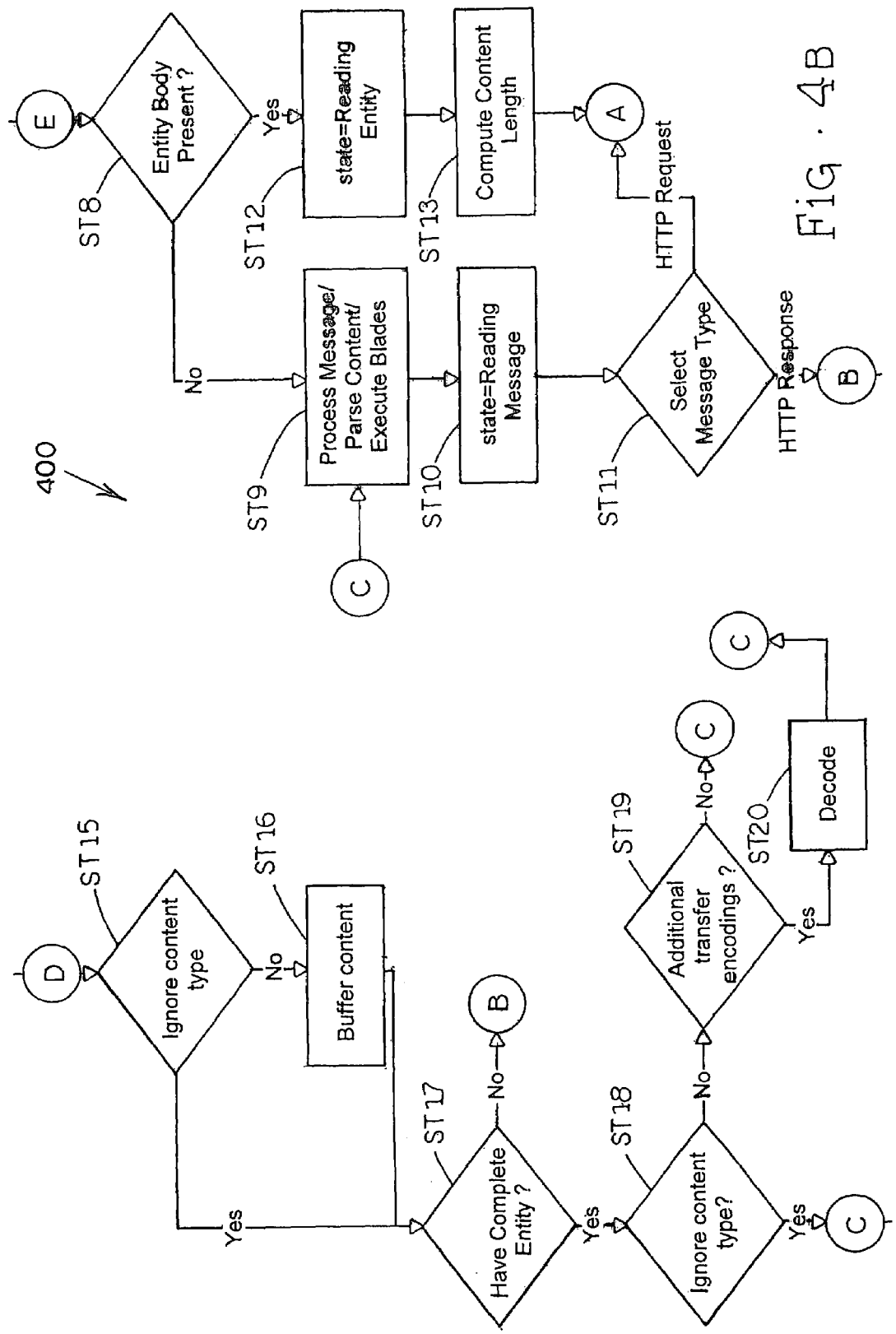

Referring to FIG. 4, a flow chart, generally designated 400, is provided which illustrates an exemplary process for parsing packets into HTTP requests and responses. The process can start at step ST1. At step ST1, received packets can be suitably reassembled and decrypted by the network layer. A separate parser for each active TCP connection can be maintained.

Referring to step ST2 of FIG. 4, security system 102 (FIGS. 1 and 2) can "listen" for packets in either direction (i.e., client-to-server and server-to-client) on an established TCP connection. Next, at step ST3, as each packet is received, a current state of the parser can be determined. The states can include reading an HTTP message ("Reading Message") or reading an HTTP entity ("Reading Entity"). If the state is "Reading Message", the process can proceed to step ST4. Otherwise, if the state is "Reading Entity", the process can proceed to step ST5.

Referring to step ST4, bounds checks can be performed. Bounds checks can include buffer overflow checks on the request-URI, message headers, and total message of the HTTP message. Next, the process can proceed to step ST6.

Referring to step ST6 of FIG. 4, a parser can determine whether a complete HTTP message has been received. A complete message can be all data, including HTTP headers. If a complete HTTP message has not been received, the process can return to step ST2 to wait for the next packet on the connection. Otherwise, if a complete HTTP message has been received, the HTTP request line or HTTP status line of the HTTP message can be parsed depending on whether the message is a client response or server response (step ST7). Additionally, all HTTP headers included in the message can be parsed. Next, the process can proceed to step ST8.

Referring to step ST8 of FIG. 4, it can be determined whether an entity body is present in the HTTP message. If the entity body is not present, the message can be processed (step ST9). Processing can include executing the system blades (described herein) and parsing the content of the HTTP message. The state of the parser can be set to "Reading Message" (step ST10). Next, at step ST11, it can be determined whether the next HTTP request message is available. If the next HTTP request message is available, the process can proceed to step ST3. Otherwise, if the next HTTP request message is not available, the process can wait at step ST2.

Referring again to step ST8, if the entity body is present, the process can proceed to step ST12. The state of the parser can be set to "Reading Entity" (step ST12). Next, the length of the included content can be calculated (step ST13). Alternatively, at step ST13, it can be determined that the HTTP message is HTTP/1.1 chunked-encoded. Next, the process can proceed to step ST3.

Referring again to step ST3 of FIG. 4, if the state of the parser is "Reading Entity", the process can proceed to step ST5. At step ST5, it can be determined whether the entity is HTTP/1.1 chunked-encoded. If the entity is HTTP/1.1 chunked-encoded, it can be determined whether a complete chunk is available (step ST14). If a complete chunk is not available, the process can loop back to step ST2 until a complete chunk is available. If it is determined that a complete chunk is available (step ST14) or the entity is not HTTP/1.1 chunked-encoded, the process can proceed to step ST15.

Referring to step ST15 of FIG. 4, it can be determined whether the entity is held in a memory based on the HTTP content-type of the entity. Entities subject to further analysis can be held in the memory. The entities subject to further analysis and held in the memory can include HTML text and XML text (step ST16). Next, the process proceeds to step ST17.

Referring to step ST17 of FIG. 4, it can be determined whether all of the entity has been received based on the content length of the entity and other suitable HTTP message parameters. If all of the entity has not been received, the process can proceed to step ST2 to wait for more of the message. Otherwise, if all of the entity has been received, the process can proceed to step ST18.

Referring to step ST18 of FIG. 4, it can be determined whether the entity is being buffered in memory. If the entity is being buffered in the memory, the process can perform a check to determine whether the buffered entity has been encoded (step ST19). If the buffered entity has been encoded, the entity can be decoded (step ST20) so it can be processed. The function of this step can support HTTP messages in which the entity has been compressed or otherwise encoded for transfer. Next, the process can proceed to step ST9. If the buffered entity has not been encoded, the process can proceed to step ST9.

According to one embodiment, the blades of security system 102 can include an application filter AF, system blade saver SAV, a node or web page mapper detector MD, and a recorder REC. Application filter AF can filter out HTTP requests that are not part of the monitored web application. Thus, application filter AF can receive data on network connection NC and discard any received data packets that are not of interest.

Figure 5A:
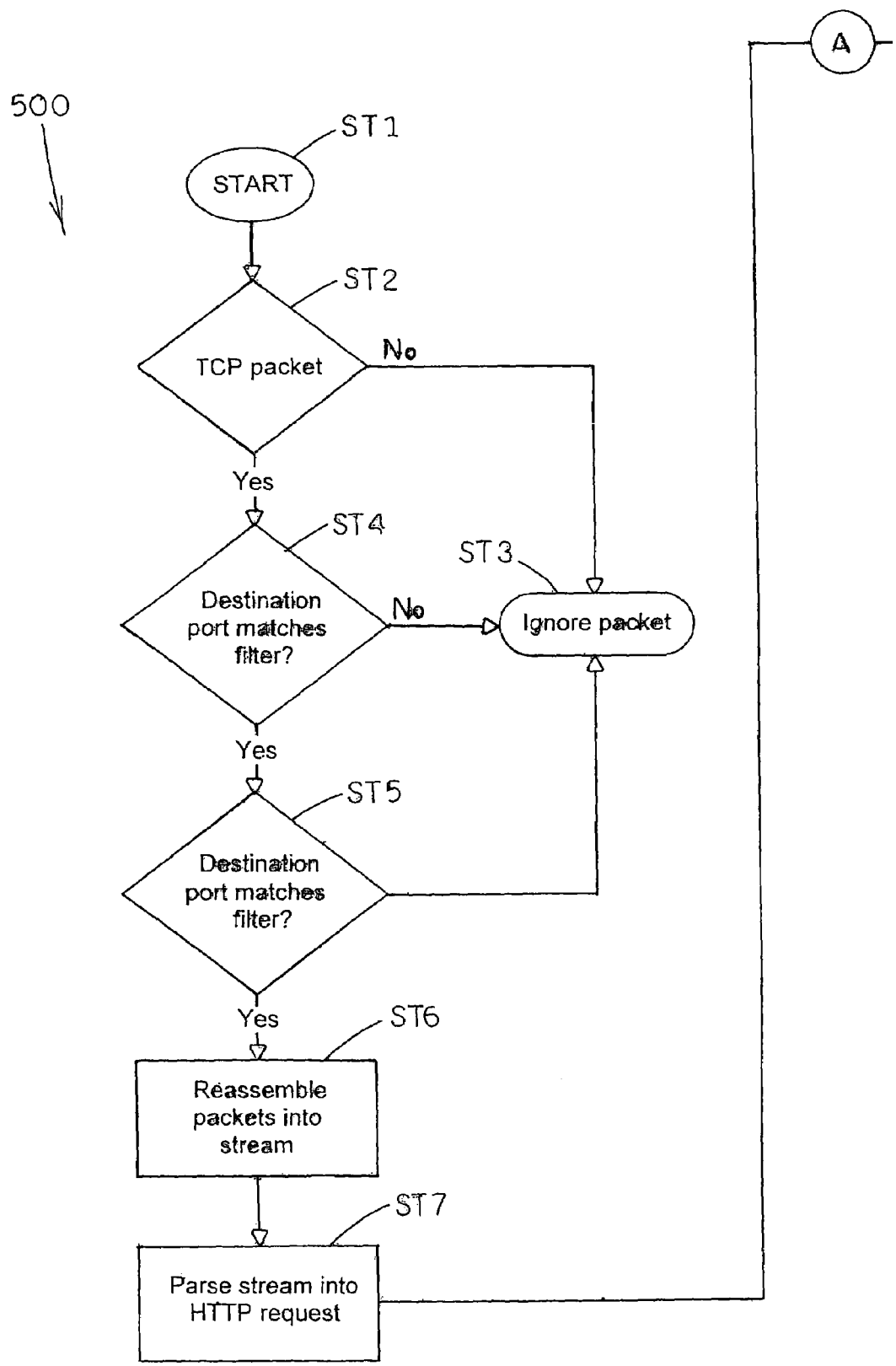
FIG. 5 is a flow chart which illustrates an exemplary process for filtering incoming packets.
Figure 5B:
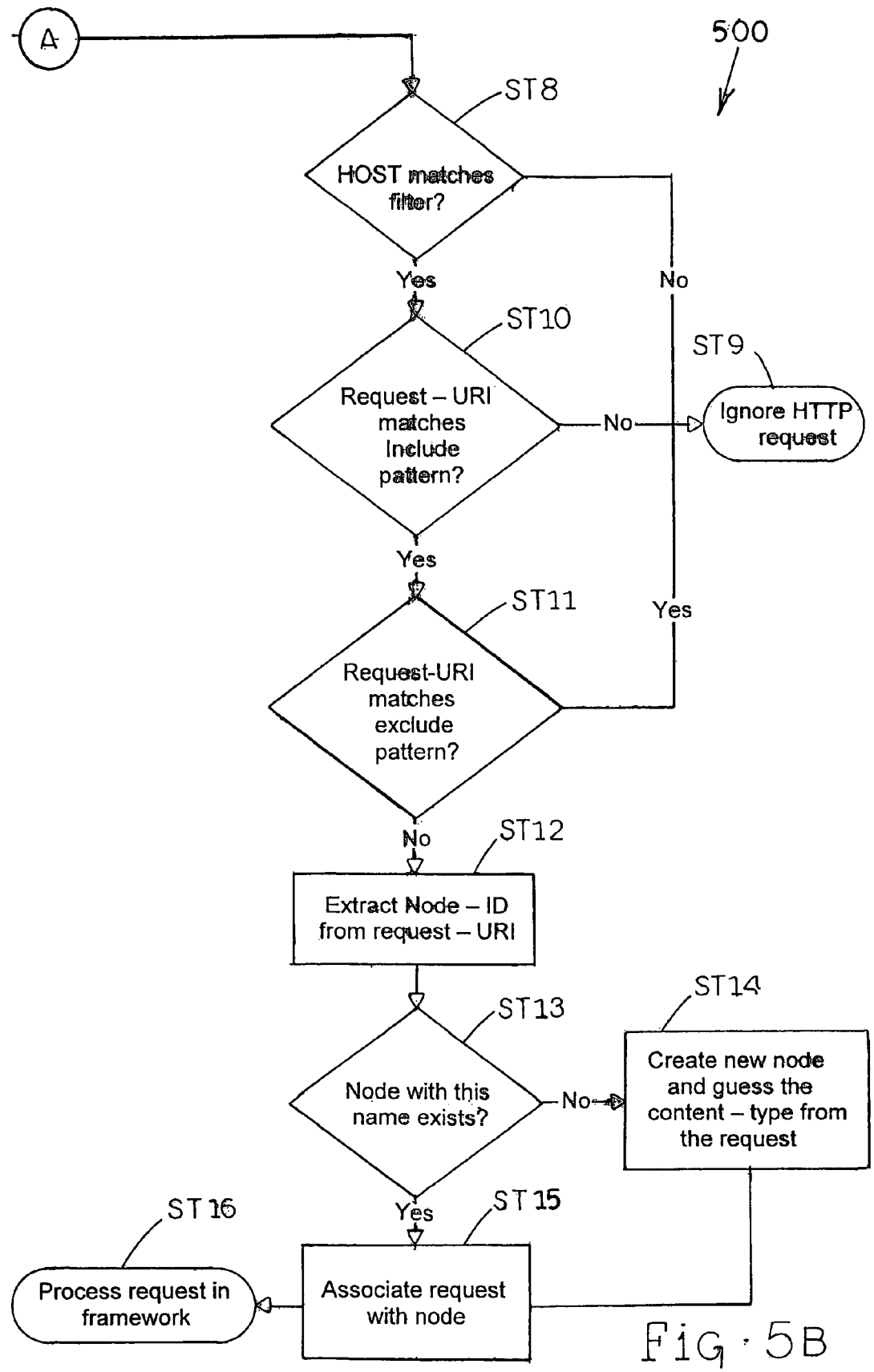

Referring to FIG. 5, a flow chart, generally designated 500, is provided which illustrates an exemplary process for filtering incoming packets. The exemplary process of flow chart 500 can be implemented by application filter AF. The process can begin at step ST1. At step ST2, application filter AF (FIG. 2) can determine whether the packet is a TCP packet. If the packet is not a TCP packet, the packet can be ignored (step ST3). Otherwise, the process proceeds to step ST4.

At step ST4, application filter AF (FIG. 2) can determine whether the destination IP address of the packet matches the filter address of the monitored web application. If the destination IP address does not match, the packet can be ignored (step ST3). Otherwise, the process proceeds to step ST5.

At step ST5, application filter AF (FIG. 2) can determine whether the destination port of the packet matches the filter port of the monitored web application. If the destination port does not match, the packet can be ignored (step ST3). Otherwise, the process proceeds to step ST6.

At step ST6, the HTTP request packet can be reassembled into the PCP stream. Next, the PCP stream can be parsed into HTTP requests (step ST7).

Next, application filter AF can determine whether the host field of the HTTP request matches the filter (step ST8). If the host field does not match, the HTTP request can be ignored (step ST9). Otherwise, the process can proceed to step ST10. At step ST10, application filter AF can determine whether the request-URI matches include pattern. If the request-URI matches does not include the pattern, the HTTP request can be ignored (step ST9). A single web server may be virtually hosting multiple applications, only one of which security system 102 is configured to monitor. These additionally cannot be filtered out at the TCP/IP layer. This step functions to eliminate traffic from application that it is not desired to monitor.

For example, the Host header supplied by HTTP/1.1 clients indicates the domain name of the intended application and supports virtual hosting of multiple applications on a single web server. If the value of this Host header does not match the domain names, the request can be ignored. Application filter AF can examine the URI of the HTTP request. In this case there are two lists, allowing the operator two choices of how to configure application filter AF. The first is an include list, meaning if the request URI matches the include pattern, the request is accepted. The second is an exclude list, meaning if the request URI matches the pattern, application filter AF can ignore the request. Otherwise, the process can proceed to step ST11.

At step ST11, application filter AF can determine whether the request-URI matches exclude pattern. If the request-URI matches does not exclude the pattern, the HTTP request can be ignored (step ST9). Otherwise, the process can proceed to step ST12. The node-ID can be extracted from the URI of the HTTP request (step ST12). Next, application filter AF can determine whether a node or web page with this name exists (step ST13). If a node with the name does not exist, a new node can be created and the content-type can be guessed from the request (step ST14). Initially, security system 102 does not have information about the monitored application. The various unique "parts" of a web application are designated by different URLs within the application. This collection of URLs that make up the application is one of the things desirable to learn. Node refers to a distinct URL within the application.

There are two problems related to learning the distinct URLs (i.e. nodes) that make up an application. First, the total set of unique URLs in an application may map to a smaller set of actual nodes. Second, a small number of apparent unique URLs may in fact map to a larger set of distinct nodes in the application. The step shown in ST12 can perform these mappings. This allows security system 102 to provide an accurate assessment of what is happening in the application than if just the raw URLs seen in requests is recorded. Next, the process can proceed to step ST15.

If a node with the name does exist, the request can be associated with the node (step ST15). Next, the request can be further processed (step ST16). Further processing can include analysis by detectors D1-D53 (FIG. 2).

System blade saver SAV can periodically save any persistent blades. According to one embodiment, system blade saver SAV can save the information of other blades of security system 102 across multiple HTTP requests, sessions, logins, and users. The blades can store information whether security system 102 is rebooted or power-cycled. Each blade can indicate which of its data should be persistent and thus saved and restored by blade saver SAV when security system 102 is rebooted or power-cycled. Data not saved can be any data that is not associated with a user or web page.

Recorder REC can record at least a portion of the communications between web server WS and web-enabled devices WED1, WED2, and WED3. Recorder REC can store and retrieve information about each transaction in a persistent database.

Security system 102 can also include an active user sessions table UST for storing information regarding active user sessions established between web server WS and web-enabled devices WED1, WED2, and WED3. User sessions table UST can include a plurality of entries. Each entry can include a user name (if any associated with the session); session identifier (ID); client IP address; a security threat score associated with the session; start time for the session; number of requests during the session; web server associated with the session; threat count; threat score; and a method utilized by the client to authenticate (i.e., login).

II. User Session Detection

Security system 102 can include a user session detector USD for detecting user sessions established between web server WS and web-enabled devices WED1, WED2, and WED3. According to one embodiment, user session detector USD can associate received network traffic with a particular user session, such as an HTTP session. Therefore, user session detector USD can enable different traffic to be associated with different user sessions.

Figure 6A:
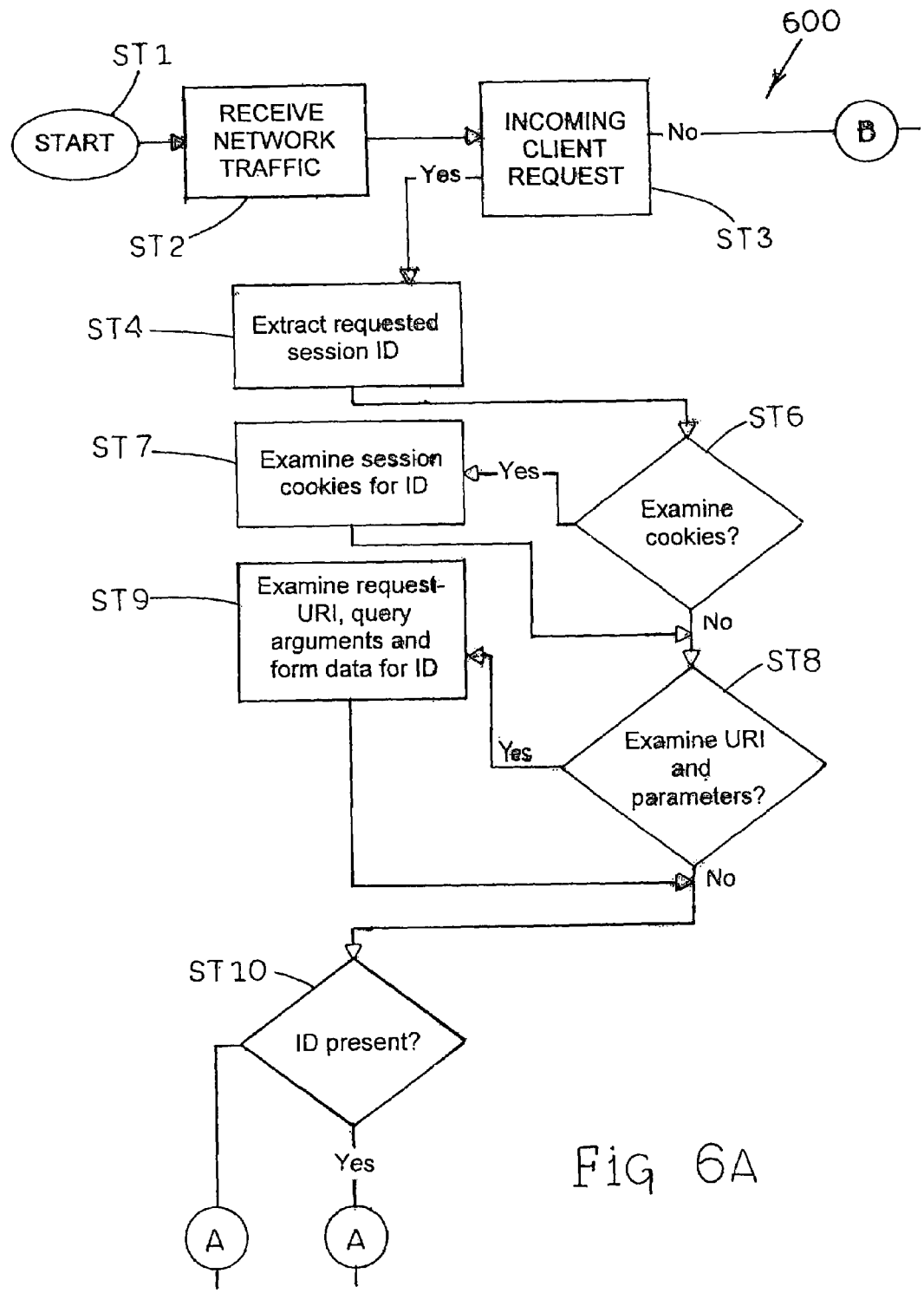
FIG. 6 is a flow chart which illustrates an exemplary process for associating received network traffic with user sessions established between a web server and one or more web-enabled devices.
Figure 6B:
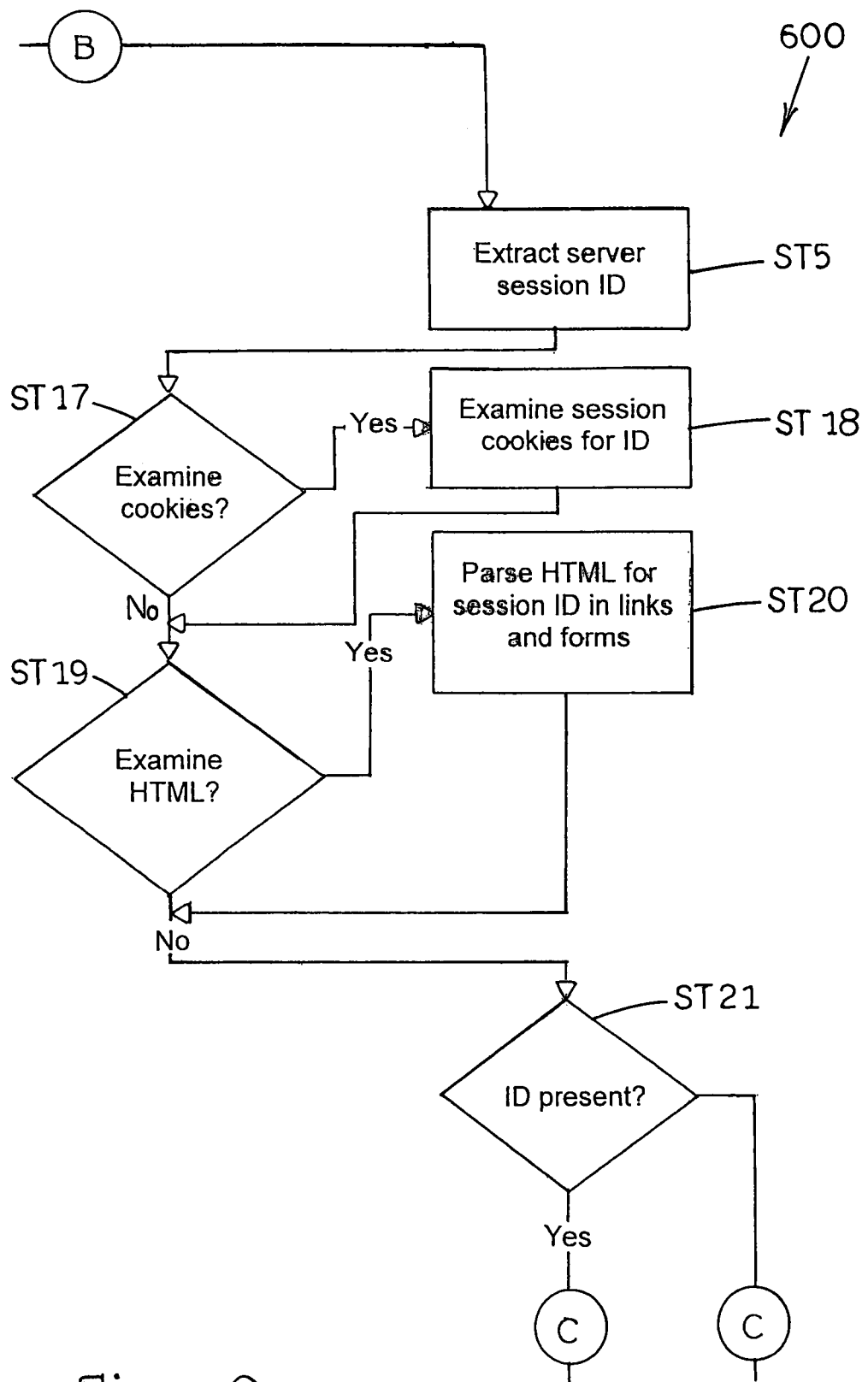
Figure 6C:
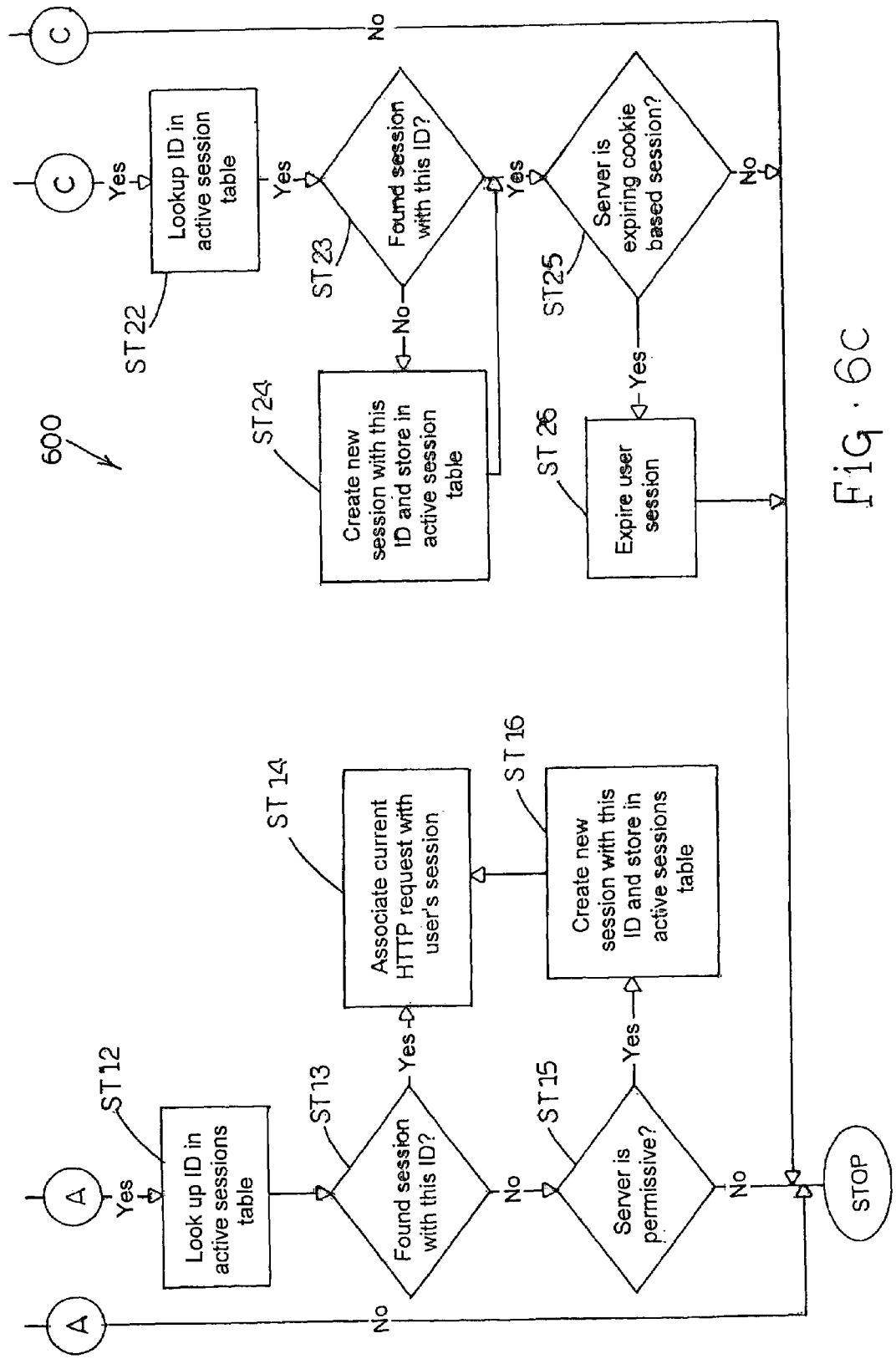

Referring to FIG. 6, a flow chart, generally designated 600, is provided which illustrates an exemplary process for associating received network traffic with user sessions established between a web server (such as web server WS or server S shown in FIGS. 1A and 1B, respectively) and one or more web-enabled devices (such as web-enabled devices WED1, WED2, and WED3). The exemplary process of flow chart 600 can be implemented by user session detector USD. The process can begin at step ST1. At step ST2, security system 102 (shown in FIGS. 1 and 2) can receive network traffic including client HTTP requests and outbound server HTTP responses.

Next, at step ST3, user session detector USD can determine whether the received network traffic is an incoming client HTTP request or an outbound server HTTP response. The direction of flow can be determined at the network layer, which notes the source and destination IP addresses of each packet, and can therefore can determine in which direction the packet is going (i.e., client-to-server, or server-to-client). The traffic in both directions is still HTTP traffic and is treated largely the same in terms of parsing. However, the distinction between direction can be important in some places because, for example, the server only sends HTTP responses while the client only sends HTTP requests. Incoming client HTTP requests can be network traffic originating from a client (such as clients C1, C2, and C3 shown in FIG. 1A and web-enabled device WED1, WED2, and WED3 shown in FIG. 1B) and transmitting to a server (such as server S shown in FIG. 1A and web server WS shown in FIG. 1B) for requesting a web page. Outbound server HTTP responses can be network traffic originating from the web server and transmitting to the web-enabled device for communicating web page data. If the received traffic is an incoming client HTTP request, the process proceeds to step ST4. In step ST4 and the steps that follow, the incoming HTTP client request can be examined to determine its associated user session. If the received traffic is an outbound server HTTP response, the process proceeds to step ST5. In step ST5 and the steps that follow, the outbound server HTTP response can be examined to determine its associated user session.

Step ST4 can include extracting the requested session ID from the received client HTTP request. In this case the entire contents of the HTTP request may be needed for determining the session ID the client is requesting. In some cases, only two items are needed: the Cookie headers provided in the request which generally contain the session ID; and the request-URI which can contain the session ID as either query arguments or as part of the path part of the request-URI. In some other cases, the session ID may be found in the FORM data included with the request.

Next, user session detector USD can determine whether to examine cookies associated with the received client HTTP request (step ST6). If it is determined to examine cookies in step ST6, the session cookies for the session ID can be examined (step ST7). The process then proceeds to step ST8.

At step ST8, user session detector USD can determine whether to examine the URI and parameters associated with the received client HTTP request. If it is determined to examine URI and parameters associated with the received client HTTP request, the request-URI, query arguments, and form data for the session ID can be examined (step ST9). Because HTTP is a stateless protocol, an attempt must be made to associate each incoming request with an established session. The data can be examined here to determine if the request is part of an established session, and if so, which one. The process then proceeds to step ST10.

At step ST10, user session detector USD can determine whether an entry with the session ID is present in active user sessions table UST. Session table UST can map session IDs to session objects. The session IDs are generated by the application being monitored Page: 31 The session object is retrieved, the object contains the data. If an entry with the session ID is not in active sessions table UST, the incoming client HTTP request is not an active user session and the process proceeds to step ST11. The process stops at step ST11.

Referring again to step ST10, if an entry with the session ID is contained in active user sessions table UST, a lookup for an entry with the session ID can be performed in active sessions table UST for retrieving data from active sessions table UST (step ST12).

Next at step ST13, user session detector USD can determine whether an entry with the session ID can be found in active sessions table UST. If an entry with the session ID is found, the current HTTP request can be associated with the found session entry (step ST14). If a session is not found in step ST13, it is determined whether the web server is permissive (step ST15). Certain web applications can accept a session ID that comes from the client and begin using it as the ID for a session even though the server does not recognize the ID as corresponding to an active session. This is called a permissive server. Typically, security system 102 only creates new sessions when it sees the server issue the session ID. However, if it is known that the server is permissive, a new session can be created for each unique ID arriving at the client (step ST16). If the web server is not permissive, the HTTP request is not part of an existing user session and the process stops (step ST11).

After step ST16, the current HTTP request can be associated with the found session entry (step ST14). The process can then stop (step ST11).

Referring again to step ST3, if the received traffic is an outbound server HTTP response, the process proceeds to step ST17. At step ST17, user session detector USD can extract the server ID session from the outgoing server HTTP response.

Step ST5 can include extracting the requested session ID from the received client HTTP request. This is similar to the same process used to determine the requested session ID from the client in step ST4, except now it is applied to responses coming from the server where an attempt is being made to determine if the server has created a new session. The data used is normally the Set-Cookie header which will contain the session ID. In some cases, it is necessary to examine the HTML content being returned to the client to look for links containing "fat URLs" which encode the session ID.

Next, user session detector USD can determine whether to examine cookies associated with the outgoing HTTP server response (step ST17). Typically, the session cookie is returned to the client in the form of a cookie. If it is determined to examine cookies in step ST17, the session cookies for the session ID can be examined (step ST18). The process then proceeds to step ST19.

At step ST19, user session detector USD can determine whether to examine the HTML associated with the outgoing HTTP server response. Step ST19 is only needed when the application is not using HTTP cookies for session management. In this case, the application will have encoded the session ID within the HTML as either "fat URLs" or hidden FORM fields. If it is determined to examine the HTML associated with the outgoing HTTP server response, the HTML can be parsed for session ID in links and forms (step ST20). The process then proceeds to step ST21.

At step ST21, user session detector USD can determine whether an entry with the session ID is present in user sessions table UST. If an entry with the session ID is not in user sessions table UST, the outgoing HTTP server response is not an active user session and the process proceeds to step ST22. The process stops at step ST10.

Referring again to step ST21, if an entry with the session ID is contained in user sessions table UST, a lookup for the entry with the session ID can be performed in user sessions table UST for retrieving data from user sessions table UST (step ST22). Next, at step ST23, it is determined whether an entry with the lookup session ID is found in user sessions table UST. If a session is not found, a new entry with this session ID can be created and stored in user sessions table UST (step ST24). A session object is created and stored with the session ID as the key. All of the session fields previously discussed are filled in at this point, if available. For example, if the server is generating the session ID in response to a login, then security system 102 will have the information it needs at this point. In other cases, the server will generate a session ID as soon as the client first "hits the home page" and a login will only be known later. Thus, the session can be created in the active sessions table, and the User-ID can be entered next. Next, the process can proceed to step ST25. If an entry is found in ST23, the process can proceed to step ST25.

At step ST25, user session detector USD can determine whether the server is expiring the cookie-based session. If the server is expiring the cookie-based session, the user session can expire (step ST26). The application can use a special syntax in the Set-Cookie header to instruct the client to immediately "forget" the value of a session cookie. This means the server is ending the session, and step ST26 can observe that event. Next, the process can stop at step ST10. If the server is not expiring the cookie-based session, the process can also stop at step ST10.

III. Login Session Detection

Security system 102 can include a login detector LD for detecting user login sessions established between a web application of web server WS and web-enabled devices WED1, WED2, and WED3. Login detector LD can associate data received from network connection NC with a particular user name. Therefore, different data can be associated with different user login sessions. Login detector LD can delineate logins and logouts at the application layer.

Figure 7A:
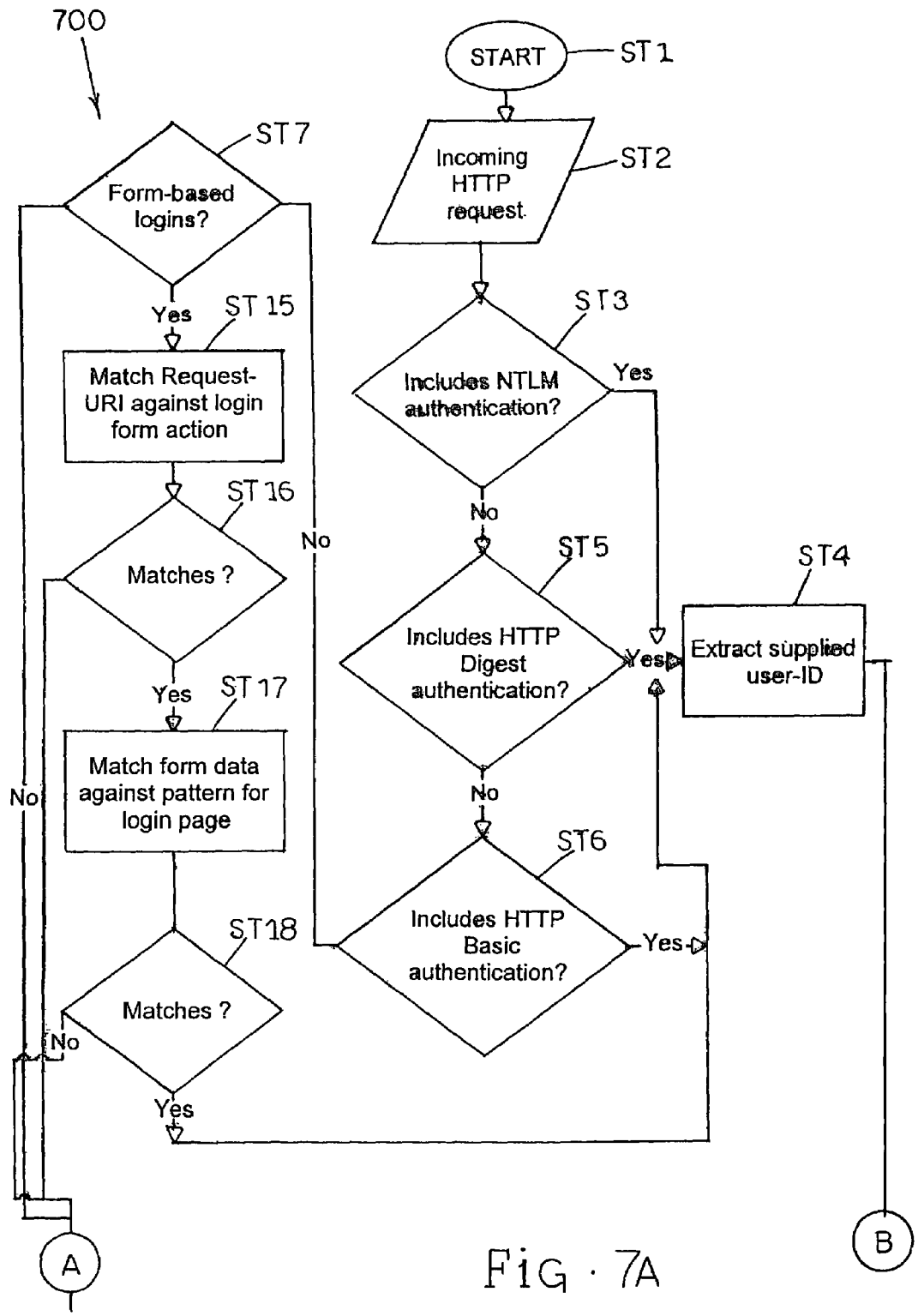
FIG. 7 is a flow chart which illustrates an exemplary process for associating network traffic with particular user login sessions.
Figure 7B:
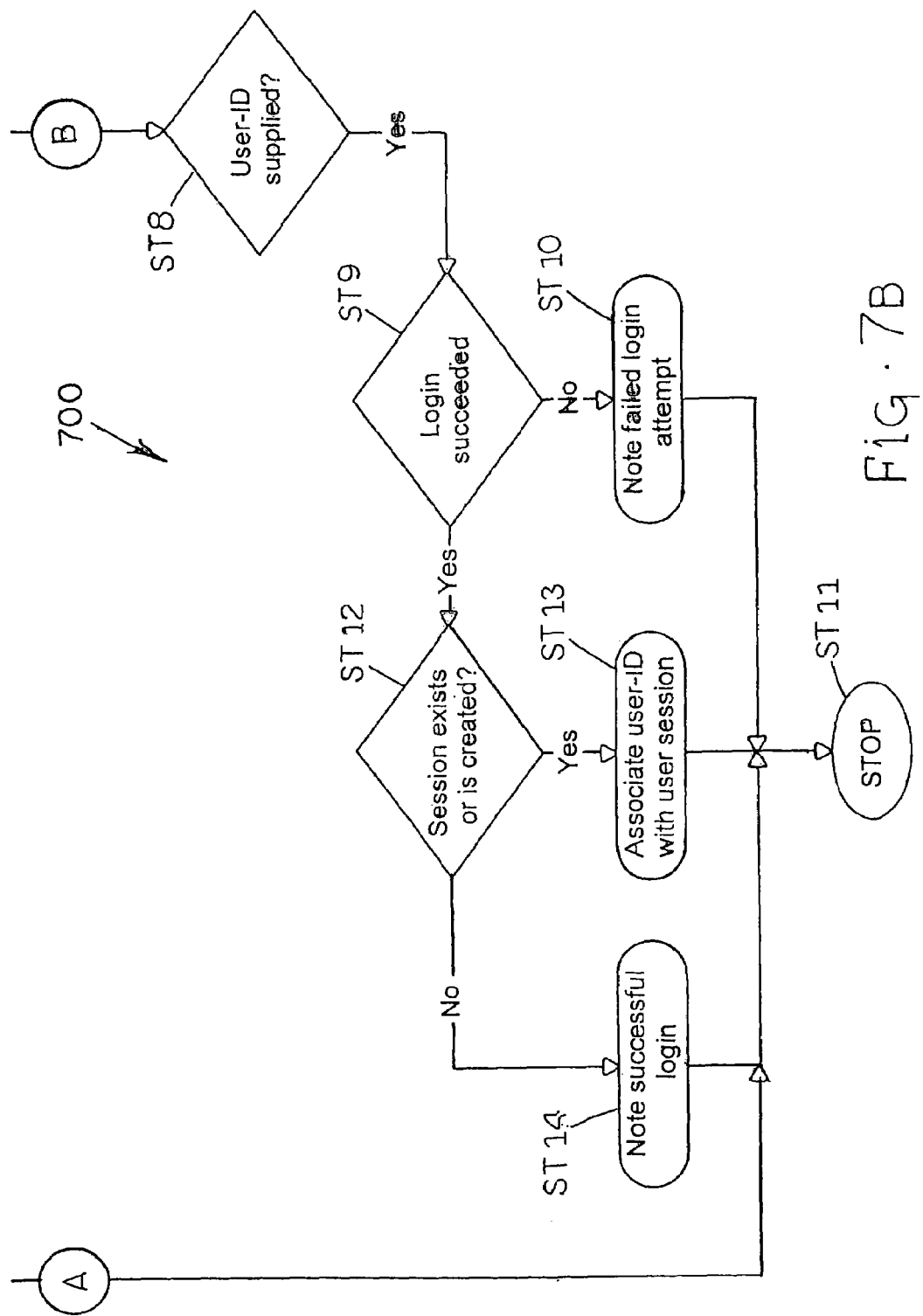

Referring to FIG. 7, a flow chart, generally designated 700, is provided which illustrates an exemplary process for associating network traffic with particular user login sessions. The exemplary process of flow chart 700 can be implemented by login detector LD. The process begins at step ST1. At step ST2, login detector LD can receive client HTTP requests from network connection NC or network CN (FIGS. 1A and 1B, respectively).

Next, at step ST3, login detector LD can determine whether the HTTP request includes NT LAN Manager (NTLM) authentication. If the HTTP request includes NTLM authentication, the process proceeds to step ST4. If the HTTP request does not include NTLM authentication, the process proceeds to step ST5.

At step ST5, login detector LD can determine whether the HTTP request includes HTTP Digest authentication. If the HTTP request includes HTTP Digest authentication, the process proceeds to step ST4. If the HTTP request does not include HTTP Digest authentication, the process proceeds to step ST6.

At step ST6, login detector LD can determine whether the HTTP request includes HTTP Basic authentication. If the HTTP request includes HTTP Digest authentication, the process proceeds to step ST4. Otherwise, the process proceeds to step ST7.

As noted above if the HTTP request includes NTLM, HTTP Digest, or HTTP authentication, the process proceeds to step ST4. At step ST4, the user ID can be extracted from the HTTP request. The process can then proceed to step ST8.

At step ST8, login detector LD can determine whether the user ID is supplied. If there is not a non-empty user-id, nothing happens. It should proceed to step ST11.

If the user ID is supplied, it is determined whether the login succeeded (step ST9). The outbound HTTP server response can be examined to determine whether the login succeeded. If the login did not succeed, an indication of the failed login for the user and/or session can be stored (step ST10). Next, the process stops (step ST11). If the login did succeed, the process proceeds to step ST12.

At step ST12, login detector LD can determine whether a user login session exists or is created. If a session exists or is created, a user ID can be associated with the user session (step ST13). Next, the process can stop (step ST11). If a session does not exist and is not created, an indication of a successful login can be stored (step ST14). Next, the process can stop (step ST11).

Referring again to step ST7, it can be determined whether the incoming HTTP request includes a form-based login. If the incoming HTTP request does not include a form-based login, the incoming HTTP request is not a login attempt and the process stops at step ST11. Form-based authentication (login) is widely used in Internet or extranet web applications because of its portability, simplicity for implementers, flexibility, and seamless integration with the look-and-feel of the application. With Form-based authentication, the application will present the user with an HTML FORM containing, minimally, a field for the user-id and a field for the password. When the user fills out the form and submits it, the user-id and password are returned to the application as FORM data. The application retrieves these values and authenticates them against whatever database it is using. Typically, if the credentials are valid the application can redirect the user to an appropriate starting point in the application, while if the credentials are invalid the application will return an error page, usually containing the login form again. When combined with HTTPS it is considered a secure authentication mechanism. If the incoming HTTP request includes a form-based login, the process can proceed to step ST15.

At step ST15, the match request-URI can be matched against login form (step ST15). Security system 102 can be provided via configuration with a URL pattern that it uses to determine that the request is a submission of the login form. Step ST15 can verify that the request is a submission of the login form and that the required parameters are present in the FORM data (e.g. user name and password parameters). Next, it is determined whether the request-URI matches the login form (step ST16). If the request-URI does not match the login form, the HTTP request is not a login attempt and the process stops at step ST11. Otherwise, the process proceeds to step ST17.

At step ST17, the form data can be matched against the pattern for the login page. Next, it is determined whether there are any matches (step ST18). If the form data does not match the pattern for the login page, the HTTP request is not a login attempt and the process stops at step ST11. Otherwise, the process proceeds to step ST4.

IV. Detectors

Security system 102 can include detectors D1-D53 for monitoring and analyzing network traffic transmitted between web-enabled devices WED1, WED2, and WED3 and web server WS. An operator of system 102 can disable any of detectors D1-D53. Detectors D1-D53 can detect and alert an operator to potentially harmful or unauthorized use of a web application of a web server (such as web server WS or server S shown in FIGS. 1A and 1B, respectively). Each of detectors D1-D53 can trigger when such an activity is detected and register a threat score for a user session and/or login session associated with the activity.

Login Activity Detectors

Security system 102 can detect and analyze login activity for security monitoring purposes. According to one embodiment, the analyzed login activity can be utilized to generate a security threat score for the login activity by comparing the analyzed login activity with threshold criteria. According to one embodiment, a login session is detected by utilizing login detector LD for associating network traffic transmitted between web server WS and web-enabled devices WED1, WED2, and WED3 with a unique login. The network traffic associated with the session login can be collected for comparison to user-defined or predetermined threshold criteria. Login detector LD can always run. Detector D1 can function as the external notification that a login has occurred. If the operator wants to see an audit trail of users logging into the application and assign an associated threat score with this action, detector D1 can be enabled. Otherwise, detector D1 can be disabled.

Detector D1 can trigger when a user has properly logged in to the monitored application. Detector D1 can require that the user has properly configured the logout detector procedure for the monitored web application. Detector D1 can be disabled entirely or for only designated users.

Figure 8:
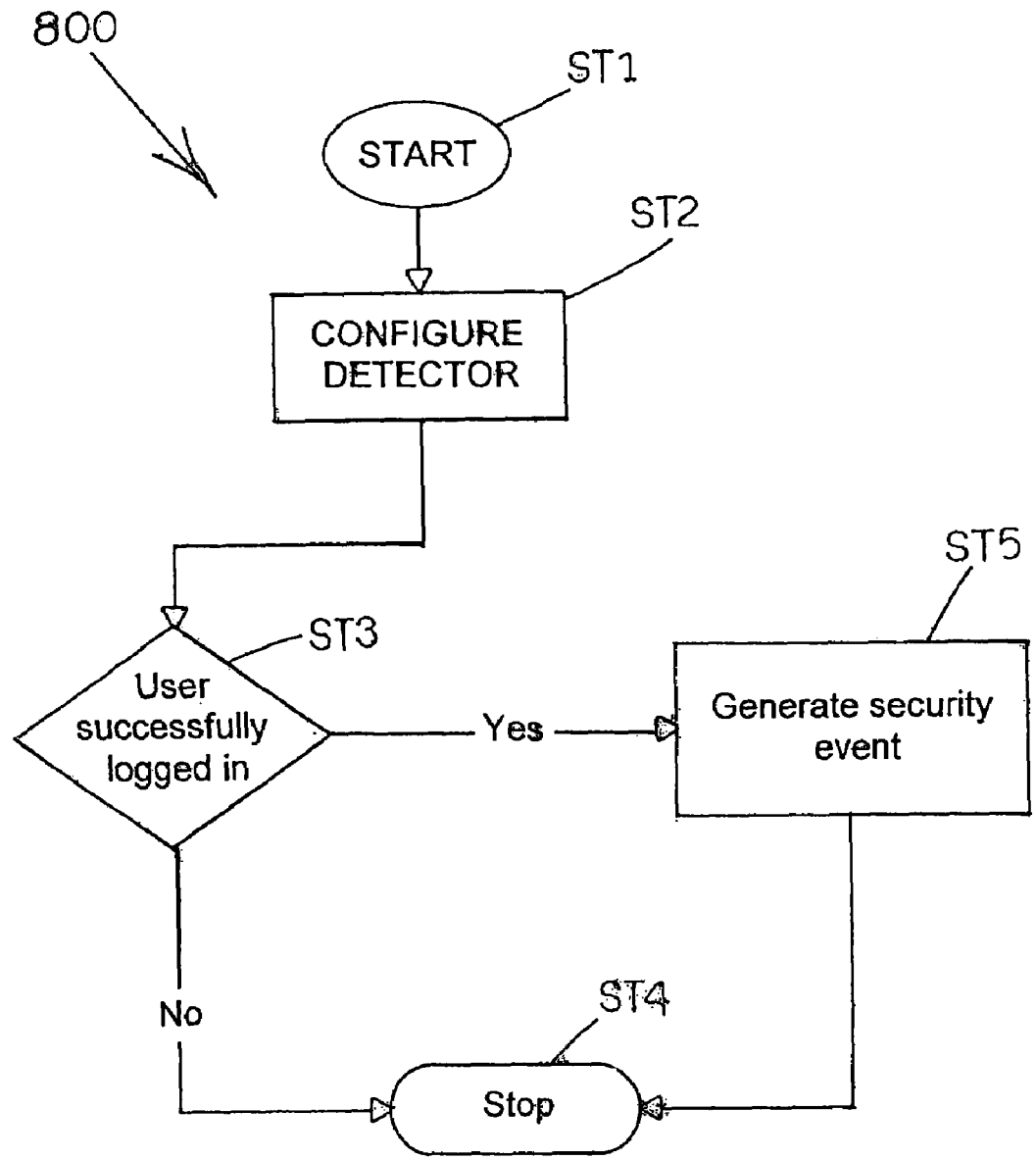
FIG. 8 is a flow chart which illustrates an exemplary process for detecting and triggering when a user has properly logged into a monitored application.

Referring to FIG. 8, a flow chart, generally designated 800, is provided which illustrates an exemplary process for detecting and triggering when a user has properly logged into a monitored application. The process can be implemented by detector D1 (FIG. 2). The process can begin at step ST1. Next, detector D1 can be configured (step ST2). The process can then proceed to step ST3.

Referring to step ST3 of FIG. 8, detector D1 (FIG. 2) can determine whether a user has successfully logged into the monitored web application. If the user does not successfully log in, the process can stop (step ST4). If the user successfully logs in, a security event can be generated and detector D1 can trigger (step ST5). Next, the process can stop (step ST4).

Figure 9:
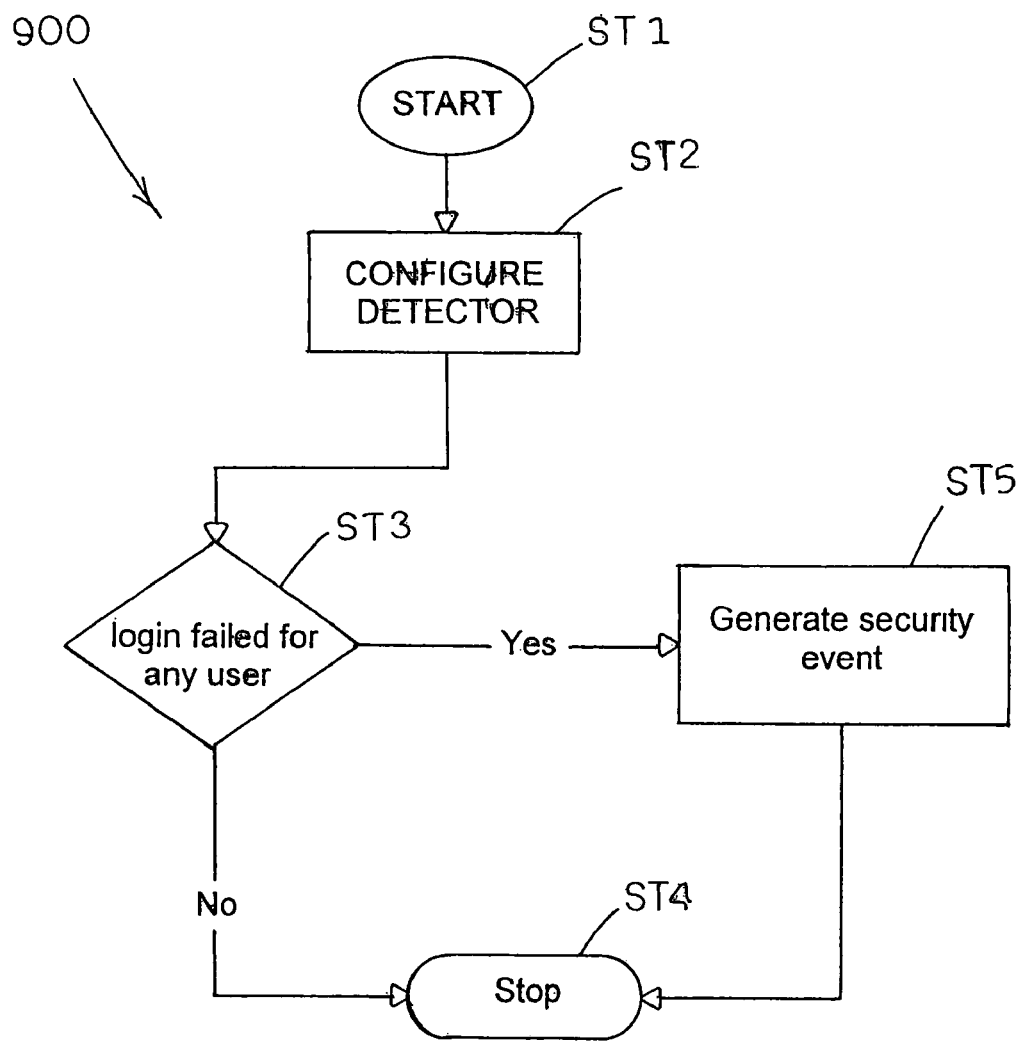
FIG. 9 is a flow chart which illustrates an exemplary process for detecting and triggering when a login attempt fails.

Detector D2 can detect login failures. Excessive occurrences of login failures can indicate a security threat. Detector D2 can trigger on each login failure detection. Referring to FIG. 9, a flow chart, generally designated 900, is provided which illustrates an exemplary process for detecting and triggering when a login attempt fails. The process can begin at step ST1. Next, detector D2 can be configured (step ST2).

Referring to step ST3 of FIG. 9, detector D2 (FIG. 2) can determine whether a login attempt has failed for any user. If a login attempt has not failed for any user, the process can stop (step ST4). Otherwise, if a login attempt has failed for any user, a security event can be generated or detector D2 can trigger (step ST5). Next, the process can stop (step ST4).

Detector D3 can detect that a user has properly logged off the monitored application. Detector D3 does not trigger when the user does not log off and allows the session to automatically expire. Detector D3 can require that the user has properly configured the logout detector procedure for the monitored web application. Detector D3 can be disabled entirely or for only designated users.

Figure 10:
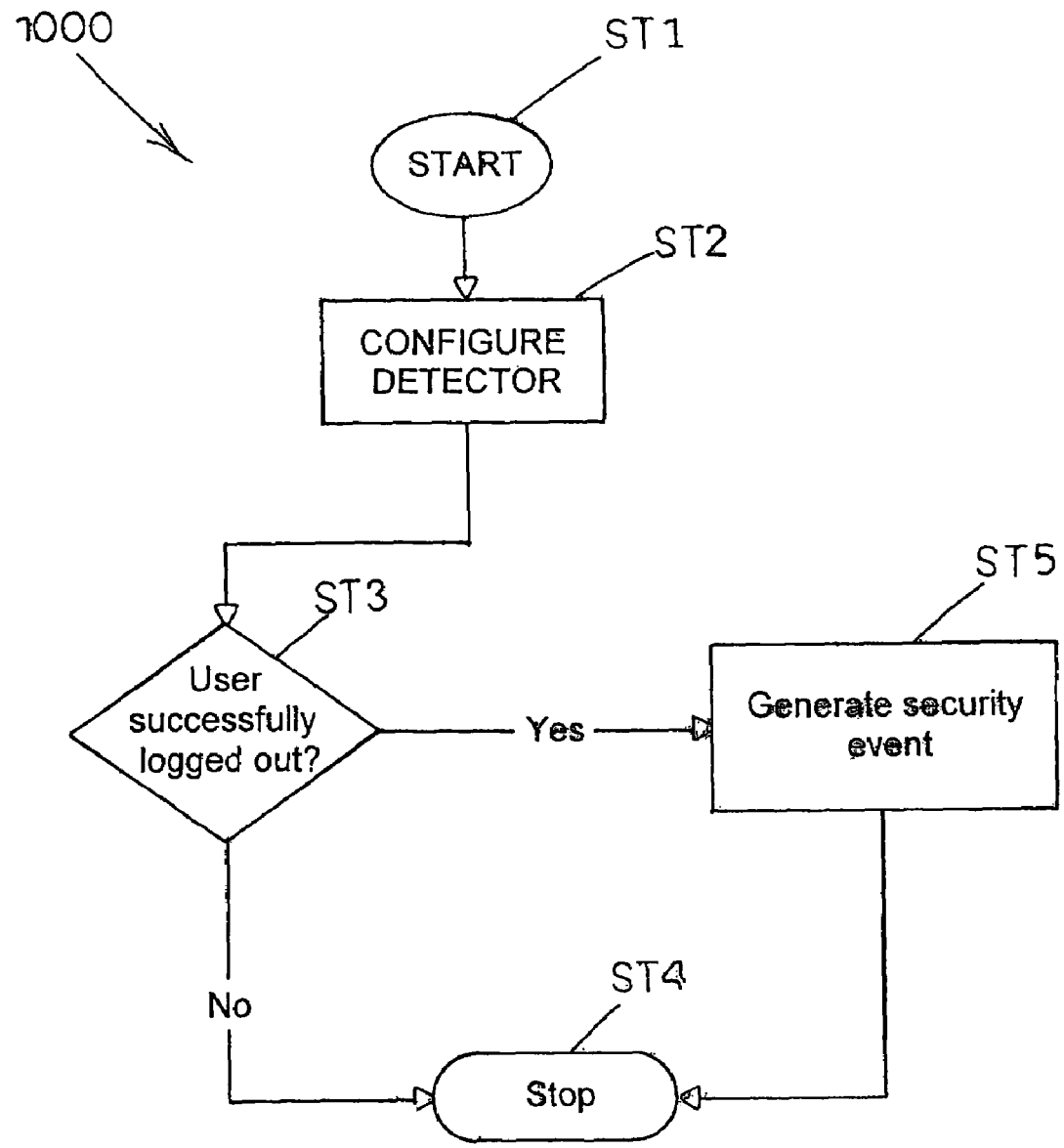
FIG. 10 is a flow chart which illustrates an exemplary process for detecting and triggering when a user has properly logged off a monitored application.

Referring to FIG. 10, a flow chart, generally designated 1000, is provided which illustrates an exemplary process for detecting and triggering when a user has properly logged off a monitored application. The process can be implemented by detector D3 (FIG. 2). The process can begin at step ST1. Next, detector D3 can be configured (step ST2). The process can then proceed to step ST3.

Referring to step ST3 of FIG. 10, detector D3 (FIG. 2) can determine whether a user has successfully logged out. If the user does not successfully log out, the process can stop (step ST4). If the user successfully logs out, a security event can be generated and detector D3 can trigger (step ST5). Next, the process can stop (step ST4).

Detector D4 can detect when the number of login failures during a single session exceeds a predetermined threshold number. An operator can set the predetermined threshold number. When the predetermined threshold number is exceeded, detector D4 can trigger. Detector D4 can require that the monitored web application create sessions prior to a successful login. According to one embodiment, if a web application only creates sessions on a successful login, then detector D4 has no effect. As described herein, user session detector USD and login detector LD can associate received data with a particular session and/or user login, respectively. The predetermined threshold number of logins can be configured by an operator.

Referring to FIG. 11, a flow chart, generally designated 1100, is provided which illustrates an exemplary process for detecting when the number of login failures during a single session exceeds a predetermined number. The process can be implemented by detector D4 (FIG. 2). The process can begin at step ST1. Detector D4 can be configured with a login failure count limit (step ST2). The process can then proceed to step ST3.

Referring to step ST3 of FIG. 11, detector D4 can determine whether a login attempt failed for a session. If the login attempt did not fail for the session, the process can stop (step ST4). Otherwise, if the login attempt failed for the session, detector D4 can increment the login failure count for the session and determine whether the login failure count for the session is greater than the predetermined number (step ST5). If the login failure count for the session is not greater than the predetermined number, a security event can be generated or detector D4 can trigger (step ST6). Next, the process can stop (step ST4). Referring again to step ST5, if the login failure count for the session is not greater than the predetermined number, the process can stop ST4.

Figure 12A:
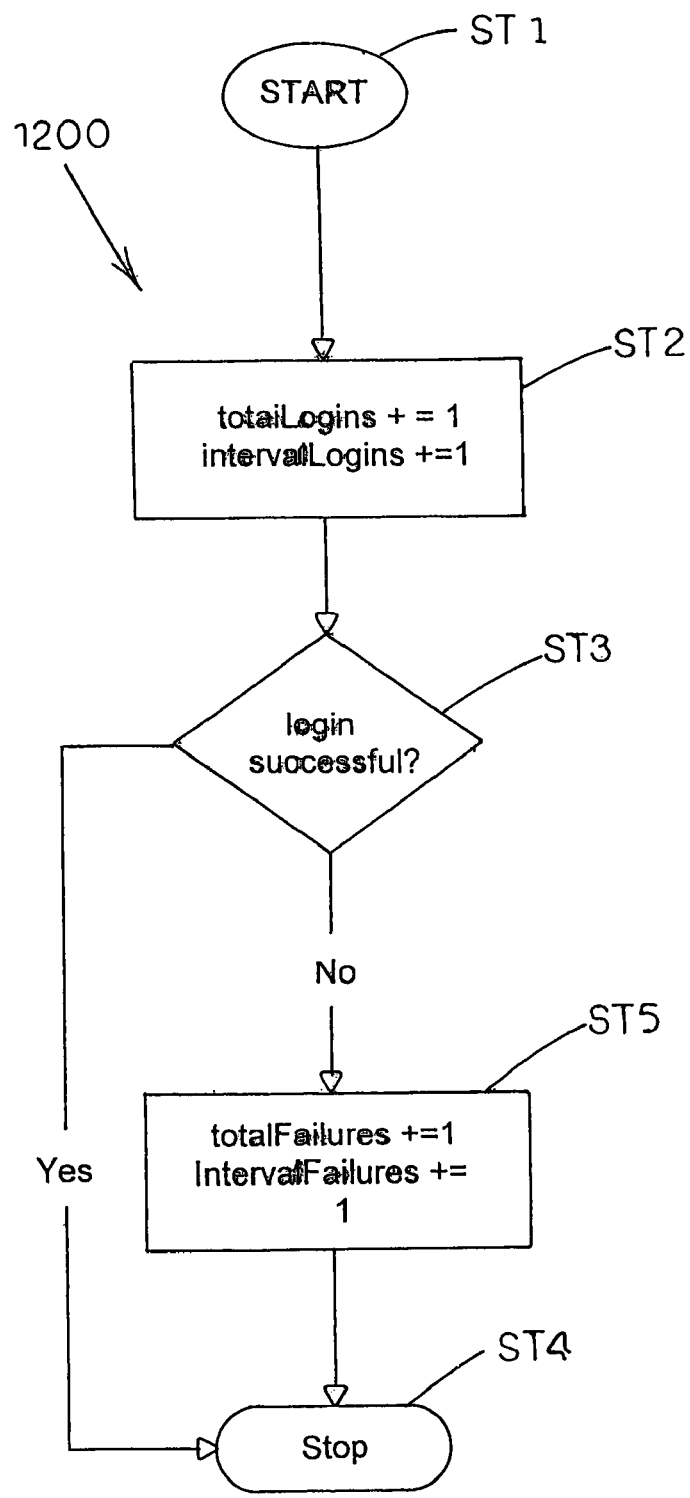
FIG. 12A is a flow chart which illustrates an exemplary process for determining a normal login failure rate for all sessions.
Figure 12B:
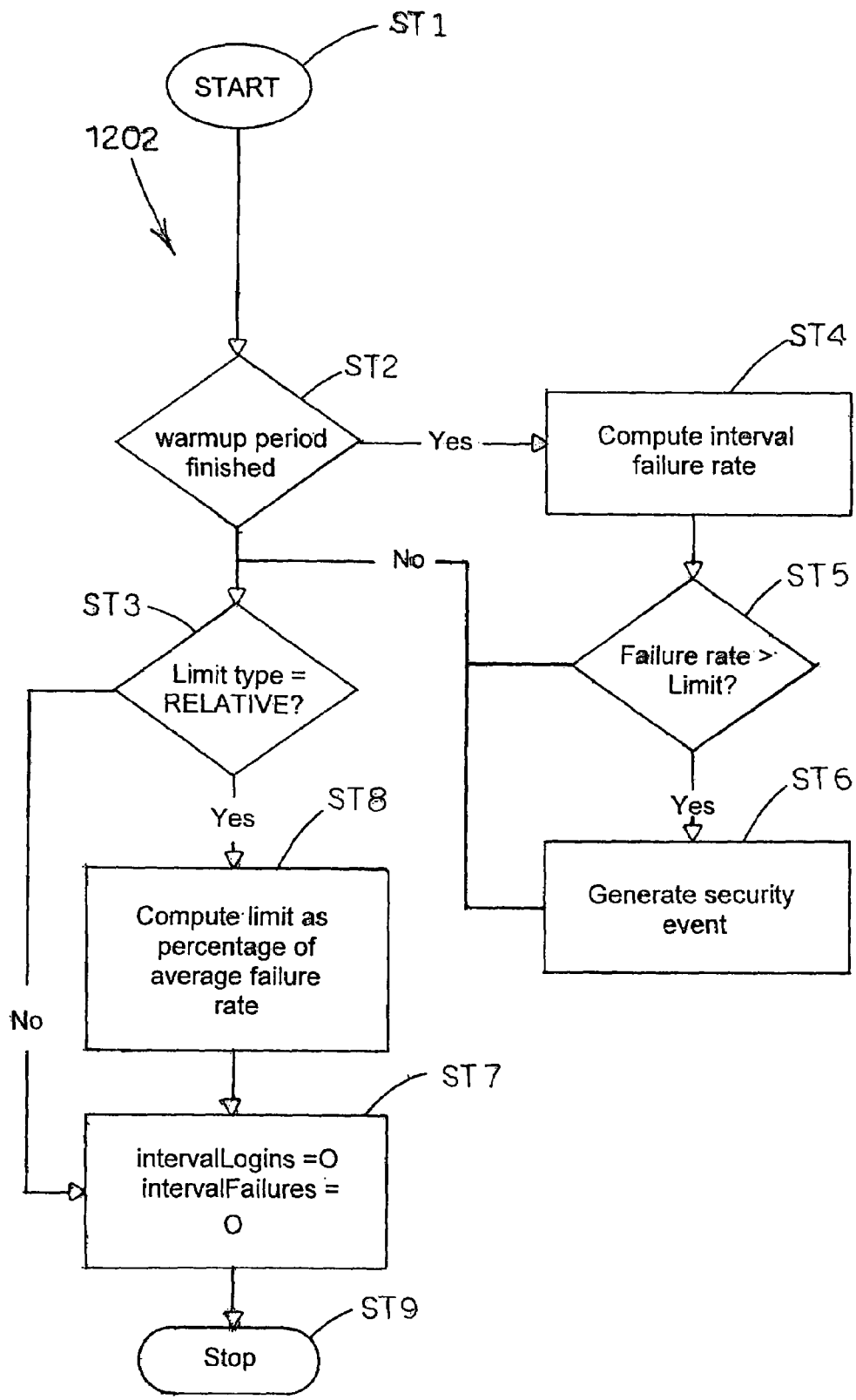
FIG. 12B is a flow chart which illustrates an exemplary process for triggering when the login failure rate for a user is not in accordance with an observed login failure rate for the session observed by the process of FIG. 12A.

Detector D5 can detect when the login failure rate for a user is not in accordance with an observed login failure rate for all observed sessions. FIGS. 12A and 12B illustrate flow charts, generally designated 1200 and 1202, respectively, of exemplary processes operating in combination for detecting and triggering when the login failure rate for a user is not in accordance with an observed login failure rate for all observed sessions. Referring specifically to FIG. 12A, the flow chart 1200 which illustrates an exemplary process for determining a normal login failure rate for all sessions. The process can begin at step ST1 when a login attempt by any user is detected. Next, a counter for the total number of login attempts can be incremented by 1 (step ST2). Additionally, a counter for the login attempts during an interval can be incremented by 1 (step ST2). The process can then proceed to step ST3.

Referring to step ST3 of FIG. 12A, detector D5 can determine whether the login attempt was successful. If the login attempt was successful, the process can stop (step ST4). If the login attempt was not successful, a counter for the total number of login failures can be incremented by 1 and a counter for the total number of login failures during an interval can be incremented by 1 (step ST5). Next, the process can stop ST4.

Referring now to FIG. 12B, the flow chart 1202 illustrates an exemplary process for triggering when the login failure rate for a user is not in accordance with an observed login failure rate for the session observed by the process of FIG. 12A. The process can begin at step ST1. Next, detector D5 can determine whether a warm-up period is finished (step ST2). When security system 102 is enabled, the detectors are accumulating some statistic that will be used to judge behavior as normal or abnormal. However, to have statistical relevance the detectors must not begin triggering too soon. Therefore, a warm-up period is used, measured either as a minimum number of observations or a minimum time period, during which the detector cannot be triggered. When the learning period is finished, the detector can begin generating events in addition to continuing to accumulate statistics. If the warm-up period is not finished, the process can proceed to step ST3. Otherwise, the process can compute the interval failure rate for all users (step ST4) and proceed to step ST5. The interval failure rate can be determined from the process of FIG. 12A.

Referring to step ST5 of FIG. 12B, detector D5 can determine whether the interval failure rate for all users is greater than a predetermined limit. If the interval failure rate for all users is greater than the predetermined limit, a security event can be generated or detector D5 can trigger (step ST6) and proceed to step ST3. Otherwise, if the interval failure rate for all users is not greater than the predetermined limit, the process can proceed to step ST3.

Referring to step ST3 of FIG. 12B, detector D5 can determine whether the limit type is relative. Detector D5 can learn the normal rate of login failures for the application. It provides two choices for setting the conditions under which it will be triggered. In ABSOLUTE mode, the operator provides a simple limit (e.g., 50%) and whenever the current rate of login failures is above the limit, detector D5 can be triggered. With the REATIVE choice, detector D5 can be triggered whenever the current rate of login failures is a given percentage above normal, for example 30%, above normal. If the limit type is not relative, the process can proceed to step ST7. Otherwise, if the limit type is relative, detector D5 can compute the limit as a percentage of the average failure rate (step ST8). The average failure rate can be determined from the process of FIG. 12A. Next, the process can proceed to step ST7.

Referring to step ST7 of FIG. 12B, the counter for the interval logins (described in the process of FIG. 12A) can be set to 0. Additionally, the counter for the interval failures (described in the process of FIG. 12A) can be set to 0 (step ST7). The process can then stop at step ST9.

Detector D6 can detect when the number of login failures using the same user identification exceeds a predetermined number over a period of time. If a user is repeatedly failing to login correctly, it can suggest that the user is guessing passwords or that the user's account has been locked out.

Figure 13:
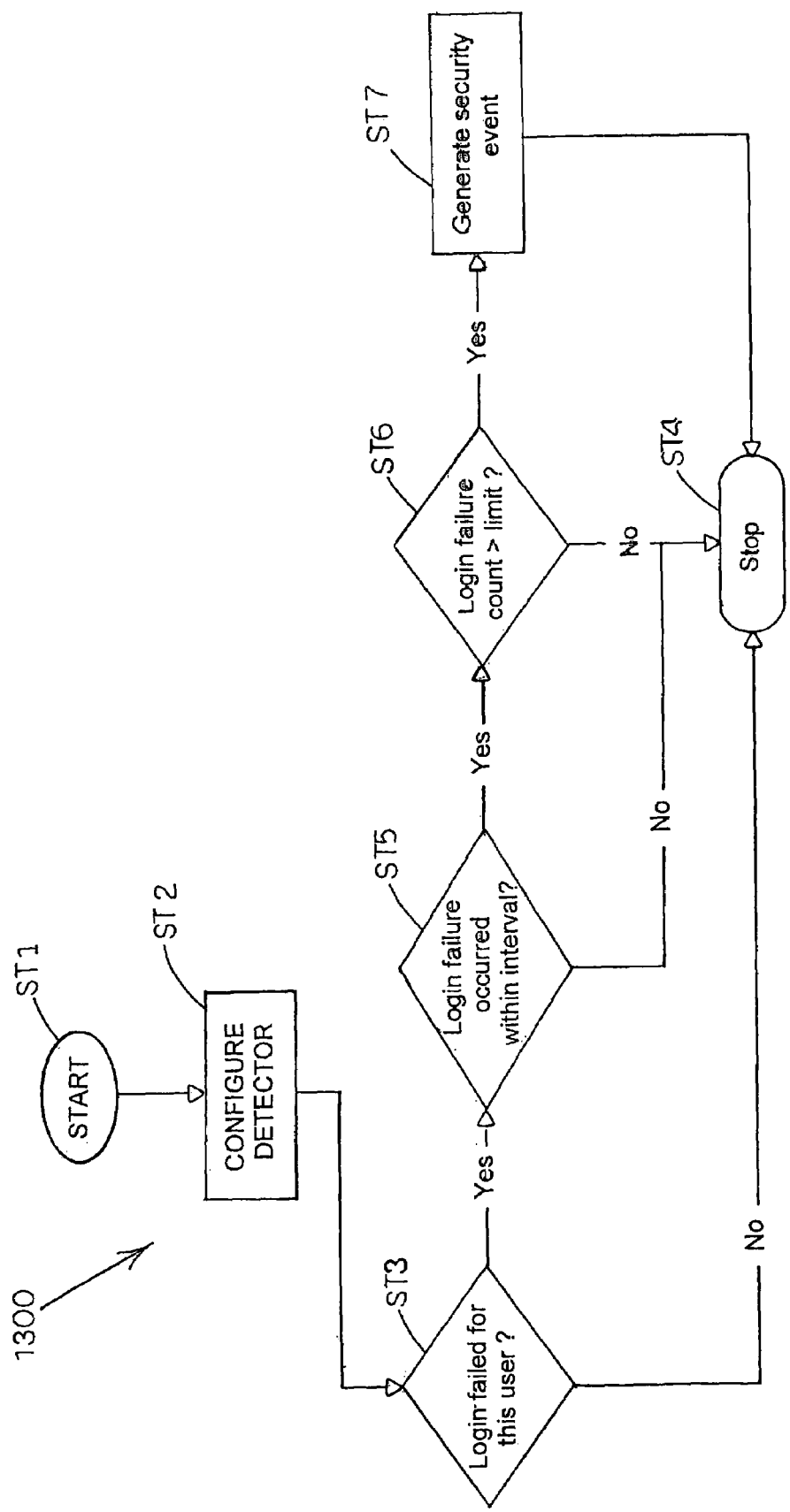
FIG. 13 is a flow chart which illustrates an exemplary process for detecting when the number of login failures using the same user identification exceeds a predetermined number over a period of time.

Referring to FIG. 13, a flow chart, generally designated 1300, is provided which illustrates an exemplary process for detecting when the number of login failures using the same user identification exceeds a predetermined number over a period of time. Detector D6 can implement the process. The process can begin at step ST1. Next, detector D6 can be configured with a login failure limit and a time interval (step ST2). The process can then proceed to step ST3.

Referring to step ST3 of FIG. 13, detector D6 can determine whether a login attempt failed for a user. If the login attempt did not fail for the user, the process can stop (step ST4). Otherwise, if the login attempt failed, the process can proceed to step ST5.

Referring to step ST5 of FIG. 13, detector D6 can determine whether the login failure occurred within the configured time interval. If the login failure did not occur within the configured time interval, the process can stop (step ST4). Otherwise, the process can proceed to step ST6.

Referring to step ST6 of FIG. 13, detector D6 can increment a login failure count for the failed login and determine whether the login failure count is greater than the predetermined login failure limit. If the login failure count is not greater than the predetermined login failure limit, the process can stop ST4. Otherwise, a security event can be generated or detector D6 can trigger (step ST7). Next, the process can stop (step ST4).

Figure 14:
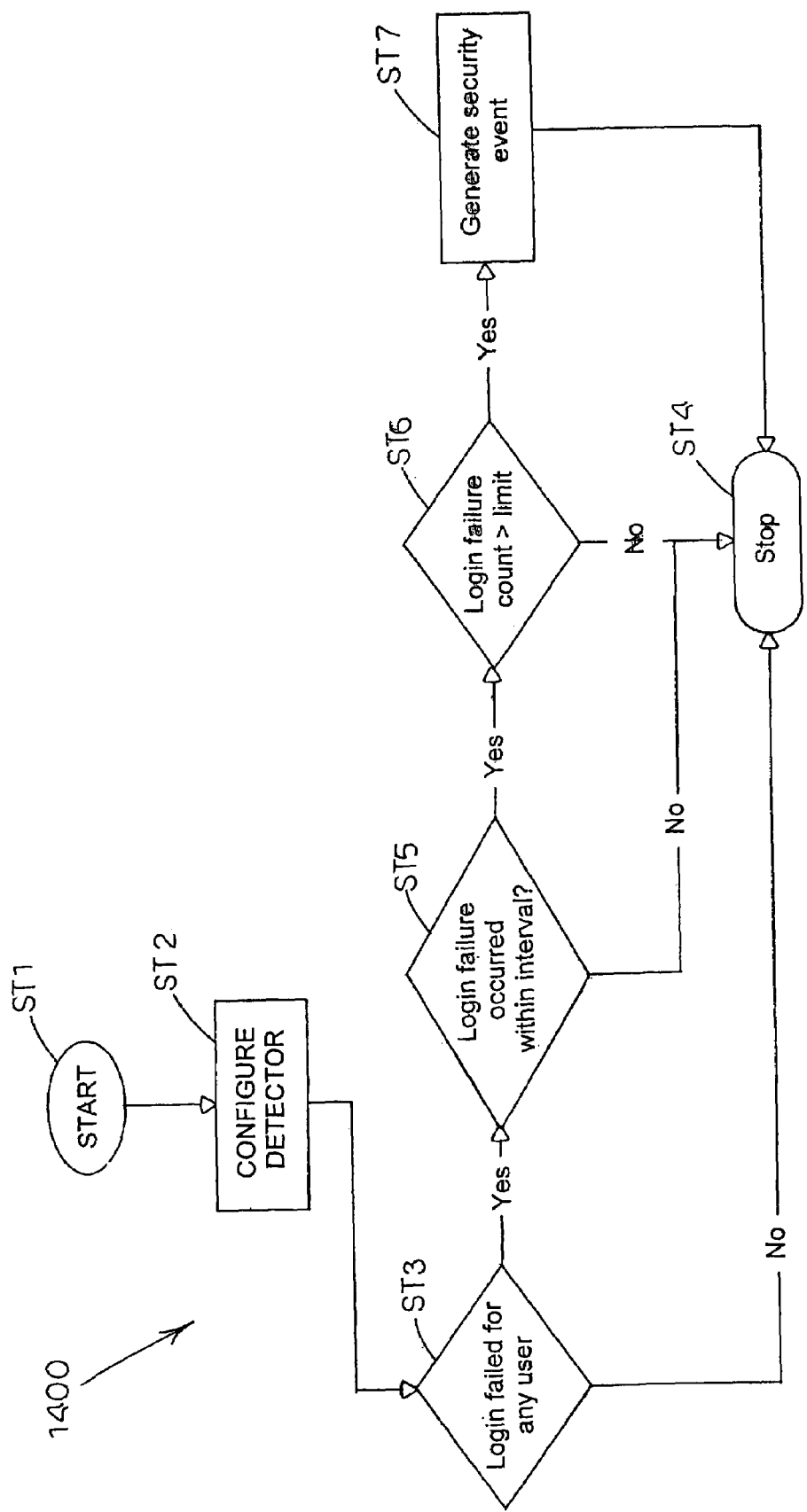
FIG. 14 is a flow chart which illustrates an exemplary process for detecting when the number of login failures for the web application for all users exceeds a predetermined number over a period of time.

Detector D7 can detect when the number of login failures for the web application for all users exceeds a predetermined number over a period of time. Referring to FIG. 14, a flow chart, generally designated 1400, is provided which illustrates an exemplary process for detecting when the number of login failures for the web application for all users exceeds a predetermined number over a period of time. The process can begin at step ST1. Next, detector D7 can be configured with a login failure limit and a time interval (step ST2). The process can then proceed to step ST3.

Referring to step ST3 of FIG. 14, detector D7 can determine whether a login attempt failed for any user. If the login attempt did not fail for any user, the process can stop (step ST4). Otherwise, if the login attempt failed, the process can proceed to step ST5.

Referring to step ST5 of FIG. 14, detector D7 can determine whether the login failure occurred within the configured time interval. If the login failure did not occur within the configured time interval, the process can stop (step ST4). Otherwise, the process can proceed to step ST6.

Referring to step ST6 of FIG. 14, detector D7 can increment a login failure count for the failed login and determine whether the login failure count is greater than the predetermined login failure limit. If the login failure count is not greater than the predetermined login failure limit, the process can stop ST4. Otherwise, a security event can be generated or detector D7 can trigger (step ST7). Next, the process can stop (step ST4).

Figure 15A:
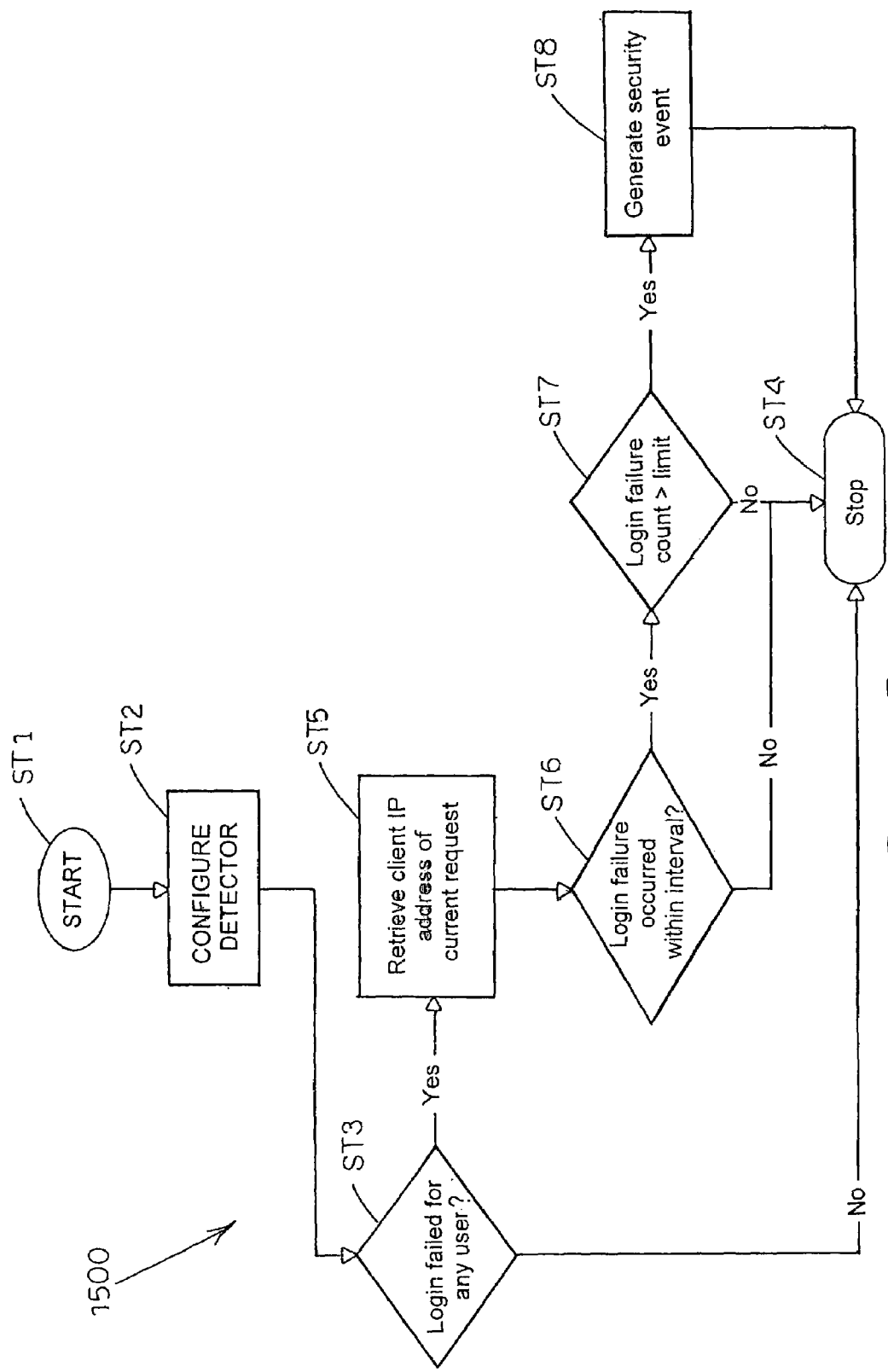
FIG. 15A is a flow chart illustrating a process for triggering based on failed logins from any single IP address.

Detector D8 can detect when the number of failed logins from any single IP address exceeds a predetermined number over a period of time. Referring to FIG. 15A, a flow chart, generally designated 1500, is provided which illustrates an exemplary process for determining and triggering when the number of failed logins from any single IP address exceeds a predetermined number over a period of time. The process can begin at step ST1. At step ST2, detector D8 can be configured with a number limit for login failures for an IP address and a time interval.

Referring to step ST3 of FIG. 15A, detector D8 (FIG. 2) can determine whether a login attempt has failed for any user. If a login attempt has not failed for any user, the process can stop (step ST4). Otherwise, if a login attempt has failed for any user, the client IP address of the current request associated with the failed login can be retrieved (step ST5).

Referring to step ST6 of FIG. 15A, detector D8 (FIG. 2) can determine whether the login failure for the IP address occurred within the configured time interval. If the login failure did not occur within the configured time interval, the process can stop (step ST4). Otherwise, if the login failure did occur within the configured time interval, the process can proceed to step ST7.

Referring to step ST7 of FIG. 15A, detector D8 (FIG. 2) can determine whether the login failure count or number of login failures for the IP address is greater than the configured number limit for login failures. If the login failure count is not greater than the limit, the process can stop (step ST4). Otherwise, if the login failure count is greater than the limit, a security event can be generated or detector D8 can trigger (step ST8). Next, the process can stop (step ST4).

Detector D9 can detect that a user has logged in more than once at the same time. An operator of system 102 can disable detector D9. Referring to FIG. 15B, a flow chart, generally designated 1502, is provided which illustrates an exemplary process for determining and triggering when a user has logged in more than once at the same time. The process can begin at step ST1. At step ST2, detector D9 can determine whether a received request is part of a session in user sessions table UST (FIG. 2). If the request is not part of a session, the process can stop (step ST3). Otherwise, if the request is part of a session, the process can proceed to step ST4.

Referring to step ST4 of FIG. 15B, detector D9 can determine whether detector D9 has already triggered for the session. If detector D9 has already triggered, the process can stop ST3. Otherwise, the process can proceed to step ST5.

Referring to step ST5 of FIG. 15B, detector D9 can determine whether a user is logged into the session associated with the request. If a user is not logged into the session associated with the request, the process can stop (step ST3). Otherwise, if the user is logged into the session associated with the request, the process can proceed to step ST6.

Referring to step ST6 of FIG. 15B, detector D9 can retrieve the session ID for the user. Next, detector D9 can determine whether the request session matches the session ID for the user (step ST7). If there is a match, the process can stop (step ST3). Otherwise, a security event can be generated or detector D9 can trigger (step ST8).

Detector D10 can be triggered when the number of logins during a time period exceeds a predetermined threshold. Alternatively, detector DI0 can be triggered when the rate of logins by a user exceeds a predetermined threshold. An operator of system 102 can disable detector D10.

Figure 15C:
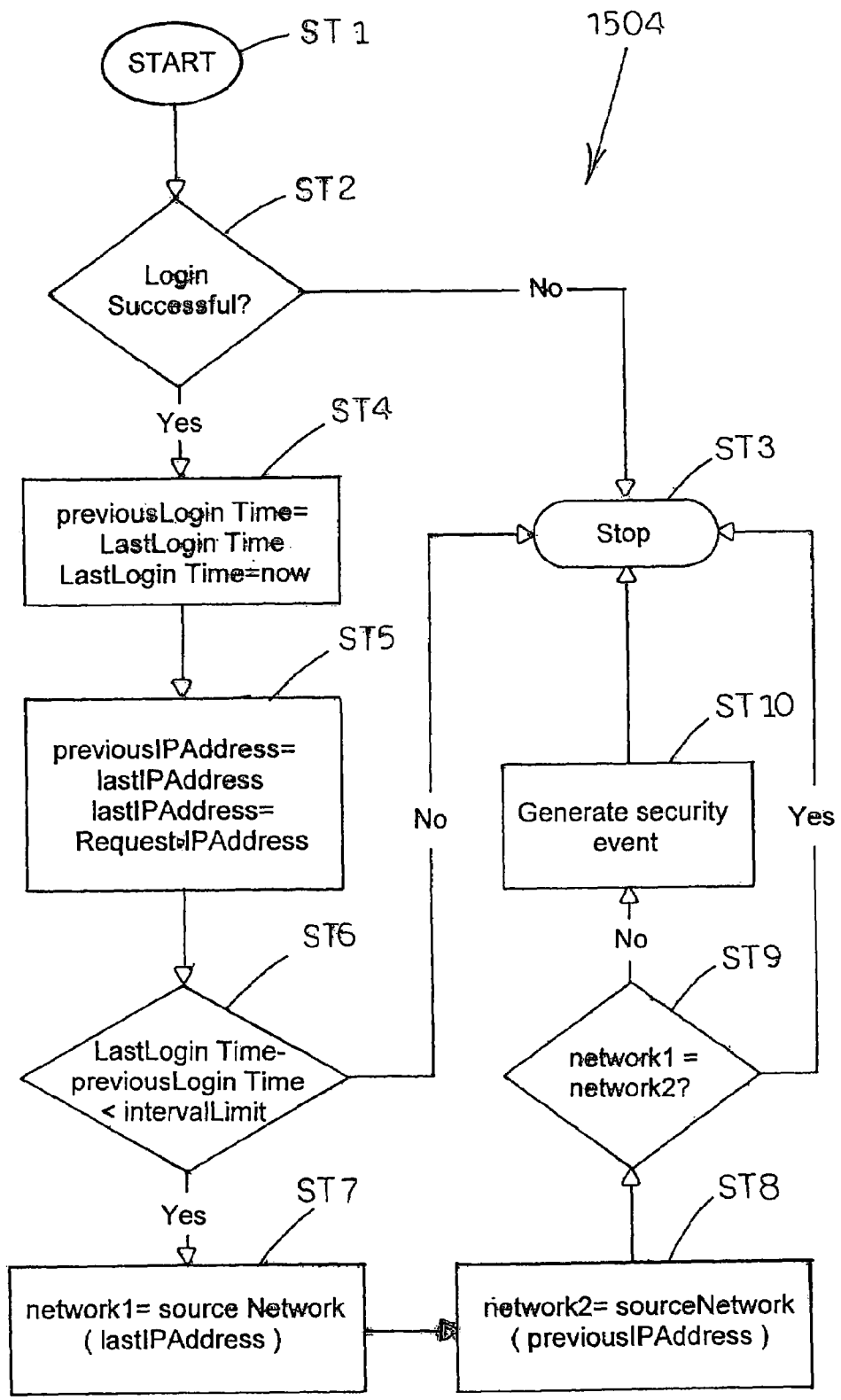
FIG. 15C is a flow chart illustrating a process for triggering when subsequent logins occur by the same user from different IP addresses.

Detector D11 can detect subsequent logins by the same user from different subnets or IP addresses. Detector D11 can monitor for a user login from a different IP address or subnet than the last login within a predetermined time period. Detector D11 can be utilized to determine whether users are sharing credentials. Referring to FIG. 15C, a flow chart, generally designated 1504, is provided which illustrates an exemplary process for determining and triggering when subsequent logins occur by the same user from different subnets or IP addresses. The process can begin at step ST1.

Referring to step ST2 of FIG. 15C, detector D11 can determine whether a user login is successful. If the login is not successful, the process can stop (step ST3). Otherwise, the process can set the previous login time to the last login time for the user (step ST4). Subsequently, at step ST4, the last login time can be set to the current time. Next, the previous IP address for the previous login is set to the last IP address (step ST5). Subsequently, at step ST5, the last IP address is set to the IP address associated with request messages associated with the current login. Next, the process proceeds to step ST6.

Referring to step ST6 of FIG. 15C, detector D11 can determines whether the difference between the last login time and the previous login time is less than a predetermined time interval limit. If the difference is not less than the limit, the process can stop ST3. Otherwise, if the difference is less than the limit, the source network of the last-seen IP address can be determined by applying a network mask (step ST7). Next, the source network of the previous IP address can be determined by applying the network mask (step ST8). Next, detector D11 can determine whether the user's IP address or source network has changed by comparing the two source network values (step ST9). If the two IP addresses are not different in step ST9, the process can stop (step ST3). Otherwise, a security event can be generated or detector D11 can trigger (step ST10).

Detector D12 can detect users logging onto a web application during a disallowed time period. For example, certain time periods, such as a particular day of the week, can be disallowed for login. Users logging on during this time period can trigger detector D12.

Detector D13 can detect when a user's login time is not in accordance with observed login time behavior for the user. For example, detector D13 can observe that a user typically logs on Monday through Friday at about 9:00 AM. Detector D13 can trigger when the user logs on during a time deviating a predetermined amount from the observed login times, such as at 4:00 AM on Sunday.

Figure 16A:
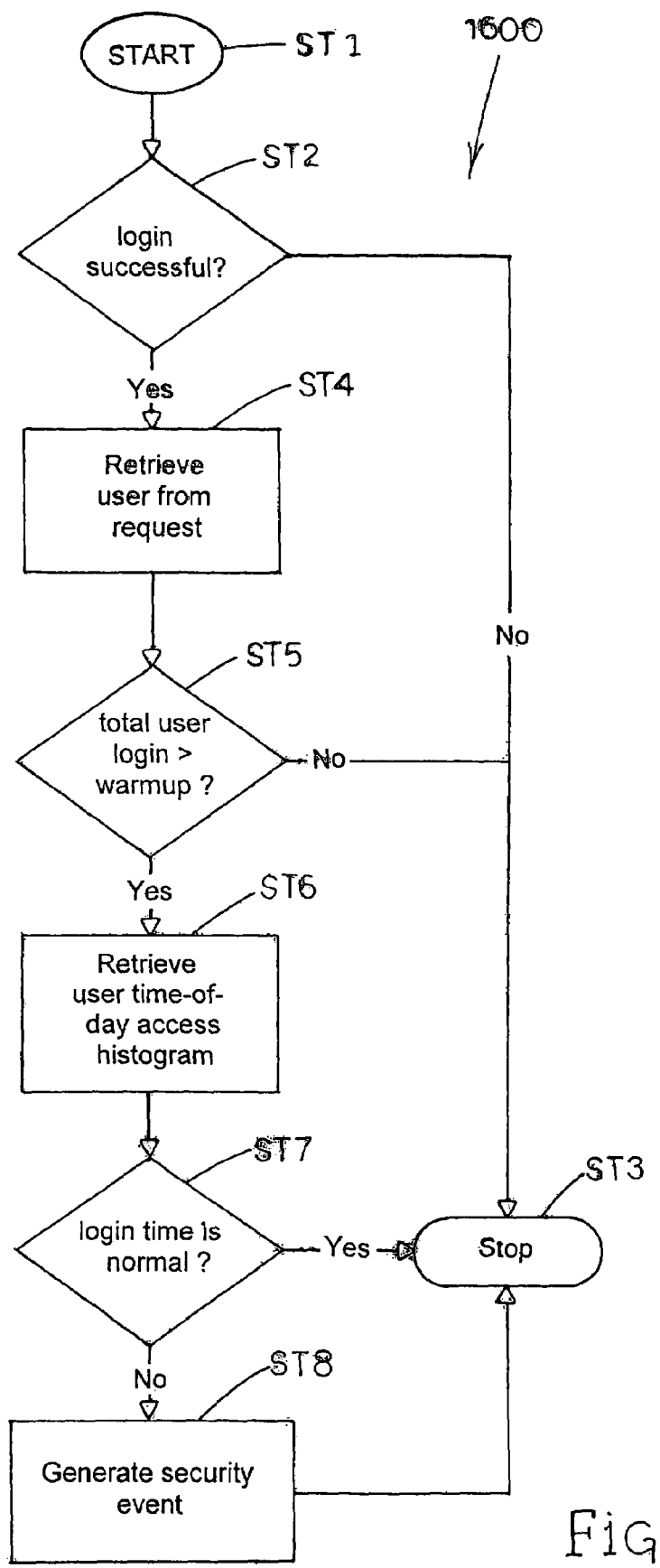
FIGS. 16A and 16B are a flow charts which illustrate exemplary processes operating in combination for detecting and triggering when a user's login time is not in accordance with observed login time behavior for the user.
Figure 16B:
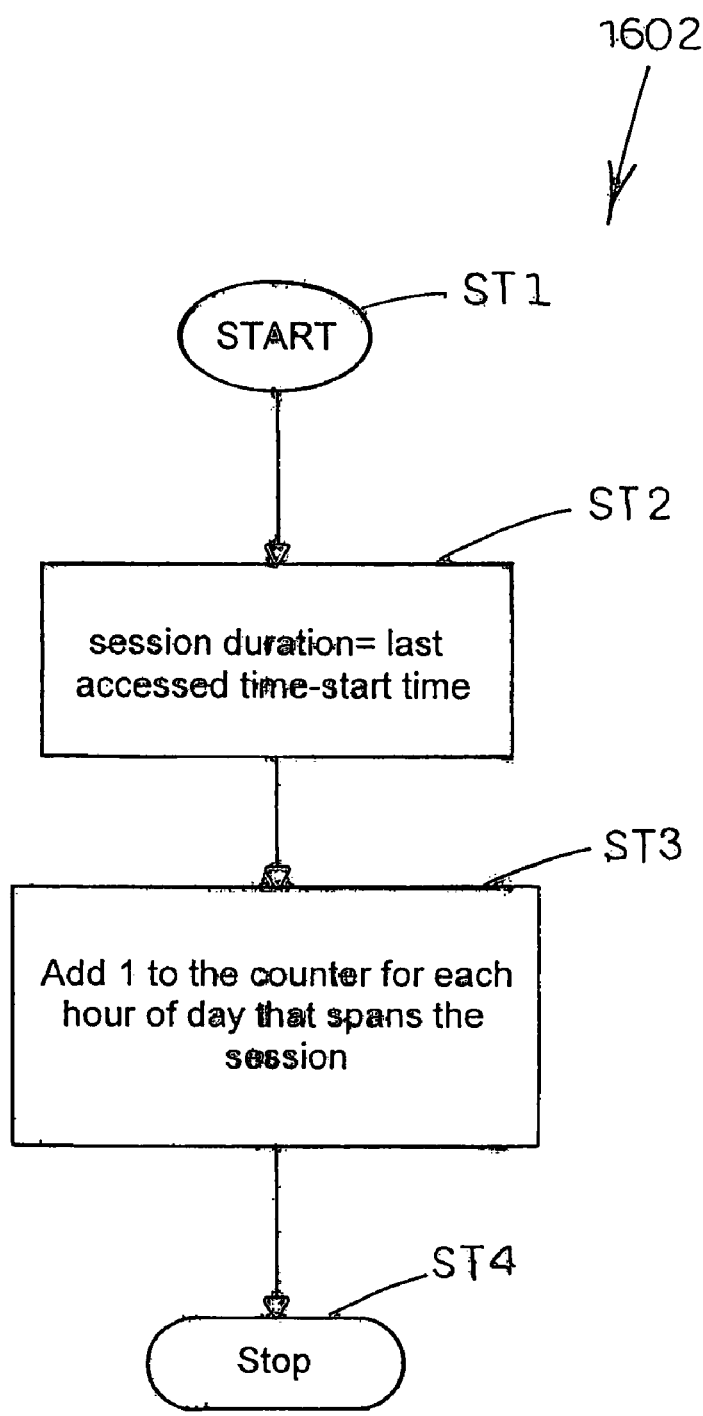

FIGS. 16A and 16B illustrate flow charts, generally designated 1600 and 1602, respectively, of exemplary processes operating in combination for detecting and triggering when a user's login time is not in accordance with observed login time behavior for the user. FIG. 16A shows the "triggering" side of detector D13. Assuming detector D13 knows a normal login time was for the user, it can easily be determined if a login right now is abnormal. FIG. 16B shows the "learning" side of this detector, in which what is normal is learned. This can be accomplished by constructing two histograms for every user in the system. For example, one histogram can be constructed for access during the week, Monday through Friday. Additionally, for example, one histogram can be constructed for weekend access, Saturday and Sunday. Each histogram consists of 24 accumulators, one for each hour of the day. Each time the user is active during a given hour, detector D13 can increment the counter for that hour.

Referring specifically to FIG. 16A, the process can begin at step ST1 when a login attempt is detected. Next, at step ST2, detector D13 can determine whether the login attempt was successful. If the login attempt was not successful, the process can stop ST3. If the login attempt was successful, a user ID can be retrieved from the HTTP request associated with the login (step ST4). Next, the process can proceed to step ST5.

Referring to step ST5 of FIG. 16A, detector D13 can determine whether the total user logins is greater than warm-up. If the total user logins is not greater than warm-up, the process can stop (step ST3). Otherwise, if total user logins is greater than warm-up, a user time-of-day access histogram for the user can be retrieved (step ST6). Next, the process can proceed to step ST7.

Referring to step ST7 of FIG. 16A, detector D13 can determine whether the login time for the user is normal based on the user time-of-day access histogram for the user. If the login time is normal, the process can stop (step ST3). Otherwise, if the login time is not normal, a security event can be generated or detector D13 can trigger (step ST8). Next, the process can proceed to step ST5.

Referring now to FIG. 16B, the process can start at step ST1. Next, detector D13 can set the session duration to the difference of the last accessed time to the start time (step ST2). Next, detector D13 can add 1 to a counter for each hour of day that spans the session (step ST3). The process can then stop (step ST4).

Detector D14 can detect when a user has not properly logged off from a monitored web application before the session associated with the logon expires. Users allowing the session to expire rather than logging off can increase the risk of session-based attacks against a web application. Detector D14 can require that the user has correctly used the logout procedure of the monitored web application.

Detector D15 can detect and trigger when an authenticated user subsequently logs in on the same session as a different user. If the monitored web application allows, intentionally or unintentionally, for a user to log in a second time with different credentials while maintaining the same session, detector D15 can provide a notification when this occurs.

User Behavior Profiling

Security system 102 can detect when the current activity of users deviates from expected behavior activity based on user behavior profiling. Security system 102 can also detect when the current activity deviates a predetermined amount from a predetermined value. When the behavior activity deviates the predetermined amount, triggering can occur to register a threat score for a user session and/or login session associated with the activity.

Detector D16 can trigger when the number of requests for a web page is unusually high. Detector D16 can monitor the requests for a web page from all users and generate a behavior profile for the requests for the web page for all users. According to one embodiment, the behavior profile can include the expected rate of web page requests or the expected number of web page requests over a predetermined period of time. Detector D16 can determine the expected rate of web page requests by dividing the number of web page requests over a period of time by the time period. Detector D16 can determine the expected number of web page requests over a predetermined period of time by monitoring the web page request over a time period equal to the predetermined period of time. Subsequently, detector D16 can monitor the web page requests and trigger when the rate of web page requests deviates from the expected rate or the number of web page requests deviates from an expected number over a period of time. Detector D16 can be set to trigger when the rate of web page requests or the number of web page request over a period of time deviates a predetermined rate or number, respectively, from the expected rate or number of web page requests, respectively. Detector D16 can be useful for detecting an abnormal usage patterns, such as data mining.

Figure 17A:
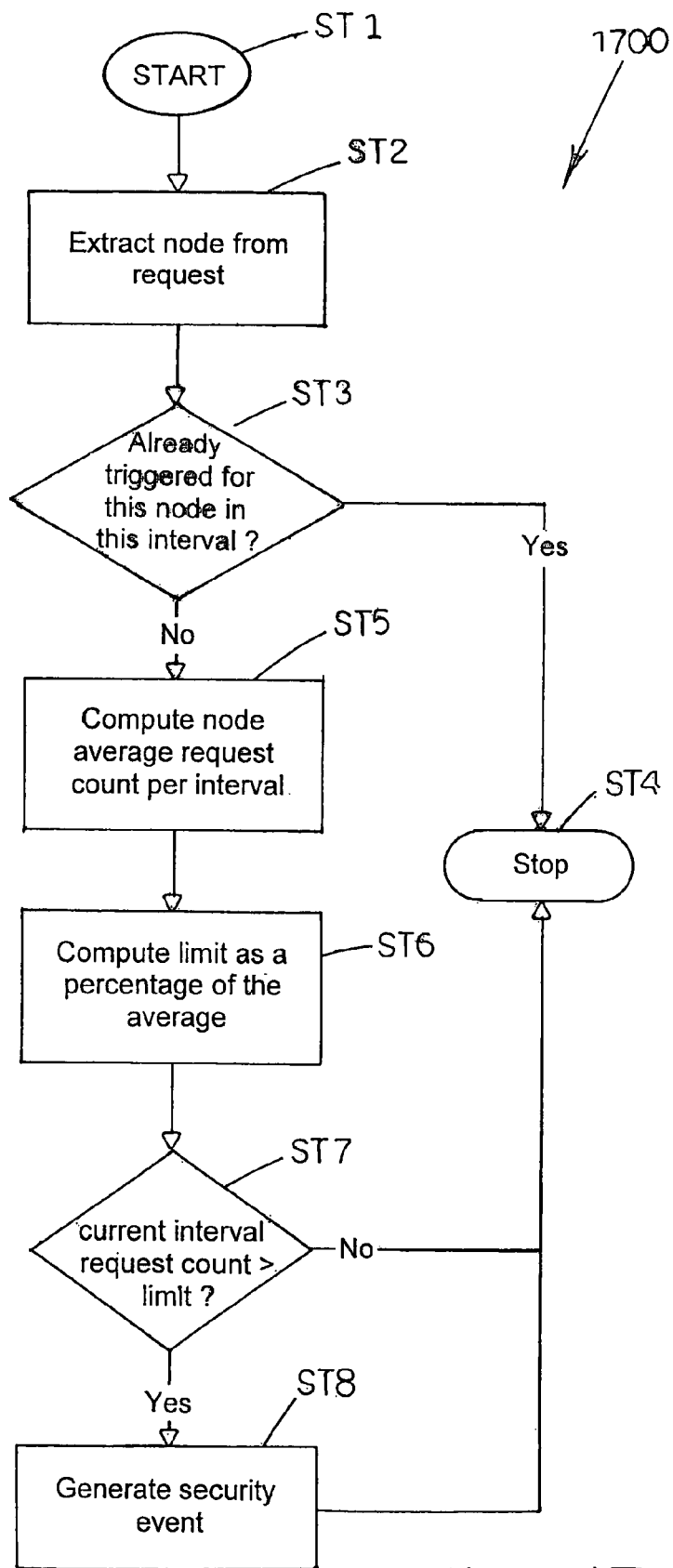
FIGS. 17A and 17B illustrate flow charts of exemplary processes operating in combination for detecting and triggering the number of requests for a web page is abnormal.
Figure 17B:
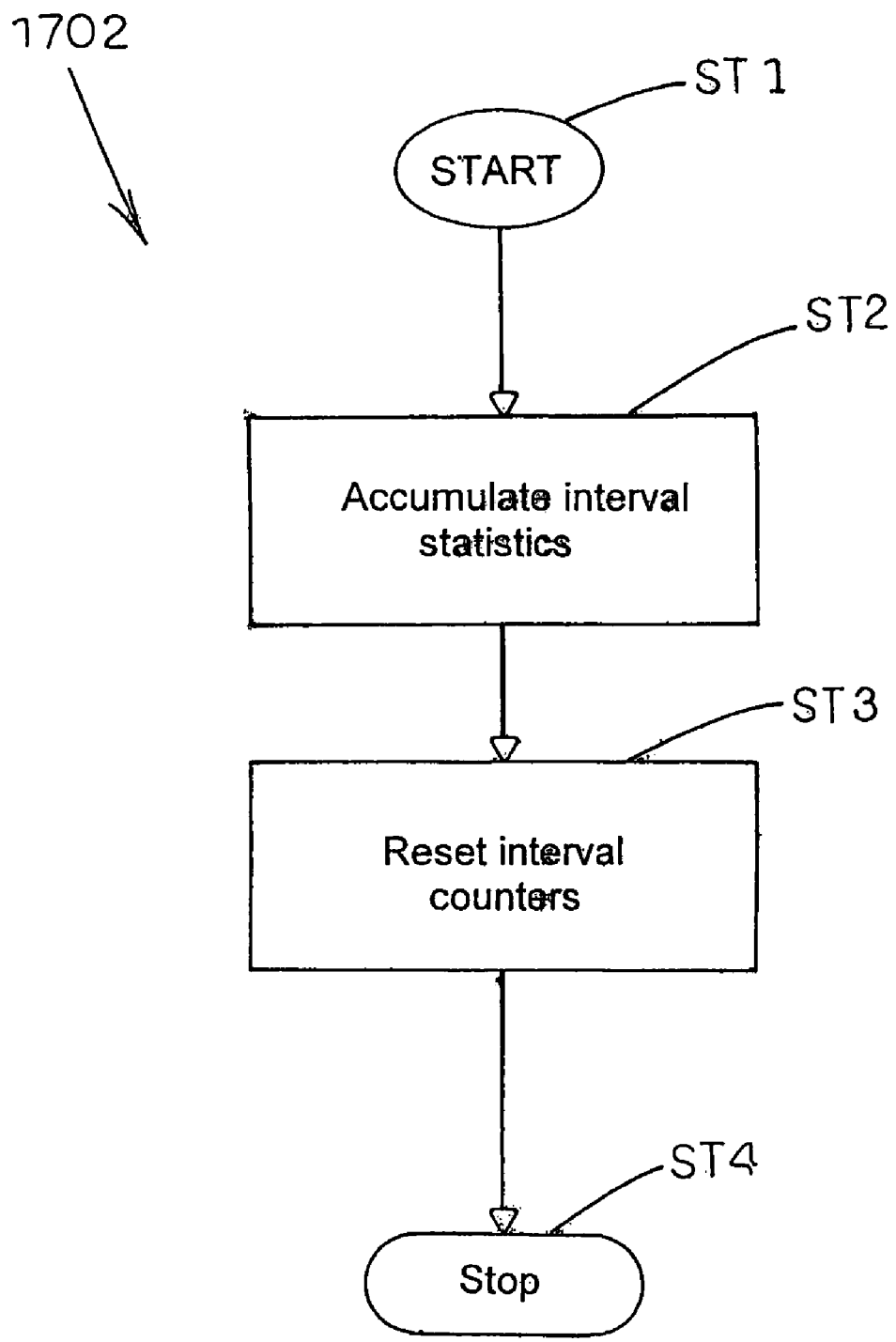

FIGS. 17A and 17B illustrate flow charts, generally designated 1700 and 1702, respectively, of exemplary processes operating in combination for detecting and triggering the number of requests for a web page is abnormal. The processes of FIGS. 17A and 17B can be implemented by detector D16. FIG. 17A shows the triggering side of detector D16. FIG. 17B shows the learning side of detector D16. Note that for users sessions create natural boundaries for calculating statistics, while for Pages (nodes) in the application, no such natural boundary exists. Therefore, detector D16 can utilize a configurable time interval for computing statistics against nodes. At the end of each time interval, the statistics make up a single observation. For example, the request count at the end of each interval makes one observation that is used to calculate an average interval request count. At the end of the interval, the counters are reset and the next interval begins.

Referring specifically to FIG. 17A, the process can begin at step ST1 when a request is received. Next, a node or web page can be extracted from the request (step ST2).

Referring to step ST3 of FIG. 17A, detector D16 can determine whether detector D16 has already triggered for this node or web page in this interval. If detector D16 has already triggered, the process can stop (step ST4). Otherwise, if detector D16 has not already triggered, detector D16 can compute the node or web page average request count per interval (step ST5). Next, step ST6, detector D16 can compute a limit as a percentage of the average request determine in step ST5. The process can then proceed to step ST7.

Referring to step ST7 of FIG. 17A, detector D16 can determine whether the current interval request count is greater than the limit. If the current interval request count is not greater than the limit, the process can proceed to step ST4. Otherwise, if the current interval request count is greater than the limit, a security event can be generated and detector D16 can trigger (step ST8). Next, the process can stop (step ST4).

Referring now to FIG. 17B, the process can start at step ST1. Next, detector D16 can accumulate interval statistics (step ST2). Detector D17 can also reset interval counters (step ST3). The process can then stop (step ST4).

Figure 18:
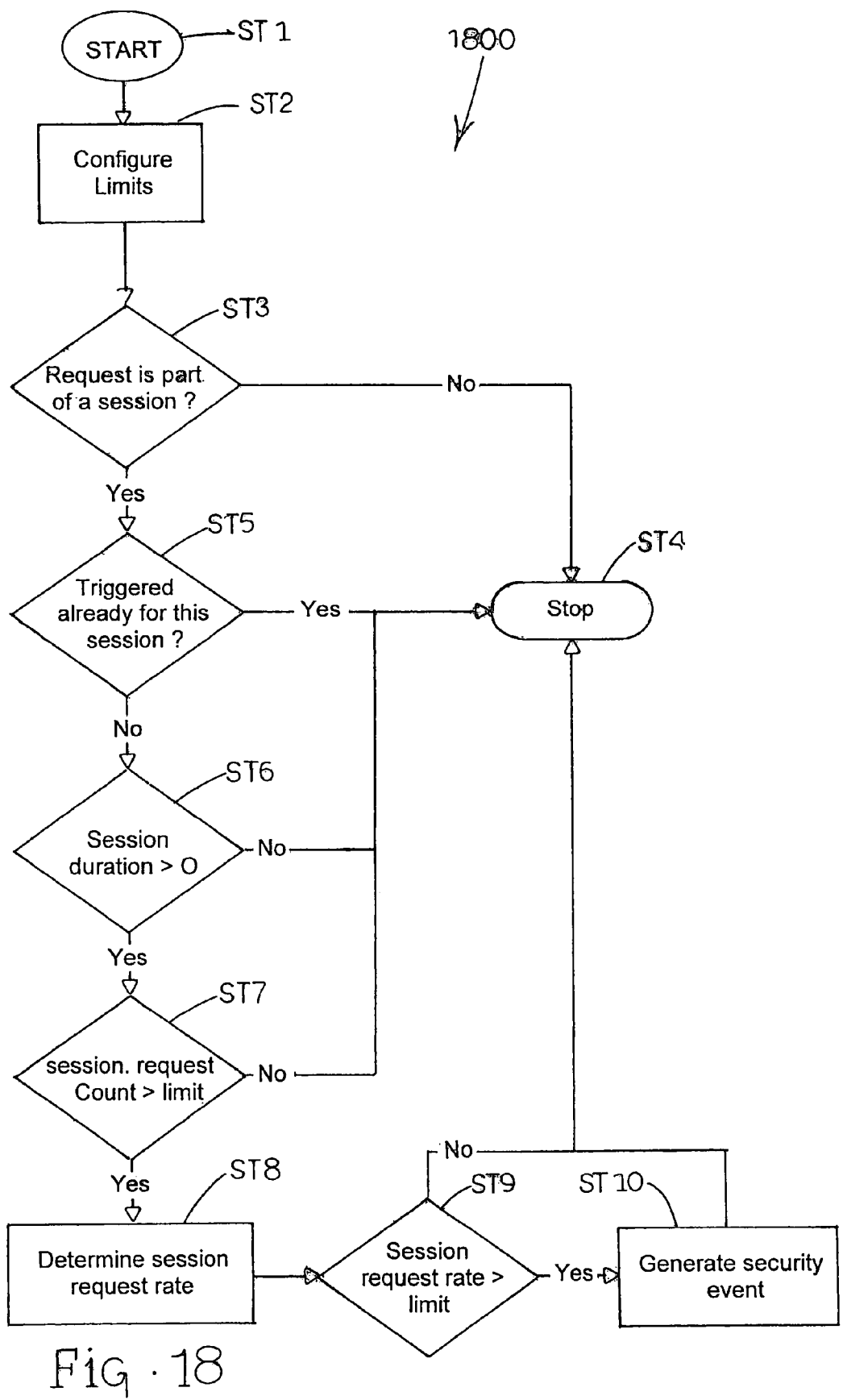
FIG. 18 is a flow chart which illustrates an exemplary process for determining and triggering when the number of requests within a single session exceeds a predetermined number during a period of time.

Detector D17 can trigger when the number of requests within a single session exceeds a predetermined number during a period of time. When a user issues web page or HTTP requests too quickly, it can indicate that a tool is being used or that the user's browser is not throttling properly. Referring to FIG. 18, a flow chart, generally designated 1800, is provided which illustrates an exemplary process for determining and triggering when the number of requests within a single session exceeds a predetermined number during a period of time. The process can begin at step ST1.

Referring to step ST2 of FIG. 18, the predetermined limits for detector D17 can be configured or set. The predetermined limits can include a session request count and a session request rate.

Next, at step ST3 of FIG. 18, detector D17 can determine whether the HTTP request is part of a user session in user sessions table UST (FIG. 2). If the HTTP request is not part of a user session in user sessions table UST, the process can stop (step ST4). Otherwise, the process can proceed to step ST5.

Referring to step ST5 of FIG. 18, detector D17 can determine whether triggering has already occurred for the user session associated with the HTTP request. If triggering has already occurred for the user session, the process can stop (step ST4). Otherwise, the process can proceed to step ST6.

Referring to step ST6 of FIG. 18, detector D17 can determine whether the session duration associated with the HTTP request is greater than 0. If the session duration is not greater than 0, the process can stop (step ST4). If the session duration is greater than 0, the process can proceed to step ST7.

Referring to step ST7 of FIG. 18, detector D17 can determine whether the request count for the user session is greater than the predetermined limit. If the request count is not greater than the predetermined limit, the process can stop (step ST4). If the request count is greater than the predetermined limit, the process can proceed to step ST8.

Referring to step ST8 of FIG. 18, detector D17 can determine the session request rate for the user session. Next, at step ST9, detector D18 can determine whether the request rate for the user session is greater than the predetermined request rate limit. If the request rate for the user session is not greater than the predetermined request rate limit, the process can stop (step ST4). Otherwise, if the request rate for the user session is greater than the predetermined request rate limit, a security event can be generated or detector D17 can trigger (step ST10).

Detector D18 can trigger when the number of requests for a web page for a user session is unusually high. According to one embodiment, detector D18 can trigger when the number of requests for a web page for the user session deviates a predetermined number compared to the average number of requests for the web page for all user sessions.

Detector D19 can trigger when a user session duration deviates from expected user behavior. Detector D19 can monitor the user session durations over a period of time for generating the expected session duration for the user. The expected session duration can be an average. Detector D19 can be set to trigger when the user session deviates a predetermined time period from the expected session duration for the user.

Figure 19A:
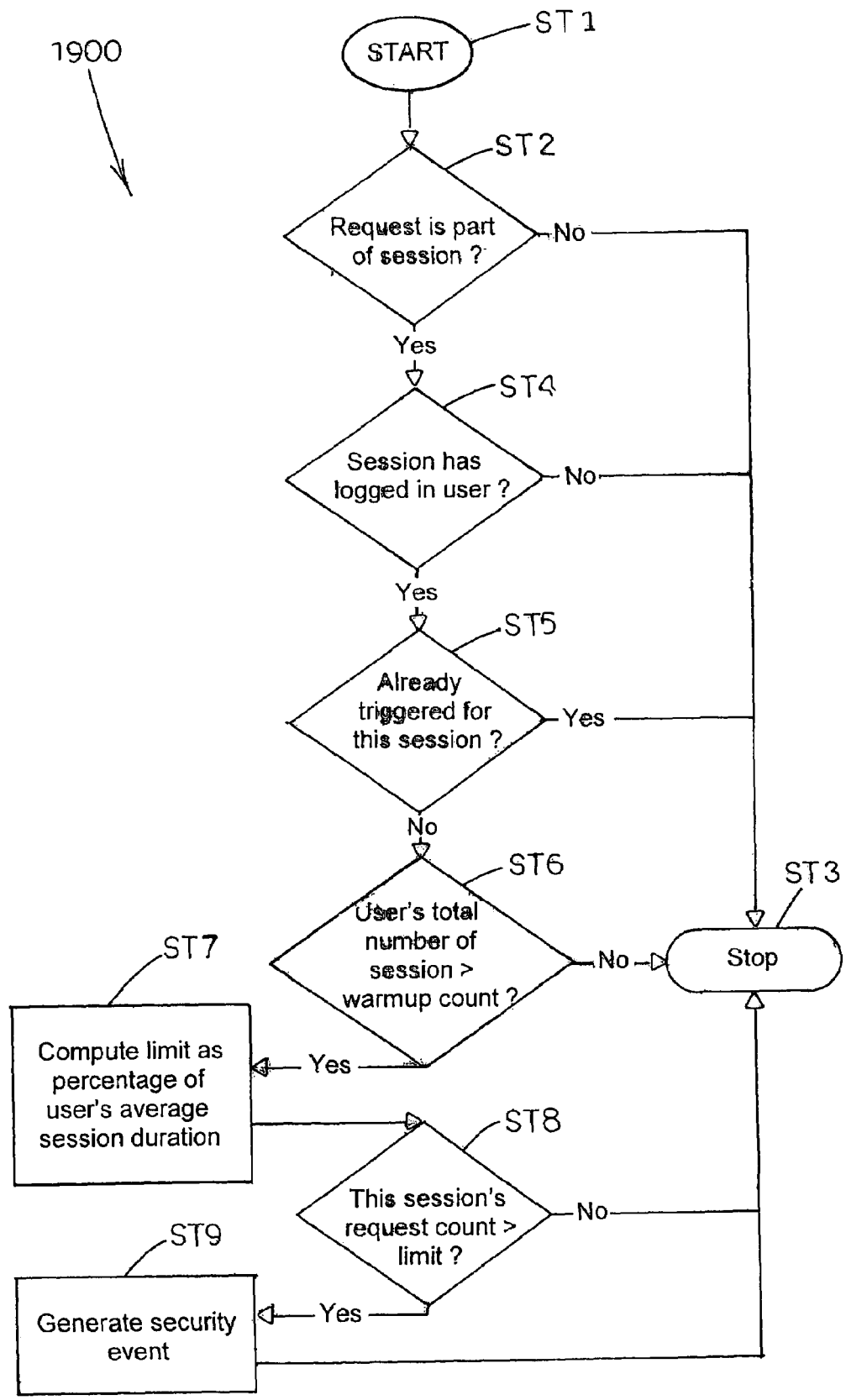
FIGS. 19A and 19B are flow charts of exemplary processes operating in combination for triggering and detecting when a user session duration deviates from expected user behavior.
Figure 19B:
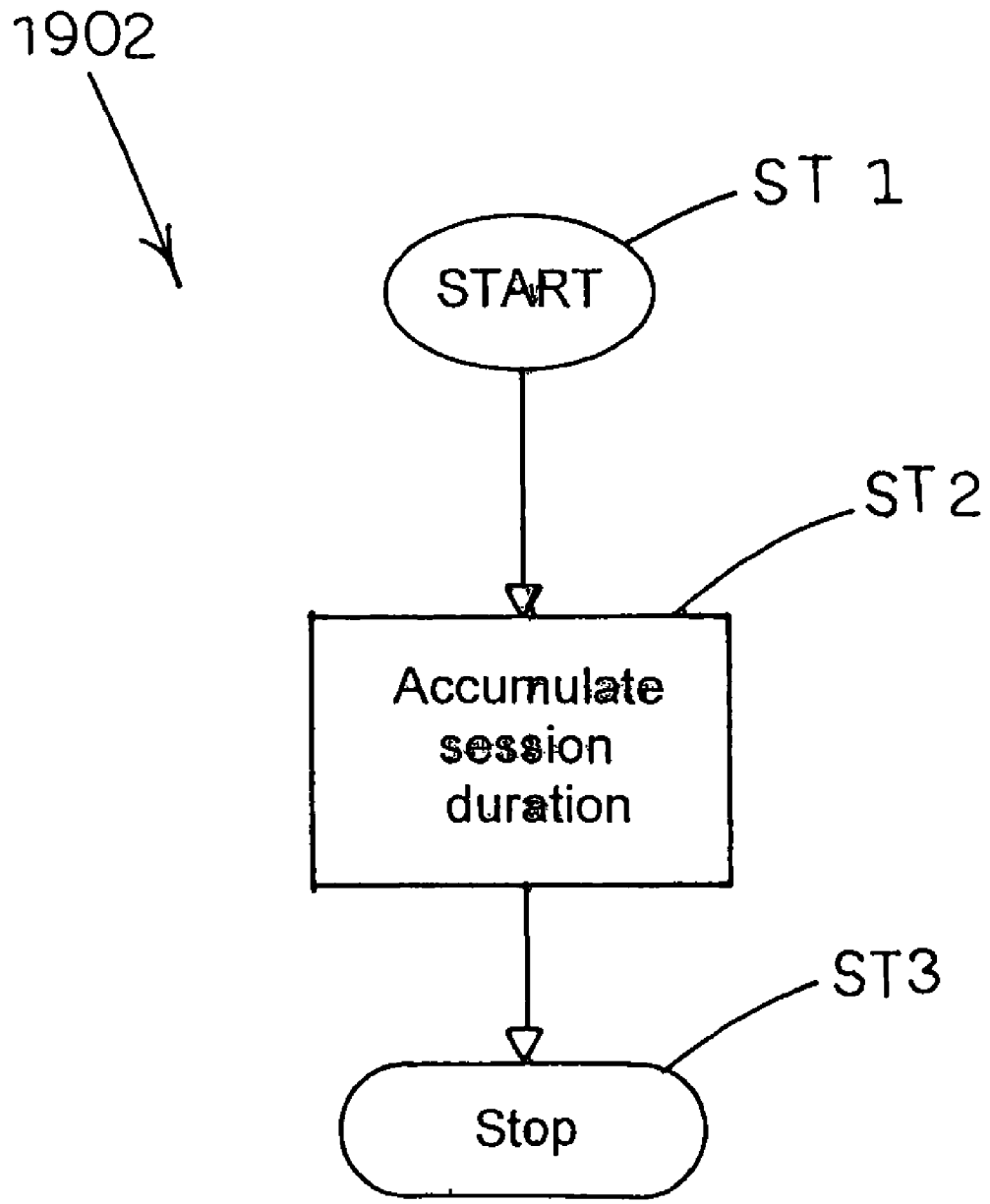

FIGS. 19A and 19B illustrate flow charts, generally designated 1900 and 1902, respectively, of exemplary processes operating in combination for triggering and detecting when a user session duration deviates from expected user behavior. Detector D19 (FIG. 2) can implement the processes of FIGS. 19A and 19B. FIG. 19A shows the triggering side of detector D19. FIG. 19B shows the learning side. At the end of each session, detector D19 compute the session duration and use it to compute the average session duration for each user in the system.

Referring specifically to FIG. 19A, the process can begin at step ST1. Next, detector D19 can determine whether the request is part of a monitored session (step ST2). If the request is not part of a monitored session, the process can stop (step ST3). Otherwise, if the request is part of a monitored session, the process can proceed to step ST4.

Referring to step ST4 of FIG. 19A, detector D19 can determine whether the session has a logged in user. If the session does not have a logged in user, the process can stop (step ST3). Otherwise, if the session has a logged in user, the process can proceed to step ST5.

Referring to step ST5 of FIG. 19A, detector D19 can determine whether detector D19 has already triggered for the session associated with the request. If detector D19 has already triggered, the process can stop (step ST3). Otherwise, if detector D19 has not triggered, the process can proceed to step ST6.

Referring to step ST6 of FIG. 19A, detector D19 can determine whether the user's session duration total is greater than the warm-up count. A minimum number of sessions must be observed before an estimate of the average session duration can be computed. During this warm-up period, detector D19 cannot be triggered. If the user's session duration total is not greater than the warm-up count, the process can stop (step ST3). Otherwise, if user's session duration total is greater than the warm-up count, detector D19 can compute the limit as a percentage of the user's average session duration (step ST7). Next, at step ST8, detector D19 can determine whether the monitored session's duration is greater than the limit computed in step ST7. If the monitored session's duration is not greater than the limit, the process can stop (step ST3). Otherwise, a security event can be generated or detector D19 can trigger (step ST9). Next, the process can stop (step ST3).

Referring now to FIG. 19B, the process can begin at step ST1 when a user logs out. Next, detector D19 can accumulate session duration statistics for the session associated with the user logging out (step ST2). Next, the process can stop (step ST3).

Detector D20 can trigger when a user session duration deviates from an expected user session duration based on all users. Detector D20 can monitor all user session durations over a period of time for generating the expected user session duration for all users. Detector D20 can be set to trigger when the user session deviates a predetermined time period from the expected session duration for all users.

Figure 20B:
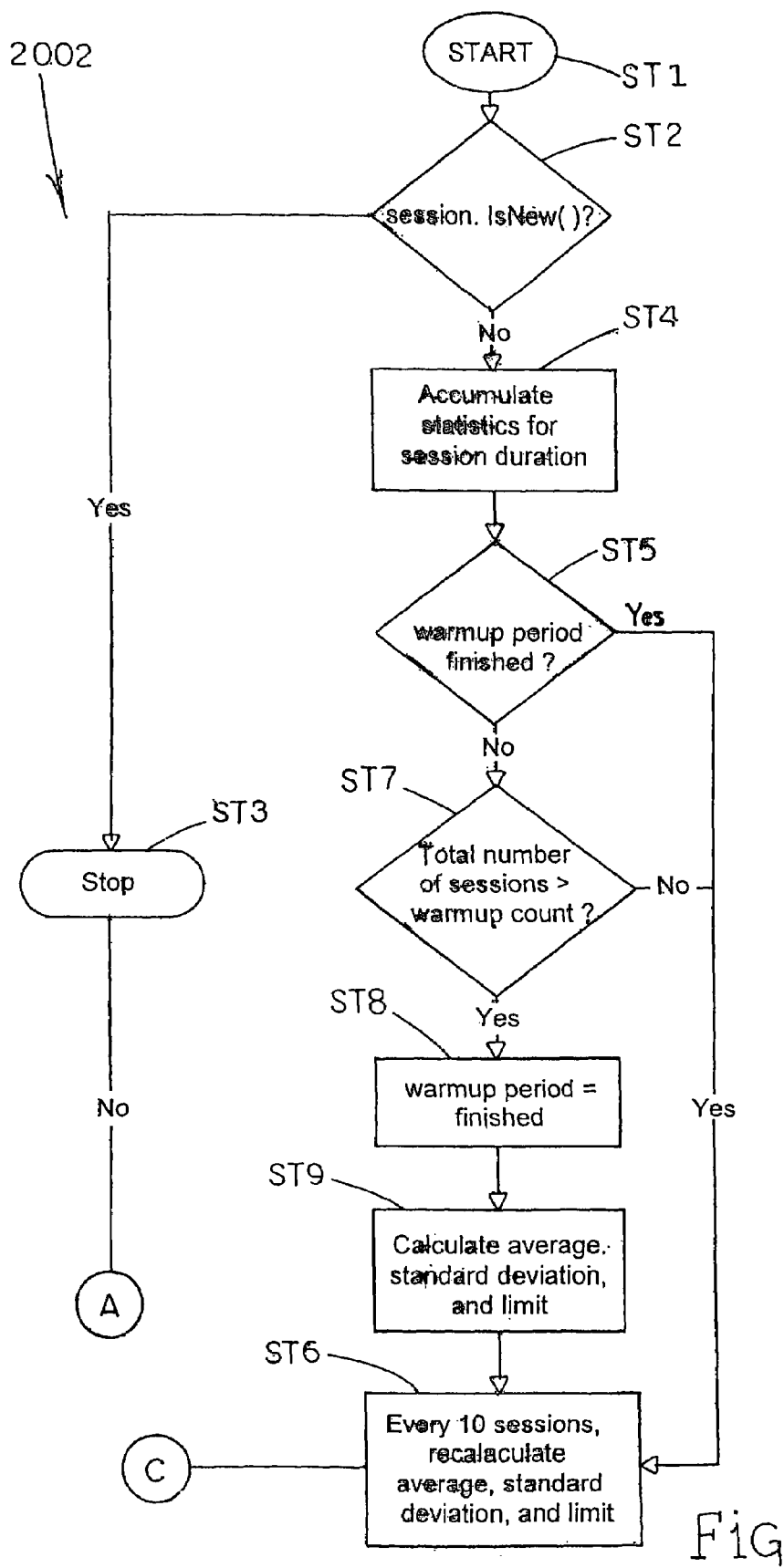
FIGS. 20A and 20B illustrate flow charts of exemplary processes for detecting and triggering when a user session duration deviates from an expected user session duration based on all users.
Figure 20C:
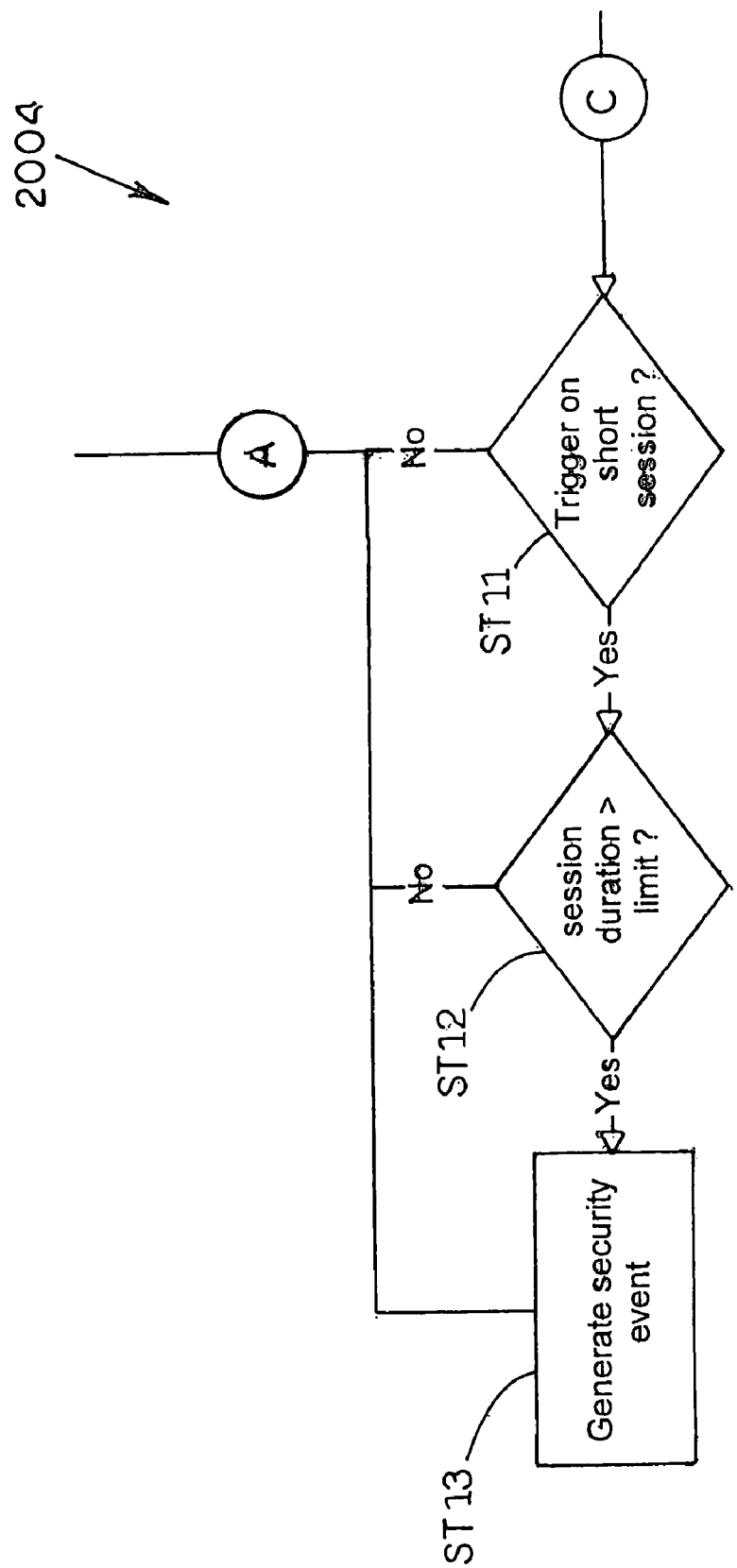

FIGS. 20A and 20B illustrate flow charts, generally designated 2000 and 2002, respectively, of exemplary processes for detecting and triggering when a user session duration deviates from an expected user session duration based on all users. Referring specifically to FIG. 20A, the process can begin at step ST1. Next, detector D20 can determine whether the warm-up period is finished (step ST2). The warm-up period is the minimum numbers of sessions that must be observed before a meaningful average session duration can be calculated. During the warmup time, the detector cannot be triggered. If the warm-up period is not finished, the process can stop (step ST3). Otherwise, if the warm-up period is finished, the process can proceed to step ST4.

Referring to step ST4 of FIG. 20A, detector D20 can determine whether the request is part of the monitored session. If the request is not part of the monitored session, the process can stop (step ST3). Otherwise, if the request is part of the monitored session, the process can proceed to step ST5.

Referring to step ST5 of FIG. 20A, detector D20 can determine whether detector D20 has already triggered for this session. If detector D20 has already triggered for this session, the process can stop (step ST3). Otherwise, if detector D20 has not already triggered for this session, the process can proceed to step ST6.

Referring to step ST6 of FIG. 20A, detector D20 can determine whether the duration for this session is greater than a predetermined limit. If the session duration is not greater than the limit, the process can stop (step ST3). Otherwise, if the session duration is not greater than the limit, a security event can be generated or detector D20 can trigger (step ST7). Next, the process can stop (step ST3).

Referring now to FIG. 20B, the process can begin at step ST1. Next, detector D20 can determine whether the session is new. New session can refer the server generating a session ID in response to a request, but the client has never returned the session ID to the server. If the session is new, the process can stop (step ST3). If the session is not new, detector D20 can accumulate statistics for the session duration. Next, the process can proceed to step ST5.

Referring to step ST5 of FIG. 20B, detector D20 can determine whether the warm-up period is finished. If the warm-up period is finished, the process can proceed to step ST6. If the warm-up period is not finished, the process can proceed to step ST7.

Referring to step ST7 of FIG. 20B, detector D20 can determine whether the total session duration is greater than the warm-up count. If the total session duration is not greater than the warm-up count, the process can proceed to step ST6. Otherwise, if the total session duration is greater than the warm-up count, the warm-up period can be finished (step ST8). Next, detector D20 can calculate the average, standard deviation, and limit for the session. For each observation, detector D20 can accumulate the sum of the values, the sum of the squares of the values, and the count of observations. Detector D20 can then use standard formulas to compute the sample average and standard deviation. The standard deviation is a measure of the variability in the observations.

Referring to step ST6 of FIG. 20B, detector D20 can recalculate the average, standard deviation, and limit for the session every 10 sessions. Next, the process can proceed to step ST11.

Referring to step ST1 of FIG. 20B, detector D20 can determine whether to trigger on short sessions. Detector D20 can provide a configuration option to also trigger on sessions that are abnormally shorter than average. If detector D20 does not trigger on short sessions, the process can stop (step ST3). Otherwise, the process can proceed to step ST12.

Referring to step ST11 of FIG. 20B, detector D20 can determine whether the session duration is less than the limit determined in steps ST6 or ST9. If the session duration is not less than the limit, the process can stop (step ST3). Otherwise, a security event can be generated or detector D20 can trigger (step ST13). Next, the process can stop (step ST3).

Figure 21:
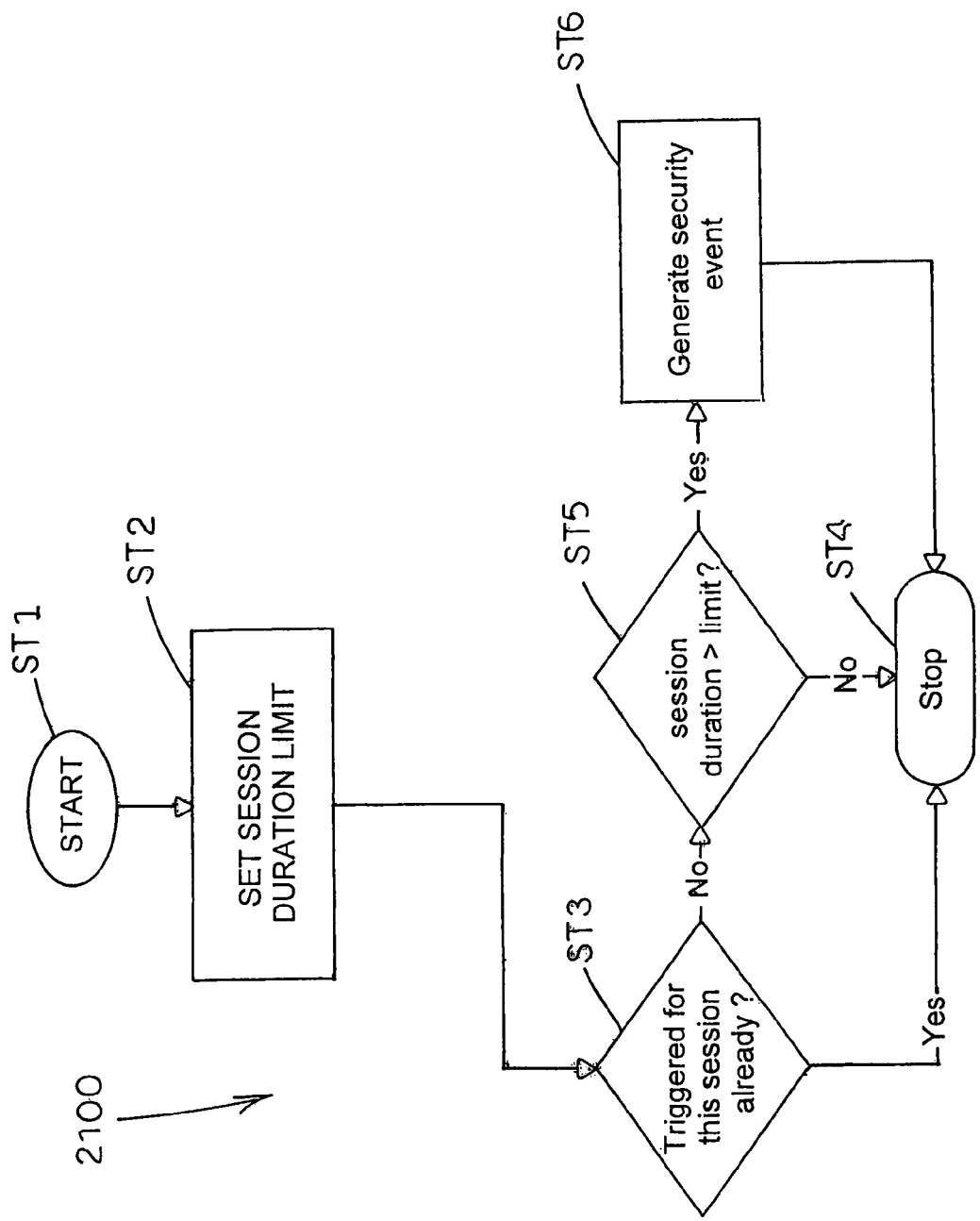
FIG. 21 is a flow chart which illustrates an exemplary process for triggering when a user's session duration exceeds a predetermined period of time.

Detector D21 can trigger when a user's session duration exceeds a predetermined period of time. The predetermined period of time can be configured by the operator. Referring to FIG. 21, a flow chart, generally designated 2100, is provided which illustrates an exemplary process for triggering when a user's session duration exceeds a predetermined period of time. The process can begin at ST1. At step ST2, the session duration limit can be set. Next, detector D21 can determine whether the user session has triggered already (step ST3). If detector D21 has triggered already, the process stops (step ST4). If detector D21 has not triggered already, the process can proceed to step ST5.

Referring to step ST5 of FIG. 21, detector D21 can determine whether the session duration exceeds the session duration limit. If the session duration does not exceed the session duration limit, the process stops (step ST4). If the session duration exceeds the session duration limit, a security event can be triggered or detector D21 triggers (step ST6) and the process stops (step ST4).

Detector D22 can trigger when user activity in a session deviates from expected or normal user activity for all user sessions. An operator can adjust the deviation required for detector D22 to trigger. For example, the operator can configure detector D22 such that triggering occurs when user activity is two standard deviations from the normal user activity.

Figure 22A:
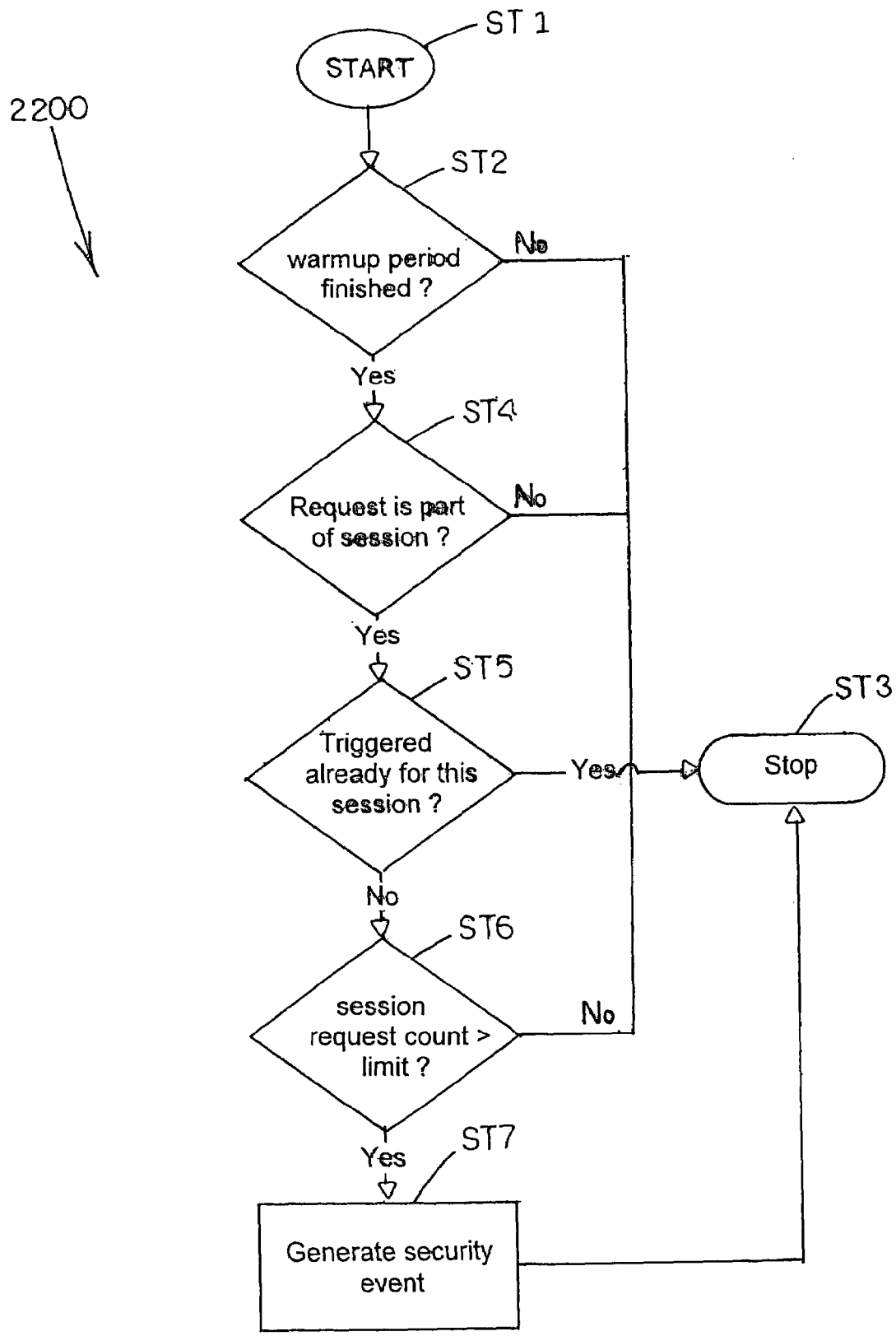
FIGS. 22A and 22B are flow charts of exemplary processes operating in combination for detecting and triggering when user activity in a session deviates from expected or normal user activity for all user sessions.
Figure 22B:
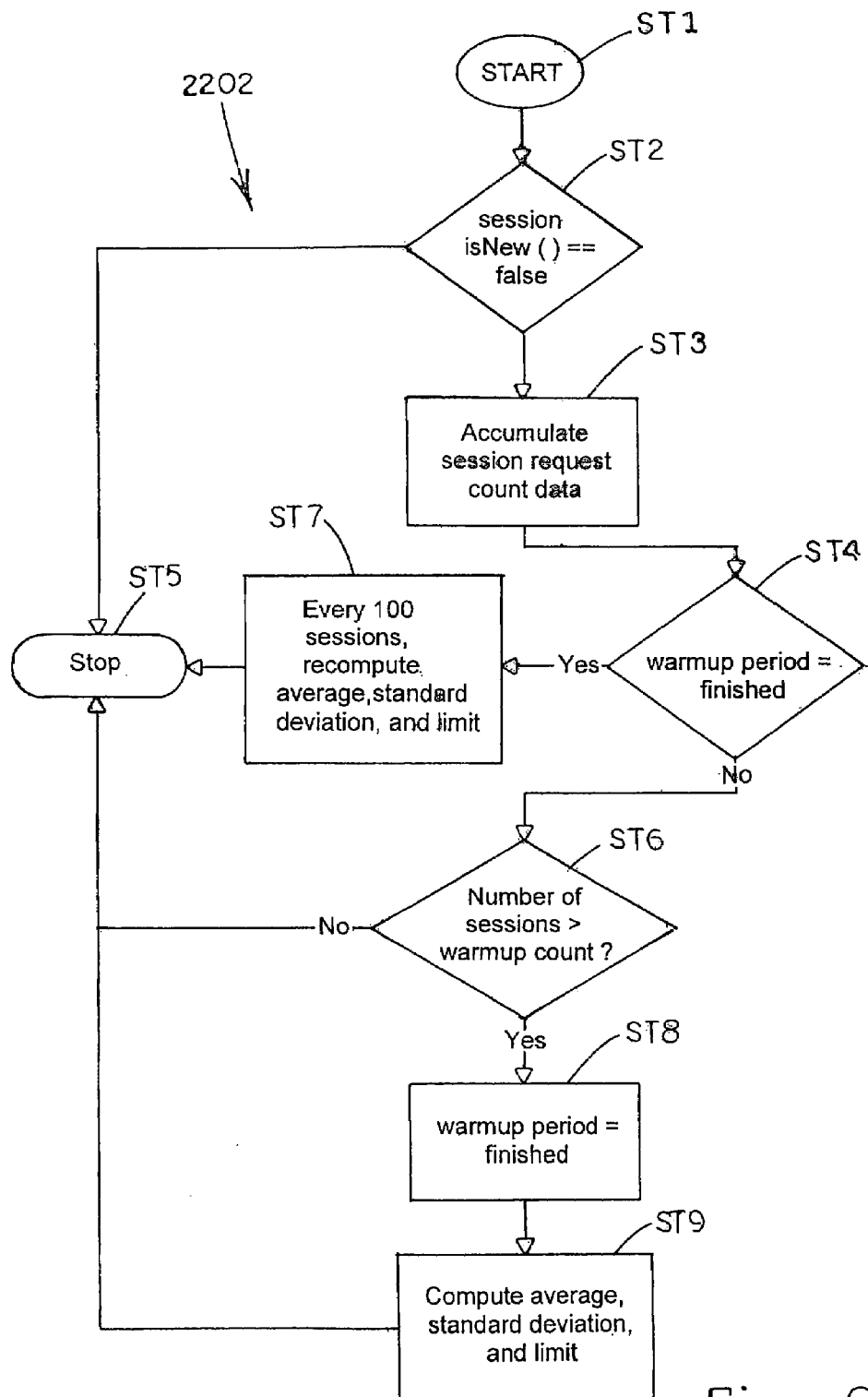

FIGS. 22A and 22B illustrate flow charts, generally designated 2200 and 2202, respectively, of exemplary processes operating in combination for detecting and triggering when user activity in a session deviates from expected or normal user activity for all user sessions. Referring specifically to FIG. 22A, the process can begin at step ST1. Next, detector D22 can determine whether the warm-up period is finished (step ST2). Detector D22 is based on the average number of requests in a session across all users. The warm-up period is used to observe the minimum number of sessions needed to compute a meaningful average. During this time, detector D22 cannot be triggered. If the warm-up period is not finished, the process can stop (step ST3). Otherwise, if the warm-up period is finished, the process can process to step ST4.

Referring to step ST4 of FIG. 22A, detector D22 can determine whether the request is part of a monitored session. If the request is not part of a monitored session, the process can stop (step ST3). Otherwise, if the request is part of a monitored session, the process can proceed to step ST5.

Referring to step ST5 of FIG. 22A, detector D22 can determine whether detector D22 has already triggered for this session. If detector D22 has already triggered for this session, the process can stop (step ST3). Otherwise, if detector D22 has not already triggered for this session, the process can proceed to step ST6.

Referring to step ST6 of FIG. 22A, detector D22 can determine whether the request count for the session is greater than a predetermined limit. The predetermined limit for detector D22 is expressed as a multiple of the standard deviation. When the request volume is greater than this limit, the detector is triggered. If the session request count is not greater than the limit, the process can stop ST3. Otherwise, if the session request count is greater than the limit, a security event can be generated or detector D22 can trigger (step ST7). Next, the process can stop (step ST3).

Referring now to FIG. 22B, the process can start at step ST1. Next, detector D22 can determine whether the monitored session is not new (step ST2). The monitored session is not new if the client has issued any requests in the session, i.e. the request count is greater than zero. If the monitored session is not new, detector D22 can accumulate session request count data for the session (step ST3) and the process can proceed to step ST4. Otherwise, if the monitored session is new, the process can stop ST5.

Referring to step ST4 of FIG. 22B, detector D22 can determine whether the warm-up period is finished. If the warm-up period is not finished, the process can proceed to step ST6. Otherwise, if the warm-up period is finished, detector D22 can recomputed the count average, the standard deviation and the limit for every 100 sessions. Even when the warmup period has finished and detector D22 is operating, detector D22 can continue to observe sessions and compute the average, standard deviation, and limit every 100 sessions. This allows it to adapt to changes in application usage over time. Next, the process can stop (step ST5).

Referring to step ST6 of FIG. 22B, detector D22 can determine whether the number of sessions is greater than the warm-up count. The warm-up count here is a number of sessions provided by the operator. If the number of sessions is not greater than the warm-up count, the process can stop (step ST5). Otherwise, if the number of sessions is greater than the warm-up count, the warm-up period can be set to finished (step ST8). Next, detector D22 can compute or determined the count average, the standard deviation and the limit for the session. For each session observed, the request count at the end of the session is one observation. The number of observations, the sum, and the sum of the squares can be accumulated. Standard formulas can be used to calculate the average and standard deviation from these. Next, the process can stop (step ST5).

Figure 23A:
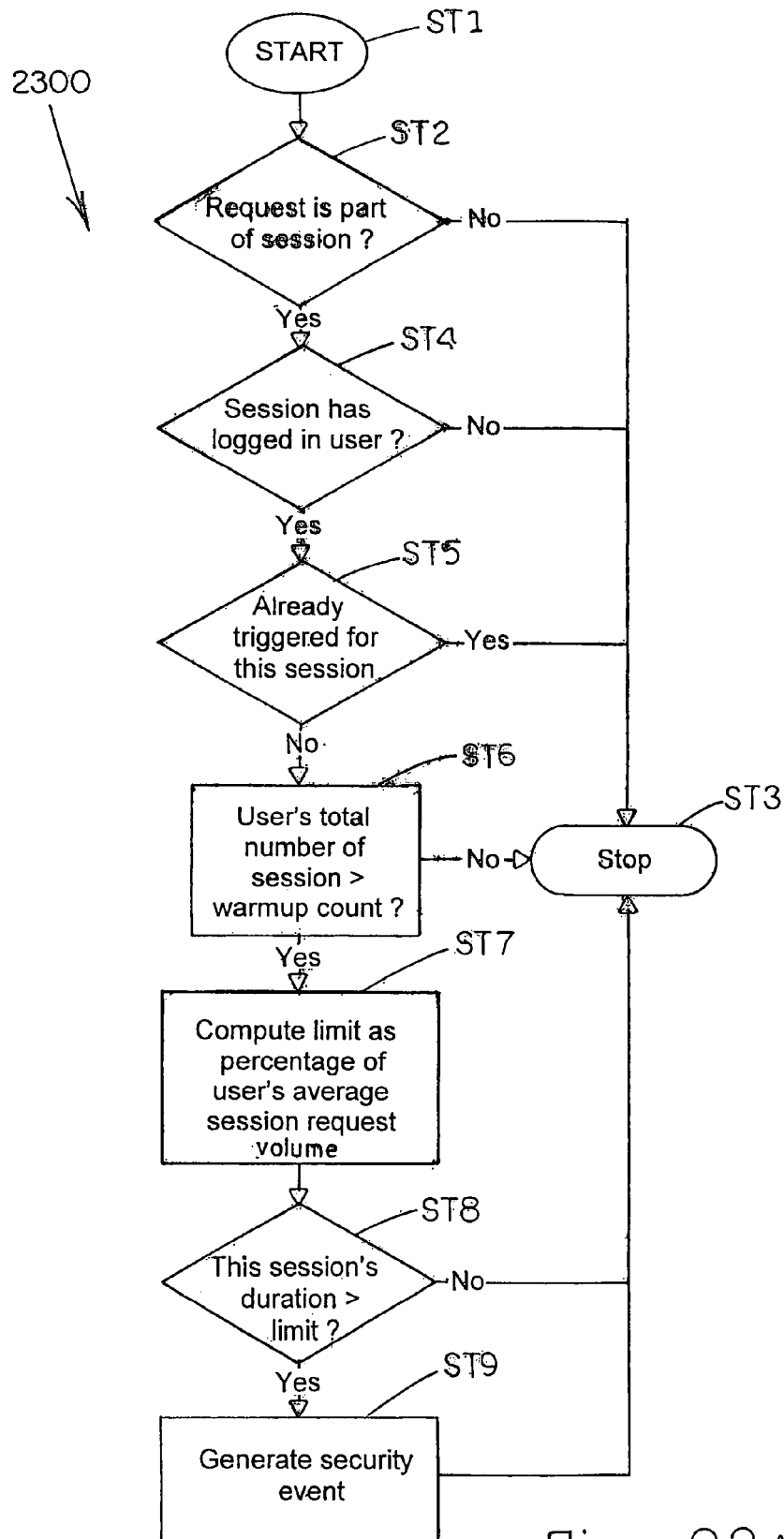

Detector D23 can trigger when user activity deviates from expected user activity for the user. An operator can adjust the deviation required for detector D23 to trigger. FIGS. 23A and 23B illustrate flow charts, generally designated 2300 and 2302, respectively, of exemplary processes operating in combination for detecting and triggering when user activity deviates from expected user activity for a user. Figure D23 can determine the average session request volume across all sessions. Detector D23 can determine the average session request volume per user. The warm-up count is a number of sessions specified by the operator required to compute the average.

Referring specifically to FIG. 23A, the process can start at step ST1. Next, detector D23 can determine whether an HTTP request is part of a monitored session (step ST2). If the request is not part of the monitored session, the process can stop (step ST3). Otherwise, if the request is part of the monitored session, the process can proceed to step ST4.

Referring to step ST4 of FIG. 23A, detector D23 can determine whether the monitored session has a logged in user. If the session does not have a logged in user, the process can stop (step ST3). Otherwise, if the session has a logged in user, the process can proceed to step ST5.

Referring to step ST5 of FIG. 23A, detector D23 can determine whether detector D23 has already triggered for this session. If detector D23 has already triggered for this session, the process can stop (step ST3). Otherwise, if detector D23 has not already triggered for this session, the process can proceed to step ST6.

Referring to step ST6 of FIG. 23A, detector D23 can determine whether the total request number for the session is greater than a warm-up count. If the total request number for the session is not greater than the warm-up count, the process can stop (step ST3). Otherwise, if the total request number for the session is greater than the warm-up count, detector D23 can compute a request limit as a percentage of the user's average session request volume (step ST7). Next, the process can proceed to step ST8.

Referring to step ST8 of FIG. 23A, detector D23 can determine whether the monitored session's request count is greater than the request limit. If the session's request count is not greater than the request limit, the process can stop (step ST3). Otherwise, if the session's request count is greater than the request limit, a security event can be generated or detector D23 can trigger (step ST9). Next, the process can stop (step ST3).

Referring now to FIG. 23B, the shown process includes steps for determining session request statistics. The process can begin at step ST1 when a user logout is detected. Next, detector D23 can accumulate session request volume statistics for use in the process of FIG. 23A. Next, the process can stop (step ST3).

Figure 24:
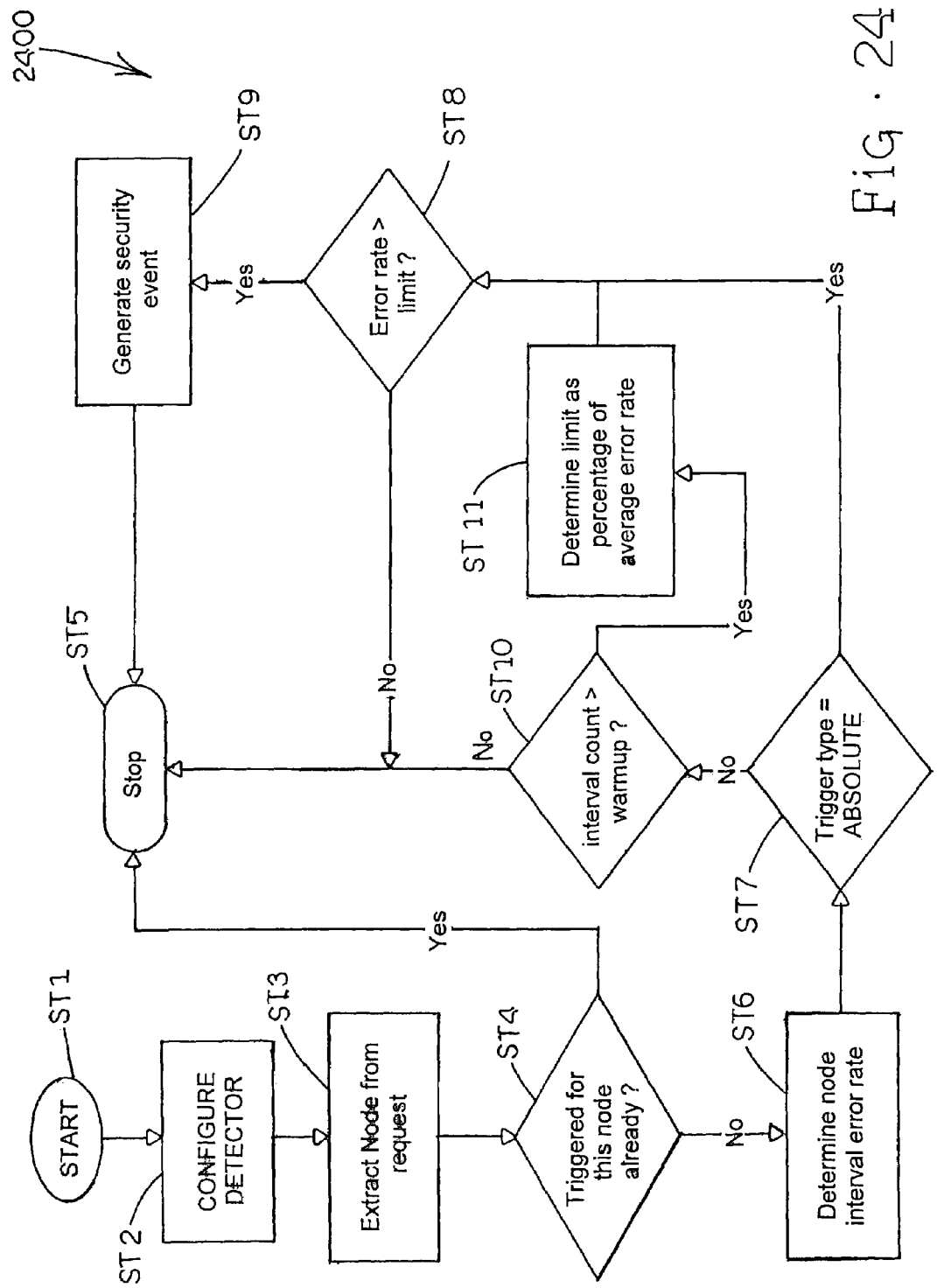
FIG. 24 is a flow chart of an exemplary process for determining when the rate of web page errors is higher than normal.

Detector D24 can detect when the rate of web page errors is higher than normal, or higher than a predetermined amount. A web page that is generating excessive errors may be under attack or the web application may be malfunctioning. Referring to FIG. 24, a flow chart, generally designated 2400, is provided which illustrates an exemplary process for determining when the rate of web page errors is higher than normal. The process can begin at step ST1. At step ST2, detector D24 can be configured with predetermined limits for triggering. Detector D24 can be set to trigger at a predetermined error rate limit. Detector D24 can also observe the normal page error rate for all users. Detector D24 can determine the page error rate across all users. Detector D24 can determine the fraction of requests during any interval for which the page returns an error (defined by HTTP status codes and/or HTML errors). Each interval provides one observation for calculating the average.

Detector D24 can also be set with different trigger types Two triggering methods can be provided for selection by the operator. For ABSOLUTE mode, the operator can specify a page error rate from 0 to 100%. When the actual error rate in any interval exceeds this value, detector D24 can trigger. In RELATIVE mode, the operator can specify the limit as a percentage above the normal error rate (e.g. 30% above normal).

Referring to step ST3 of FIG. 24, the node or web page request can be extracted from the HTTP request. Next, detector D24 can determine whether triggering has already occurred for this node or web page (step ST4). If triggering has already occurred for this node or web page, the process can stop (step ST5). Otherwise, detector D24 can determine the interval error rate for the node or web page (step ST6). Next, the process can proceed to step ST7).

Referring to step ST7 of FIG. 24, the detector D24 can determine whether the trigger type is absolute. If the trigger type is absolute, detector D24 can determine whether the error rate for the node or web page is greater than the predetermined error rate limit. If the error rate for the node or web page is greater than the predetermined error rate limit, a security event can be generated or detector D24 can trigger (step ST9). Otherwise, the process can stop (step ST5).

Referring again to step ST7 of FIG. 24, if the trigger type is not absolute, detector D24 can determine whether the interval count is greater than the warm-up (step ST10). Page (or node) statistics can be determined on a time-interval basis. Each interval can contribue one observation to the average, the interval counters can be reset, and the next interval can begin. In this case, the warm-up count can be the number of intervals required to compute a meaningful average page error rate. If the interval count is not greater than warm-up, the process can stop (step ST5). Otherwise, if the interval count is greater than warm-up, detector D24 can determine the predetermined limit as a percentage of the average error rate (step ST11). Next, the process proceeds to step ST8.

Referring again to step ST8 of FIG. 24, detector D24 can determine whether the error rate is greater than the limit as a percentage of the average error rate, as determined in step ST11. If the error rate is greater, then a security event can be generated and detector D24 can trigger (step ST9). Otherwise, the process can stop (step ST5).

Session Activity Detectors

Security system 102 can detect suspicious network traffic or activity regarding a user session. For example, detector D25 can detect and trigger when a user session changes to a different IP address. A change to a different IP address for a user session can indicate that another user has hijacked the session. In some instances, it can be normal for a user's communication to originate from different IP addresses. The network mask can be utilized to constrain how the user's IP address changes during a single session. IP addresses can have four subparts (called "quads") written in a "dotted string format" e.g. 192.168.55.103. The network mask can "zero out" part of the IP address for the purpose of comparing it or determining a source network. For example, IP address=192.168.55.103; Mask=255.255.0.0→network=192.168.0.0. A user access list can also be utilized to disable detector D23 for specific source networks. The UAL allows the operator to (1) disable specific detectors for a set of users based on the client IP address and/or the user-id; and (2) to modify the threat score of all detectors for these users. Detector D25 can trigger sometime between when a user session is created and when the user logs out to end a login session, as detected by detector D25.

Figure 25:
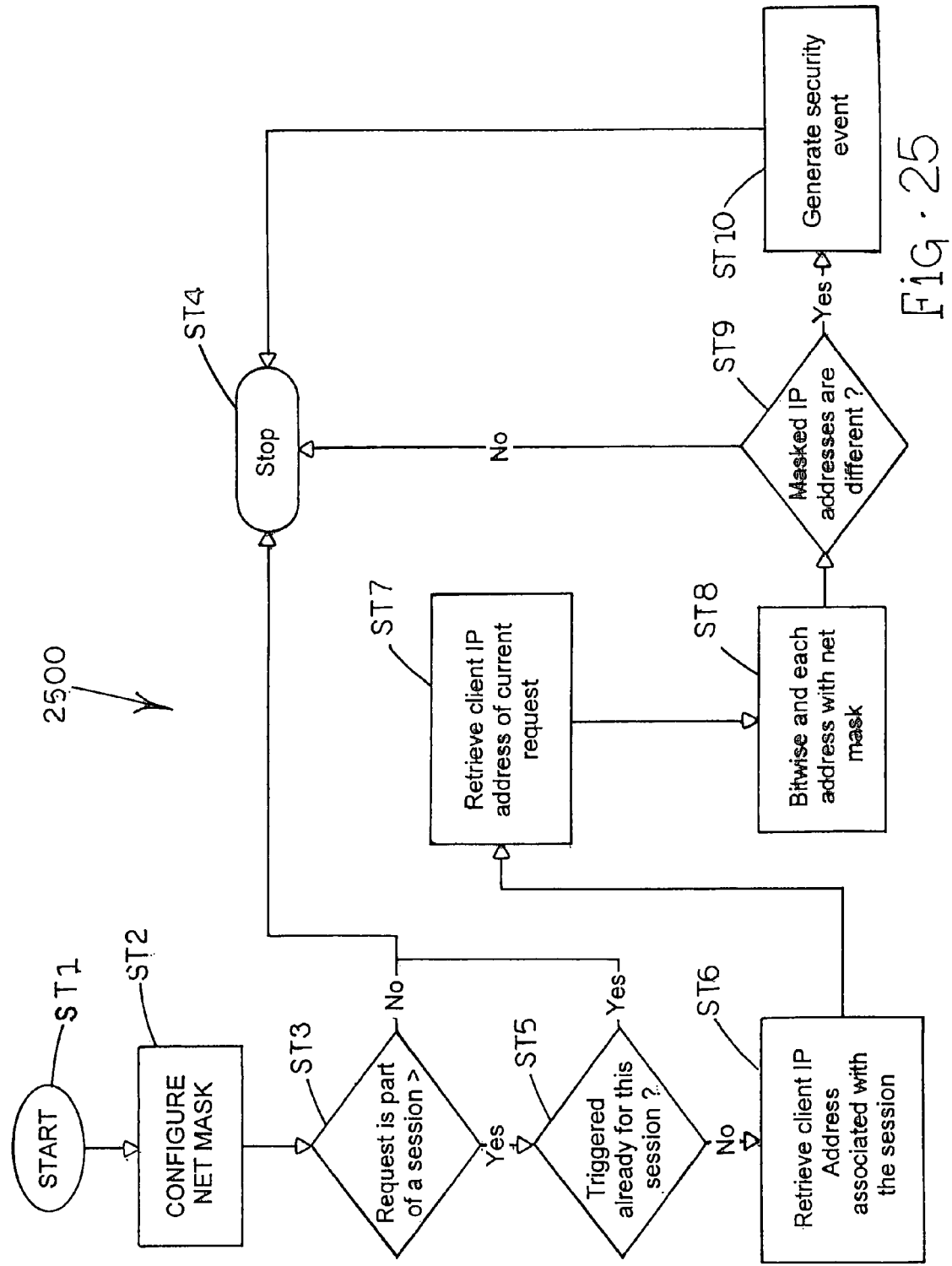
FIG. 25 is a flow chart of an exemplary process for detecting and triggering when a user session changes to a different IP address.

Referring to FIG. 25, a flow chart, generally designated 2500, is provided which illustrates an exemplary process for detecting and triggering when a user session changes to a different IP address. The exemplary process of flow chart 2500 can be implemented by detector D25. The process can begin at step ST1. At step ST2, a net mask can be configured. The network mask is used to "zero out" parts of the IP address for the purpose of determining if it has changed. For example, if the IP address of a session changes from 192.168.55.1 to 192.168.55.2 and the mask being used is 255.255.255.0, detector D25 is not triggered.

Referring to step ST3 of FIG. 25, detector D25 can determine whether the HTTP request is part of a user session. If the HTTP request is not part of a user session, the process stops at step ST4. If the HTTP request is part of a user session, the process can proceed to step ST5.

Referring to step ST5 of FIG. 25, detector D25 can determine whether detector D25 has already triggered for this user session (step ST5). If detector D25 has already triggered, the process can stop (step ST4). Otherwise, the process proceeds to step ST6.

Referring to step ST6 of FIG. 25, detector D25 can retrieve the client IP address associated with this user session from user sessions table UST (FIG. 2). Next, detector D25 can retrieve the client IP address of the current HTTP request (step ST7). At step ST8, detector D25 can have two IP addresses: one IP address from the current request; and one IP address learned at the start of the session. Detector D25 can take each one and "applies the mask to it". This means it performs a bitwise-and operation using the mask and each IP address. These yields the "masked addresses" used in the next step.

Referring to step ST9 of FIG. 25, detector D25 can determine whether the masked IP addresses are different. If the masked IP addresses are not different, the process stops at step ST4. If the masked IP addresses are different, a security event can be generated or detector D25 triggers (step ST10) and the process stops ST4.

Detector D26 can detect and trigger when a session ID is requested that has not been issued by a web server (such as server S or web server WS shown in FIGS. 1A and 1B, respectively). The request of a session ID not issued by the web server can indicate a brute force attack on the web application. Detector D26 can be enabled for web servers that utilize HTTP session cookies for session management and that are not permissive. A permissive web server accepts session IDs that it has not generated.

Figure 26:
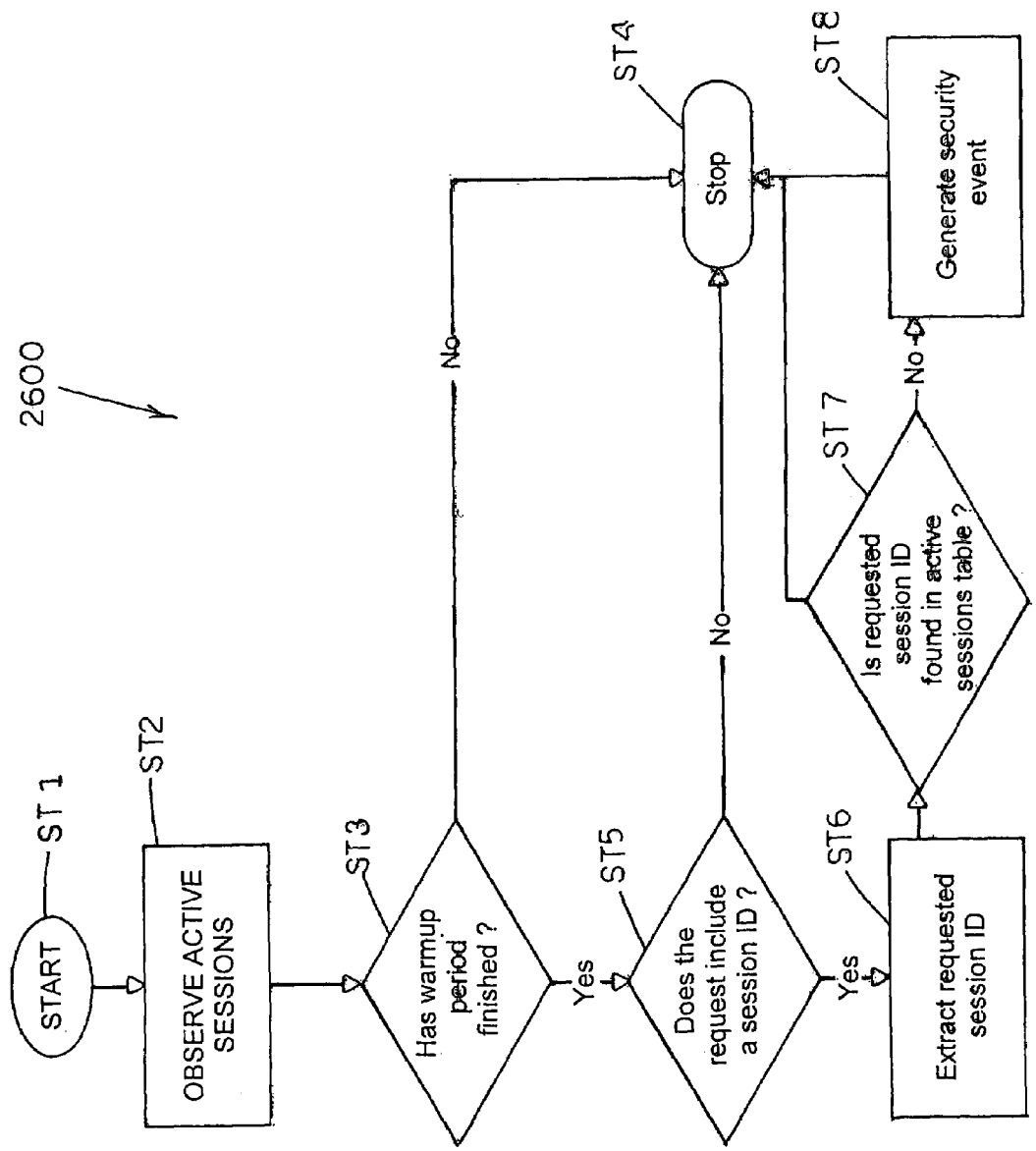
FIG. 26 is a flow chart of an exemplary process for detecting and triggering when a session ID is requested that has not been issued by a web server.

Referring to FIG. 26, a flow chart, generally designated 2600, is provided which illustrates an exemplary process for detecting and triggering when a session ID is requested that has not been issued by a web server. The exemplary process of flow chart 2600 can be implemented by detector D26. The process can begin at step ST1. At step ST2, detector D26 (FIG. 2) can observer active user sessions during a warm-up period. Detector D26 can use a warm-up period to observe all sessions that were in progress when security system 102 began. Detector D26 is not triggered during this time.

Referring to step ST3 of FIG. 26, detector D26 can determine whether the warm-up period is finished. If the warm-up period is not finished, the process can stop (step ST4). If the warm-up period is finished, the process can proceed to step ST5.

Referring to step ST5 of FIG. 26, detector D26 can determine whether the HTTP request includes a session ID. If the HTTP request does not include a session ID, the process can stop (step ST4). If the HTTP request includes a session ID, the process can extract the session ID (step ST6) and proceed to step ST7.

Referring to step ST7 of FIG. 26, detector D26 can determine whether the requested session ID is found in user sessions table UST (FIG. 2). If the requested session ID is found in user sessions table UST, the process can stop (step ST4). If the requested session ID is not found in user sessions table UST, a security event can be generated or detector D26 can trigger (step ST8) and the process can stop (step ST4).

HTTP Protocol Detectors

Security system 102 can detect suspicious network traffic or activity regarding protocols utilized for communication. For example, detector D27 can detect and trigger when the total number of protocol errors within a user session exceeds a predetermined number. According to one embodiment, detector D27 triggers when the total number of HTTP response codes or errors within a user session exceeds a predetermined number or specified limit. Detector D27 can associate HTTP response codes with particular user sessions by utilizing user session detector USD. According to one embodiment, detector D27 is not triggered if a user session is not created.

Figure 27:
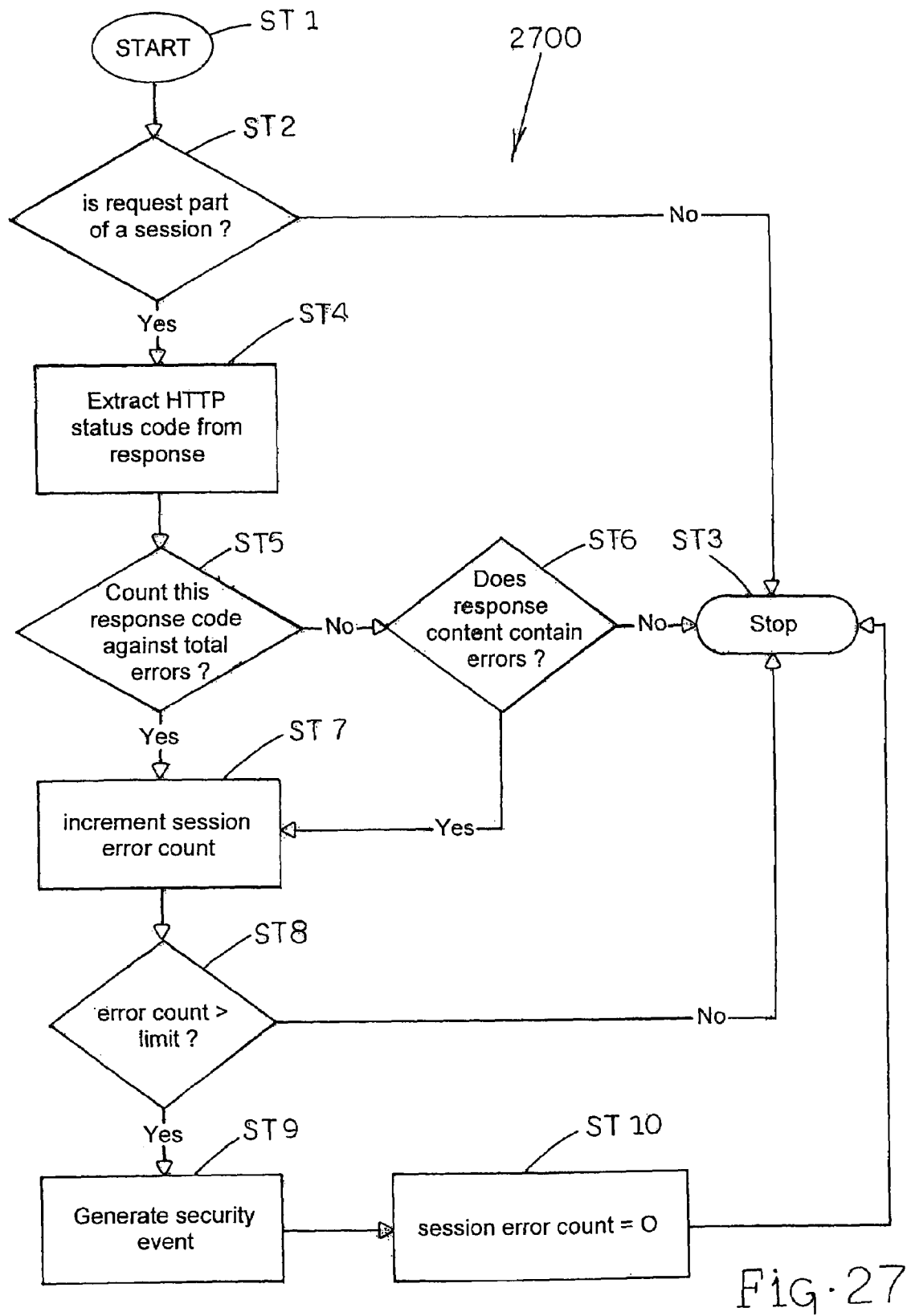
FIG. 27 is a flow chart of an exemplary process for detecting and triggering when the total number of HTTP response codes or errors within a user session exceeds a predetermined number or specified limit.

Referring to FIG. 27, a flow chart, generally designated 2700, is provided which illustrates an exemplary process for detecting and triggering when the total number of HTTP response codes or errors within a user session exceeds a predetermined number or specified limit. The exemplary process of flow chart 2700 can be implemented by detector D27. The process can begin at step ST1. Next, detector D27 can determine whether a received HTTP request is part of a user session in user sessions table UST (FIG. 2) (step ST2). If the HTTP request is not part of a user session in user sessions table UST, the process can stop (step ST3). Otherwise, the process can proceed to step ST4.

Referring to step ST4 of FIG. 27, detector D27 can extract an HTTP status code from the HTTP response code for the user session. Next, detector D27 can determine whether the response code is counted against the total errors (step ST5). Detector D27 can be configured to count a predetermined type of response codes. Exemplary response codes can include:

305 Use Proxy
400 Bad Request
401 Unauthorized
403 Forbidden
404 Not Found
405 Method Not Allowed
406 Not Acceptable
407 Proxy Authentication Required
408 Request Timeout
409 Request Conflict
410 Gone
411 Length Required
412 Precondition Failed
413 Request Entity Too Large
414 Request-URI Too Long
415 Unsupported Media Type
416 Request Range Not Satisfiable
417 Expectation Failed
500 Internal Server Error
501 Not Implemented
502 Bad Gateway
503 Service Unavailable
504 Gateway Timeout
505 HTTP Version Not Supported If the response code is counted against the total errors, the process can proceed to step ST6. Otherwise, if the response code is not counted against the total errors, the process can proceed to step ST7.

Referring to step ST6 of FIG. 27, detector D27 can determine whether the response content contains errors. If the response content does not contain errors, the process can stop (step ST3). If the response content contains errors, the process can proceed to step ST7.

Referring to step ST7 of FIG. 27, the session error count can be incremented. Next, at step ST8, detector D27 can determine whether the error count is greater than a predetermined error count limit. If the error count is not greater than the predetermined error count limit, the process can stop (step ST3). If the error count is greater than the predetermined error count limit, a security event can be generated or detector D27 can trigger (step ST9). After step ST9, the session error count can be reset to 0 (step ST10) and the process can stop (step ST3).

Detector D28 can detect and trigger when the number of individual response codes within one user session exceeds a predetermined number. According to one embodiment, detector D28 can detect and trigger when the number of individual HTTP response codes or errors within one user session exceeds a predetermined number or specified limit. Detector D28 can associate HTTP response codes with particular user sessions by utilizing user session detector USD. According to one embodiment, detector D28 is not triggered if no user session is created.

Figure 28:
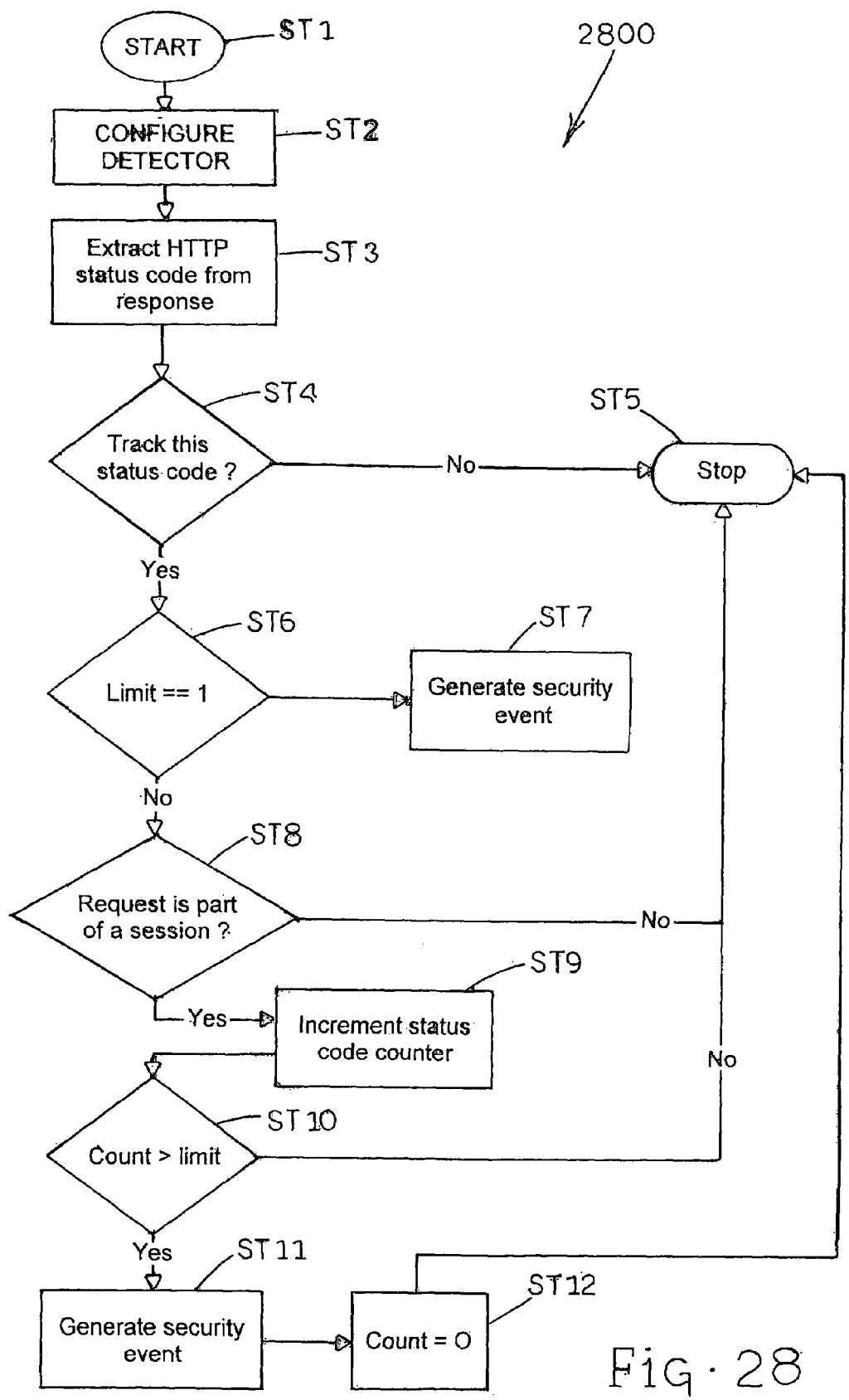
FIG. 28 is a flow chart of an exemplary process for detecting and triggering when the number of individual response codes within one user session exceeds a predetermined number.

Referring to FIG. 28, a flow chart, generally designated 2800, is provided which illustrates an exemplary process for detecting and triggering when the number of individual response codes within one user session exceeds a predetermined number. The process of FIG. 28 can be implemented by detector D28. The process can begin at step ST1. Referring to step ST2, detector D28 can be configured. Configuring detector D28 can include setting predetermined error limits for each HTTP status code. Next, detector D28 can extract an HTTP status code from the response to a HTTP request (step ST3).

Referring to step ST4 of FIG. 28, detector D28 can determine whether to track the HTTP status code in the response. If the status code is not tracked, the process can stop (step ST5). If the status code is tracked, detector D28 can determine whether the limit is 1 for this status code (step ST6). If the limit is 1 for this status code, a security event can be generated or detector D28 can trigger (step ST7). Otherwise, the process can proceed to step ST8.

Referring to step ST8 of FIG. 28, detector D28 can determine whether the request is part of a user session in user session table UST (FIG. 2). If the request is not part of a user session in user session table UST, the process can stop (step ST5). If the request is part of a user session in user session table UST, the status code counter for this status code can be incremented in a status code counts table for each user session (step ST9).

Referring to step ST10 of FIG. 28, detector D28 can determine whether the count in the status code counter for this status code is greater than the predetermined limit for this status code. If the count is not greater than the predetermined limit, the process can stop (step ST5). If the count is greater than the predetermined limit, a security event can be generated or detector D28 can trigger (step ST11). Next, the count in the status code counter for this status code can be set to 0 (step ST12). Next, the process can stop (step ST5).

Detector D29 can detect when selected HTTP response codes for each web page or particular server data in the monitored web application exceeds a predetermined number during a predetermined time period. According to one embodiment, detector D29 can count selected HTTP response codes against each web page in the monitored web application and trigger when the number of each one exceeds the predetermined number during the predetermined time period.

Figure 29:
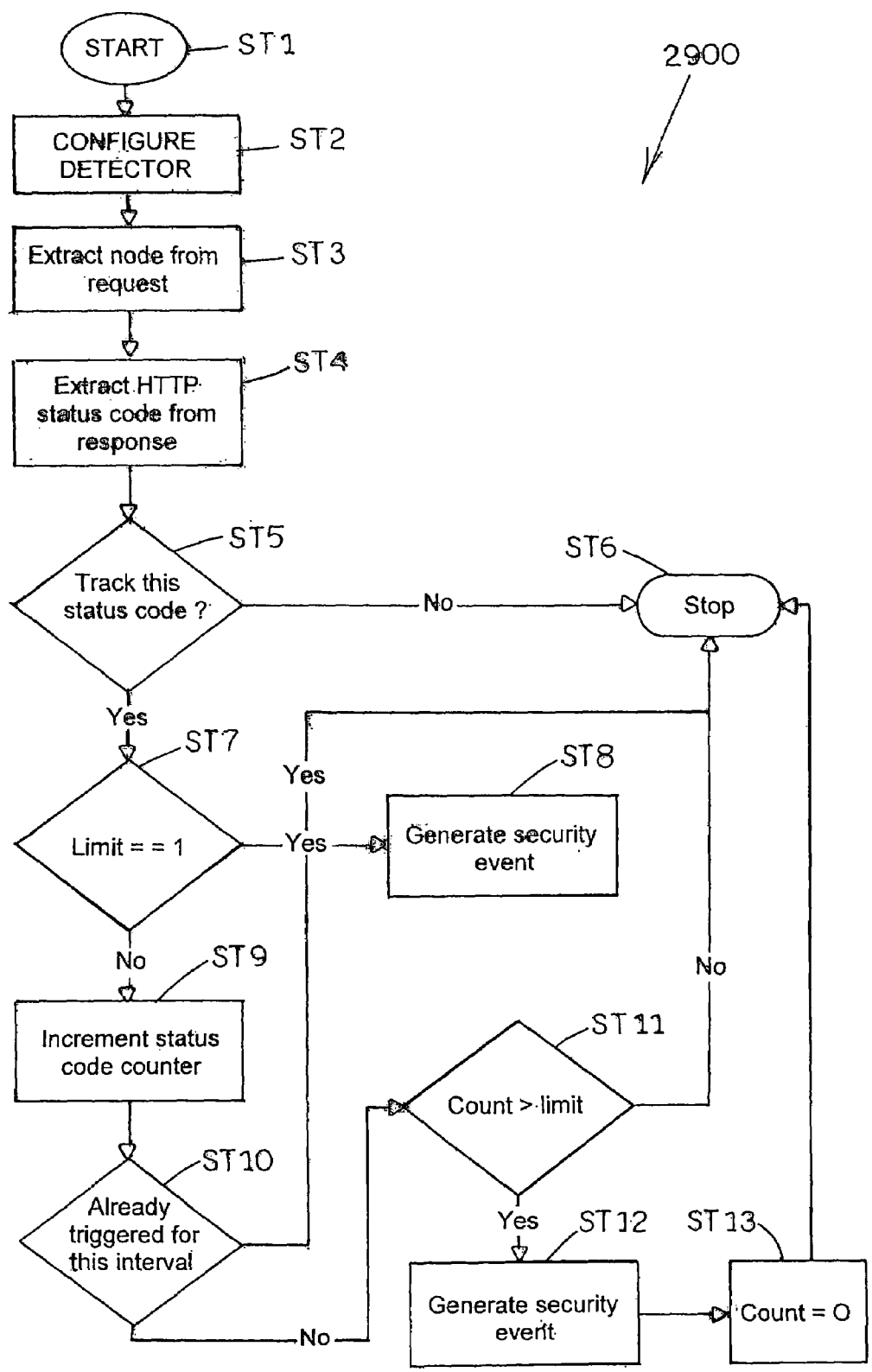
FIG. 29 is a flow chart of an exemplary process for detecting and triggering when selected HTTP response codes for each web page in the monitored web application exceeds a predetermined number during a predetermined time period.

Referring to FIG. 29, a flow chart, generally designated 2900, is provided which illustrates an exemplary process for detecting and triggering when selected HTTP response codes for each web page in the monitored web application exceeds a predetermined number during a predetermined time period. The process of FIG. 29 can be implemented by detector D29. The process can begin at step ST1. Referring to step ST2, detector D29 can be configured. Configuring detector D29 can include setting predetermined error limits for each HTTP status code. Next, a node or web page can be extracted from an HTTP request (step ST3). Next, detector D29 can extract an HTTP status code from the response to the HTTP request (step ST4).

Referring to step ST5 of FIG. 29, detector D29 can determine whether to track the HTTP status code in the response. If the status code is not tracked, the process can stop (step ST6). If the status code is tracked, detector D29 can determine whether the limit is 1 for this status code (step ST7). If the limit is 1 for this status code, a security event can be generated or detector D29 can trigger (step ST8). Otherwise, the process can proceed to step ST9.

Referring to step ST9 of FIG. 29, the status code counter for this status code can be incremented in a status code counts table for each node or web page. Next, detector D29 can determine whether detector D29 has already triggered for this interval (step ST10). If detector D29 has already triggered, the process can stop (step ST6). Otherwise, if detector D29 has not triggered for this interval, the process can proceed to step ST11.

Referring to step ST11 of FIG. 29, detector D29 can determine whether the count in the status code counter for this status code is greater than the predetermined limit for this status code. If the count is not greater than the predetermined limit, the process can stop (step ST6). If the count is greater than the predetermined limit, a security event can be generated or detector D29 can trigger (step ST12). Next, the count in the status code counter for this status code can be set to 0 (step ST13). Next, the process can stop (step ST6).

Figure 30:
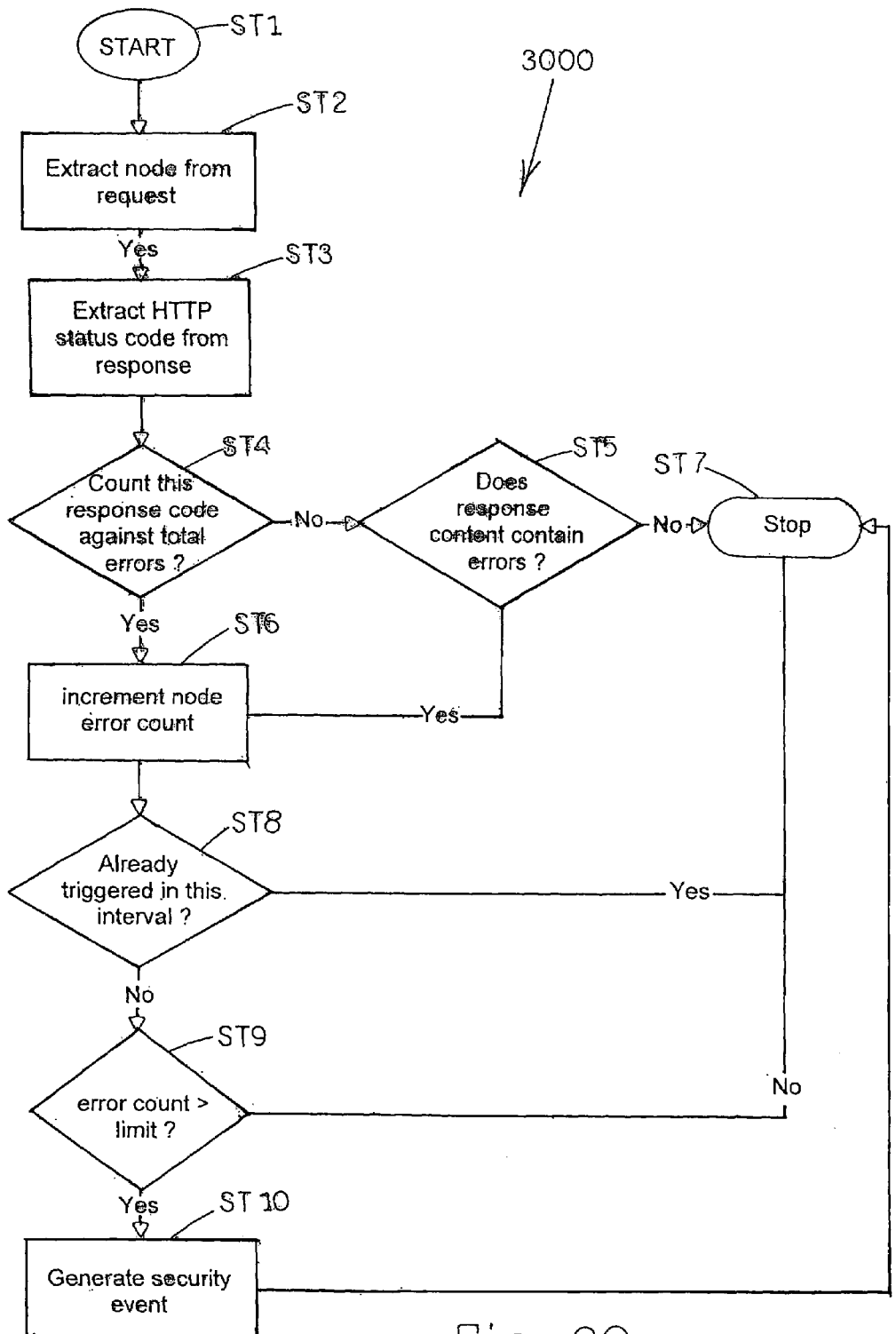
FIG. 30 is a flow chart which illustrates an exemplary process for detecting and triggering when the total number of selected HTTP response codes against each web page exceeds a predetermined number.

Detector D30 can count selected HTTP response codes against each web page in the monitored web application and trigger when the total number exceeds a predetermined number. Referring to FIG. 30, a flow chart, generally designated 3000, is provided which illustrates an exemplary process for detecting and triggering when the total number of selected HTTP response codes against each web page exceeds a predetermined number. The process can begin at step ST1. At step ST2, detector D30 can extract the node or web page from the HTTP request. Next, detector D30 can extract the HTTP status code from the response to the HTTP request for determining whether an error occurred (step ST3).

Referring to step ST4 of FIG. 30, detector D30 can determine whether to count this response code against the total number of web page errors. If the response code is not counted, detector D30 can determine whether the response content contains errors (step ST5). Otherwise the process can proceed to step ST6. Referring to step ST5, if the response content does not contain errors, the process can stop (step ST7). Otherwise, if the response content contains errors, the process proceeds to step ST6.

Referring to step ST6 of FIG. 30, the node or web page error count can be incremented. Next, at step ST8, detector D30 can determine whether detector D30 has already triggered during a predetermined interval of time. If detector D30 has already triggered, the process can stop (step ST7). Otherwise, if detector D30 has not triggered, the process can proceed to step ST9).

At step ST9, detector D30 can determine whether the error count for the node or web page is greater than a predetermined limit. If the error count is not greater than the predetermined limit, the process can stop (step ST7). Otherwise, if the error count is greater than the predetermined limit, a security event can be generated or detector D30 can trigger (step ST10).

Detector D31 can trigger when malformed HTTP requests are detected.

Detector D32 can detect and trigger when an HTTP message cannot be parsed correctly. Detector D32 can associate the HTTP message with a particular user by utilizing user session detector USD. According to one embodiment, system 102 can ignore users transmitting such data.

Detector D33 can trigger buffer overflows within HTTP protocol elements are detected.

Figure 31:
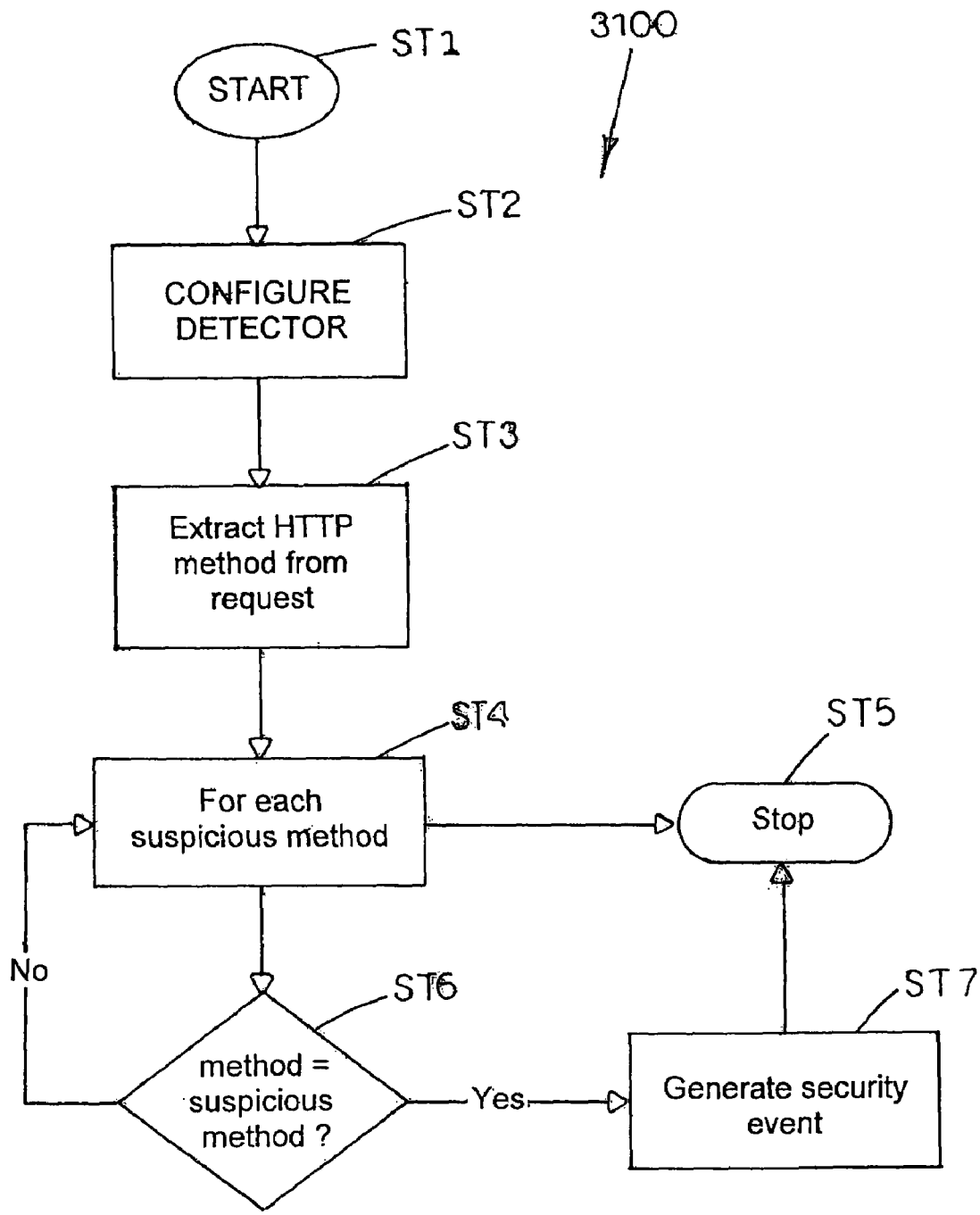
FIG. 31 is a flow chart which illustrates an exemplary process for detecting and triggering when suspect HTTP methods are used in requests.

Detector D34 can trigger when suspect HTTP methods used in requests are detected. Certain HTTP methods are unusual when used in a production environment. The use of such unusual methods can indicated that penetration testing is being conducted. Referring to FIG. 31, a flow chart, generally designated 3100, is provided which illustrates an exemplary process for detecting and triggering when suspect HTTP methods are used in requests. The process can begin at step ST1. At step ST2, detector D34 can be configured with a list of HTTP methods to trigger on. Next, at step ST3, an HTTP method can be extracted from an HTTP request. Next, the process can proceed to step ST4.

Referring to step ST4 of FIG. 31, the process can begin a loop for analyzing each HTTP method in the method list (step ST4). The process can stop at step ST5 after each HTTP method has been analyzed. For each method in the list, detector D34 can determine whether the method is a suspicious method (step ST6). If the method is a suspicious method, a security event can be generated or detector D34 can trigger (step ST7) and the process can stop (step ST5). Otherwise, the process can proceed to step ST4.

Secure Socket Layer (SSL) Detectors

Security system 102 can detect suspicious network traffic or activity regarding SSL. For example, detector D35 can trigger when weak encryption browsers are detected for indicating the receipt of communications utilizing weak encryptions. A web application and web browser can communicate at different SSL encryption strengths. The web application can be certified for high encryption (such as 128 bit strength, as commonly required by banks) while being configured to accept communications utilizing weaker encryptions (such as 40 bit strength).

Detector D36 can trigger when traffic is received from a web-enabled device utilizing a low version of SSL. For example, the current version of SSL may be 3.0, and detector D36 can trigger when SSL version 2.0 is being utilized. SSL version 2.0 and 3.0 were developed by Netscape Communications Corporation of Mountain View, Calif.

Detector D37 can trigger when an invalid SSL protocol is detected. For example, detector D37 can trigger when non-SSL data (such as plain text data) is transmitted to an SSL port of the web application. Detector D37 can indicate that system 102 has been misconfigured to identify non-SSL traffic as SSL.

URL Encoding Detectors

Detector D38 can trigger when URL encoded 8-bit characters are not Universal Transformation Format (UTF)-8 encoded. Non US-ASCII characters should not be UTF-8 encoded.

Detector D39 can trigger when invalid UTF-8 octet sequences are detected.

Detector D40 can trigger when URL encoded Universal Character Set (UCS)-4 characters are detected. URL encoded UCS-4 characters should not be used in URLs.

Detector D41 can trigger when an invalid use of "%" characters is detected in a URL encoded string.

Detector D42 can trigger when a sequence of "%%" characters is detected in a URL encoded string. The use of a sequence of "%%" characters is invalid.

Detector D43 can trigger when "%uXXXX" unicode characters is detected in a URL encoded string. The use of "%uXXXX" unicode characters in a URL encoded string is unsupported on many platforms and can be used to circumvent Intrusion Prevention Systems (IPS) and Intrusion Detection Systems (IDS).

Detector D44 can trigger when overlong UTF-8 or "%uXXX" representations of characters are detected in a URL encoded string. The use of overlong UTF-8 or "%uXXX" representations of characters in a URL encoded string can be used to attack certain web servers.

Detector D45 can trigger on the detection of invalid escape sequences in URL encoded strings that are not recoverable.

Usage Policy Detectors

Detector D46 can trigger and detect when the overall application request rate for the monitored web application is too high. According to one embodiment, detector D46 samples the HTTP transactions-per-second (TPS) throughput of the monitored web application. When the transaction-per-second is higher than a predetermined value or rate, it can indicate that an attack to the monitored web application is proceeding or that additional resources are required to maintain service. For example, a web server (such as server S or web server WS shown in FIGS. 1A and 1B, respectively) can be expected to handle 1000 transactions-per-second, and detector D46 can be configured to trigger when 2000 transactions-per-second are detected. Detector D46 can be set to not trigger more than once during an interval (e.g., no more than once every five minutes).

Figure 32:
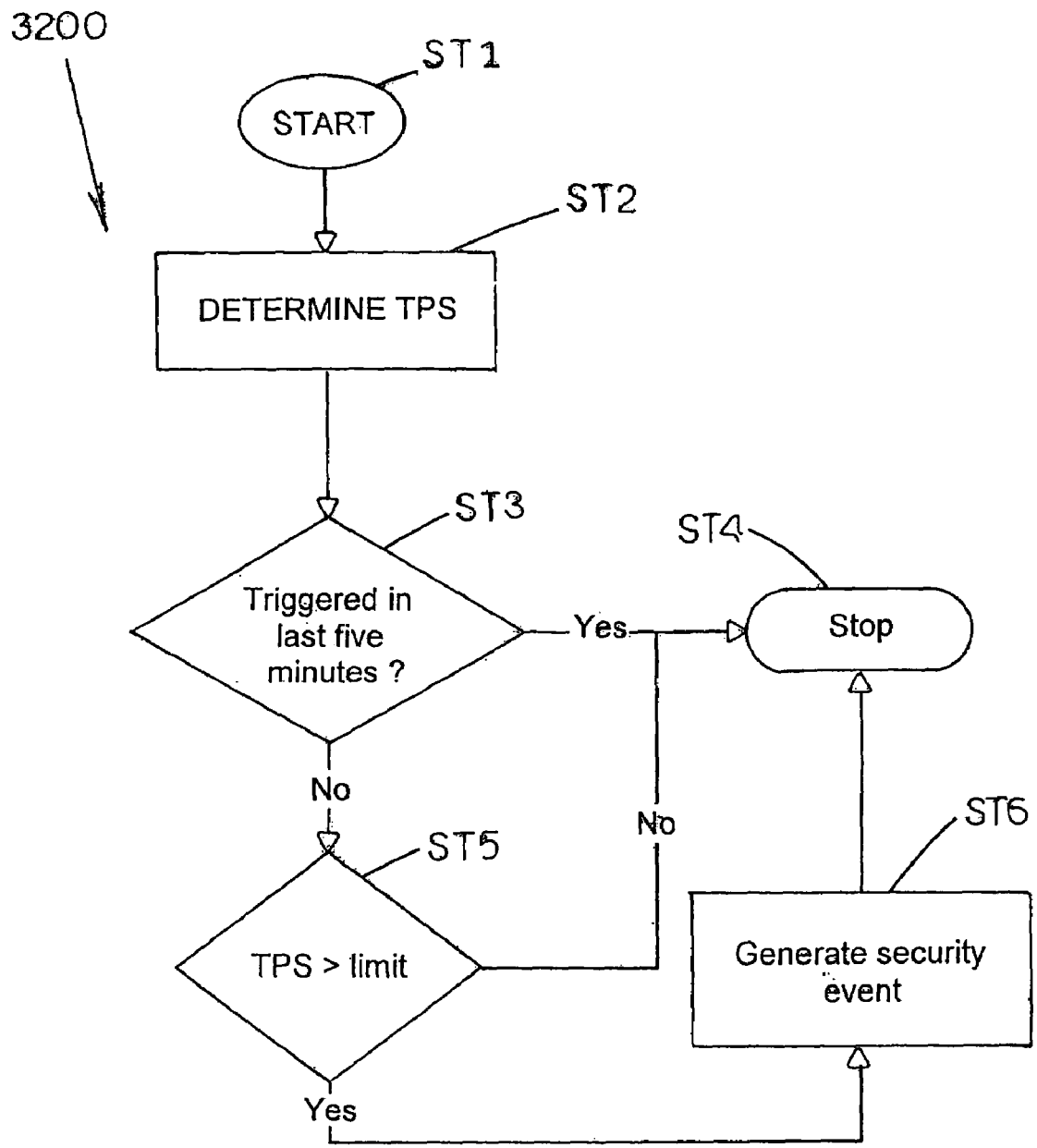
FIG. 32 is a flow chart which illustrates an exemplary process for flagging users of the monitored web application.

Referring to FIG. 32, a flow chart, generally designated 3200, is provided which illustrates an exemplary process for flagging users of the monitored web application. The exemplary process of flow chart 3200 can be implemented by detector D53. The process can begin at step ST1. At step ST2, the HTTP transactions-per-second (TPS) can be determined. According to one embodiment, security system 102 can determine TPS once every thirty seconds.

Referring to step ST3 of FIG. 32, detector D53 can determine whether detector D53 has triggered in the last five minutes. If detector D53 has triggered in the last five minutes, the process can stop (step ST4). Thus, detector D53 can trigger a maximum of once every five minutes. Otherwise, the process can proceed to step ST5.

Referring to step ST5 of FIG. 32, detector D53 can determine whether TPS is greater than a predetermined limit or number. The predetermined limit can be set by an operator. If TPS is greater than the predetermined limit, a security event can be generated and/or detector D53 can be triggered. Next, the process can stop (step ST4).

Detector D47 can trigger when a user's web application request rate deviates from an expected request rate for the user. Detector D47 can observe a user's web application request rate over a period of time for determining an expected request rate for the user. Detector D47 can also implement the process of FIG. 32 and, with respect to step ST5, determine whether the current TPS for the user deviates a predetermined amount or predetermined standard deviation from the expected request rate for the user. If the current TPS deviates the predetermined amount or predetermined standard deviation from the expected request rate for the user, detector D47 can trigger.

Content Manipulation Detectors

Typically, a web application transmits a cookie to a web browser associated with a particular session. The web browser is expected to return the cookie in an unmodified condition. If the returned cookie has been modified, it can indicate that the web browser operator is trying to penetrate the web application.

Detector D47 can trigger when a cookie returned from the web application has been modified. When a server (such as server S and web server WS shown in FIGS. 1A and 1B, respectively) issues session cookies to a client (such as clients C1, C2, and C3 shown in FIG. 1A and web-enabled devices WED1, WED2, and WED3 shown in FIG. 1B), the cookies should normally be returned with the same value as that set by the web server. If the value is different, it can indicate that the user of the web-enabled device has altered the value. Detector D47 can be disabled for the web applications that are designed to use client side scripting that can alter the value.

Figure 33A:
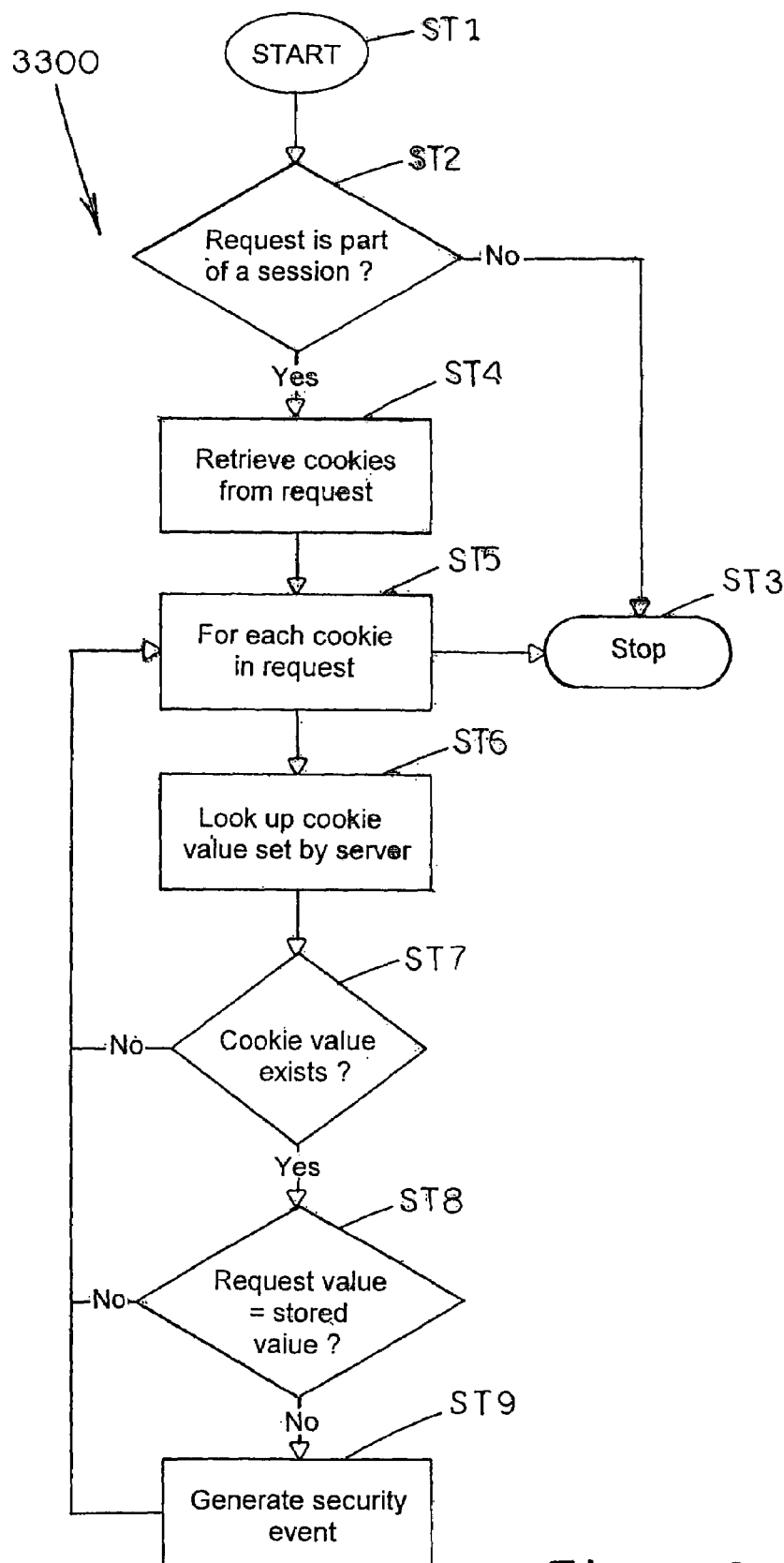

FIGS. 33A and 33B illustrate flow charts, generally designated 3300 and 3302, respectively, of exemplary processes operating in combination for detecting and triggering when a session cookie returned from the web application has been modified. The processes of FIGS. 33A and 33B can be implemented by detector D48 (FIG. 2). Referring specifically to FIG. 33A, the process can begin at step ST1. Next, at step ST2, detector D48 can determine whether an HTTP request is part of a user session in user sessions table UST (FIG. 2). If the HTTP request is not part of a user session in user session table UST, process can stop (step ST3). Otherwise, session cookies can be retrieved from the HTTP request (step ST4). Next, the process can proceed to step ST5.

Referring to step ST5 of FIG. 33A, the process can begin a loop for examining each session cookie in the HTTP request. After each session cookie is examined, the process can stop (step ST3). The first step in the loop can include looking up a cookie value set by a web server (such as web server WS) (step ST6). The cookie value set by the web server is retrieved in the process described in FIG. 33B.

Referring to step ST7 of FIG. 33A, detector D48 can determine whether a cookie value exists. Detector D48 can remember all the session cookies set by the server per session. For each incoming request, detector D48 can check whether the cookie values supplied in the request are the same values that the server set. Thus, for each cookie, in the request, it looks up this cookie by name in a per-session table to retrieve the value set by the server. If a cookie value does not exist, the process can proceed to step ST5. Otherwise, detector D48 can determine whether the session cookie value of the HTTP request is the same as the stored cookie value (step ST8). If the session cookie value of the HTTP request is not the same as the stored cookie value, the process can proceed to step ST5. Otherwise, a security event can be generated or detector D48 can trigger (step ST9).

Referring now to FIG. 33B, the process can start at step ST1. Next, at step ST2, detector D48 can determine whether the HTTP request is part of a user session in user sessions table UST (FIG. 2). If the HTTP request is not part of a user session in user session table UST, process can stop (step ST3). Otherwise, session cookies can be retrieved from the response to the HTTP request (step ST4). Next, the detector D48 can store the retrieved session cookie values for access by the process of FIG. 33A (step ST5).

Detector D49 can detect application forms issued during a session that have been manipulated. Forms issued by a server (such as server S shown in FIG. 1A and web server WS shown in FIG. 1B) to a client (such as clients C1, C2, and C3 shown in FIG. 1A and web-enabled devices WED1, WED2, and WED3 shown in FIG. 1B) can have hidden fields that should normally be returned with the same value as set by the web server. Additionally, some fields have constraints such as "maxLength" that should be respected. If the value of these fields is different, it can indicate that the user of the web-enabled device has altered the value. Detector D49 can be disabled for the web applications that are designed to use client side scripting that can alter the value.

Figure 34A:
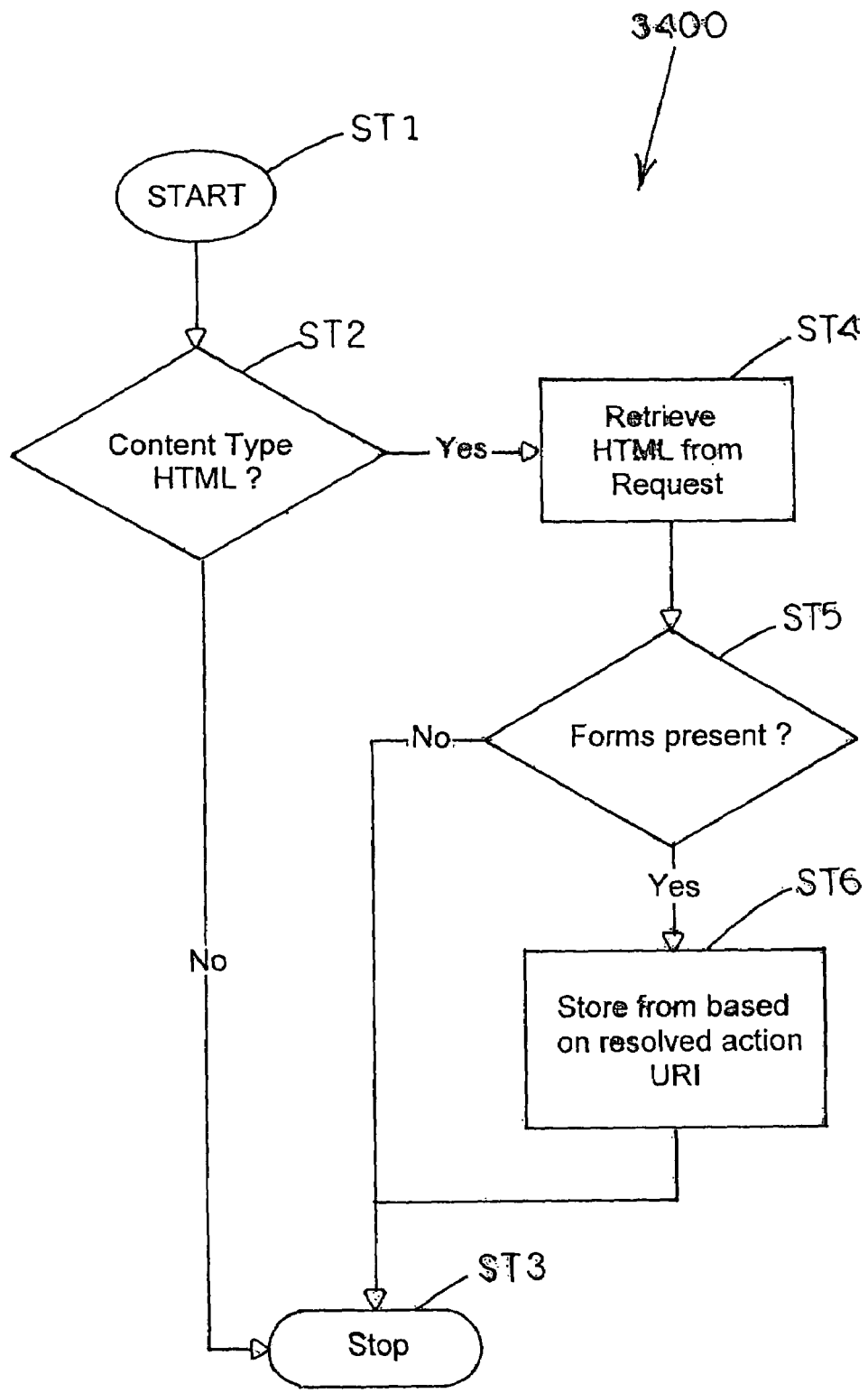
FIGS. 34A and 34B are flow charts of exemplary processes operating in combination for detecting and triggering application forms issued during a session that have been manipulated.
Figure 34B:
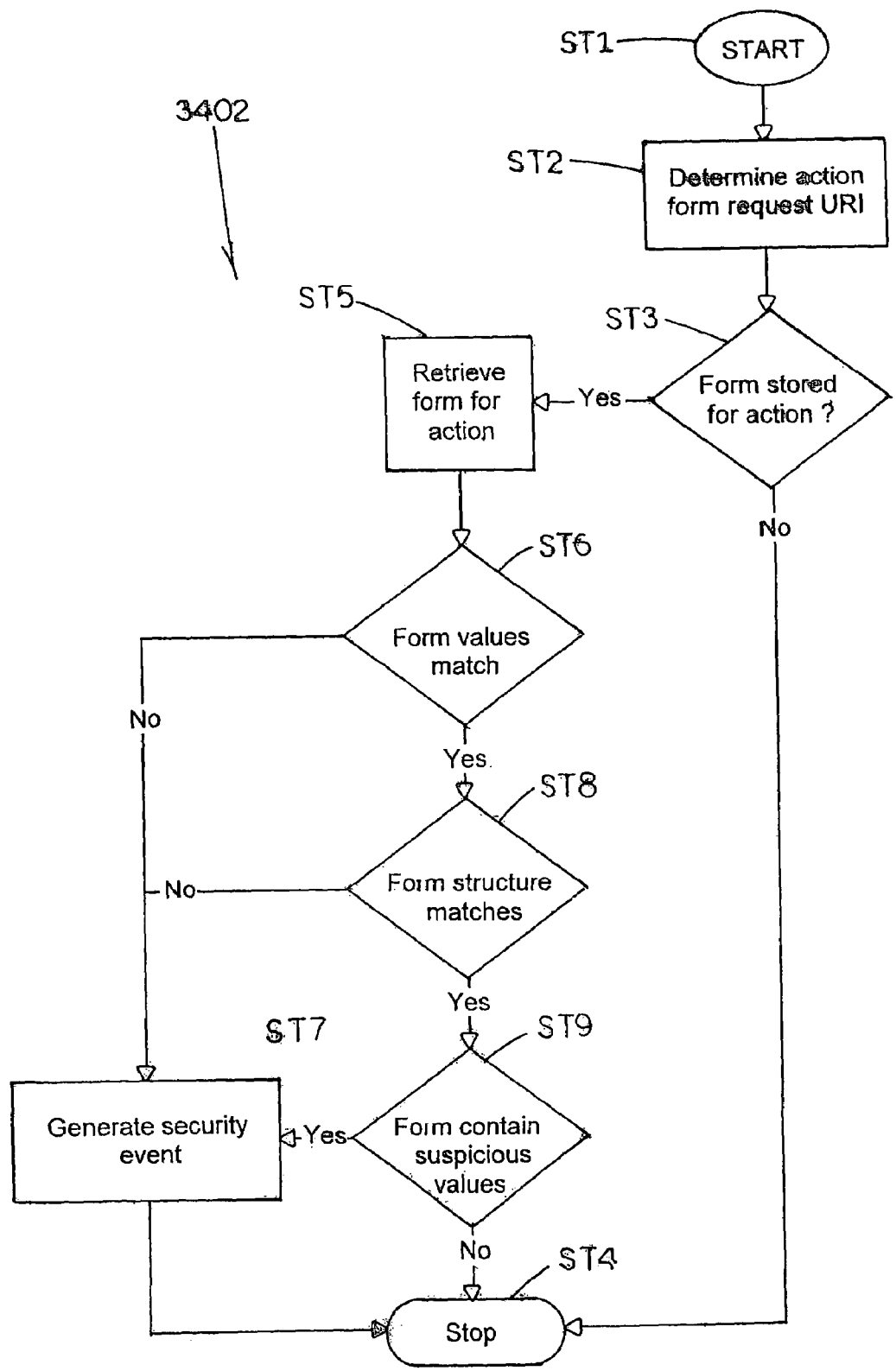

FIGS. 34A and 34B illustrate flow charts, generally designated 3400 and 3402, respectively, of exemplary processes operating in combination for detecting and triggering application forms issued during a session that have been manipulated. Referring specifically to FIG. 34A, flow chart 3400 shows an exemplary process for storing an application form issued by a web server to a client for comparison to the associated returned application form from the client. The process can begin at step ST1.

Referring to step ST2 of FIG. 34A, detector D49 can determine whether the content type of the server transmission is HTML. If the content type is not HTML, the process can stop (step ST3). Otherwise, the HTML document can be retrieved (step ST4). Next, the process can proceed to step ST5.

Referring to step ST5 of FIG. 34A, detector D49 can determine whether the HTML contains forms. If the HTML does not contain forms, the process can stop (step ST3). Otherwise, detector D49 can store the forms based on the resolved action URI (step ST6). Forms in HTML have an associated ACTION that can be set by the application server. When the client submits the form, the application server can be instructed to submit the form to the URL specified in the ACTION. URLs in the requests can be absolute URLs meaning simple that they are fully qualified path names. However, the URLs the server sets in the Form ACTION are often relative URLs, or simply partial paths that are interpreted relative to the path of the web page the client is currently viewing. When observing the ACTION of outbound forms, this detector must resolve them into absolute URLs so that it can recognize them when they are submitted by the client. Next, the process can stop (step ST3).

Referring now to FIG. 34B, flow chart 3402 illustrates an exemplary process for detecting when the form stored in the process of FIG. 34A does not match the same returned form from the client. The process can begin at step ST1. Next, detector D49 can determine the action from the request URI of the HTTP request (step ST2) and proceed to step ST3.

Referring to step ST3 of FIG. 34B, detector D49 can determine whether an application form is stored for the action of the HTTP request. If a form is not stored for action, the process can stop ST4. If a form is stored for the action, a form for the action can be retrieved (step ST5). Next, the process can proceed to step ST6.

Referring to step ST6 of FIG. 34B, detector D49 can determine whether the form values matches for the form returned in the HTTP request and the associated form stored in the process of FIG. 34A. If the form values do not match, a security event can be generated or detector D49 can trigger (step ST7). Otherwise, if the form values match, the process can proceed to step ST8.

Referring to step ST8 of FIG. 34B, detector D49 can determine whether the form structure matches for the form returned in the HTTP request and the associated form stored in the process of FIG. 34A. If the form structure matches, a security event can be generated or detector D49 can trigger (step ST7). Otherwise, if the form values match, the process can proceed to step ST9.

Referring to step ST9 of FIG. 34B, detector D49 can determine whether the form contains suspicious values. If the form contains suspicious values, a security event can be generated or detector D49 can trigger (step. ST7). Otherwise, if the form values match, the process can stop (step ST4).

Web Crawler Detector

A webcrawler is an application that automatically scans web applications for fetching web pages. Spiders can be used to feed pages to search engines. Because most Web pages contain links to other web pages, a spider can start almost anywhere. As soon as it sees a link to another page, it goes off and fetches it.

Figure 35:
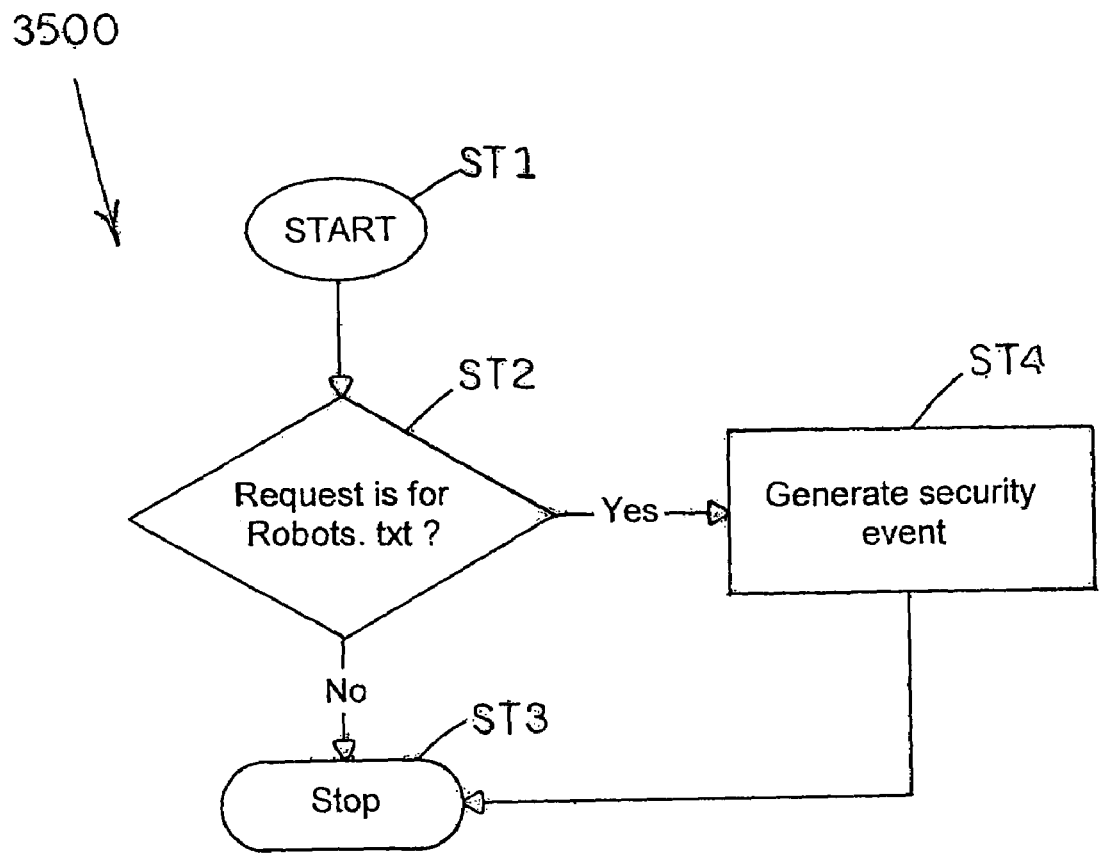
FIG. 35 is a flow chart which illustrates an exemplary process for detecting and triggering when a web crawler begins scanning a web application.

Detector D50 can detect when a web crawler begins scanning a web application of a web server (such as server S shown in FIG. 1A and web server WS shown in FIG. 1B). Referring to FIG. 35, a flow chart, generally designated 3500, is provided which illustrates an exemplary process for detecting and triggering when a web crawler begins scanning a web application. The process can begin at step ST1. At step ST2, detector D50 can determine whether a received HTTP request is for "robots.txt". Many web crawlers begin any session by issuing a request to the web server for the file "/robots.txt." By convention, this file if present will instruct the web crawler as to what parts of the website it should crawl. Whenever a request is seen for "/robots.txt", detector D50 can detect that a web crawler is beginning a session against the server. If the request is not for "robots.txt", the process can stop (step ST3). If the request is for "robots.txt", a security event can be generated and detector D50 can trigger (step ST4). Next, the process can stop (step ST3).

Access Policy Detection

Figure 36:
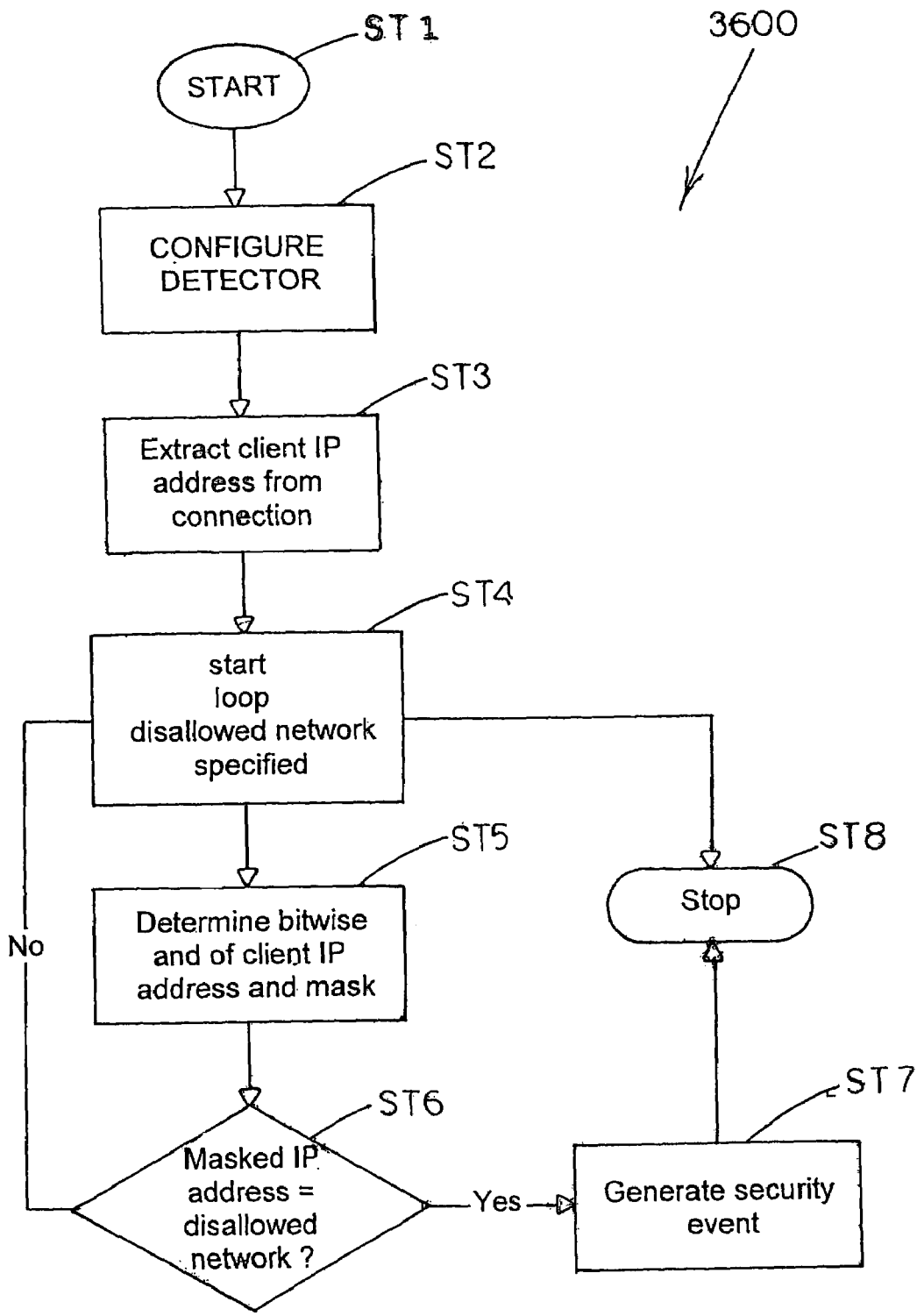
FIG. 36 is a flow chart which illustrates an exemplary process for detecting and triggering when users are accessing a web application from an IP address that has been disallowed.

Security system 102 can alert an operator when a user that has been disallowed is accessing a web application. For example, detector D51 can detect and trigger when users are accessing a web application from an IP address that has been disallowed. Referring to FIG. 36, a flow chart, generally designated 3600, is provided which illustrates an exemplary process for detecting and triggering when users are accessing a web application from an IP address that has been disallowed. The process can begin at step ST1. At step ST2, detector D51 can be configured. Configuring detector D51 can include obtaining retrieving a list of disallowed network addresses and/or masks. The network addresses can include IP addresses.

Referring to step ST3 of FIG. 36, detector D51 can extract the client IP address from the connection or network traffic. Next, detector D51 can execute a loop beginning at step ST4 for each disallowed network specified in step ST2. Detector D51 can then determine the bitwise and of client IP address and mask for a specified disallowed network (step ST5). The network mask can be used to "zero out" parts of the IP address for the purpose of determining if it is allowed. For example, the operator may wish to disallow access from the network 192.168.0.0 with a network mask of 255.255.0.0. These means any address that begin with 192.168 should be disallowed.

Referring to step ST6 of FIG. 36, detector D51 can determine whether the masked IP address of the client is the same as the disallowed network. If the masked IP address of the client is the same as the disallowed network, a security event can be generated or detector D51 can trigger (step ST7). Next, the process can stop (step ST8). If the masked IP address of the client is not the same as the disallowed network, the process can proceed to the start of the loop at step ST4. The loop can continue through steps ST5 and ST6 for each disallowed network specified in step ST2 and then stop (step ST8) unless a security event is triggered at step ST7.

Figure 37:
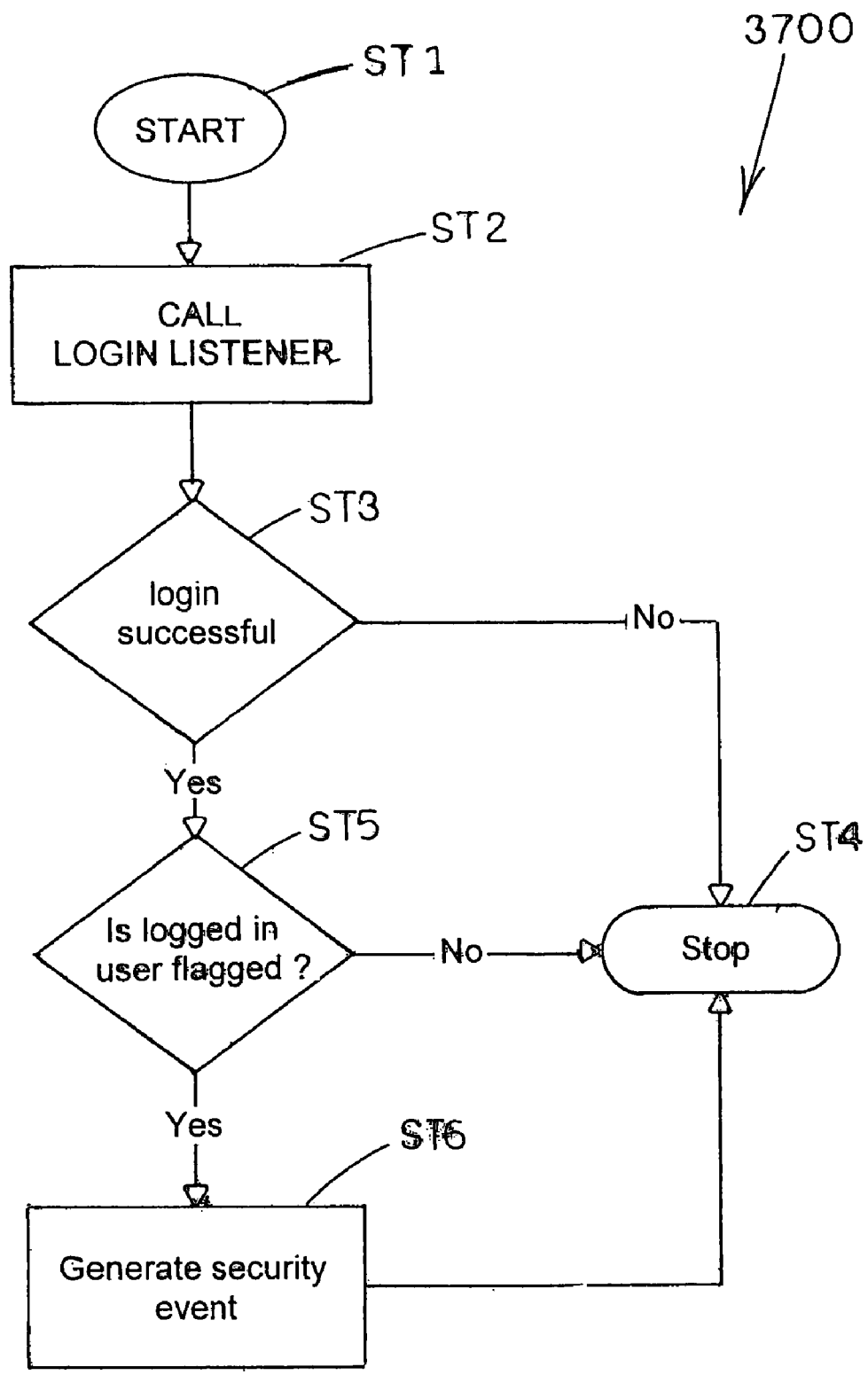
FIG. 37 is a flow chart which illustrates an exemplary process for detecting and triggering when a flagged user logs in to a web application.

Security system 102 can flag certain web application user when they are deemed to require special attention. Detector D52 can detect when a flagged user logs in to a web application. Users requiring special attention can be manually or automatically flagged. Detector D52 can provide an alert when such a user logs into the monitored web application. Referring to FIG. 37, a flow chart, generally designated 3700, is provided which illustrates an exemplary process for detecting and triggering when a flagged user logs in to a web application. The process can begin at step ST1. At step ST2, the LoginListener callback can be called for determining whether a user is attempting a login. Next, detector D52 can determine whether the login attempt was successful (step ST3). If the login attempt was not successful, the process can stop (step ST4). Otherwise, the process can proceed to step ST5.

Referring to step ST5 of FIG. 37, detector D52 can determine whether the logged in user has been flagged. If the logged in user has not been flagged, the process can stop (step ST4). Otherwise, if the logged in user has been flagged, a security event can be generated or detector D52 can trigger (step ST6). Next, the process can stop (step ST4).

When a user has achieved a threat score greater than a predetermined threshold, the user can be flagged for alerting an operator of the web server. Detector D53 can detect when the user's threat score has exceeded the predetermined threshold and mark the user as flagged. Flagging can be used to enable operators to quickly identify users that should be monitored closely. Users can also be flagged manually by the operator of security system 102.

Figure 38:
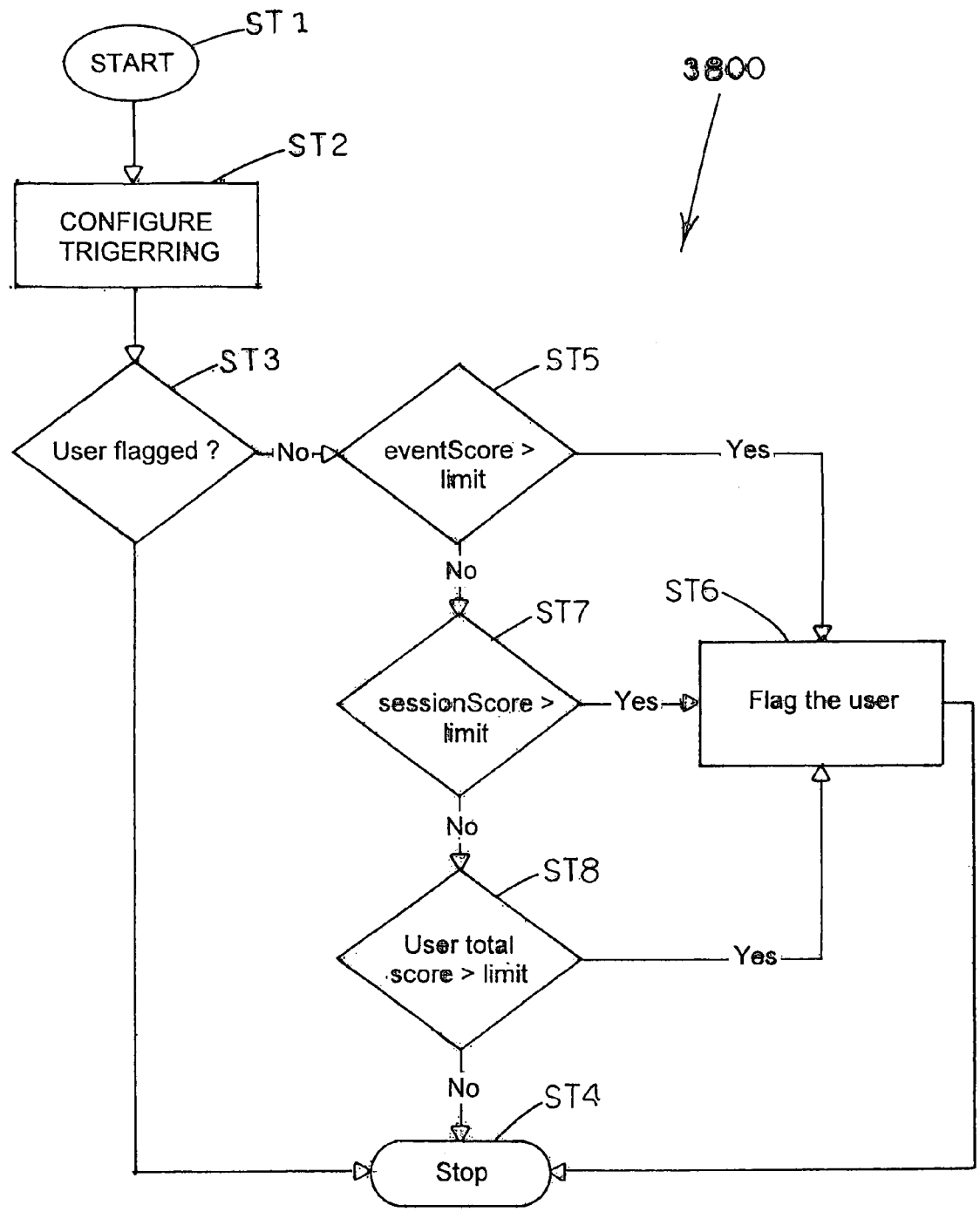
FIG. 38 is a flow chart which illustrates an exemplary process for flagging users of the monitored web application.

Referring to FIG. 38, a flow chart, generally designated 3800, is provided which illustrates an exemplary process for flagging users of the monitored web application. The exemplary process of flow chart 3800 can be implemented by detector D53. The process can begin at step ST1. ThreatListener is a function that blades can implement. Security system 102 can invoke this each time any blade generates a security event. This allows blades to analyze security events themselves. In this case, the triggers for this detector D53 are all based on threat scores. ThreatListener can examine the threat scores. At step ST2, detector D53 can be configured to trigger when a threat score is greater than a predetermined limit or amount. Next, at step ST3, detector D53 can determine whether the user is flagged. If the user has been flagged, the process stops at step ST4. Otherwise, the process proceeds to step ST5.

At step ST5, detector D53 can determine whether an event or threat score for the user is greater than the predetermined limit. If the event score is greater than the predetermined limit, the user can be flagged (step ST6) and the process stops at step ST4. Otherwise, the process proceeds to step ST7.

At step ST7, detector D53 can determine whether a total session score for the user is greater than the predetermined limit. If the total session score is greater than the predetermined limit, the user can be flagged (step ST6) and the process stops at step ST4. Otherwise, the process proceeds to step ST8.

At step ST8, detector D53 can determine whether a total score for all sessions for the user is greater than the predetermined limit. If the total session score for all sessions is greater than the predetermined limit, the user can be flagged (step ST6) and the process stops at step ST4. Otherwise, the process stops at step ST4.

V. User Interface

Security system 102 (FIGS. 1A, 1B, and 2) can include display DISP (FIG. 2) for displaying server activity information to alert operator to suspicious activity regarding a monitored web application. Display DISP can also provide an interface for analyzing server activity. Further, display DISP can provide an interface for configuring security system 102 to monitor and analyze server activity.

Monitoring

Figure 39:
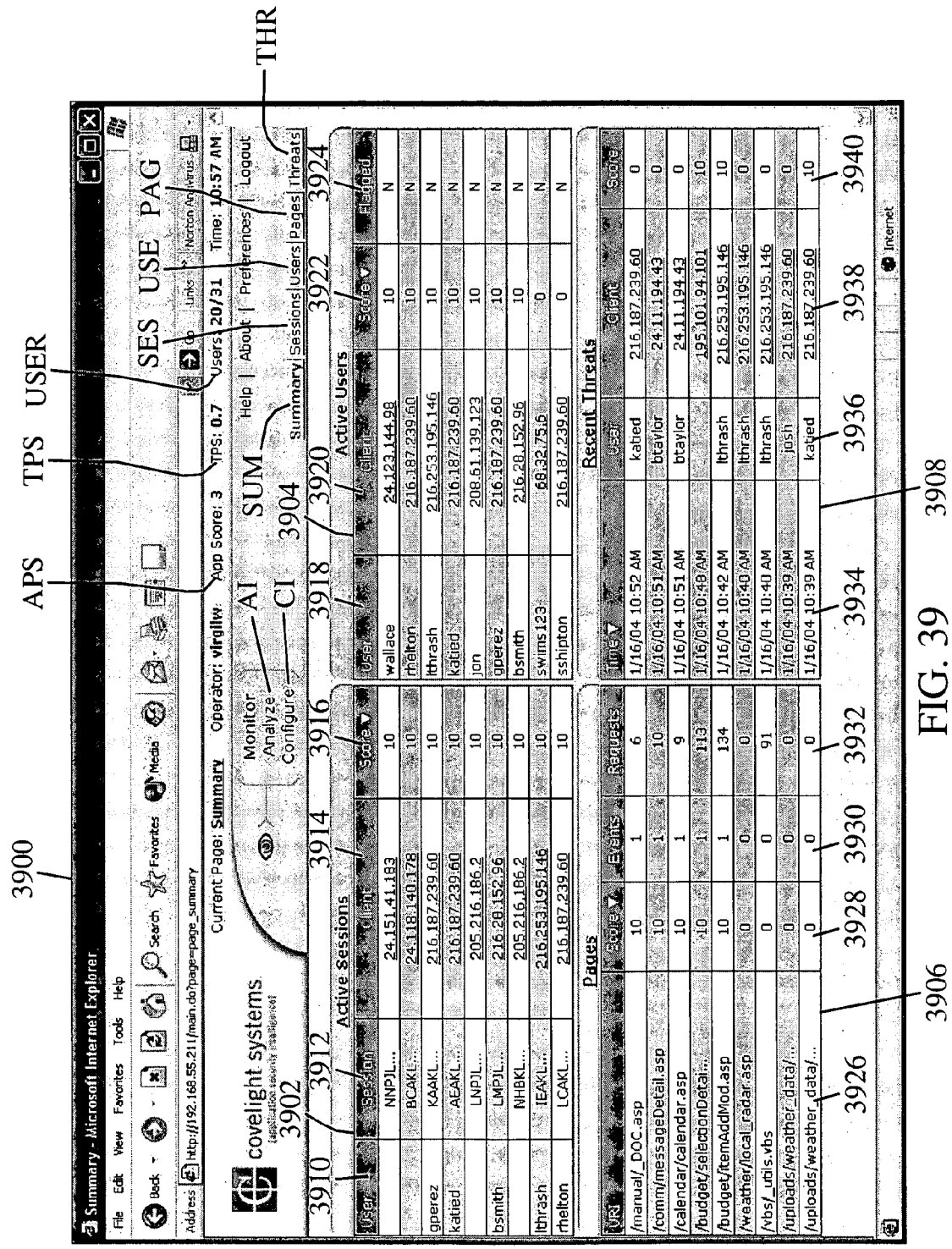
FIG. 39 is a screen display of summary tables of a monitored web application.

FIGS. 39-61 illustrate exemplary screen displays of display DISP for displaying activity information to alert an operator to suspicious activity regarding a monitored server application. Referring specifically to FIG. 39, a screen display 3900 of summary tables of a monitored server application is illustrated. Screen display 3900 can display an active sessions table 3902, an active users table 3904, a pages table 3906, and a recent threats table 3908. Screen display 3900 can also include an analyze icon AI and a configure icon CI for switching to other screen displays described herein for analyzing web activity and configuring security system 102 (FIGS. 1A, 1B, and 2).

Active sessions table 3902 can include a summary of the data contained in user sessions table UST. In this example, active sessions table 3902 lists the nine entries in user sessions table UST (FIG. 2) with the highest threat score. Table 3902 can include the following columns: user 3910, session 3912, client 3914, and score 3916. User column 3910 can list the user name for the session entries having an authenticated user. Session column 3912 can list the session ID associated with the entry. Sessions can be defined by server applications. The particular session ID associated with a session can differ depending on the server application. Client column 3914 can list the URL of the web-enabled device associated with the user session. Score column 3916 can list the current threat score associated with the user session. The threat score can increase each time a detector associated with the user session is triggered.

Active users table 3904 can include a summary of current login session information. In this example, active users table 3904 lists the nine current login sessions having the highest threat score. Table 3904 can include the following columns: user 3918, client 3920, score 3922, and flagged 3924. User column 3918 can list the user name of the associated login sessions. Client column 3920 can list the URL of the web-enabled device associated with the session. Score column 3922 can list the current threat score associated with the session. The threat score can increase each time a detector associated with the session is triggered. Flagged column 3924 can indicate whether the login session has been flagged. For example, when detector D52 or detector D53 trigger, the user session can be flagged.

Pages table 3906 can include a summary of the web page information. In this example, pages table 3906 lists the nine web pages of the monitored web application having the highest threat score. Table 3906 can include the following columns: URI 3926, score 3928, events 3930, and requests 3932. URI column 3926 can list the URI of the web page associated with the entry. Score column 3928 can list the current threat score associated with the web page. Events column 3930 can list the number of security events for which the given web page was the intended target (i.e., the request URL was for that page). Requests column 3932 can list the number of requests recorded for the web page.

Recent threats table 3908 can include a summary of recent potential threats to the monitored web application. In this example, recent threats table 3908 lists the nine more recent threats to the monitored web application. Table 3908 can include the following columns: time 3934, user 3936, client 3938, and score 3940. Time column 3934 can the time that a detector (such as detector D35 shown in FIG. 2) has been triggered. User column 3936 can list the user name of a login session having an activity that triggers the associated detector. If no user name is listed in user column 3936, then no authenticated user can be associated with the triggering. Client column 3938 can list the URL of the web-enabled device associated with the triggering. Score column 3940 can list the threat score associated with the triggering.

Referring to FIG. 39, screen display 3900 can display the HTTP transactions-per-second at reference TPS. Screen display 3900 can also display the number of users currently being monitored and the number of user names known at reference USER. Additionally, screen display 3900 can display the average threat score per application at reference APS. Screen display 3900 can switch to more detailed information regarding user sessions, login sessions, web pages of the monitored application, and recent threats by selecting icons SES, USE, PAG, and THR, respectively.

Figure 40A:
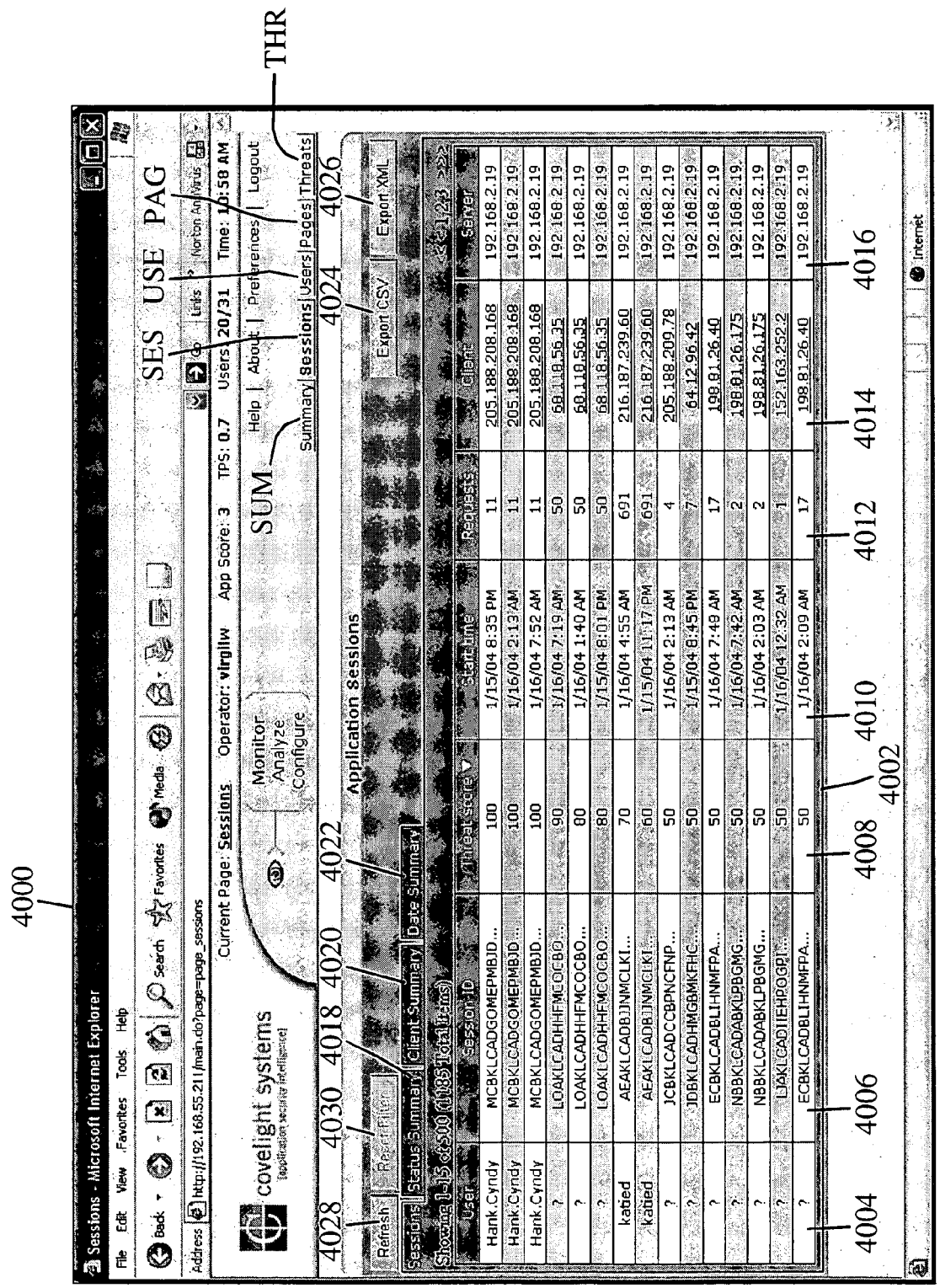
FIG. 40A is a screen display of an active sessions page.
Figure 50:
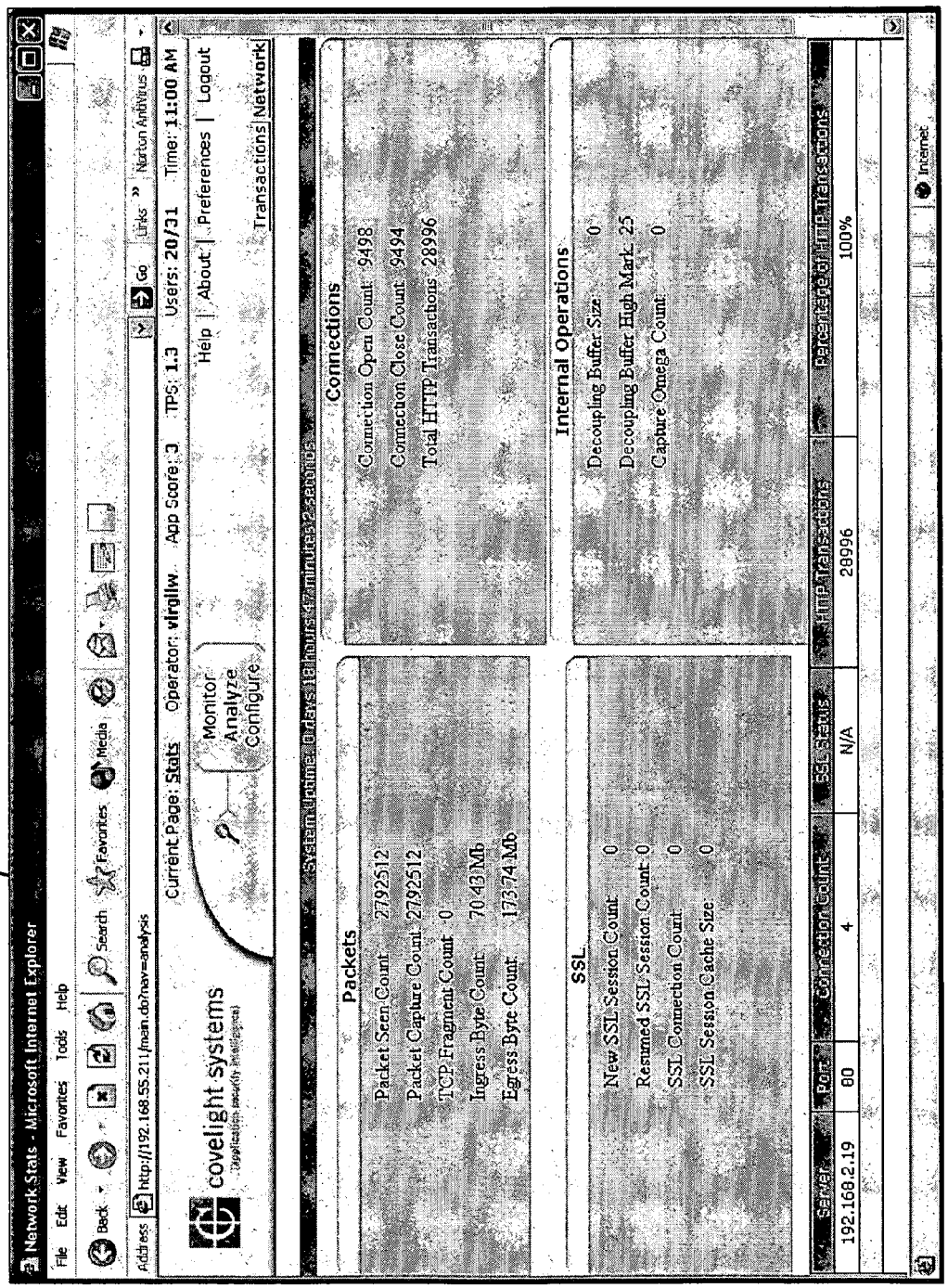
FIG. 50 is a screen display of network information for a monitored web application.

Referring to FIGS. 40A-40D, screen displays of information for an active session page are illustrated. Referring specifically to FIG. 40A, a screen display 4000 of an active sessions page is illustrated. Display 3900 (FIG. 39) can switch to screen display 4000 by selecting sessions icon SES (FIG. 50). Screen display 4000 can switch to screen display 3900 by selecting summary icon SUM. Screen display 4000 can display more detailed information regarding user sessions than displayed in screen display 3900 (FIG. 39). Screen display 4000 can display a table 4002 including the fifteen entries in user sessions table UST (FIG. 2) with the highest threat score. Table 4002 can include the following columns: user 4004, session ID 4006, threat score 4008, start time 4010, requests 4012, client 4014, and server 4016. User column 4004 can list the session entries having an authenticated user. A user name is shown for the entries having an authenticated user. Session ID column 4006 can list the session ID associated with the entry. Sessions can be defined by web applications. The particular session ID associated with a session can differ depending on the web application. Threat score column 4008 can list the current threat score associated with the session. Start time column 4010 can list the time that the associated session was initiated. Requests column 4012 can list the number of requests made during the user session. Client column 4014 can list the URL of the web-enabled device associated with the user session. Server column 4016 can list the web server associated with the user session.

Referring to FIG. 40A, screen display 4000 can include a status summary tab 4018, a client summary tab 4020, and a date summary tab 4022 for selection by an operator to provide other screen displays to display the information shown in screen display 4000. The table can show both active sessions and completed sessions (historical sessions). Tab 4018 can show the sessions divided into these two categories (i.e. those that are active versus those that are completed). An operator can select client summary tab 4020 to list the information of screen display 4000 according to client IP address. An operator can select date summary tab 4022 to list the information of screen display 4000 according to date. According to one embodiment, the information can be summarized on a monthly, weekly, or daily basis.

Figure 40B:
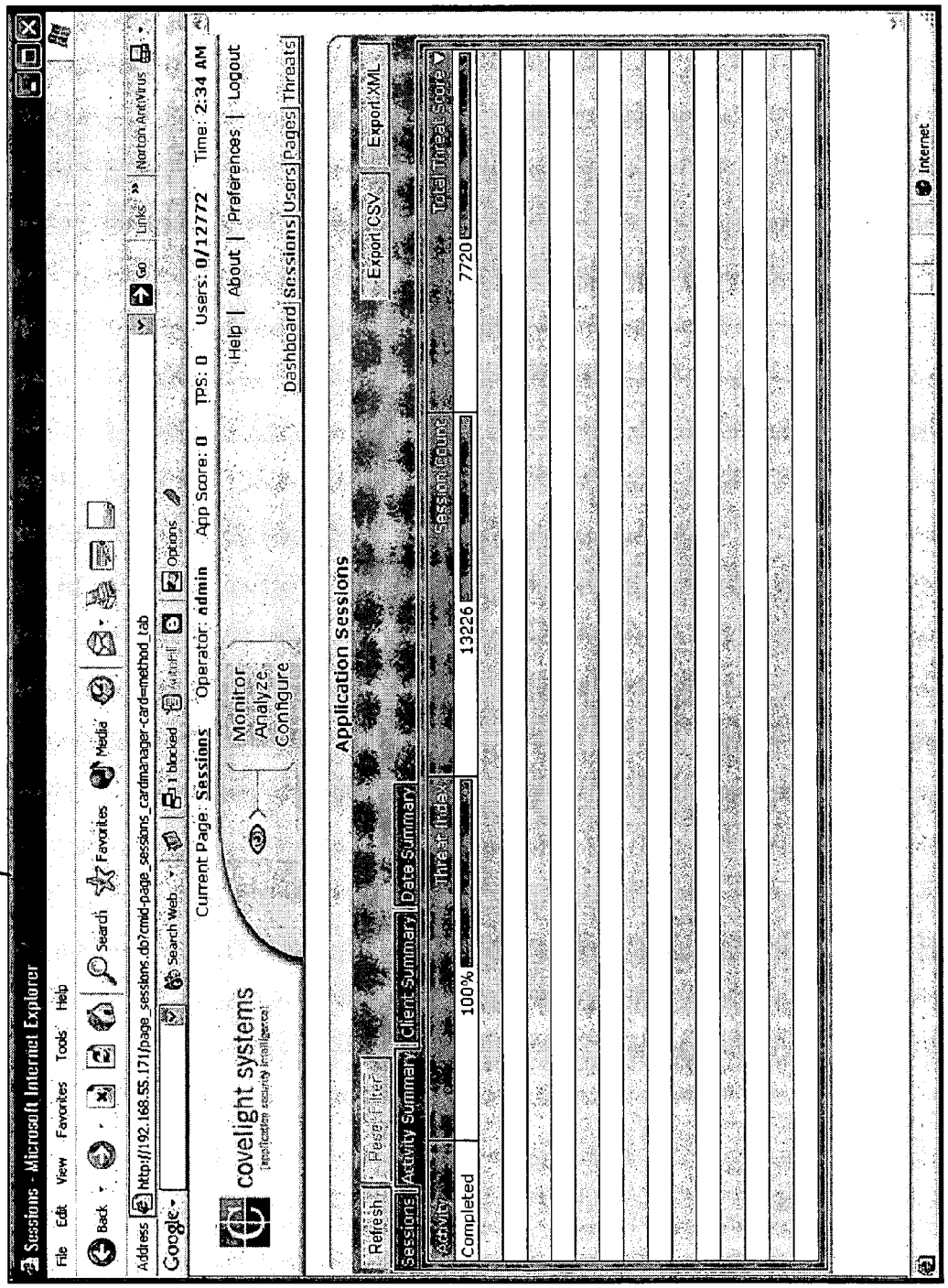
FIG. 40B is a screen display for showing active sessions and completed sessions.

Referring to FIG. 40B, a screen display 4032 for showing active sessions and completed sessions is illustrated. Screen display 4032 can be displayed by selecting tab 4018 (FIG. 40A).

Figure 40C:
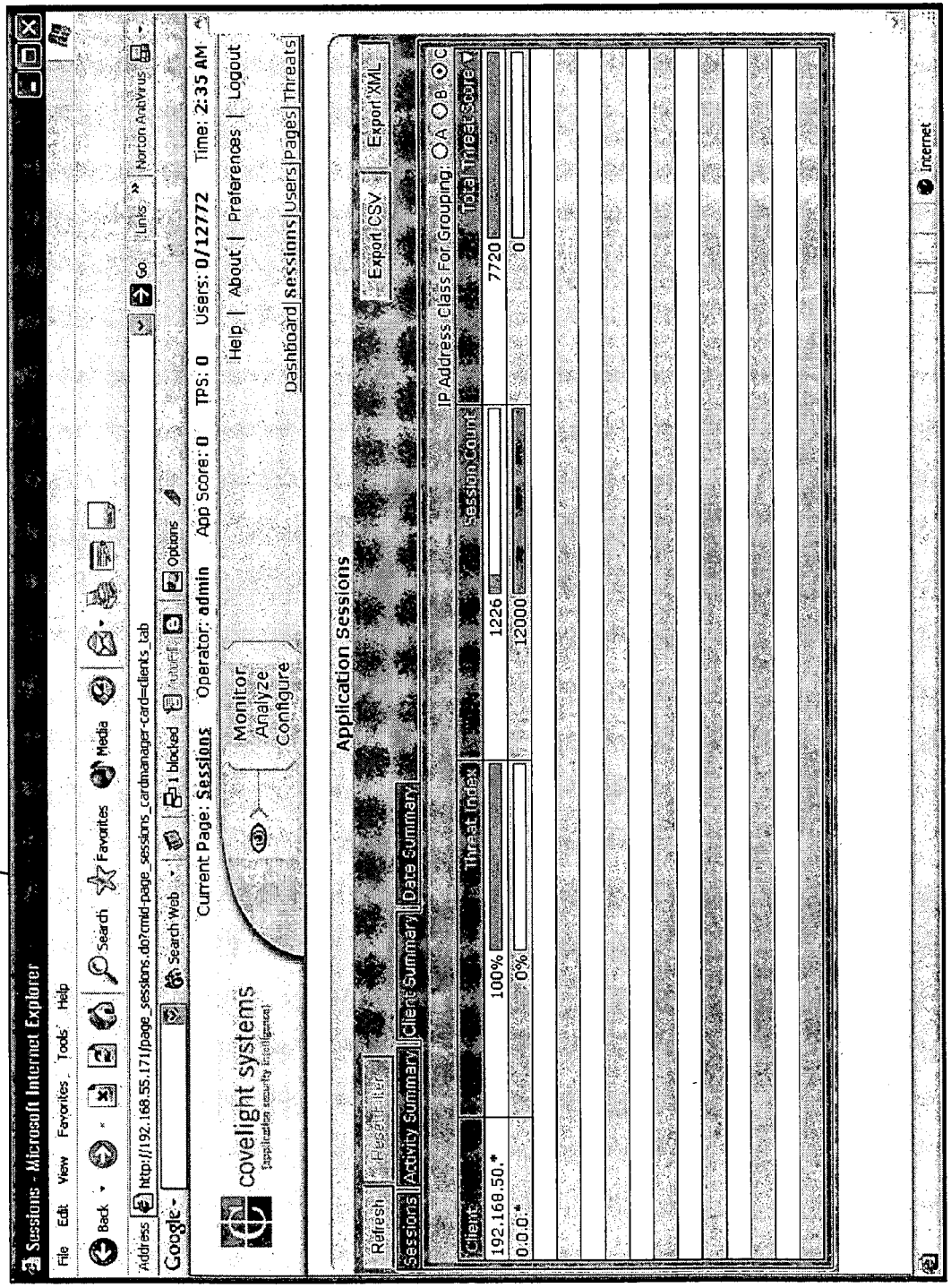
FIG. 40C is a screen display for showing sessions grouped according to client IP address.

Referring to FIG. 40C, a screen display 4034 for showing sessions grouped according to client IP address is illustrated. Screen display 4034 can be displayed by selecting tab 4020 (FIG. 40A).

Figure 40D:
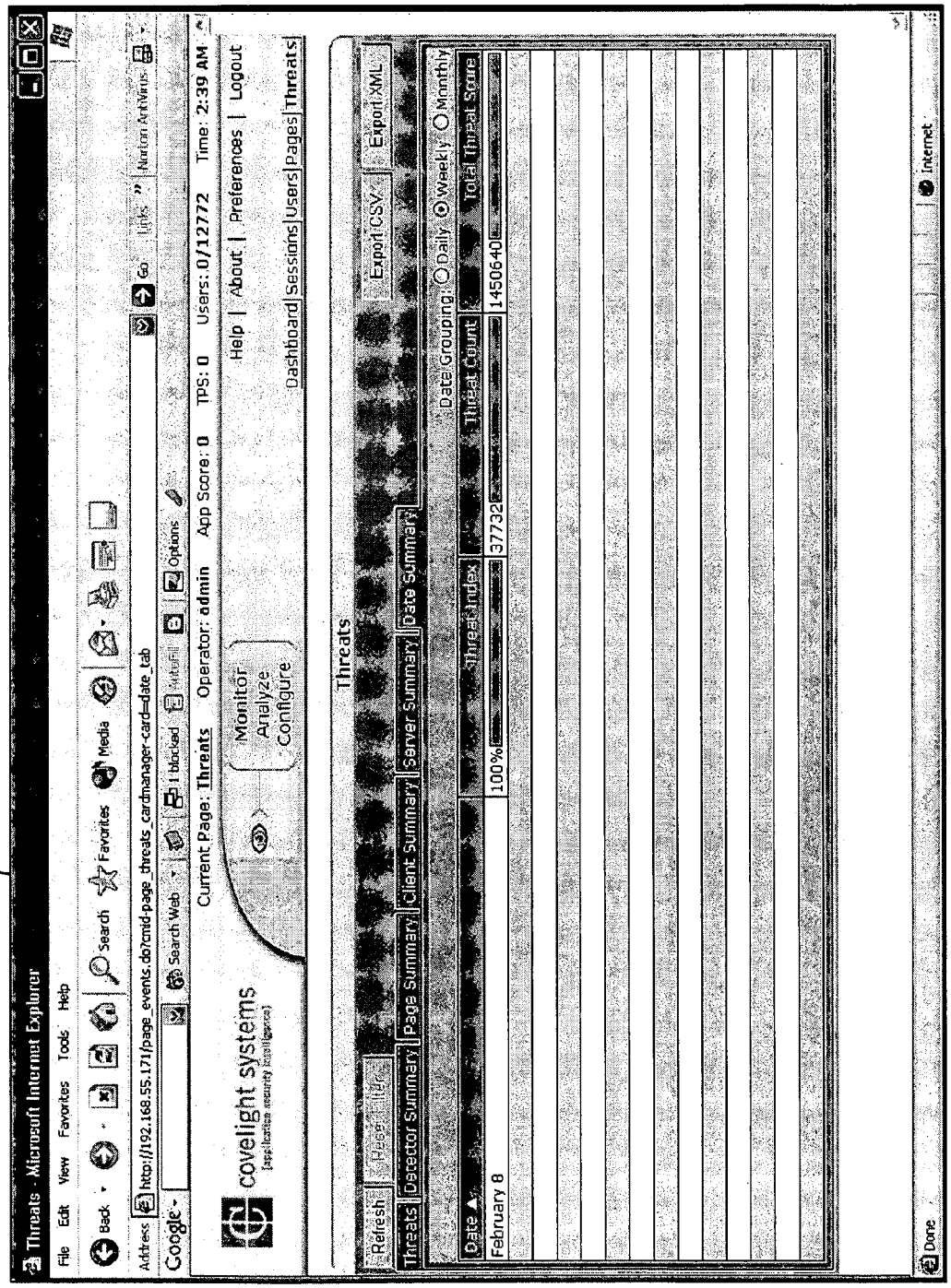
FIG. 40D is a screen display for showing sessions grouped according to time of occurrence.

Referring to FIG. 40D, a screen display 4036 for showing sessions grouped according to time of occurrence is illustrated. The displayed time of occurrence can include day, week, and month. Screen display 4036 can be displayed by selecting tab 4022 (FIG. 40A).

Referring again to FIG. 40A, screen display 4000 can also include an export CSV icon 4024 and export XML icon 4026. The data associated with user sessions table UST can be exported to a common separated value (CSV) document by selecting export CSV icon 4024. The data associated with user sessions table UST can be exported to an XML document by selecting export CSV icon 4024. According to one embodiment, the data can be exported to a document in the EXCEL application available from Microsoft Corporation of Redmond, Wash.

The operator can click a refresh icon 4028 to refresh or update the data on screen display 4000. If the rows displayed in the table are filtered, the operator can clear the filter and display all the data by clicking reset filter icon 4030.

Figure 41:
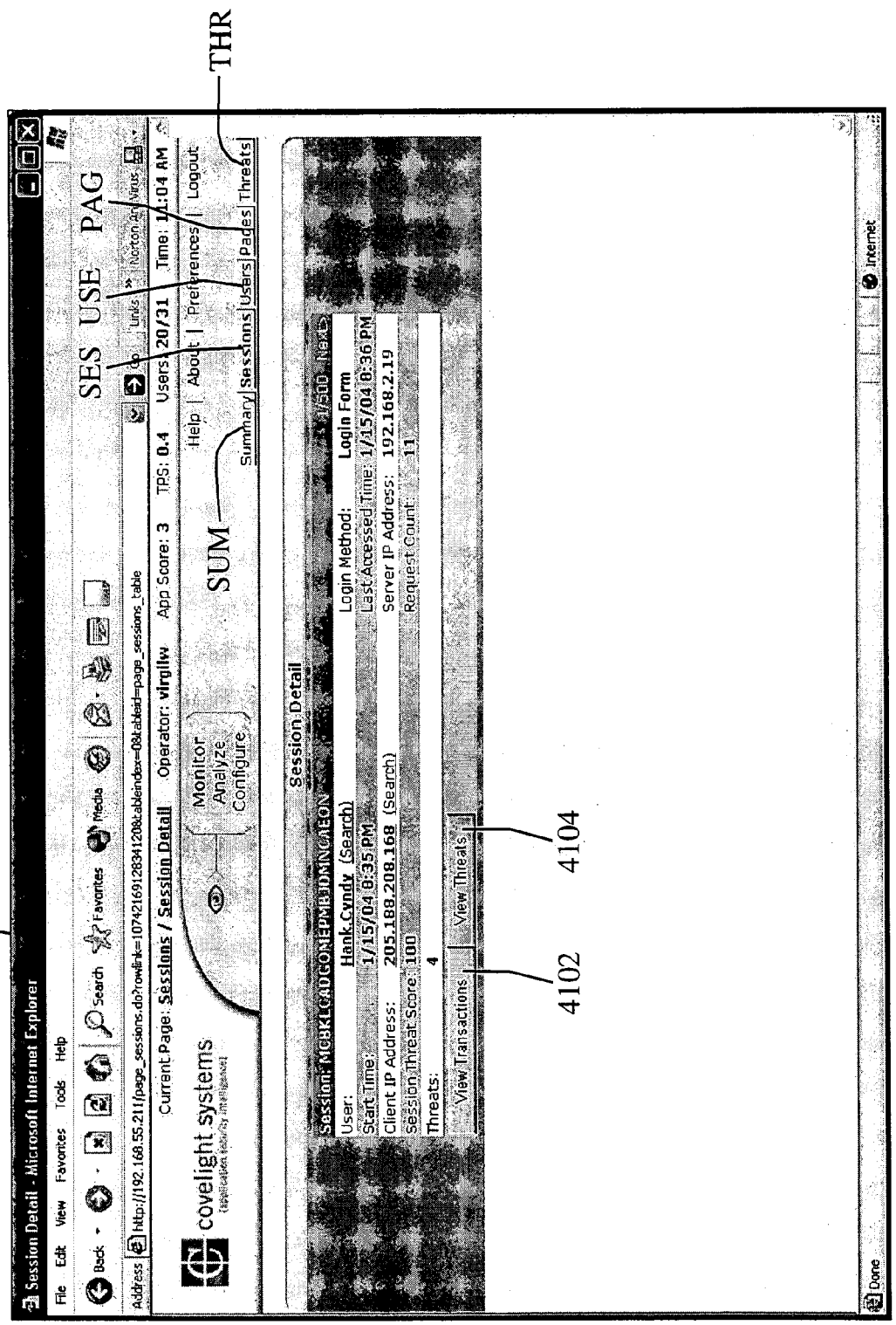
FIG. 41 is a screen display of an entry in user sessions table.

Referring to FIG. 41, a screen display 4100 of an entry in user sessions table UST is illustrated. Screen display 4100 can include information regarding the user associated with the user session, the start time of the user session, the client IP address, the current threat score for the user session, the number of threats or triggers for the session, the login method for the user session, the last access time for the web application associated with the user session, and the server IP address for the web server associated with the user session, and the request count for the user session.

Screen display 4100 can include a view transactions icon 4102 and a view threats icon 4104. When view transactions icon 4102 is selected, the transactions associated with this session can be displayed. When view threats icon 4104 can be selected, the threats associated with this session can be displayed.

Figure 42:
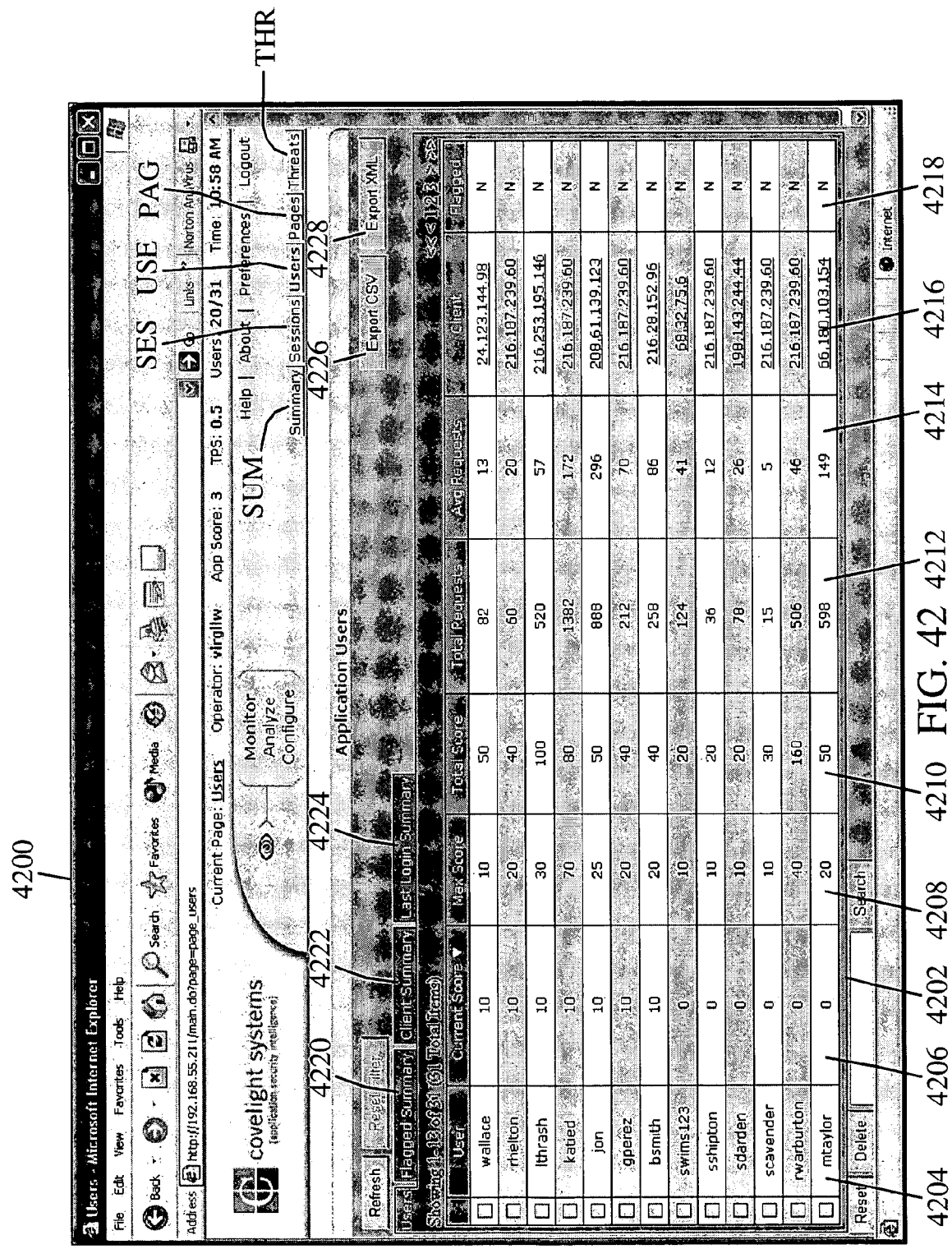
FIG. 42 is a screen display of an active users page.

Referring to FIG. 42, a screen display 4200 of an active users page is illustrated. Display 3900 (FIG. 39) can switch to screen display 4200 by selecting users icon USE (FIG. 39). Screen display 4200 can display more detailed information regarding active users than displayed in screen display 3900 (FIG. 39). Screen display 4200 can display a table 4202 including the thirteen logged in users with the highest threat score. For this monitored web application, there are thirty-one unique user names. Table 4202 can include the following columns: user 4204, current score 4206, max score 4208, total score 4210, total requests 4212, average requests 4214, client 4216, and flagged 4218. User column 4204 can indicate the user name for the associated user. Current score column 4206 can indicate the score for the user for this session. Max score column 4208 can indicate the maximum score for this user for any session. Total threat score 4210 is the cumulative threat score for this user across all of their sessions (including completed sessions). Total requests column 4212 can indicate the total requests from the user for the monitored web application for all sessions. Average requests column 4214 can indicate the average requests made by the user per session. Client column 4216 can indicate the client ID for the user. The client ID in column 4216 can be selected for displaying another screen display including more detailed information regarding the client. Flagged column 4218 can indicate whether the user has been flagged.

Referring to FIG. 42, screen display 4200 can include a flagged summary tab 4220, a client summary tab 4222, and a last login summary tab 4224 for selection by an operator to provide other screen displays to display the information shown in screen display 4200. An operator can select flagged summary tab 4220 to list the information of screen display 4200 according to flagged users. An operator can select client summary tab 4222 to list the information of screen display 4200 according to client IP address. An operator can select client summary tab 4224 to list the information of screen display 4200 according to the time that the user was last logged onto the web application.

Screen display 4200 can also include an export CSV icon 4226 and export XML icon 4228. The data associated with screen display 4200 can be exported to a common separated value (CSV) document by selecting export CSV icon 4226. The data associated with screen display 4200 can be exported to an extensible markup language (XML) document by selecting export CSV icon 4228.

Figure 43:
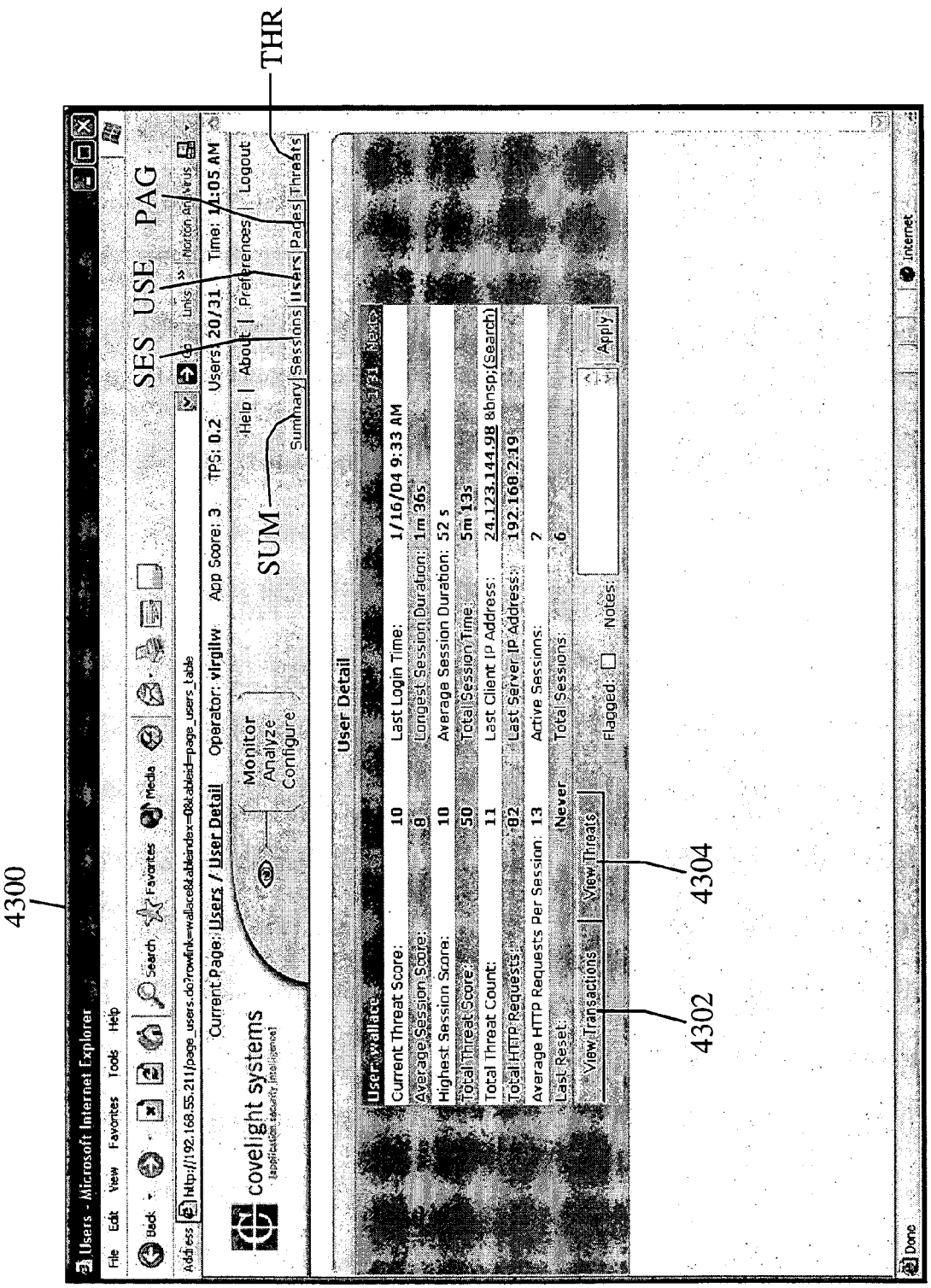
FIG. 43 is a screen display of an entry for a user login name.

Referring to FIG. 43, a screen display 4300 of an entry for a user login name is illustrated. Screen display 4300 can include information regarding the user name associated with the login session; the current threat score for the login session; the average session threat score; the highest session threat score for all sessions; the total threat score for all sessions; the total HTTP requests for the monitored web application for all sessions; the average HTTP requests per session; the last reset; the last login time; the longest session duration; the average session duration; the total time for all sessions; the last client IP address for the user name; the last web server IP address; the number of active session for the user name; and the total sessions established for the user name. All cumulative statistics for the selected users can be reset. The reset button can perform the reset function and show the last time of reset. According to one embodiment, the reset can reset the following values shown on this screen: average session threat score, highest session threat score, total threat score, and total threat count.

Screen display 4300 can include a view transactions icon 4302 and a view threats icon 4304. When view transactions icon 4302 is selected, the transactions associated with this login session can be displayed. When view threats icon 4304 can be selected, the threats associated with this login session can be displayed.

Figure 44:
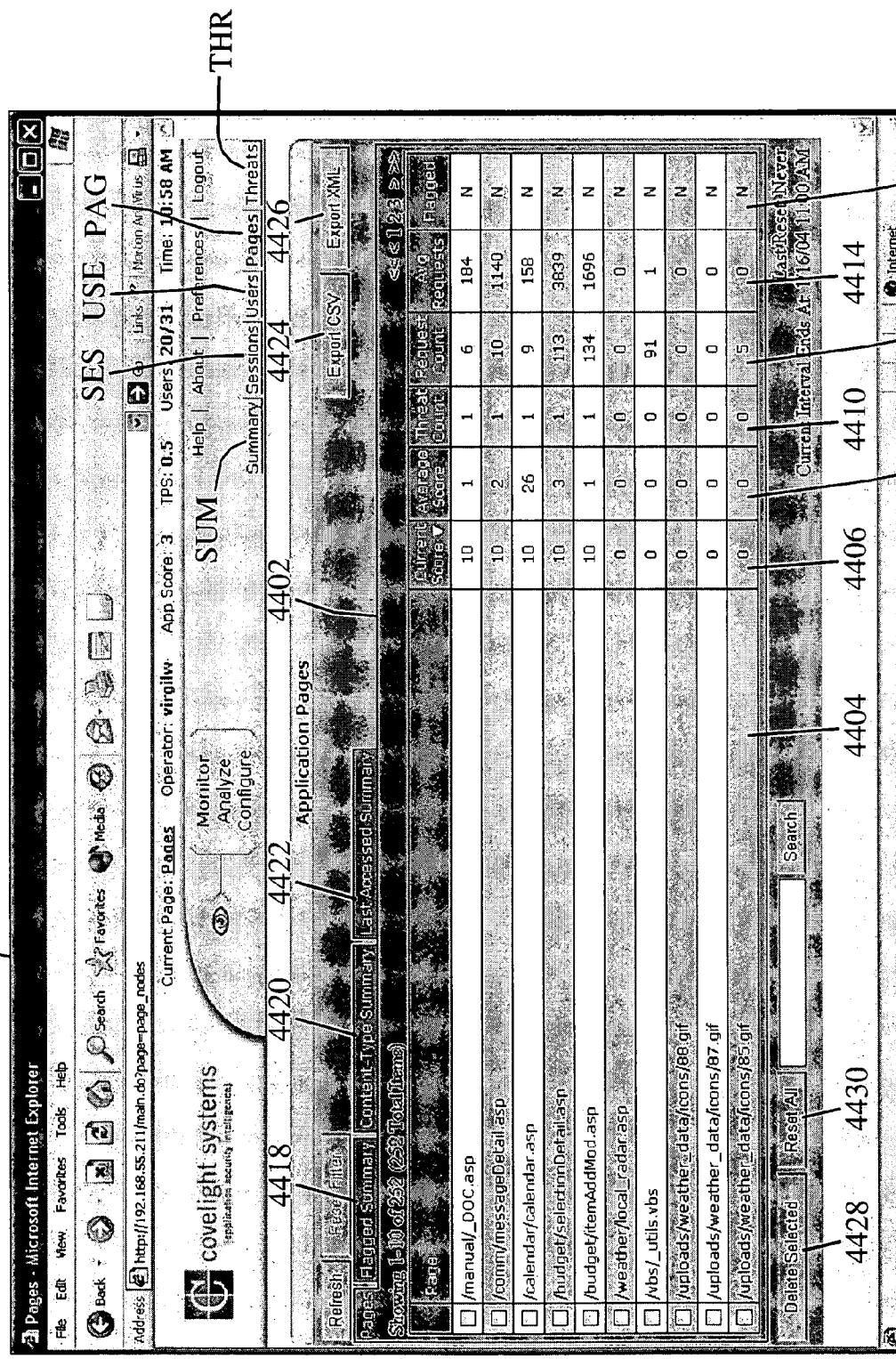
FIG. 44 is a screen display of recent potential threats to the web pages of the monitored web application.

Referring to FIG. 44, a screen display 4400 of recent potential threats to the web pages of the monitored web application is illustrated. Display 3900 (FIG. 39) can switch to screen display 4400 by selecting pages icon PAG (FIG. 39). Screen display 4400 can display more detailed information regarding the web pages of the monitored web application than displayed in screen display 3900 (FIG. 39). Screen display 4400 can display a table 4402 including the ten web pages with the highest current threat score. Table 4402 can include the following columns: page 4404, current score 4406, average score 4408, threat count 4410, request count 4412, average requests 4414, and flagged 4416. Page column 4404 can list the web page associated with the entry. Current score column 4406 can list the current threat score associated with the session. Average score 4408 can list the average threat score for the associated web page per request. Threat count 4410 can list the number of threats for the associated web page per request. Request count 4412 can list the total number of requests for the associated web page. Average requests column 4414 can list the average number of requests for the web page per session. Flagged column 4416 can list the web pages that have been flagged for attention.

Referring to FIG. 44, screen display 4400 can include a flagged summary tab 4418, a content-type tab 4420, and a last accessed summary tab 4422. An operator can select flagged tab 4418 to list pages combined into groups based on whether each page has been marked for observation by an operator. The operator can select content-type tab 4420 to list all pages combined into groups with each page in a group have the same content-type. The content-type is the type of document that a web page returns to clients (e.g., /index.html has a content-type of "text/html" and /images/home.gif has a content-type of "image/gif"). The operator can select last accessed summary tab 4422 to list all pages combined into groups with each page in a group having the same date of last access. The information can be shown on a daily, weekly, or monthly basis.

Screen display 4400 can also include an export CSV icon 4424 and export XML icon 4426. The data can be exported to a common separated value (CSV) document by selecting export CSV icon 4424. The data can be exported to an extensible markup language (XML) document by selecting export CSV icon 4424. Delete selected icon 4428 can remove selected pages from the database. Reset all 4430 can reset cumulative statistics for all nodes (same function as reset for users except that users are reset on an individual basis and pages are all reset together).

Figure 45:
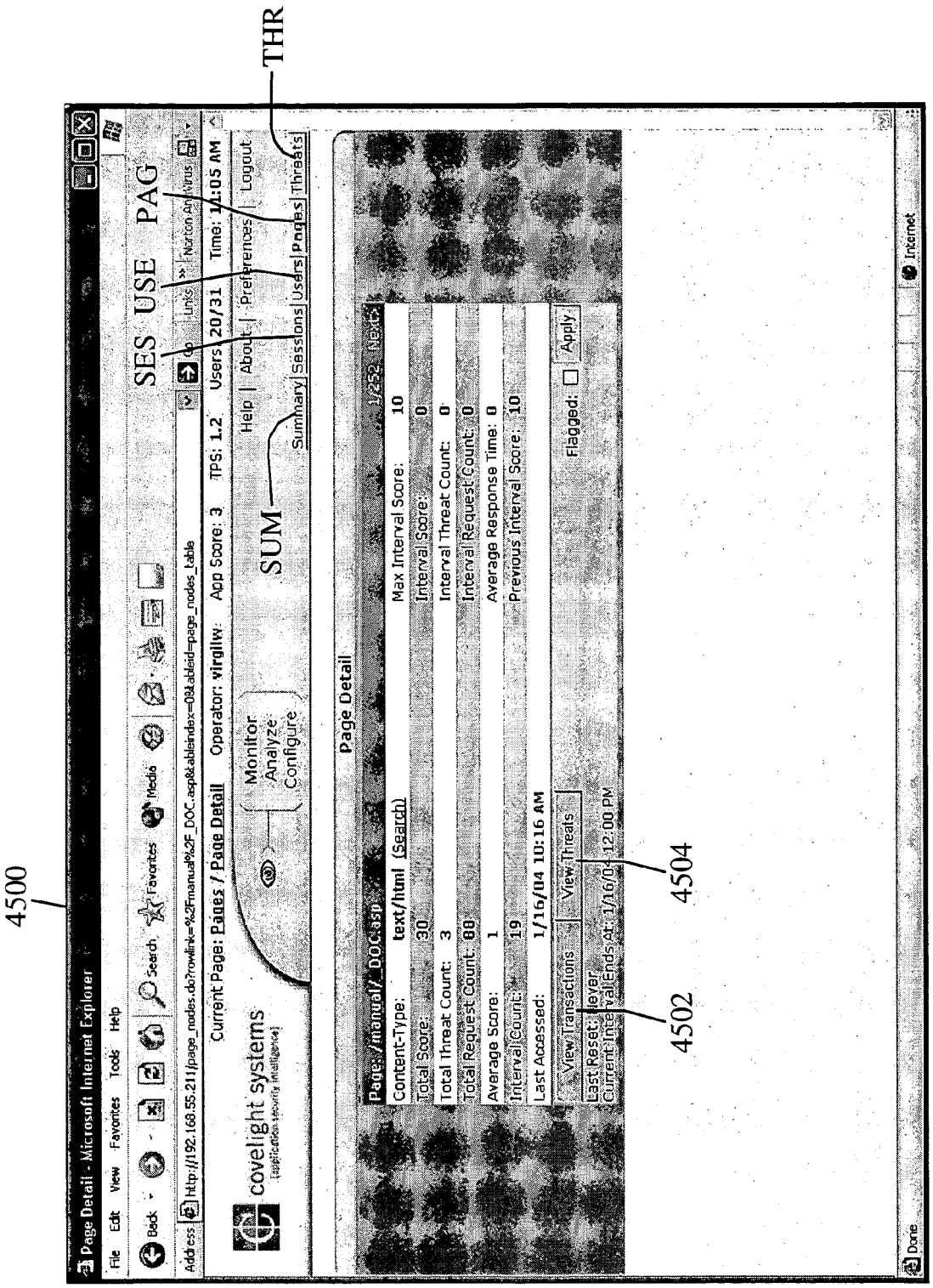
FIG. 45 is a screen display of an entry in a table shown in FIG. 44.

Referring to FIG. 45, a screen display 4500 of an entry in table 4402 (shown in FIG. 44) is illustrated. Screen display 4500 can include information regarding a web page of the monitored web application; the content-type; the total threat score; the total threat count; the total request count; the average score; the interval count; the last access time; the maximum interval score; the interval score; the interval threat count; the interval request count; the average response time; and the previous interval score.

Screen display 4500 can include a view transactions icon 4502 and a view threats icon 4504. When view transactions icon 4502 is selected, the transactions associated with this web page can be displayed. When view threats icon 4504 can be selected, the threats associated with this web page can be displayed.

Figure 46A:
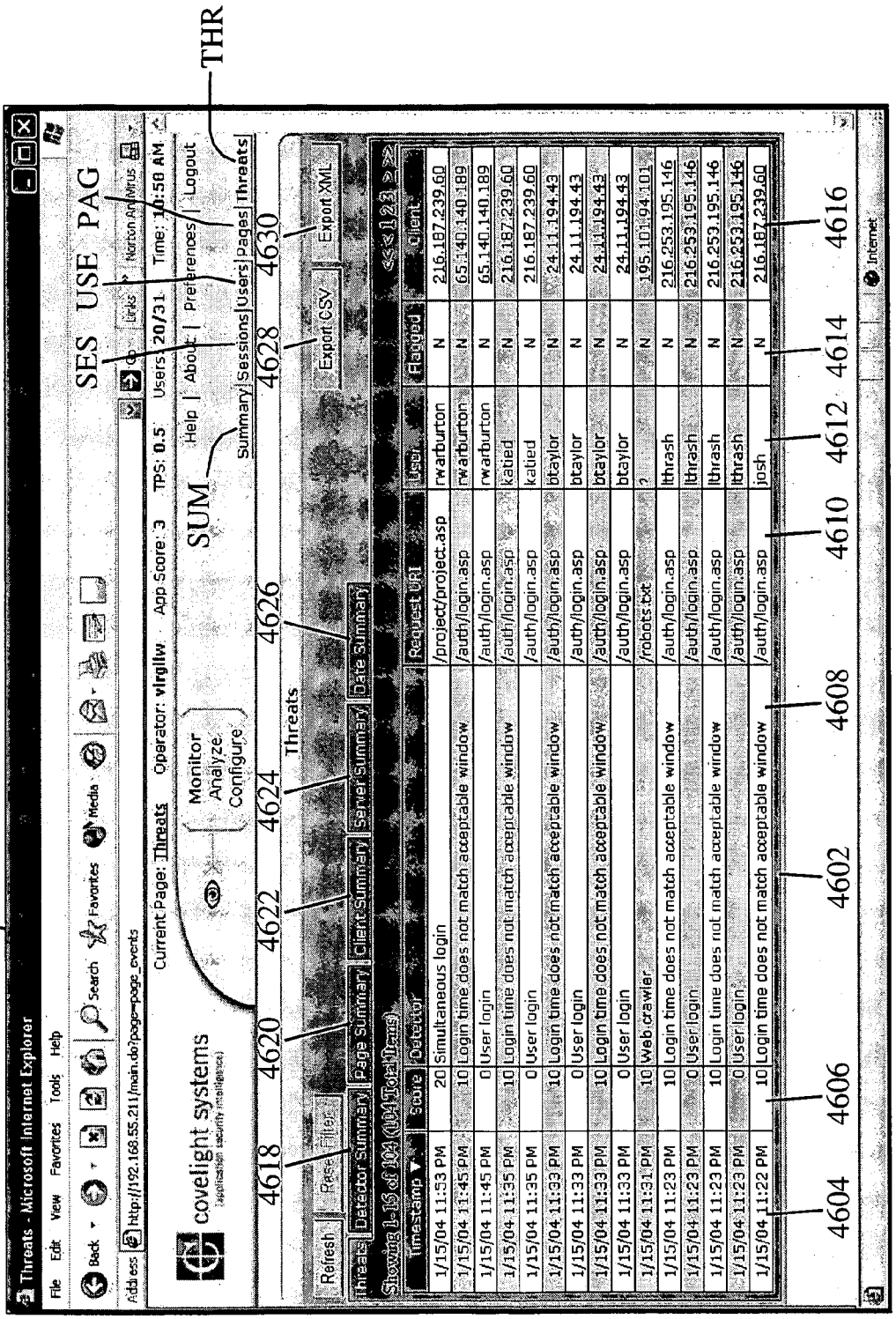
FIG. 46A is a screen display of recent potential threats to a monitored web application.

Referring to FIGS. 46A-46F, screen displays for showing information of recent potential threats to the monitored web application are illustrated. Referring specifically to FIG. 46A, a screen display 4600 of recent potential threats to the monitored web application is illustrated. Display 3900 (FIG. 39) can switch to screen display 4600 by selecting threats icon THR (FIG. 39). Screen display 4600 can display more detailed information regarding recent potential threats of the monitored web application than displayed in screen display 3900 (FIG. 39). Screen display 4600 can display a table 4602 including the fifteen most recent threats. Table 4602 can include the following columns: timestamp 4604, score 4606, detector 4608, request URI 4610, user 4612, flagged 4614, and client 4616. Timestamp column 4604 can list the time that the threat occurred. Score column 4606 can list the threat score associated with the threat. Detector column 4608 can list the name of the detector triggering the threat. Request URI column 4610 can list the URI of the web-enabled device associated with the threat. User column 4612 can list the user name, if any, associated with the threat. Flagged column 4614 can indicate if the user name associated with the threat has been flagged. Client column 4616 can indicate the client ID associated with the threat.

Referring to FIG. 46A, screen display 4600 can include a detector summary tab 4618, a page summary tab 4620, a client summary tab 4622, a server summary tab 4624, and a date summary tab 4626. An operator can select detector summary tab 4618 to list only the detectors triggering for the monitored application. Selection of server summary tab 4618 can also list the number of trigger events detected by each detector. The operator can select page summary tab 4620 to group threats based on the page targeted by the threat; and summarize the data by showing the total threat score against each page. The operator can select client summary tab 4622 to group threats based on the client IP address; and summarize the data by showing the total threat score originating from each source network. The operator can select server summary tab 4624 to group threats based on the physical server targeted by the threat; and summarize the data by showing the total threat score against each server. The operator can select date summary tab 4626 to group threats based on day, week, or month the threat executed on; and summarize the data by showing the total threat score on each date.

Figure 46B:
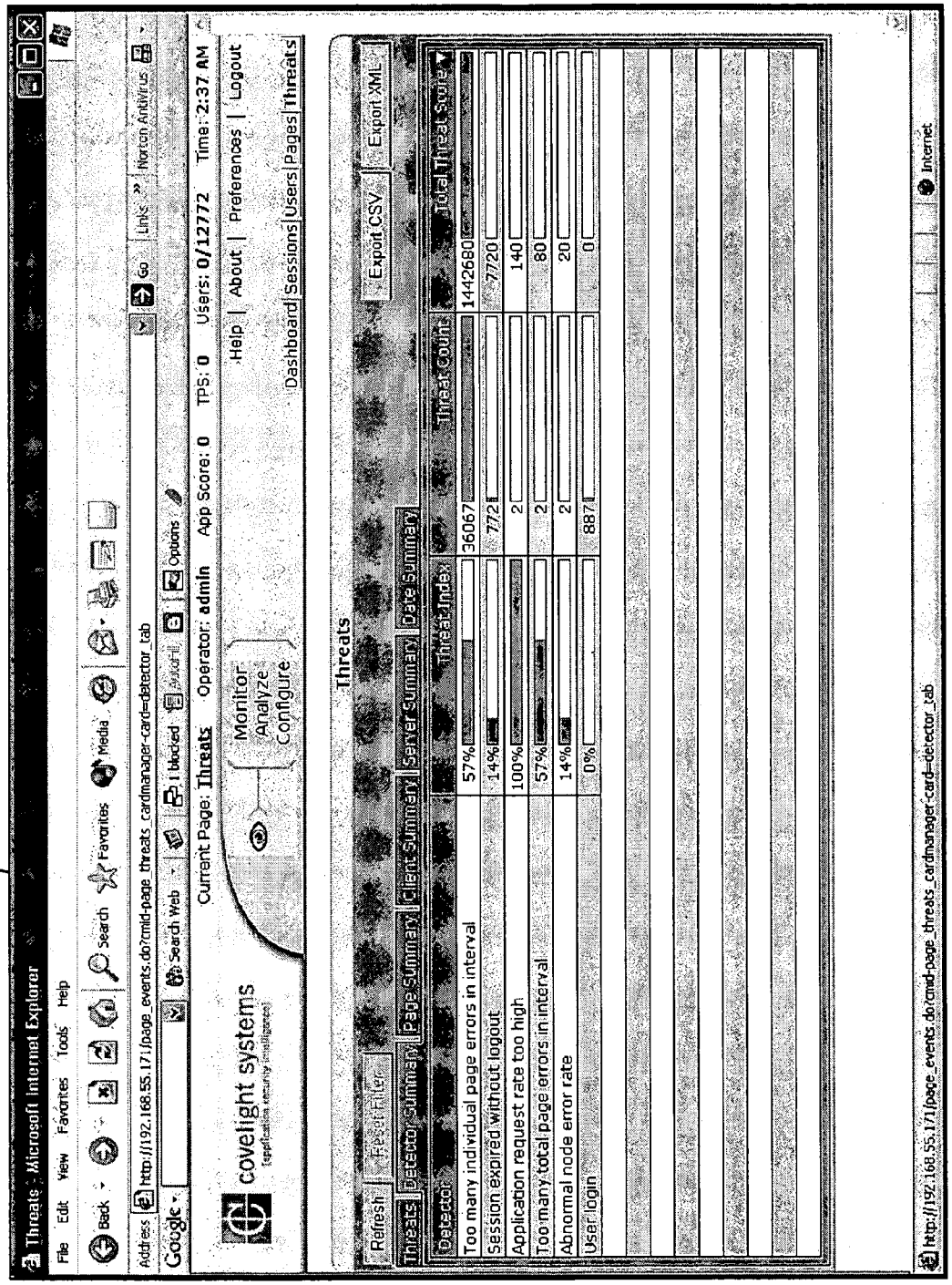
FIG. 46B is a screen display for showing threats grouped according to a triggering detector.

Referring to FIG. 46B, a screen display 4632 for showing threats grouped according to the triggering detector is illustrated. Screen display 4632 can be displayed by selecting tab 4618 (FIG. 46A).

Figure 46C:
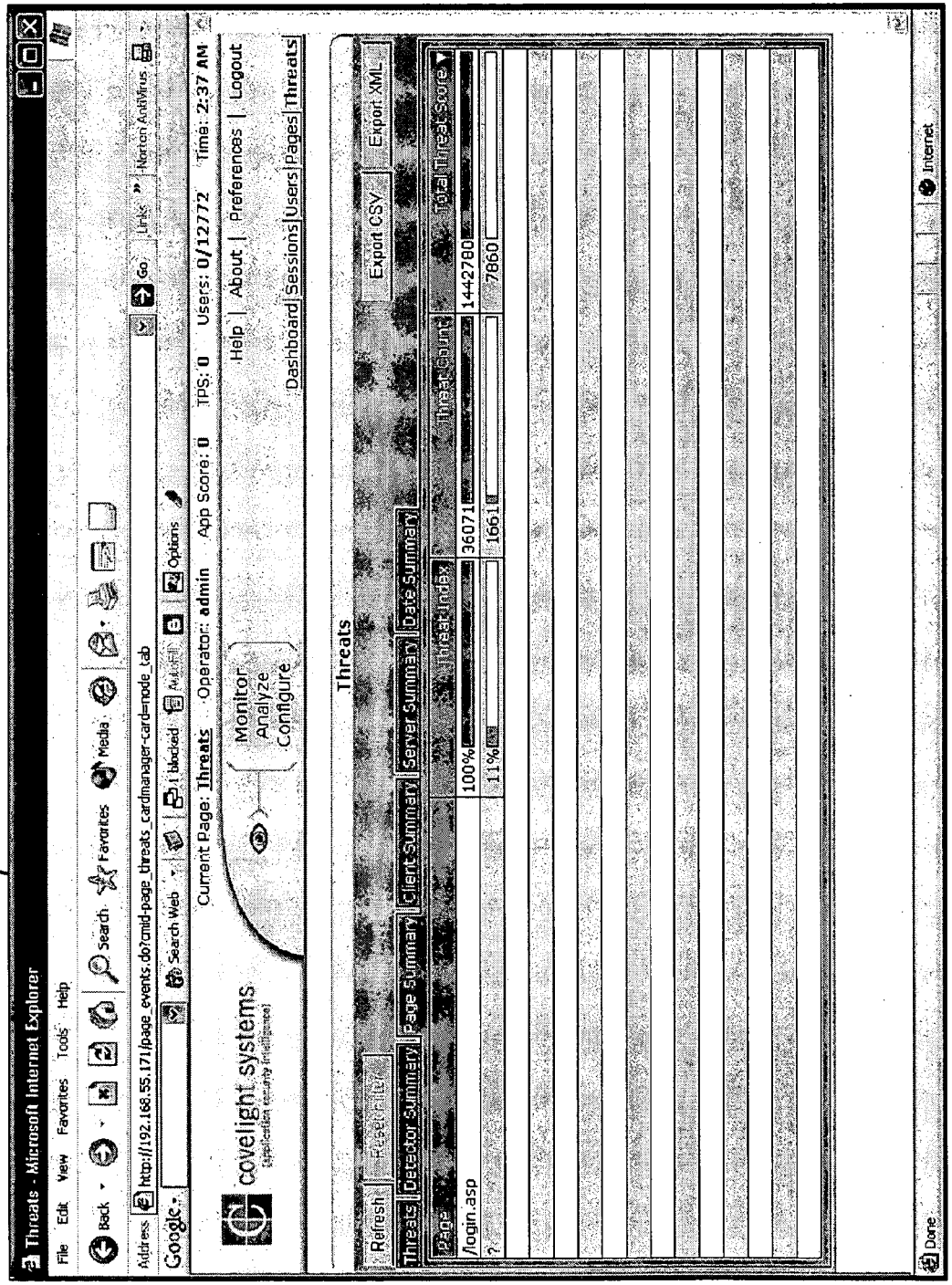
FIG. 46C is a screen display for showing threats grouped according to the page that the threats were targeted against.

Referring to FIG. 46C, a screen display 4634 for showing threats grouped according to the page that the threats were targeted against is illustrated. Screen display 4634 can be displayed by selecting tab 4620 (FIG. 46A).

Figure 46D:
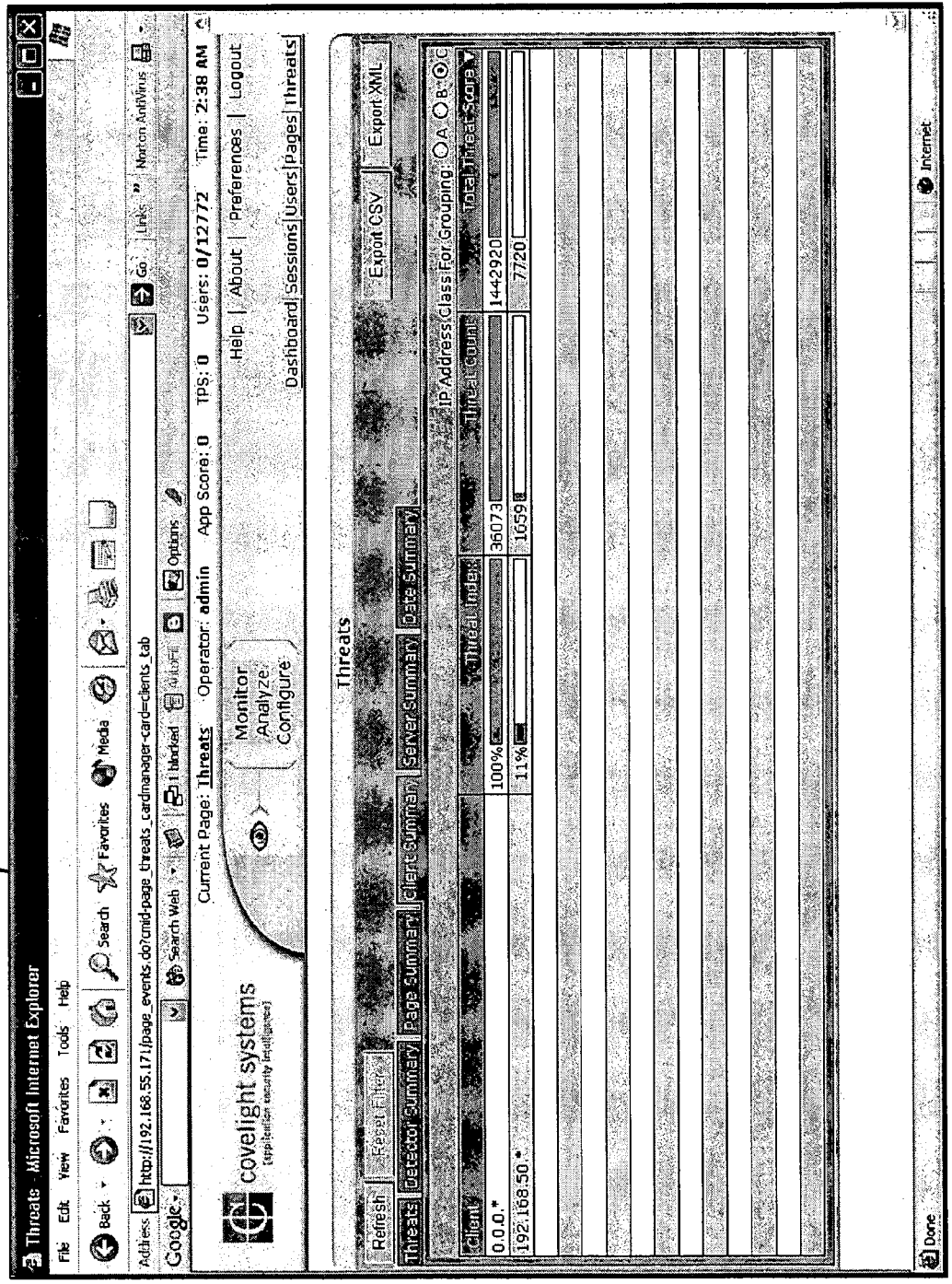
FIG. 46D is a screen display for showing threats grouped according to a triggering client.

Referring to FIG. 46D, a screen display 4636 for showing threats grouped according to the triggering client is illustrated. Screen display 4636 can be displayed by selecting tab 4622 (FIG. 46A).

Figure 46E:
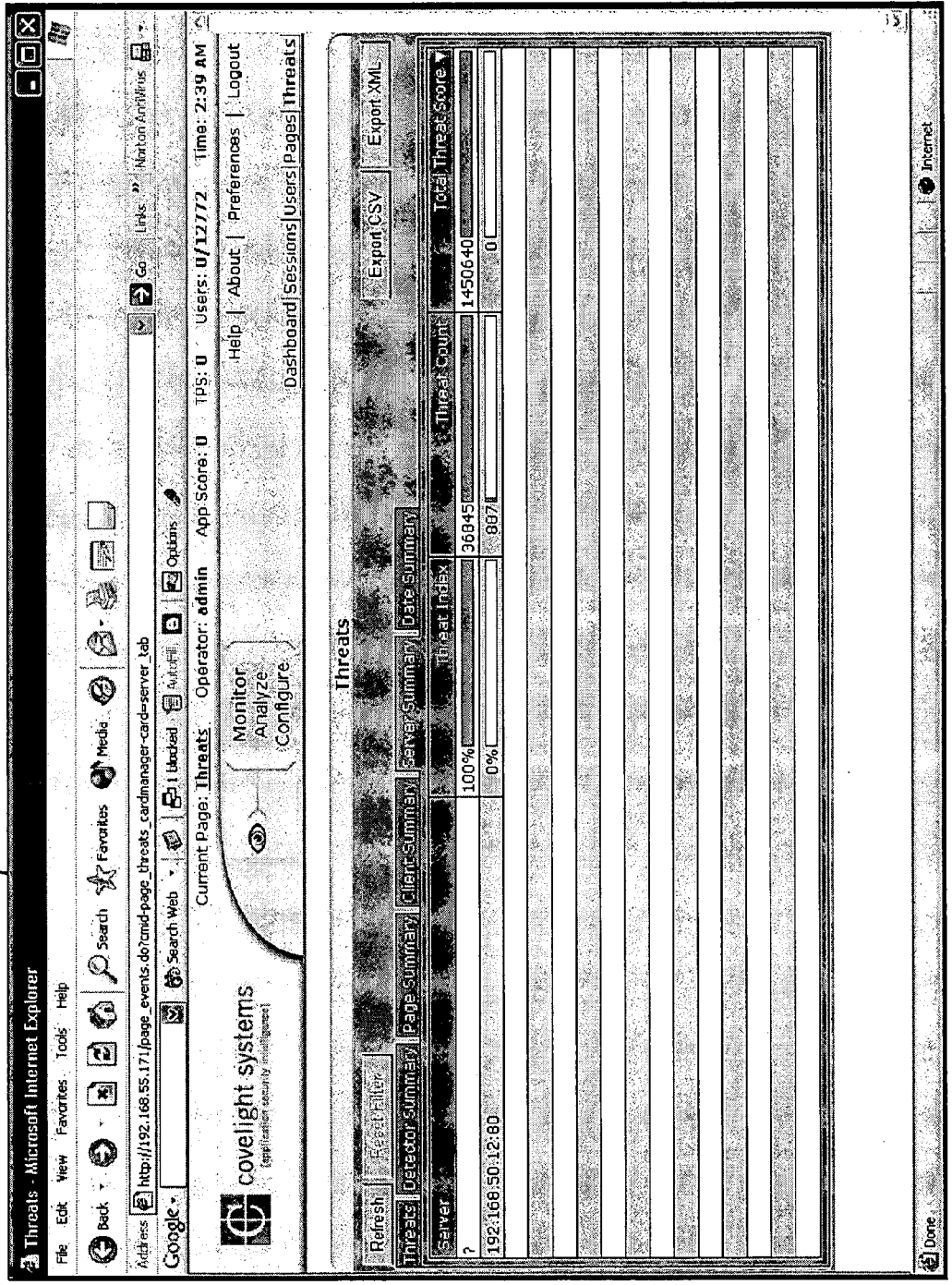
FIG. 46E is a screen display for showing threats grouped according to the server.

Referring to FIG. 46E, a screen display 4638 for showing threats grouped according to the page that the threats were targeted against is illustrated. Screen display 4638 can be displayed by selecting tab 4620 (FIG. 46A).

Figure 46F:
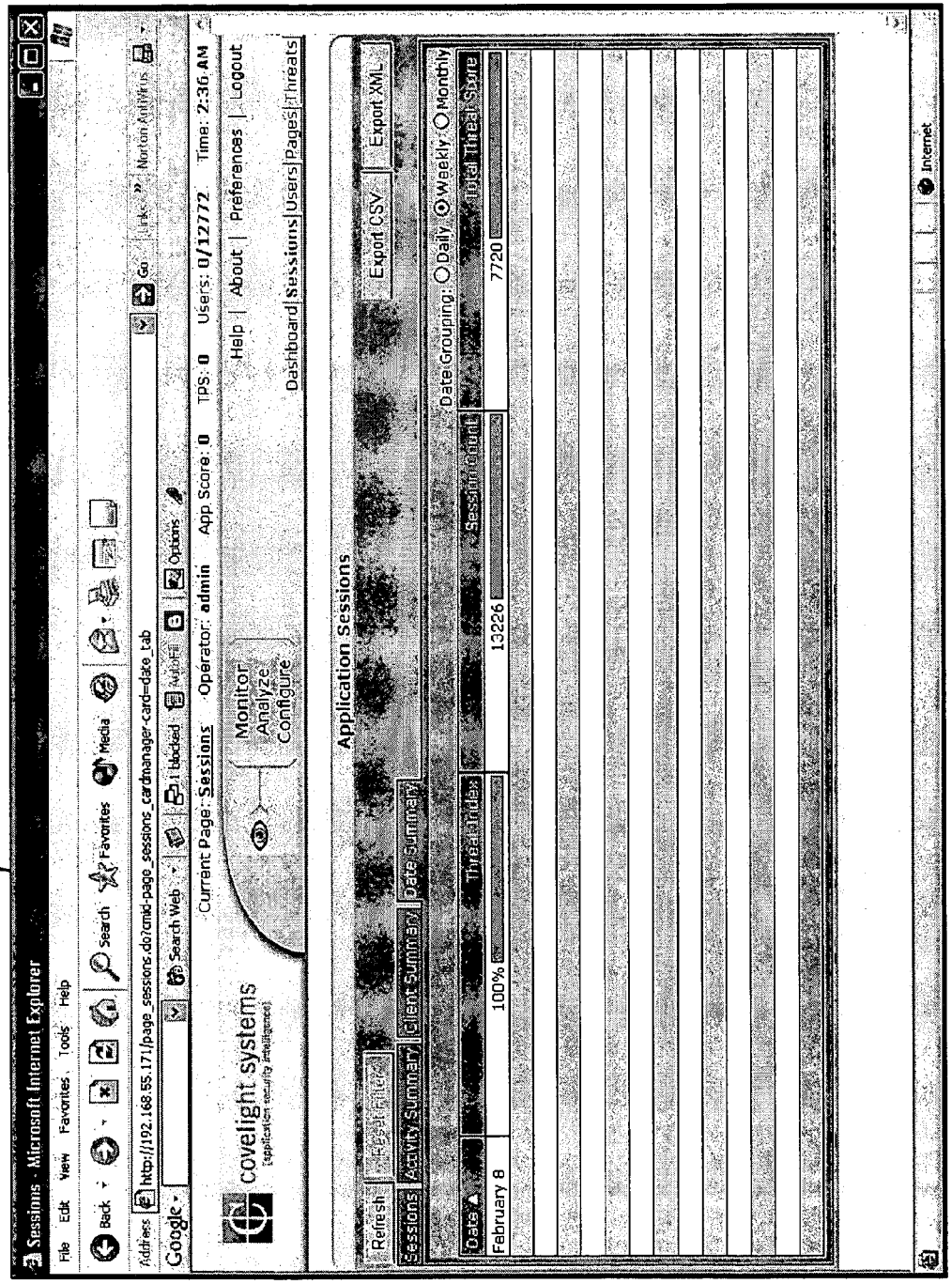
FIG. 46F is a screen display for showing threats grouped according to date.

Referring to FIG. 46F, a screen display 4640 for showing threats grouped according to the page that the threats were targeted against is illustrated. The displayed time of occurrence can include day, week, and month. Screen display 4640 can be displayed by selecting tab 4622 (FIG. 46A).

Referring again to FIG. 46A, screen display 4600 can also include an export CSV icon 4628 and export XML icon 4630. The data can be exported to a common separated value (CSV) document by selecting export CSV icon 4628. The data can be exported to an extensible markup language (XML) document by selecting export CSV icon 4630.

Figure 47:
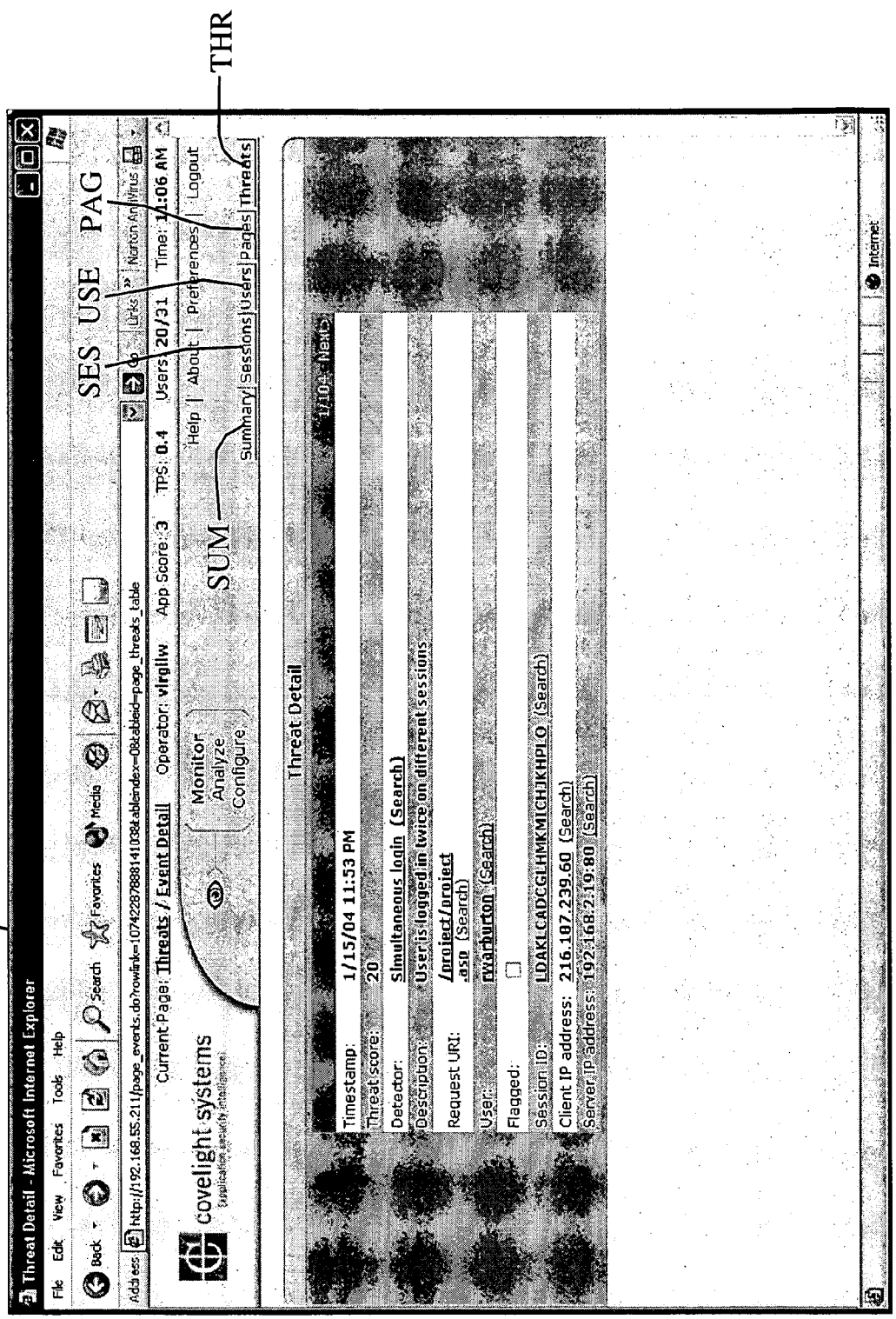
FIG. 47 is a screen display of an entry shown in FIG. 46A.

Referring to FIG. 47, a screen display 4700 of an entry in table 4602 (shown in FIG. 46A) is illustrated. Screen display 4700 can include information regarding a recent threat to the monitored application; a timestamp for the threat; a threat score; a name of a detector triggering the threat; a description of the threat; the URI of the requesting web-enabled device; a user name for the user triggering the threat; a user name associated with the threat; whether the user has been flagged; a session ID; a client IP address associated with the threat; and a server IP address associated with the web server for the monitored web application. The server IP address is useful when monitoring more than one web server.

Analyzing

Figure 48:
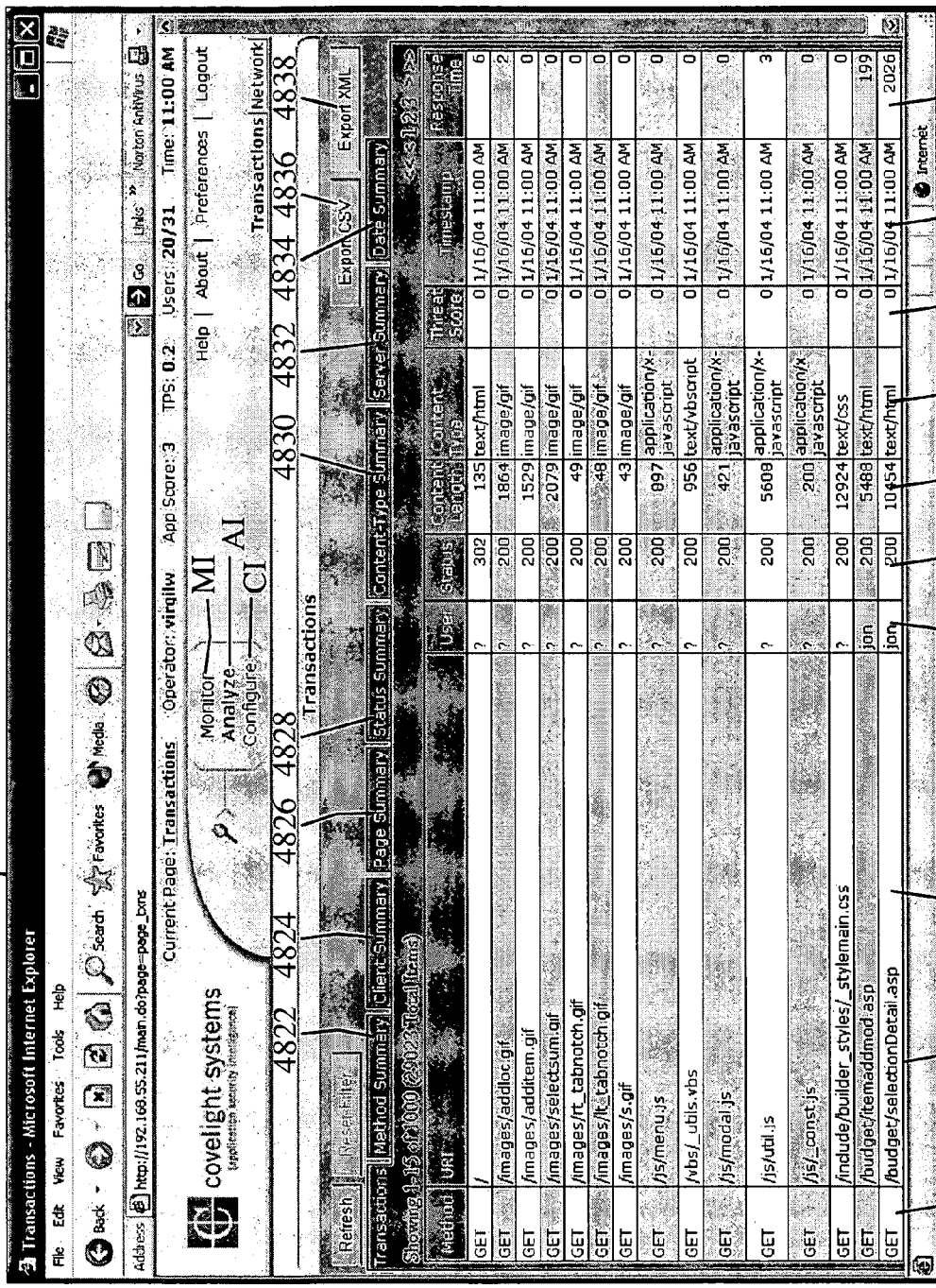
FIG. 48 is a screen display of a transaction summary table of a monitored web application.

Referring to FIG. 48, a screen display 4800 of a transaction summary table 4802 of a monitored web application is illustrated. Table 4802 can summarize each transaction between the monitored web application and web-enabled devices. Transaction summary table 4802 can list the fifteen most recent transactions. Table 4802 can include the following columns: method 4804, URI 4806, user 4808, status 4810, content length 4812, content type 4814, threat score 4816, timestamp 4818, and response time 4820. According to one embodiment, method column 4804 can indicate the possible request methods prescribed by the HTTP/1.1 specification. A GET can mean to "send me the entity described by the URL". URI column 4806 can indicate the URI names the resource on the server being requested by the client. User column 4808 can indicate the user name, if any, of an authenticated user. Status column 4810 can indicate HTTP Status Code sent in the server's response to the client's request. Content length column 4812 can indicate the number of bytes in the document the server sent to the client in its response. Content type column 4814 can indicate the content type of the associated request the type of the document the server to the client in its response. Threat score column 4816 can indicate a threat score associated with the transaction. Timestamp column 4818 can indicate when the transaction occurred. Response time column 4820 can indicate response time showing the time that the server took to begin sending the response to the client.

Referring to FIG. 48, screen display 4800 can include a method summary tab 4822, a client summary tab 4824, a page summary tab 4826, a status summary tab 4828, a content-type summary tab 4830, a server summary tab 4832, and a date summary tab 4834. Method summary tab 4822 can be selected to provide a screen display grouping transactions by HTTP request method and summarizing the data by showing total number of transactions and total threat score for each HTTP request method. Client summary tab 4824 can be selected to provide a screen display grouping transactions by client IP address and summarizing the data by showing total number of transactions and total threat score for each source network. Page summary tab 4826 can be selected to provide a screen display grouping transactions according to web pages of the monitored web application and summarizing the data by showing total number of transactions and total threat score for each page. Status summary tab 4828 can be selected to provide a screen display grouping transactions by HTTP status code of the response and summarizing the data by showing total number of transactions and total threat score for each status code. Content-type summary tab 4830 can be selected to provide a screen display grouping transactions according to content type of the response and summarizing the data by showing total number of transactions and total threat score for each content type. Server summary tab 4832 can be selected to provide a screen display grouping transactions according to the web server receiving the request and summarizing the data by showing total number of transactions and total threat score for each server. Date summary tab 4834 can be selected to provide a screen display grouping transactions according to day, week, or month the transaction was executed and summarizing the data by showing total number of transactions and total threat score for each data.

Screen display 4800 can also include an export CSV icon 4836 and export XML icon 4838. The data can be exported to a common separated value (CSV) document by selecting export CSV icon 4836. The data can be exported to an extensible markup language (XML) document by selecting export CSV icon 4838.

Screen display 4800 can also include a monitor icon MI for switching to screen display 3900 (FIG. 39) and configure icon CI for switching to a screen display for configuring security system 102 (FIGS. 1A, 1B, and 2). Screen display 4000 can also include an export CSV icon 4024 and export XML icon 4026. The data associated with the information of screen display 4900 can be exported to a common separated value (CSV) document by selecting export CSV icon 4024. The data associated with the information of screen display 4800 can be exported to an extensible markup language (XML) document by selecting export CSV icon 4024.

Figure 49:
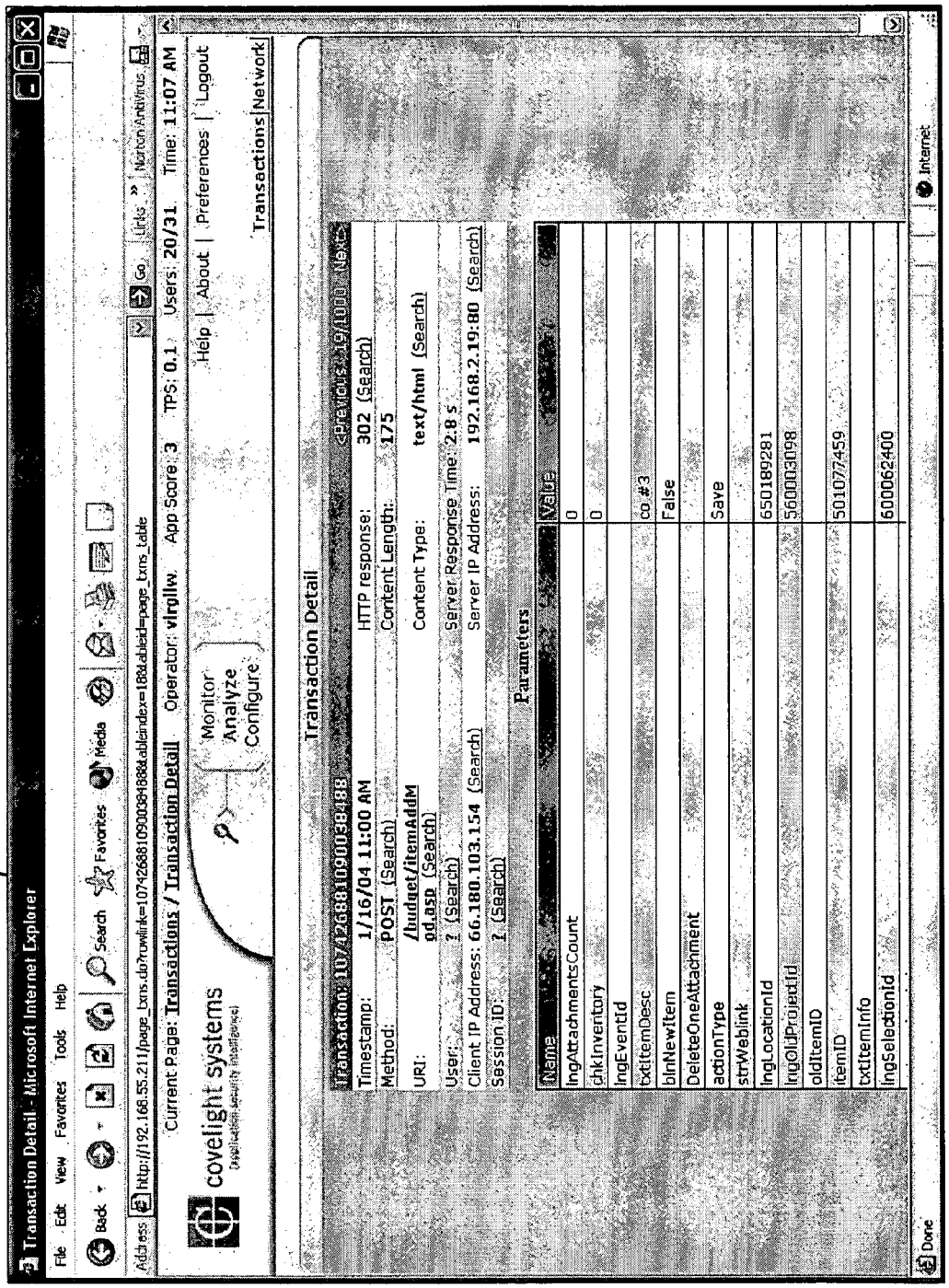
FIG. 49 is a screen display of transaction details.

Referring to FIG. 49, a screen display 4900 of transaction details is illustrated. The data shown in screen display 4900 represents information associated with one transaction for the monitored web application. In addition to the information included for each transaction in screen display 4800 (FIG. 48), screen display 4900 includes several parameters associated with the transaction. Screen display 4900 can shows the timestamp when the request the executed, the HTTP method of the request, the URI of the request, the User-ID associated with the transaction if known, the IP address of the client issuing the request, the session ID associated with the request if any, the HTTP status code of the response, the content length in bytes of the response, the content type of the document returned in the response, the time in milliseconds taken by the server to answer the request, and the IP address of the server. Additionally, screen display 4900 can show parameters included in the request as FORM data.

Referring again to FIG. 48, screen display 4800 can include a network icon NET for switching to a screen display indicating network information. Referring to FIG. 50, a screen display 5000 of network information for a monitored web application is illustrated. Screen display 5000 can show three tables of information. Packets table can include: packet count observed; packet capture count; TCP fragment count; TCP fragment count; ingress byte count; and egress byte count. The packet count observed can be the number of packets that the appliance has seen on the network. The packet count can be the number of packets that match the filter of web servers configured for the web application. The TCP Fragment Count can be the number of captured packet that were TCP fragments. The ingress byte count can be the total byte count of captured packets that were destined for one of the web servers. The egress byte count can be the total byte count of captured packets that originated from one of the web servers. The Screen display 5000 can include a transactions icon TI for switching to screen display 4800.

Screen display 5000 can also include a connections table. The connections table can include: a connection open count; a connection close count; a new SSL session count, a resumed SSL session count; and an SSL connection count. The connections open count can be the number of new connections that have been seen from the assembled packets. The connection close count can be the number of connection closes that have been seen from the assembled packets. The new SSL session count can be the number of new SSL sessions that have been seen. The resumed SSL session count can be the number of resumed SSL session that have been seen. The SSL connection count can be the total number of SSL connections.

Screen display 5000 can also include a servers table which shows a list of servers that are actively being monitored. The servers table can include a server with the IP address of the server port; a port with the port number of the server; connection count with the current number of active connections for the server; an SSL status with the number of SSL sessions cached for the server; an HTTP transactions with the number of HTTP transactions for this server; and a percentage of HTTP transactions with the percentage of transactions that this server has seen compared to all servers.

Configuring

Figure 51:
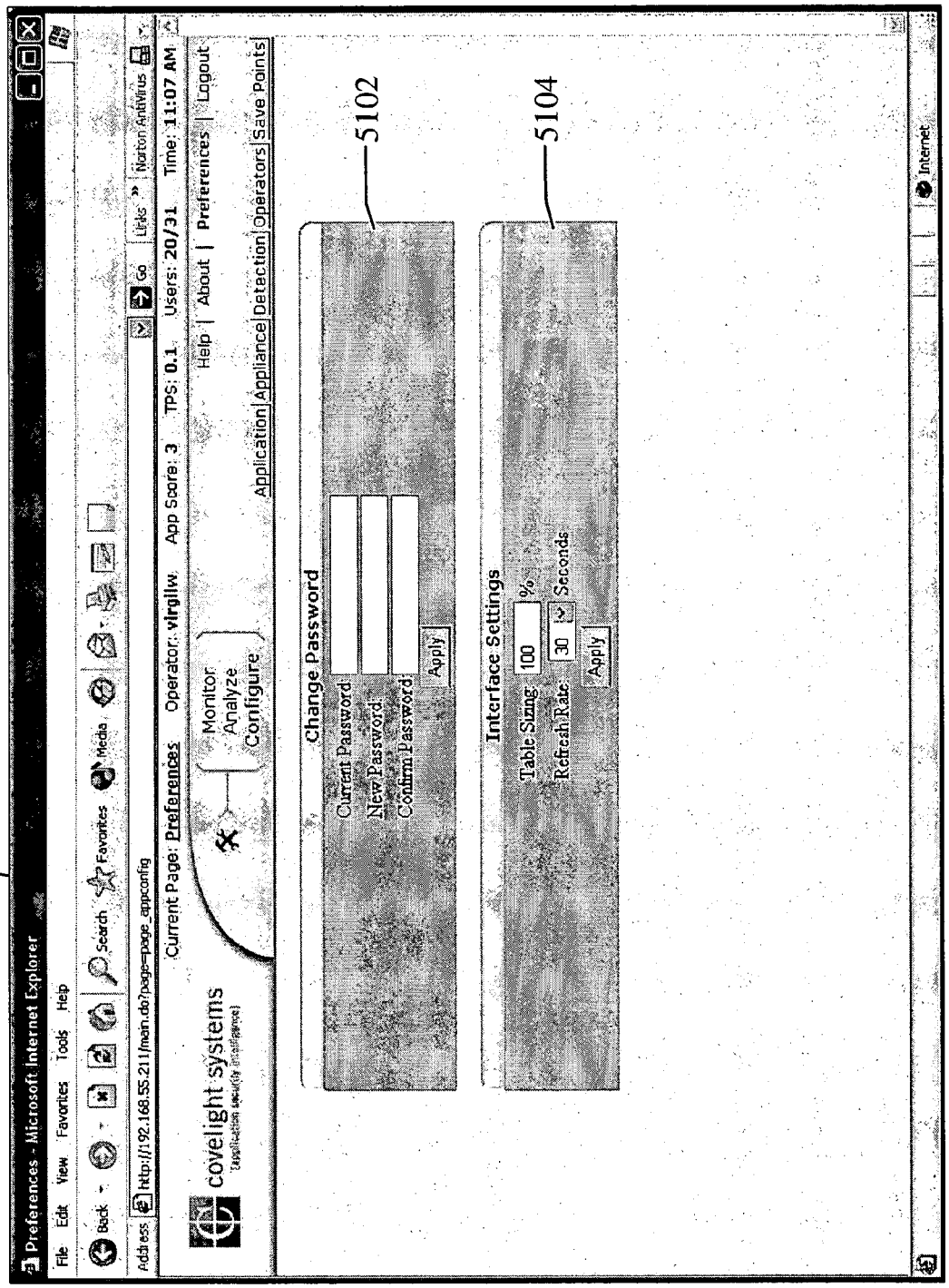
FIG. 51 is a screen display for configuring password and interface settings.

Referring to FIGS. 51-71, different screen displays are illustrated which provide an interface for configuring security system 102 (FIGS. 1A, 1B, and 2). Referring specifically to FIG. 51, a screen display 5100 for configuring password and interface settings is illustrated. Screen display 5100 can include a form 5102 for changing an operator password for accessing security system 102 (FIGS. 1A, 1B, and 2). Screen display 5100 can also include a form 5104 for configuring interface settings. In form 5104, an operator can change the size percentage of the screen displays described herein. Also, in form 5104, an operator can change the refresh rate for the information presented in the screen displays described herein.

Figure 52:
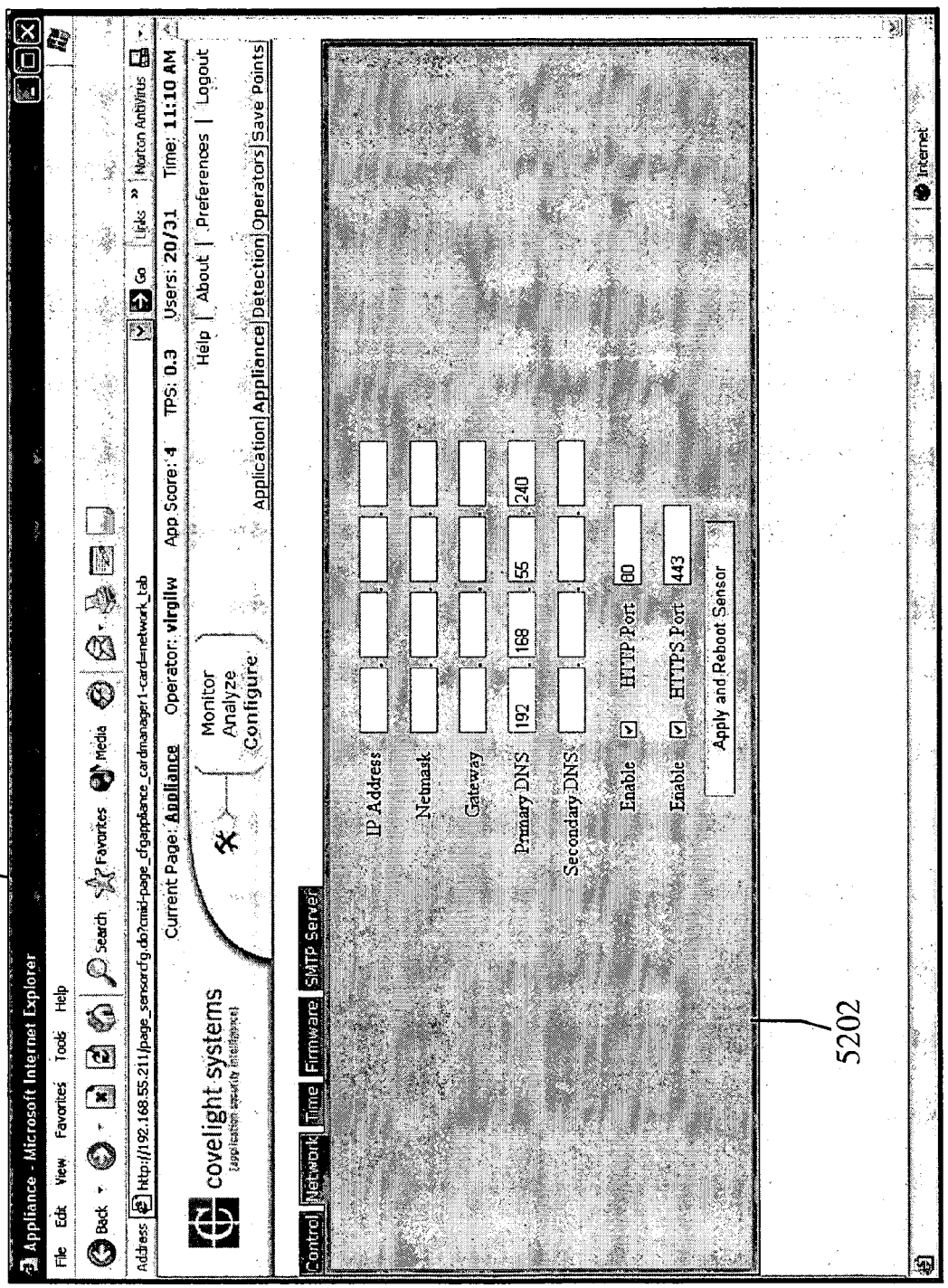
FIG. 52 is a screen display for configuring one or more web servers for monitoring.

Operators can also configure security system 102 (FIGS. 1A, 1B, and 2) for monitoring network traffic to one or more web servers. Referring to FIG. 52, a screen display 5200 for configuring one or more web servers for monitoring is illustrated. Screen display 5200 can include a form 5202 for identifying a web server. Form 5202 can include inputs for entering the following information about a web server: IP address, netmask, gateway, primary domain name system (DNS), and secondary DNS. Additionally, form 5202 can include an input for enabling an HTTP and HTTPS ports.

Figure 53:
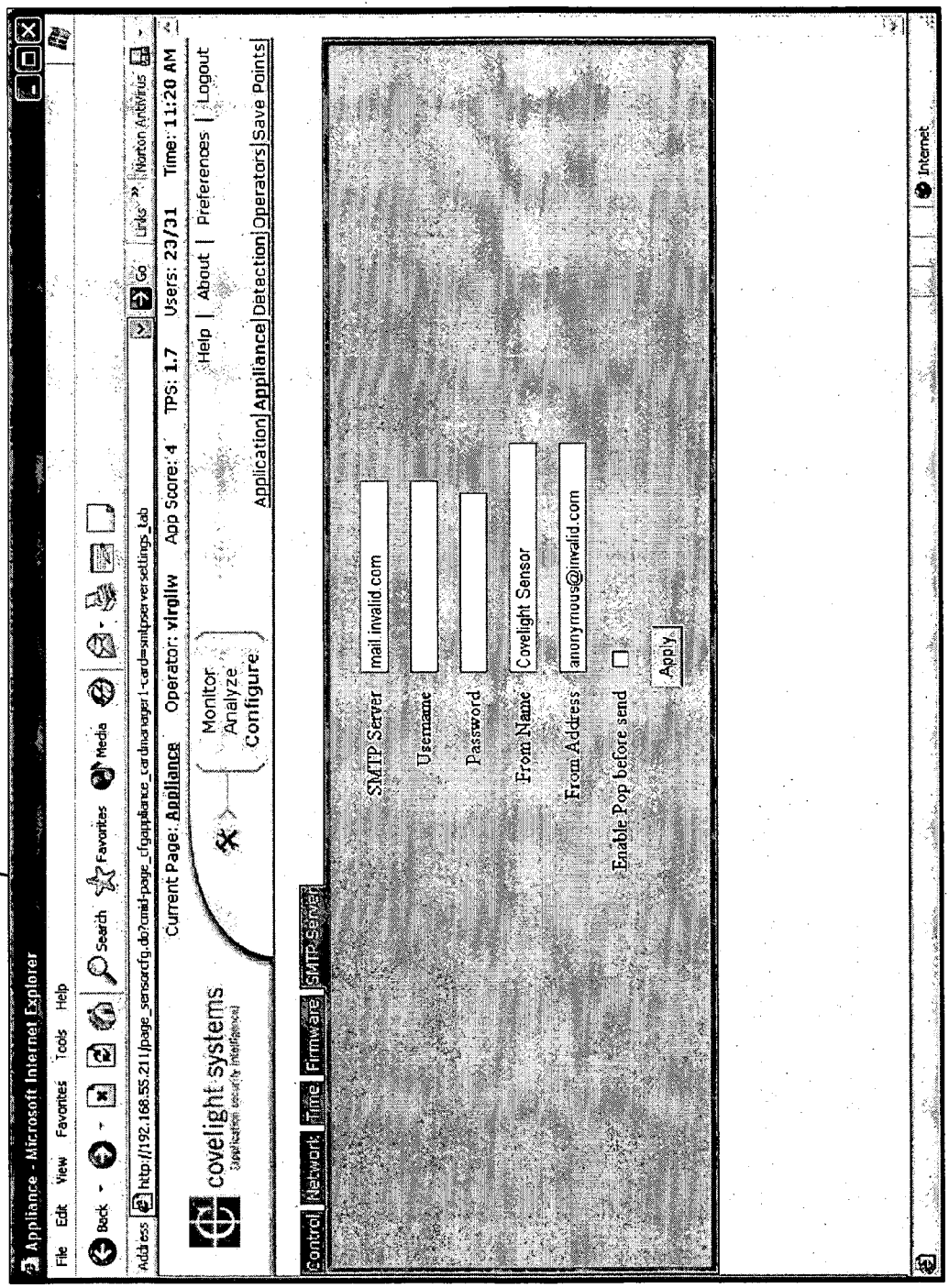
FIG. 53 is a screen display showing configuration for a mail server to allow the sensor to send e-mail alerts and daily reports of activity.

Referring to FIG. 53, a screen display 5300 showing configuration for a mail server to allow the sensor to send e-mail alerts and daily reports of activity is illustrated. An operator can enter in a domain name or IP address of an SMTP server for use in sending mail. The username field can receive an optional user name to use for authentication to above server. The password field can receive an optional password to use for authentication to above server. The from name field can receive a display name to use for sending emails. The from address field can receive an e-mail address to use for sending e-mails. The enable pop-before-send field can receive input for enabling a special access mode required by some SMTP servers.

Figure 54:
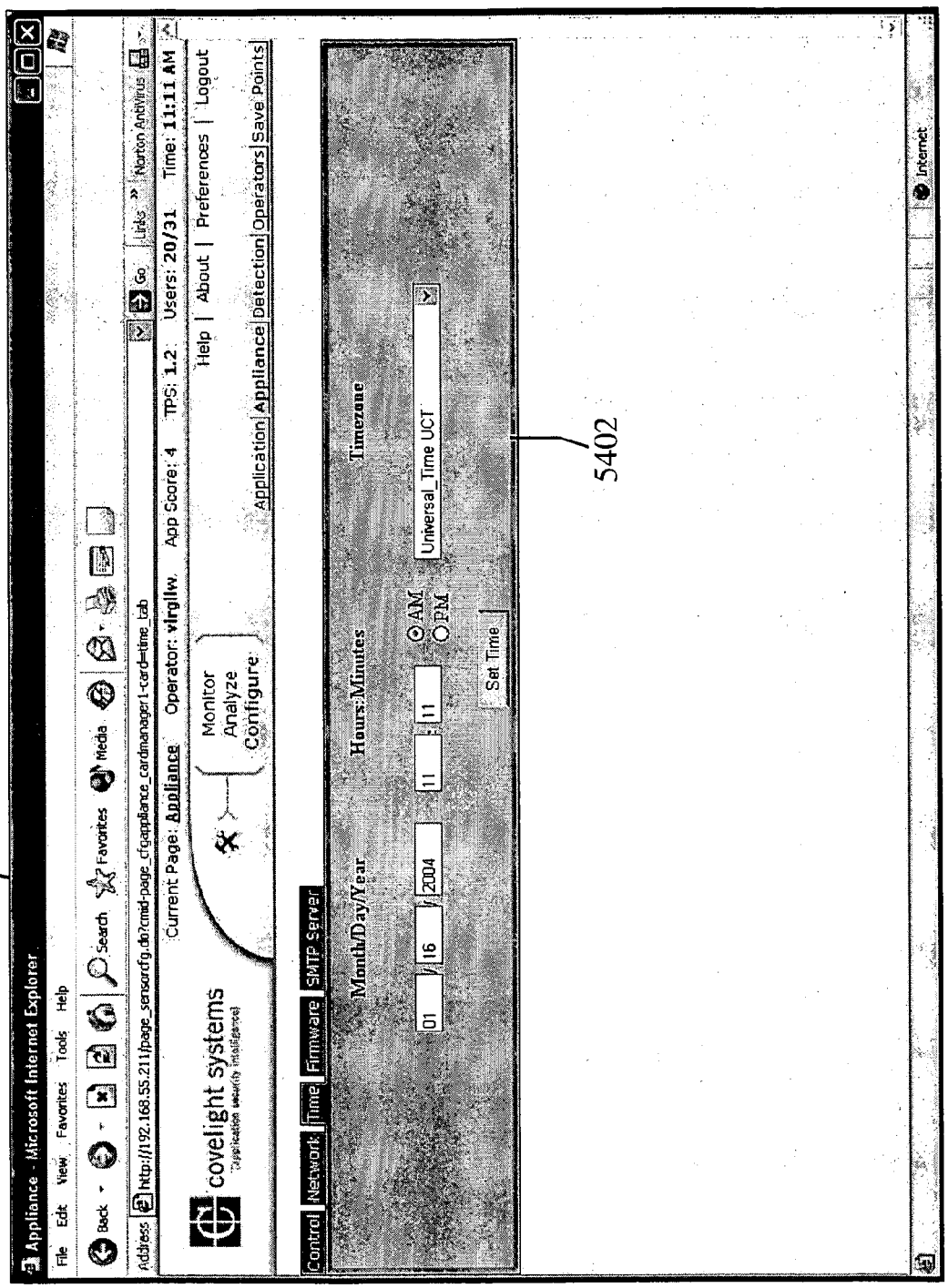
FIG. 54 is a screen display for setting time for a security system.

Referring to FIG. 54, a screen display 5400 for setting time for security system 102 (FIGS. 1A, 1B, and 2). Screen display 5400 can include a form 5402 for setting date, time, and timezone.

Figure 55:
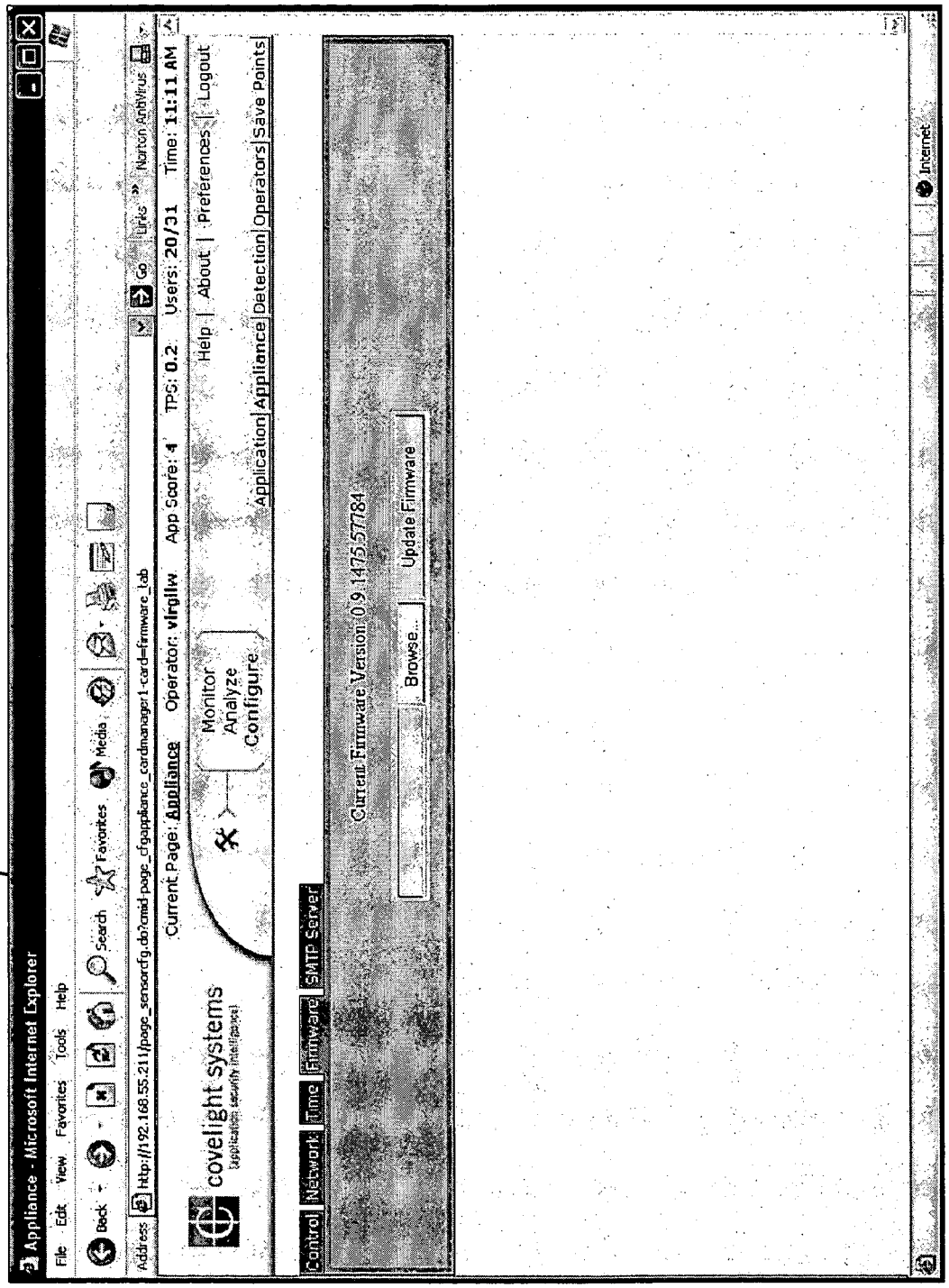
FIG. 55 is a screen display showing a software upgrade feature by which an operator can patch or upgrade a security system by browsing to a patch file and uploading it to the security system.

Referring to FIG. 55, a screen display 5500 is illustrated which shows a software upgrade feature by which the operator can patch or upgrade a security system (such as security system 102 shown in FIGS. 1A and 1B) by browsing to a patch file and uploading it to the security system.

Figure 56:
FIG. 56 is a screen display for controlling a security system.

Referring to FIG. 56, a screen display 5600 for controlling security system 102 (FIGS. 1A, 1B, and 2) is illustrated. Screen display 5600 can include inputs for enabling and disabling security system 102 for monitoring. Screen display 5600 can include inputs for resetting and turning off sensor (security system 102).

Figure 57:
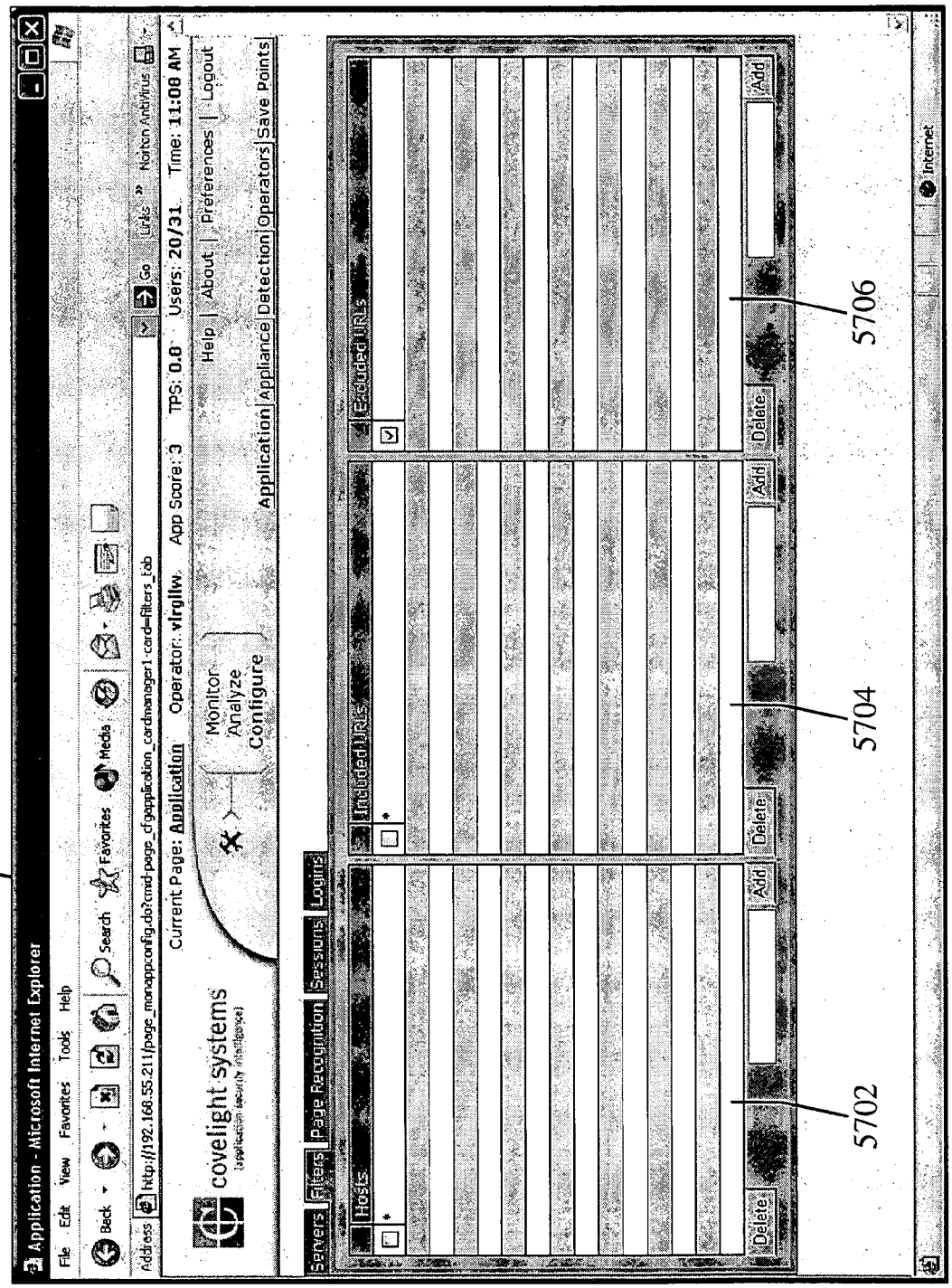
FIG. 57 is a screen display for configuring a security system to monitor one or more web pages.

Operators can also configure security system 102 (FIGS. 1A, 1B, and 2) to filter network traffic that is not part of the traffic being monitored. An operator can configure system 102 to only receive traffic to a specific port of a web server with screen display 5200 (FIG. 52). Referring to FIG. 57, a screen display 5700 for configuring security system 102 (FIGS. 1A, 1B, and 2) to monitor one or more web pages is illustrated. Screen display 5700 can include host fields 5702, included URLs fields 5704, and excluded URLs fields 5706. Optional field 5702 can allow domain names to be entered that match the domain name users type into their web browser to reach the monitored application. An operator can enter URLs to be monitored or ignored in fields 5704 and 5706, respectively.

Figure 58:
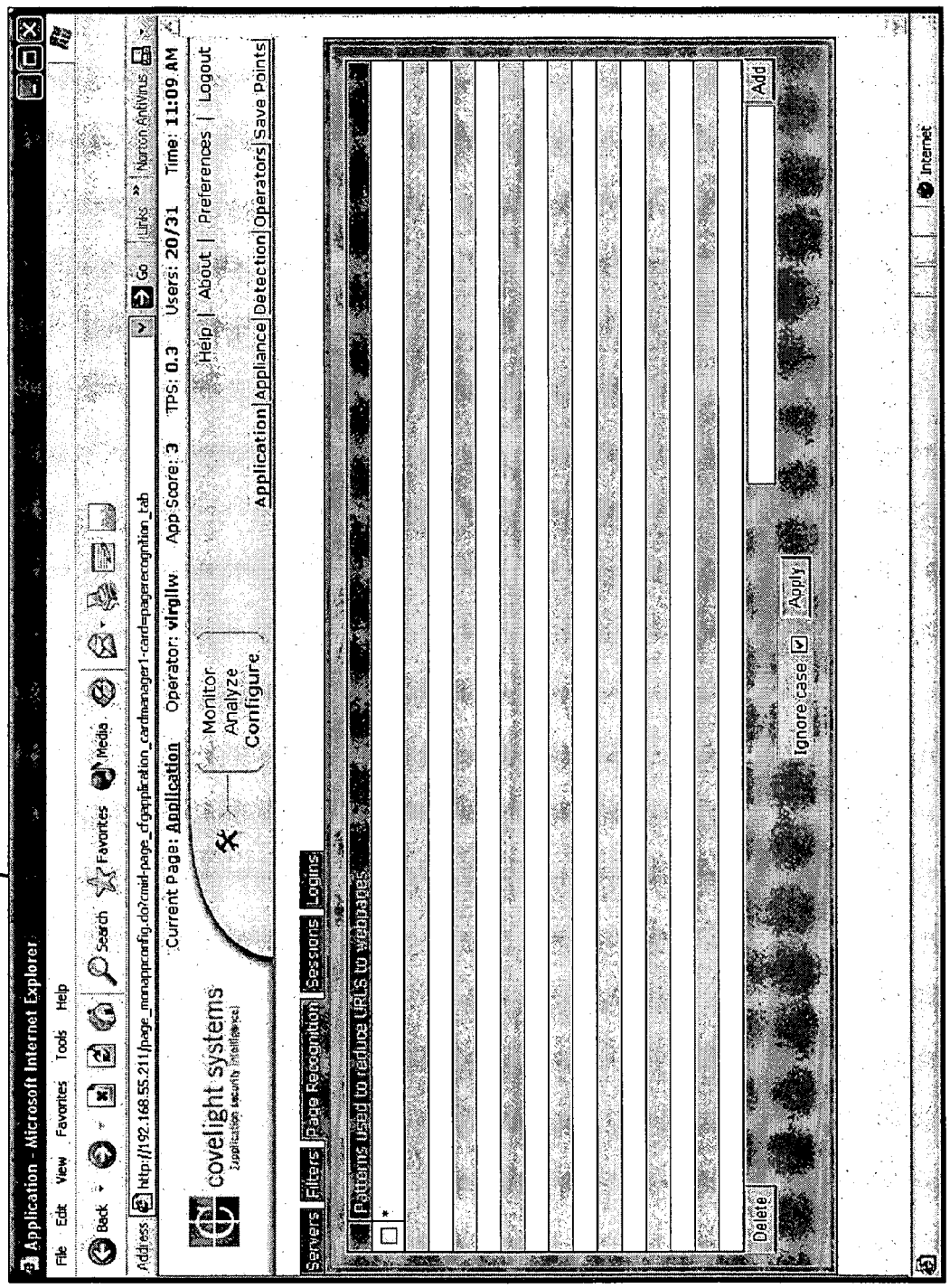
FIG. 58 is a screen display for configuring page recognition.

Operators can also configure security system 102 (FIGS. 1A, 1B, and 2) to filter URLs. Referring to FIG. 58, a screen display 5800 for configuring page recognition is illustrated. Screen display 5800 can include a form for entering patterns for reducing URLs to web pages. FIG. 58 shows the configuration for the sysnodemapper system detector. The strings entered are wildcard patterns used for identifying the Pages of the application from the entire set of possible URLs in the application. The patterns can be case sensitive or case insensitive by checking the Ignore Case input.

Figure 59:
FIG. 59 is a screen display for configuring a security system to monitor different types of sessions.

Security system 102 can be configured to handle different types of sessions. Referring to FIG. 59, a screen display 5900 for configuring security system 102 (FIGS. 1A, 1B, and 2) to monitor different types of sessions. Screen display 5900 can include the following forms: session management 5902, application server features 5904, and custom settings 5906. Session management form 5902 can include inputs for configuring security system 102 to handle one of standard J2EE sessions, standard PHP sessions, and standard ASP sessions. Form 5902 can also include an input for setting custom settings in custom setting form 5906. Application server features form 5904 can include inputs for selecting permissive sessions or strict sessions. Additionally, form 5904 can include an input for setting session timeout. The session cookie name can be treated as case sensitive or case insensitive. Custom settings form 5906 can include inputs for configuring sessions that are cookie-based; sessions with a session ID that is encoded as a query argument in URLs; and session with a session ID that is encoded as a path parameter in URLs.

Figure 60:
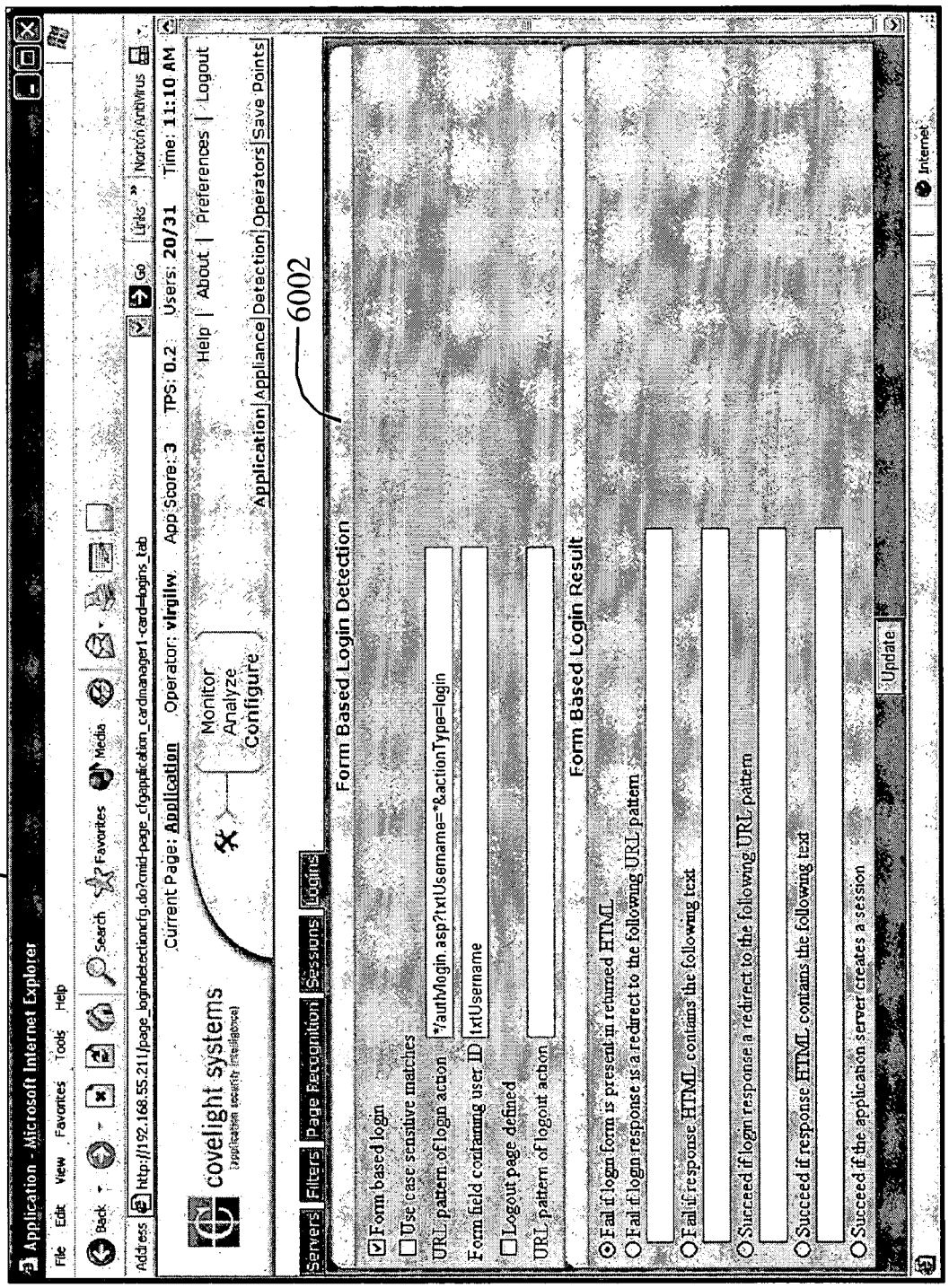
FIG. 60 is a screen display for user authentication configuration.

Security system 102 (FIGS. 1A, 1B, and 2) can be configured to determine when a user has successfully authenticated against the monitored web application. Referring to FIG. 60, a screen display 6000 for user authentication configuration is illustrated. Screen display 6000 can include a form 6002 for form based login detection and a form 6004 for form based login result. Form 6002 can include inputs for setting for form-based login; use case sensitive matches; and logout page defined authentication. Additionally, an input is provided for entering the URL pattern of login action. Form 6002 can also include input for entering form field containing user ID; and a URL pattern of logout action. Form 6004 can include several inputs for determining when a login failed or succeeded. In addition to the inputs shown in form 6004, security system 102 can be configured to support HTTP basic authentication, Microsoft MP authentication, and DIGEST authentication.

Figure 61:
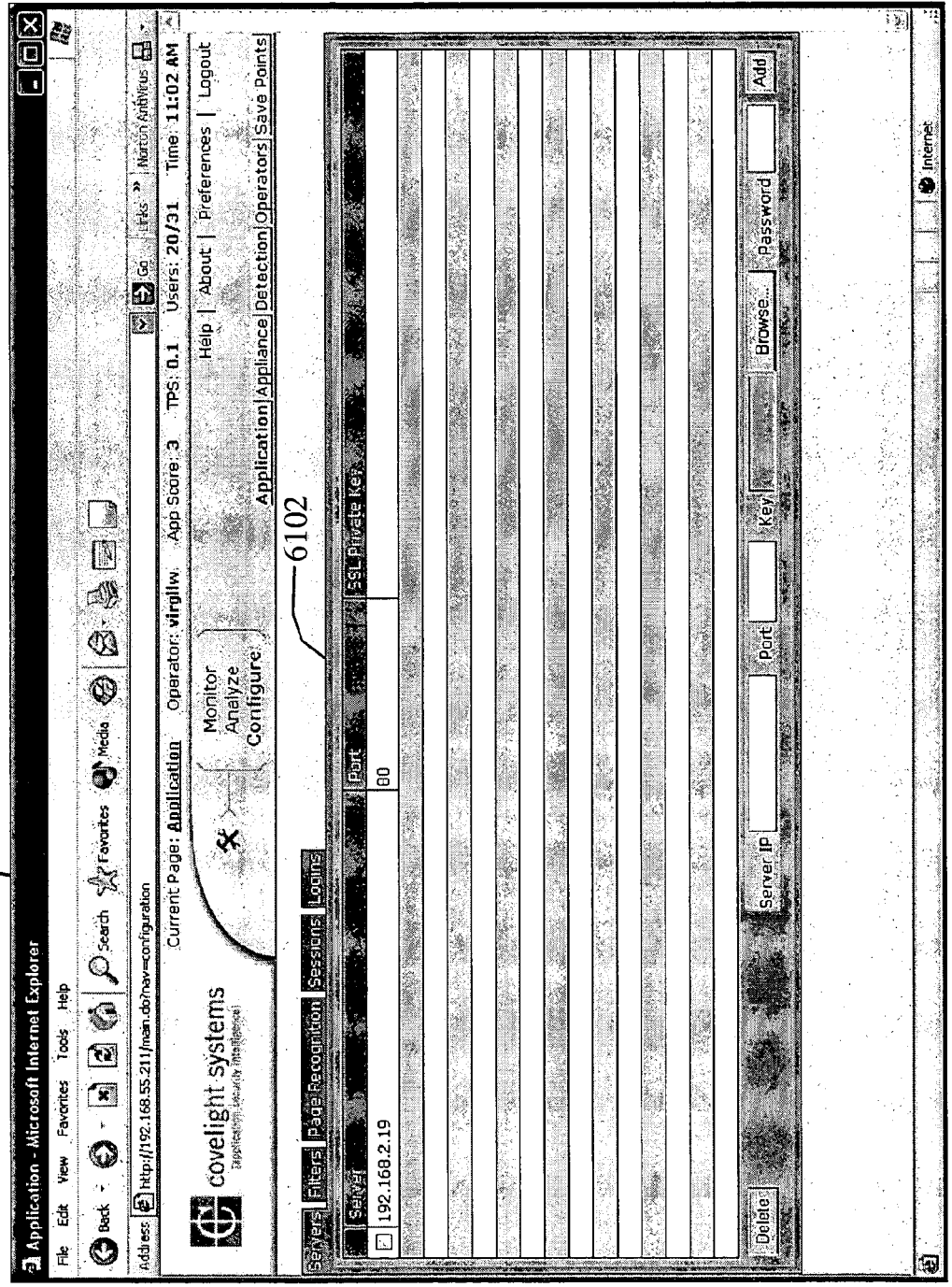
FIG. 61 is a screen display for configuring a security system with an IP address.

Security system 102 (FIGS. 1A, 1B, and 2) can also be configured with an IP address. Referring to FIG. 61, a screen display 6100 for configuring security system 102 with an IP address is illustrated. Screen display 6100 can include a form 6102 for entering an IP address, a port, and an SSL private key. Screen display 6100 can show selection of the physical servers that will be monitored. They are identified by their IP address and port (called a "service"). If a service operates over SSL, the operator can supply the private key of the server and optionally the password used to protect the private key.

Figure 62:
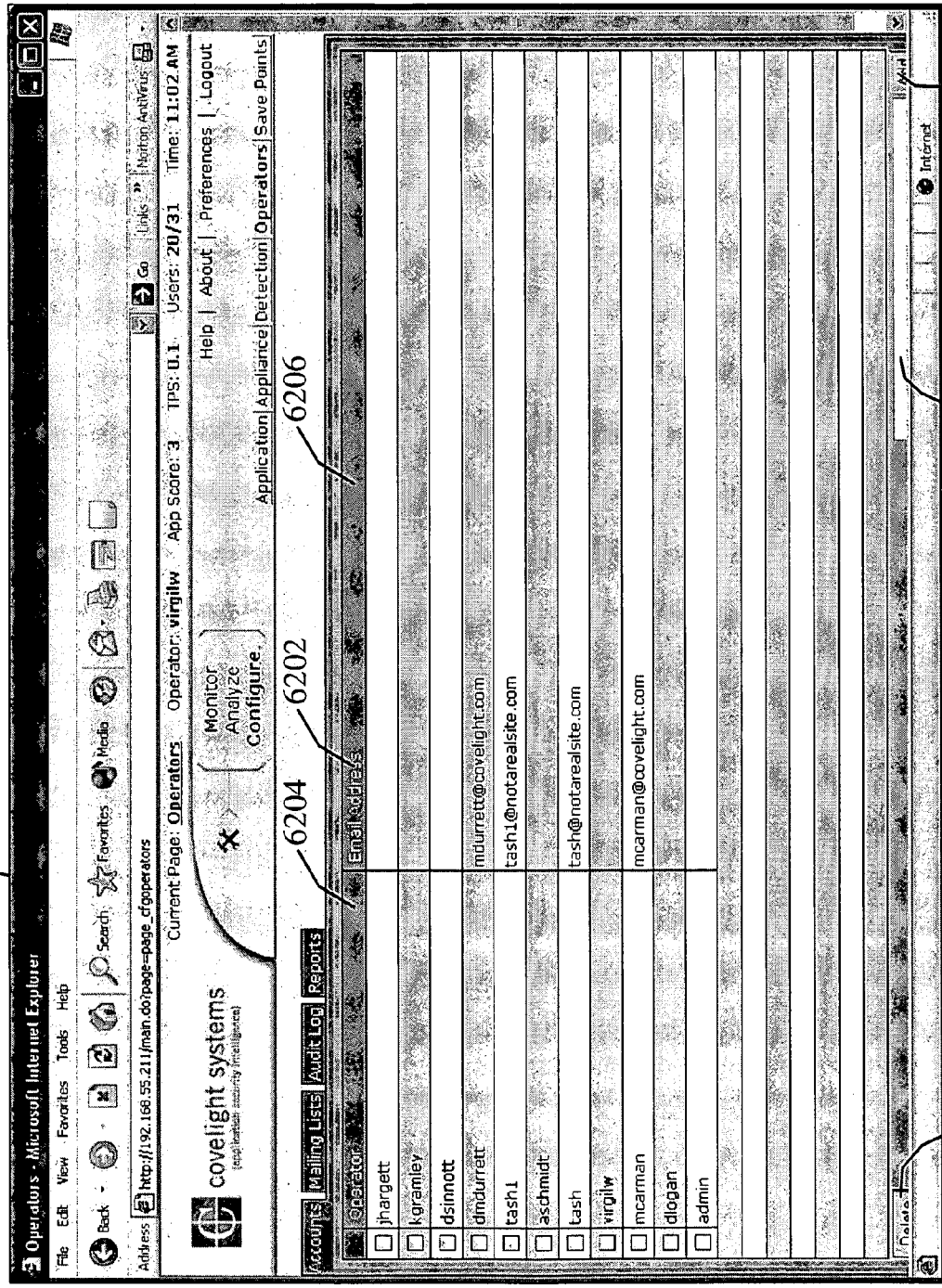
FIG. 62 is a screen display for configuring operators for a security system.
Figure 63:
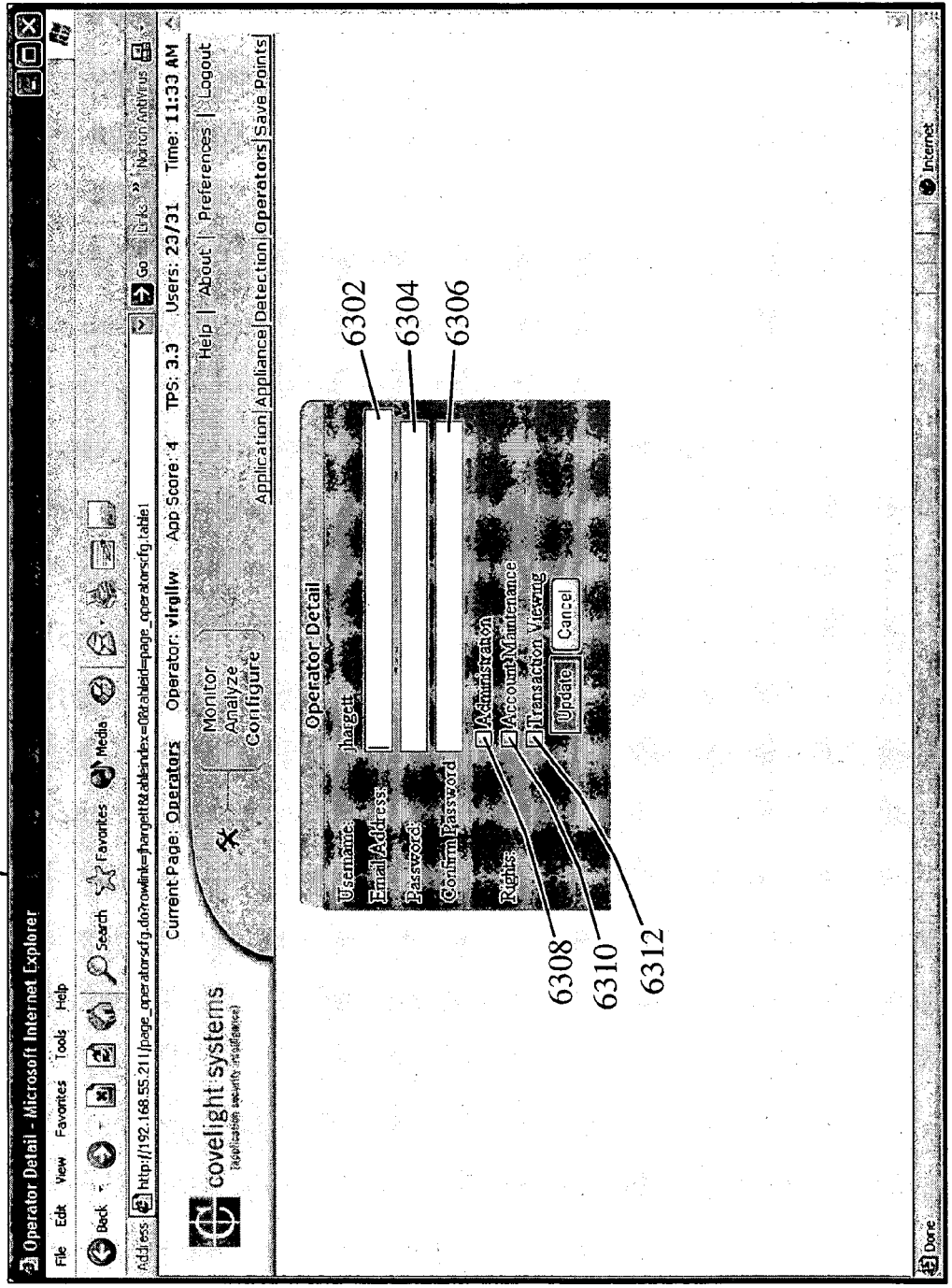
FIG. 63 is a screen display for configuring details of an operator account.

Security system 102 (FIGS. 1A, 1B, and 2) can be configured to add and delete operators. FIGS. 62 and 63 illustrate screen displays for configuring operators for security system 102. Referring specifically to FIG. 62, a screen display 6200 for configuring operators for security system 102 is illustrated. Screen display 6200 can include a table 6202 of operator accounts on security system 102. An operator column 6204 can include the user name of the operator. An e-mail address column 6206 can include the e-mail address of the operator, if an e-mail address is supplied. A delete icon 6208 can allow selected operator accounts to be removed. An add icon 6210 can allow a new account to be created by filling in the user name in a text field 6212.

Referring to FIG. 63, a screen display 6300 for configuring details of an operator account is illustrated. Screen display 6300 can include an e-mail address field 6302 and password fields (6304 and 6306) for allowing the e-mail address and password, respectively, of the operator to be entered. Screen display 6300 can include rights fields 6308, 6310, and 6312 for allowing operators to have different privileges while using security system 102. Administration rights field 6308 can grant the operator the ability to access configure menus. Account maintenance field 6310 can grant the operator the ability to access the operators menu. Transaction viewing field 6312 can grant the operator the ability to access an analyze transactions menu.

Figure 64:
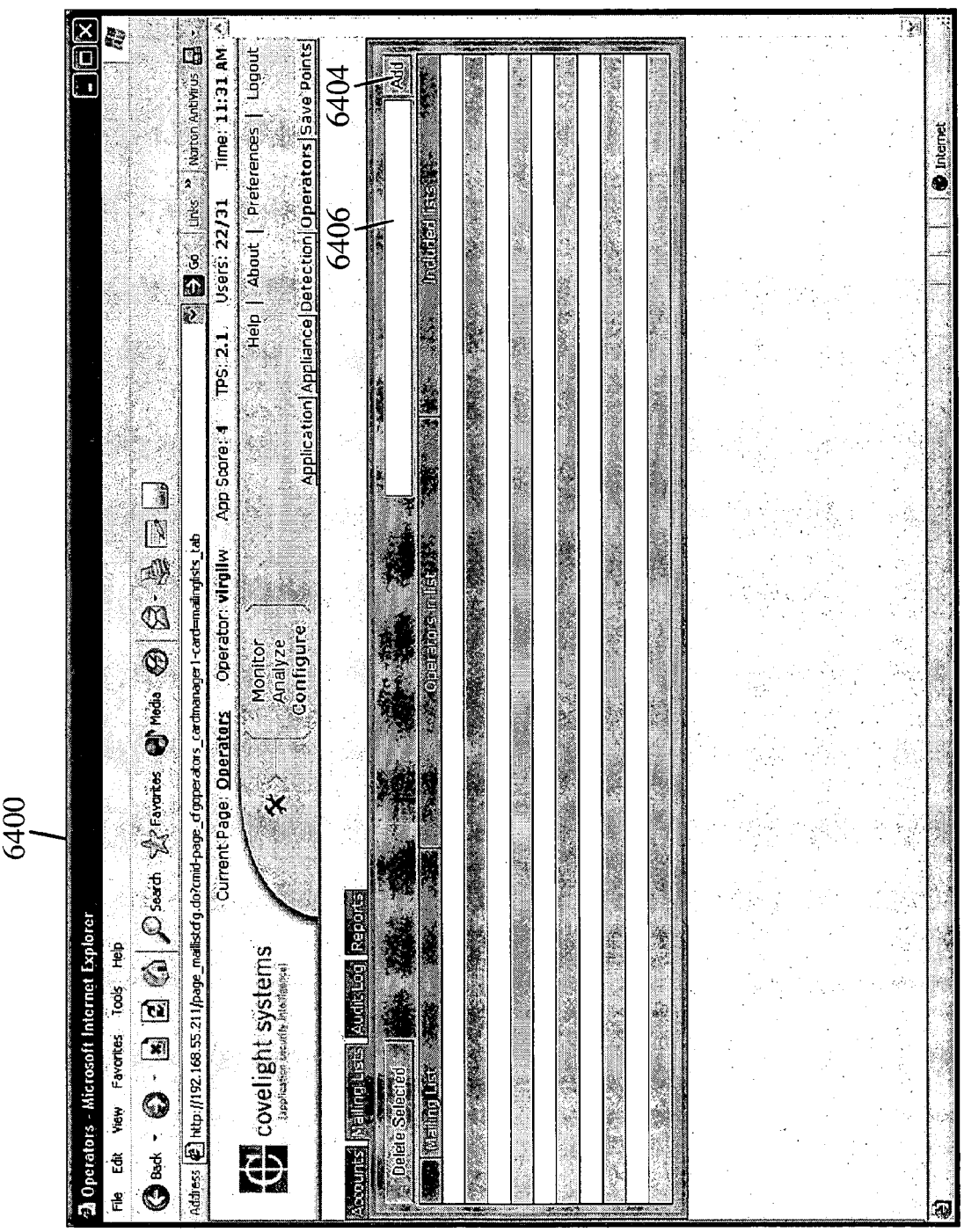
FIG. 64 is a screen display for configuring lists for e-mailing alerts and daily reports.

Security system 102 (FIGS. 1A, 1B, and 2) can be configured with lists for e-mailing alerts and daily reports. Referring to FIG. 64, a screen display 6400 for configuring lists for e-mailing alerts and daily reports is illustrated. A mailing list is comprised of operators. A delete selected icon 6402 can allow a mailing list to be removed from security system 102. An add icon 6404 can allow a new mailing list to be created by entering a name in a text field 6406.

Figure 65:
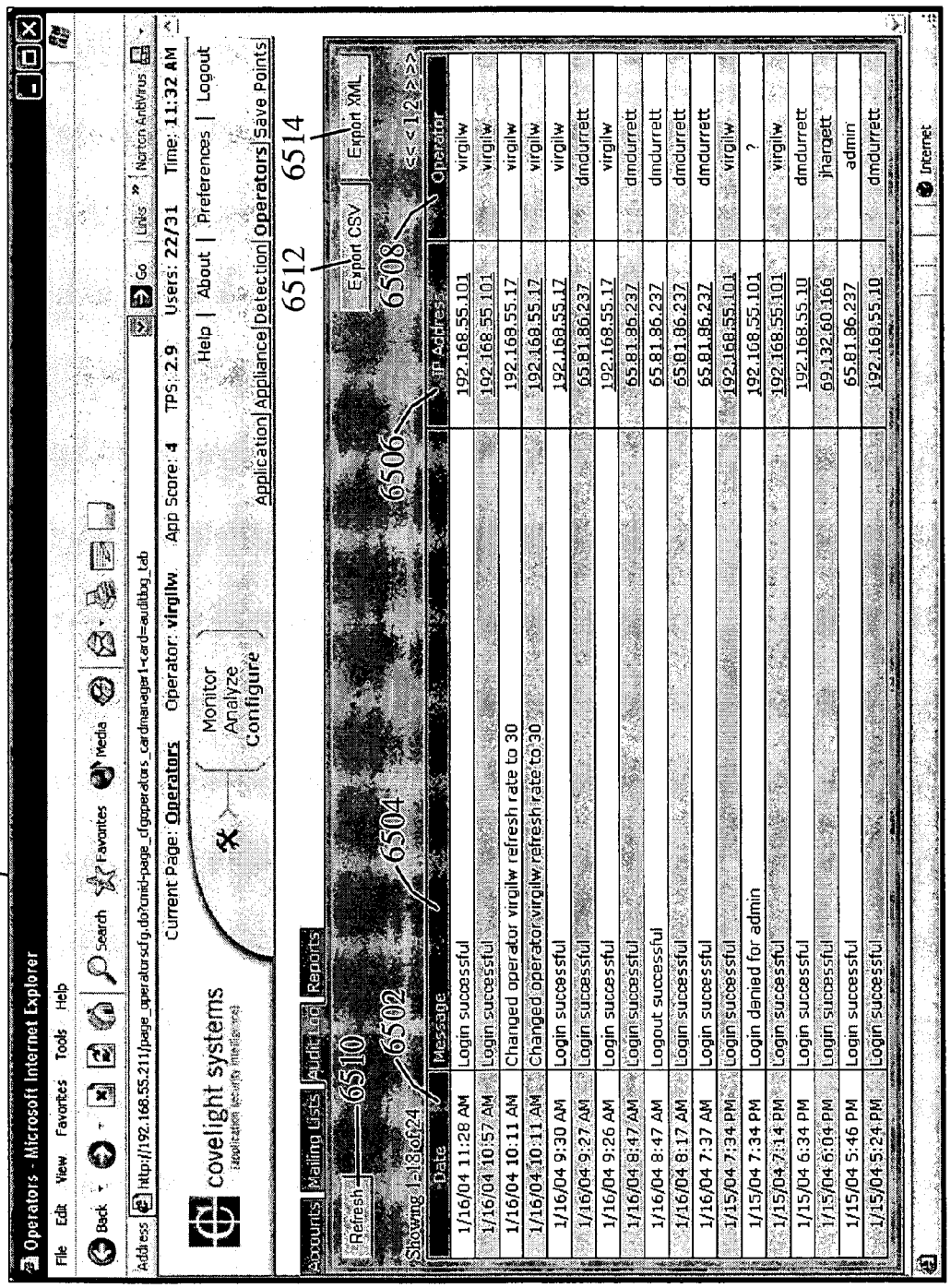
FIG. 65 is a screen display for listing an audit history of actions taken by operators.

Security system 102 (FIGS. 1A, 1B, and 2) can list an audit log of operator activity. Referring to FIG. 65, a screen display 6500 for listing an audit history of actions taken by operators is illustrated. A date column 6502 can show the time when the action was performed. A message column 6504 can show the action taken by the operator. An IP address column 6506 can show the IP address of the client taking the action. An operator column 6508 can show the user name of the operator performing the action. A refresh icon 6510 can update screen display 6500 with any new actions. An export CSV icon 6512 can download the contents of the audit log to an operator's browser in comma-separated-values format. An export XML icon 6514 can download the contents of the audit log to an operator's browser in XML format.

Figure 66:
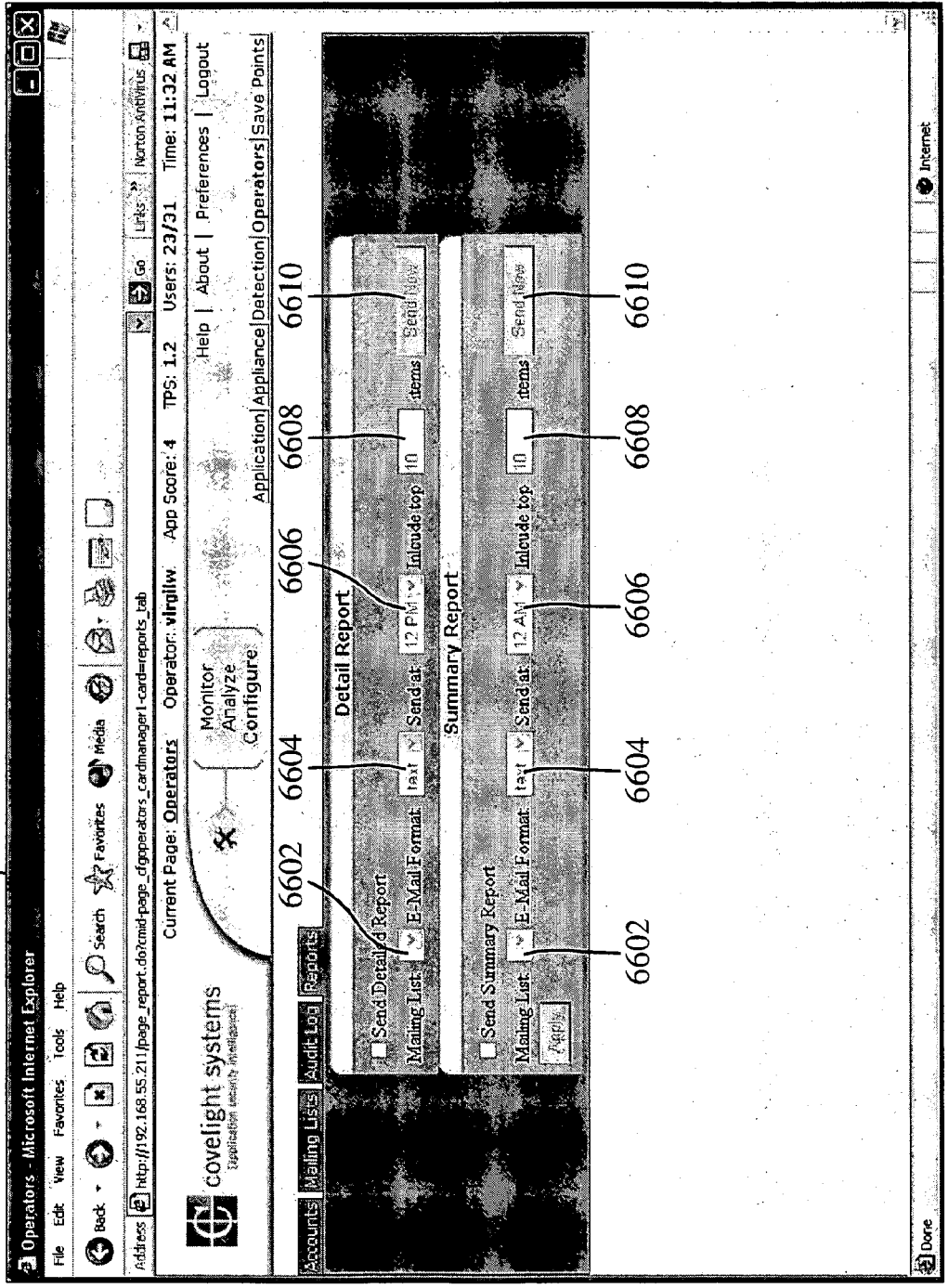
FIG. 66 is a screen display for generating two daily reports to e-mail to selected operators.

Security system 102 (FIGS. 1A, 1B, and 2) can generate and e-mail daily reports to selected operators. Referring to FIG. 66, a screen display 6600 for generating two daily reports to e-mail to selected operators is illustrated. A detail report can provide detailed information about users, pages, and threats for each day. A summary report can show a summary of activity for users, pages, and threats for each day. Each report is configured with: a mailing list box 6602 for indicating what operators to send the report to; an e-mail format box 6604 indicating whether the report should be plain text or HTML format; a sent at box 6606 for indicating the hour of each day to generate the report; an include top box 6608 for indicating the volume of information to include in the report; and a send now icon 6610 for generating and e-mailing the report.

Security system 102 (FIGS. 1A, 1B, and 2) can list the installed detectors. Referring to FIG. 67, a screen display 6700 for listing installed detectors is illustrated. Screen display 6700 can include a name column 6702 showing the name of the detector. Security system 102 can include a category column 6704 showing the administrative category of the detector. Security system 102 can include a score column 6706 showing the threat score assigned to events generated by the detector. Security system 102 can include a status column 6708 showing the current status of the detector (WORKING, LEARNING, DISABLED, or ERROR).

Figure 68:
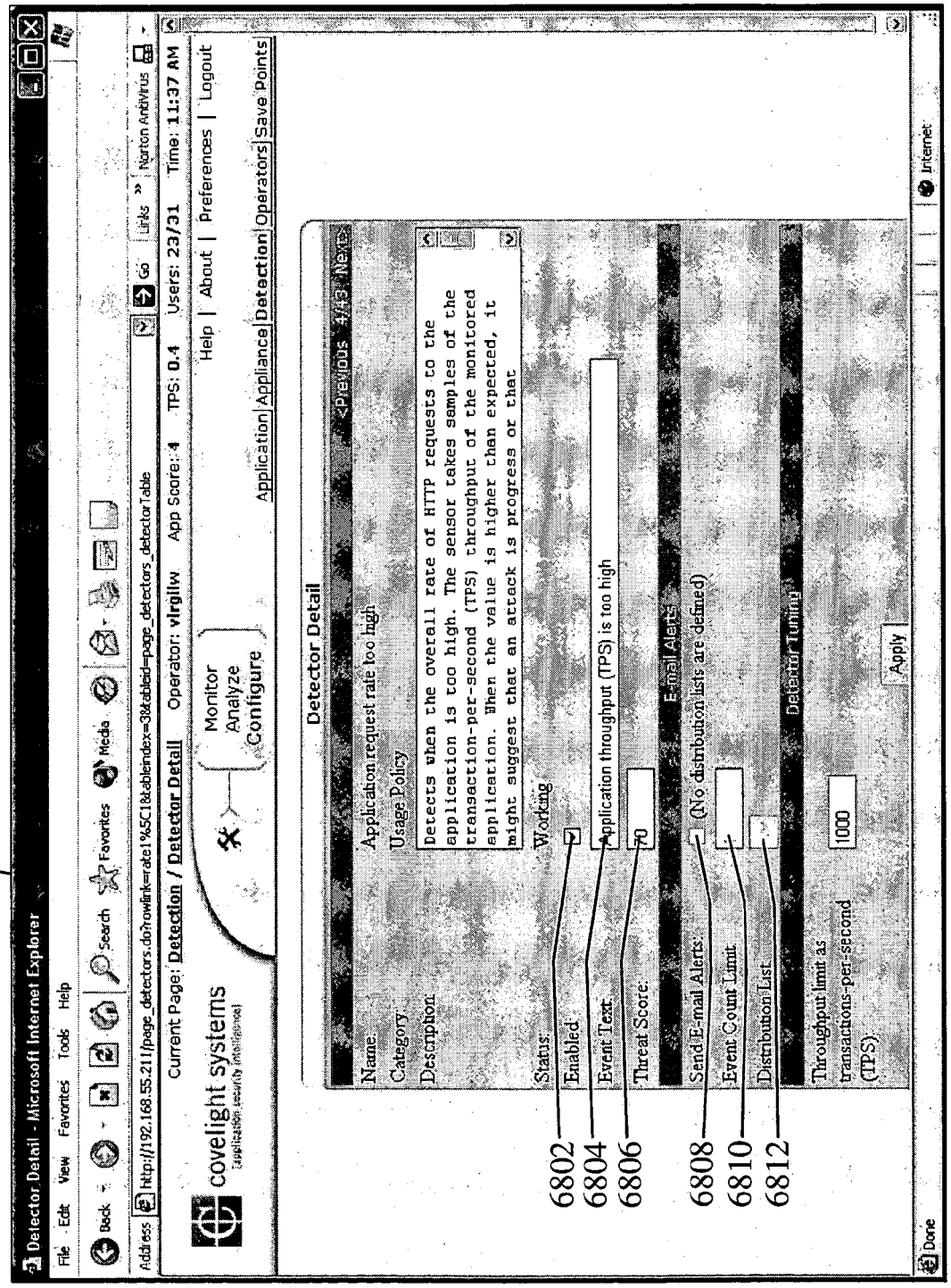
FIG. 68 is a screen display for displaying and allowing operators to change a detector configuration.

Security system 102 (FIGS. 1A, 1B, and 2) can display and allow operators to change detector configurations. Referring to FIG. 68, a screen display 6800 for displaying and allowing operators to change a detector configuration is illustrated. Screen display 6800 can display a name of the detector; a detector category showing the administrative category of the detector; a description for explaining the purpose and general operation of the detector; a detector status showing the current operational status of the detector (WORKING, LEARNING, DISABLED, or ERROR); an enabled input 6802 for allowing the operator to remove this detector from operation, or to place it back into operation; an event field 6804 for allowing the operator to customize the message displayed for this detector on the threats display; a threat score field 6806 for allowing the operator to customize the score assigned to events generated by this detector; a send e-mail alerts input 6808 for allowing the operator to specify that an email should be sent when this detector is triggered; an event count limit field 6810 for allowing the operator to specify that the e-mail should not be sent for every event generated by this detector, but only when a certain number of events are generated; a distribution list input 6812 for allowing the operator to specify which operators should receive the e-mail alert. Security screen 6800 can include a detector tuning portion 6812 for each detector. Detector tuning portion 6812 can that contain the specific configurable elements for the detector.

Figure 69:
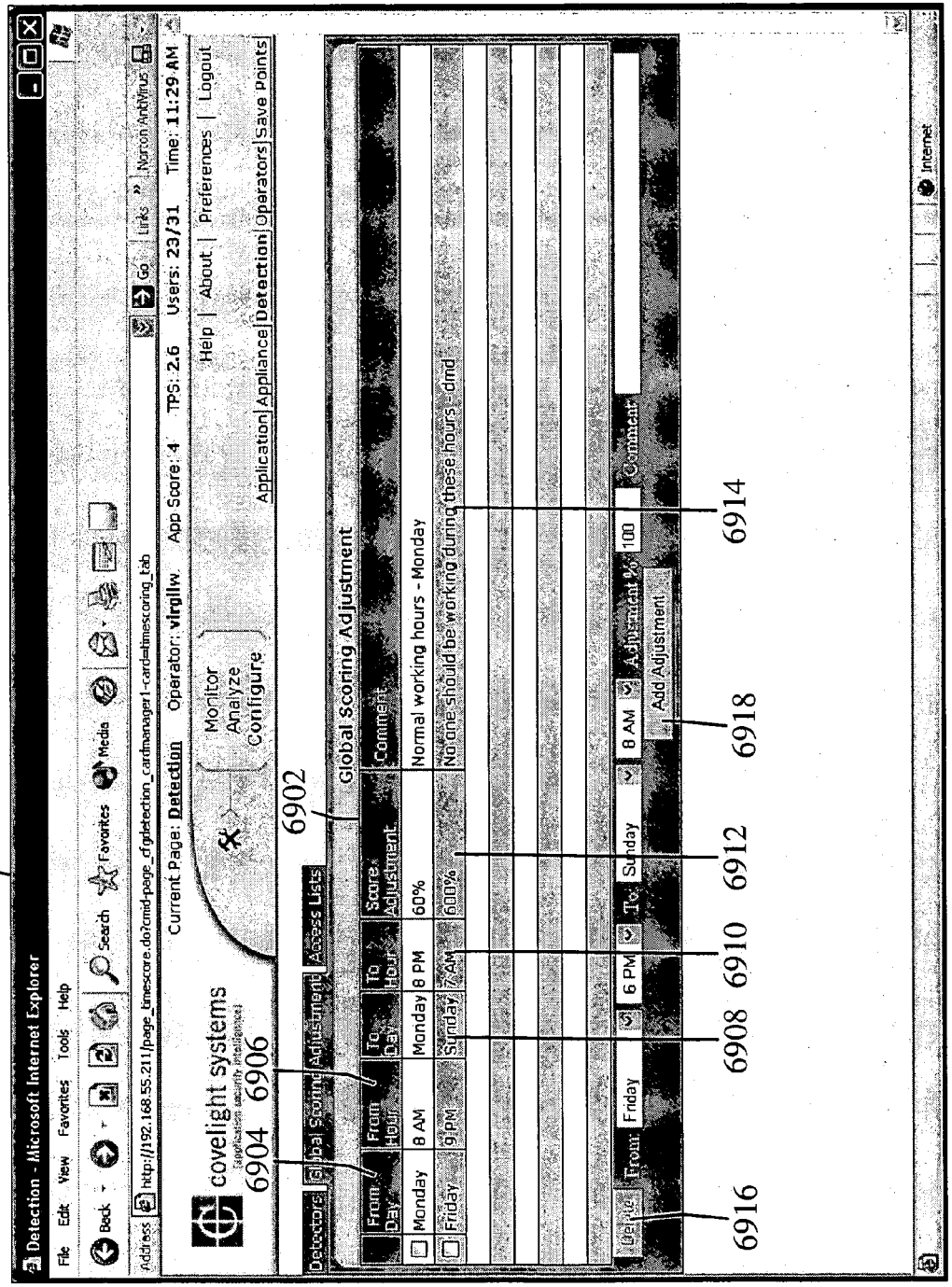
FIG. 69 is a screen display for adjusting threat scores.

Security system 102 (FIGS. 1A, 1B, and 2) can display a table containing a list of time-based scoring adjustments for adjusting the threat score registered by a detector. Referring to FIG. 69, a screen display 6900 for adjusting threat scores is illustrated. Screen display 6900 can include a table 6902 having entries for instructing security system 102 to automatically adjust the threat score of any event generated during the time period covered by the entry. Table 6902 can include a from day column 6904 for indicating the beginning day for this adjustment. Table 6902 can include a from hour column 6906 for indicating the beginning hour for this adjustment. Table 6902 can include a to day column 6908 for indicating the ending day for this adjustment. Table 6902 can include a to hour column 6910 indicating the ending hour for this adjustment. Table 6902 can include a score adjustment column 6912 indicating the percentage by which all threat scores should be automatically adjusted during this time period. Table 6902 can include a comment column 6914 for indicating a descriptive comment for the entry. A delete icon 6916 can allow an entry to be removed from security system 102. An add adjustment icon 6918 can allow a new entry to be added by filling in the fields shown.

Figure 70:
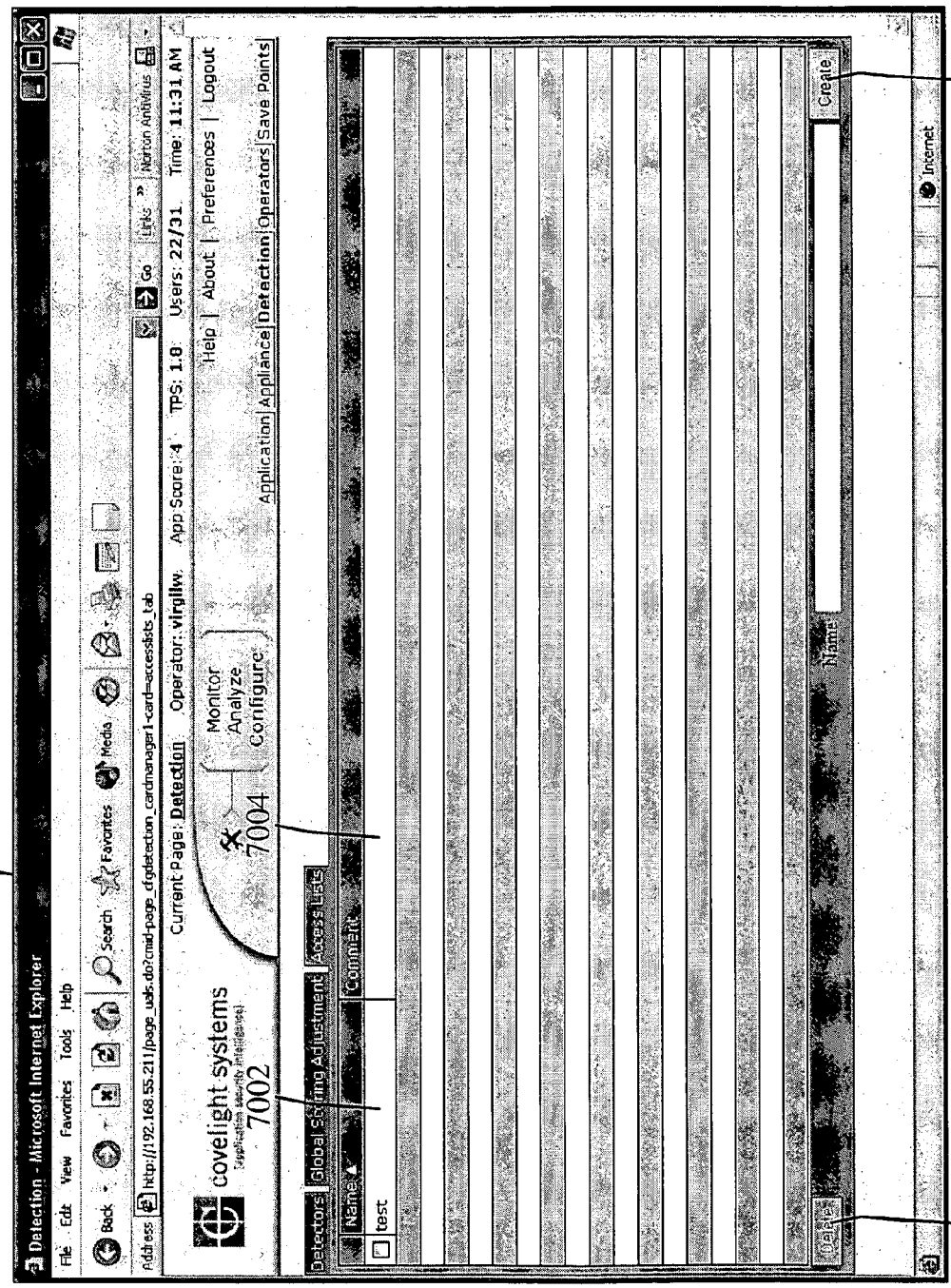
FIG. 70 is a screen display for displaying a user access list.
Figure 71:
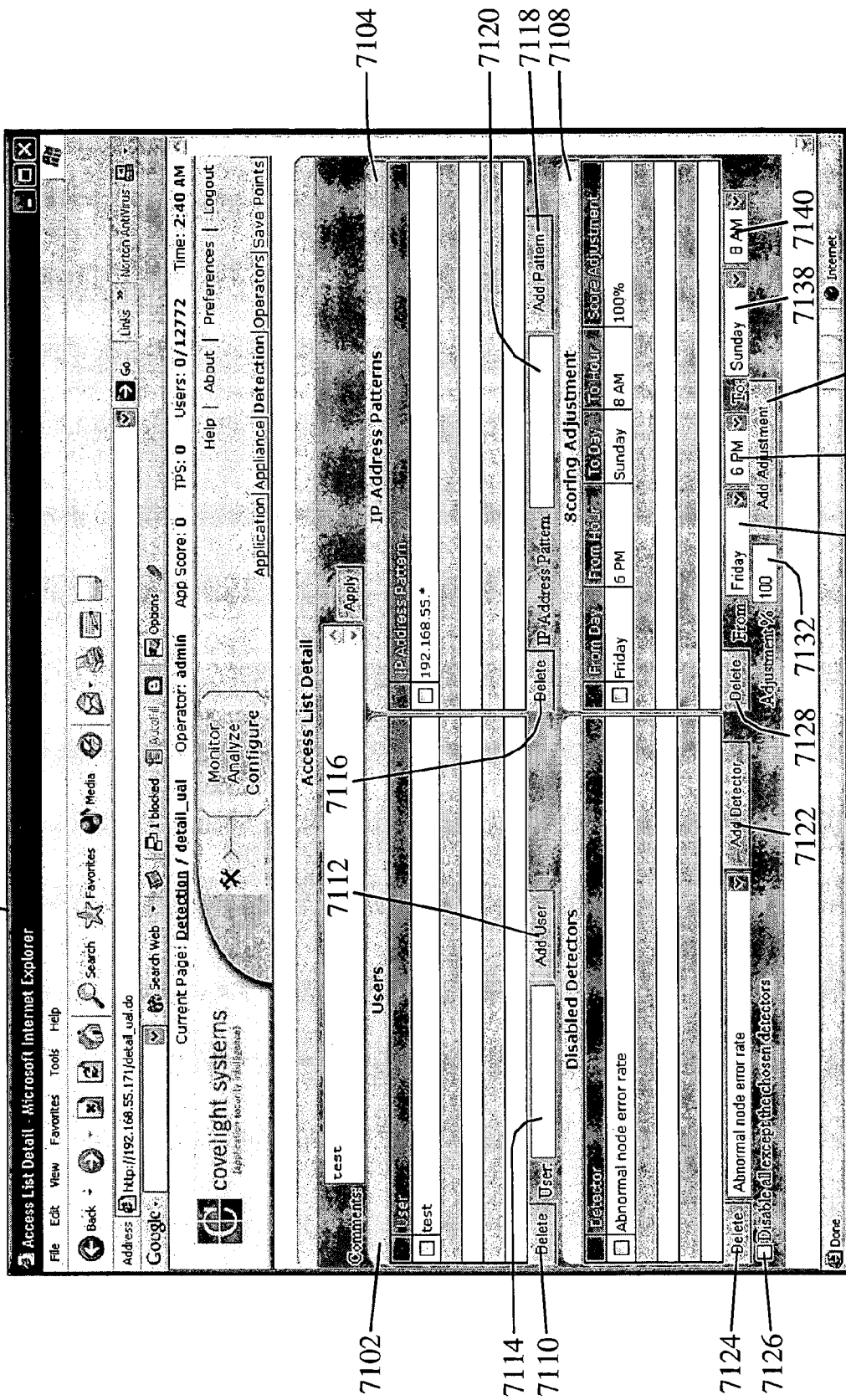
FIG. 71 is a screen display for showing user access list details.

Security system 102 (FIGS. 1A, 1B, and 2) can display a table containing user access lists (UAL). FIGS. 70 and 71 illustrate screen displays of user access lists. Referring to FIG. 70, a screen display 7000 for displaying a user access list is illustrated. Screen display 7000 can include a name column 7002 showing the name assigned to the user access list. Screen display 7000 can include a comment column 7004 showing a descriptive explanation for the user access list. A delete icon 7006 can allow a user access list to be removed from security system 102. A create icon 7008 can allow a new user access list to added to security system 102 by filling in the name field.

Referring specifically to FIG. 71, a screen display 7100 for showing user access list details is illustrated. Screen display 7100 can display a users table 7102, an IP address patterns table 7104, a disabled detectors table 7106, and a scoring adjustment table 7108. Users table 7102 can list application user names included in the user access list. Table 7102 can include a delete icon 7110 for removing user names from the user access list. Table 7102 can also include an add user icon 7112 for adding a new user name to the user access list by entering the user name in field 7114.

Referring to FIG. 71, IP address patterns table 7104 can list IP address patterns included in the user access list. Table 7102 can include a delete icon 7116 for removing IP address patterns from the user access list. Table 7104 can also include an add pattern icon 7118 for adding a new IP address pattern to the user access list by entering the pattern in field 7120. The pattern is a mask that can be used to match client IP addresses.

Referring to FIG. 71, disabled detectors table 7106 can list enabled and disabled detectors for the users in this user access list. Table 7106 can include a delete icon 7120 for removing a detector from the user access list. Table 7104 can also include an add detector icon 7122 for adding a new detector to the user access list by selecting a detector in drop-down list 7124. Table 7106 can also include a checkbox 7126 for disabling all detectors by default, rather than the detectors shown in the list.

Referring to FIG. 71, scoring adjustment table 7104 can time-based scoring adjustments made for users in the user access list. Table 7102 can include a delete icon 7128 for removing a scoring adjustment from the user access list. Table 7104 can also include an add adjustment icon 7130 for adding a new scoring adjustment to the user access list by completing fields 7132, 7134, 7136, 7138, and 7140. Fields 7132, 7134, 7136, 7138, and 7140 can allow an operator to select a starting and ending time for the adjustment and a percentage by which all threat scores should be adjusted during a covered time period.

It will be understood that various details of the presently disclosed subject matter can be changed without departing from the scope of the subject matter. Furthermore, the foregoing description is for the purpose of illustration only, and not for the purpose of limitation.

What is claimed is:

1. A method for detecting abnormal activity of a server application user, the method comprising:
    (a) measuring a predetermined activity of a server application user over a first predetermined time for generating a first measurement;
    (b) measuring the predetermined activity of the server application user over a second predetermined time for generating a second measurement; and
    (c) determining whether the first and second measurements deviate a predetermined amount to detect abnormal activity for the server application user,
    wherein the predetermined activity comprises web page requests.

2. The method of claim 1, comprising maintaining a log of the predetermined activity of the server application user over the first and second predetermined times.

3. The method of claim 1, wherein the predetermined activity comprises a server application request.

4. The method of claim 1, wherein the predetermined activity comprises failed login attempts.

5. The method of claim 1, wherein the predetermined activity comprises login time.

6. The method of claim 1, wherein the web page requests are hypertext transfer protocol (HTTP) requests.

7. The method of claim 1, wherein the second measurement is an average count of web page requests for communication sessions between the server application user and a server application.

8. The method of claim 1, wherein the second measurement is an average count of web page requests between the server application user and a server application during a time interval.

9. The method of claim 1, wherein the predetermined activity comprises session duration.

10. A method for detecting abnormal activity of a server application user, the method comprising:
    (a) measuring a predetermined activity of a server application user over a first predetermined time for generating a first measurement;
    (b) measuring the predetermined activity of the server application user over a second predetermined time for generating a second measurement; and
    (c) determining whether the first and second measurements deviate a predetermined amount to detect abnormal activity for the server application user,
    wherein the predetermined activity comprises a server application request, and
    wherein the server application request is a hypertext transfer protocol (HTTP) request.

11. A method for detecting abnormal activity of a server application user, the method comprising:
    (a) measuring a predetermined activity of a server application user over a first predetermined time for generating a first measurement;
    (b) measuring the predetermined activity of the server application user over a second predetermined time for generating a second measurement; and
    (c) determining whether the first and second measurements deviate a predetermined amount to detect abnormal activity for the server application user,
    wherein the predetermined activity comprises failed web page requests.

12. The method of claim 11, wherein the second measurement is an average count of failed web page requests for communication sessions between the server application user and a server application.

13. A system for detecting abnormal activity of a server application user, the system comprising:
    (a) a network interface for receiving communication data of a predetermined activity of a server application user over a first and second predetermined time, respectively; and
    (b) a detector operable to generate a first and second measurement of the predetermined activity for the first and second predetermined times, respectively, and operable to determine whether the first and second measurements deviate a predetermined amount to detect abnormal activity for the server application user,
    wherein the predetermined activity comprises web page requests.

14. The system of claim 13, comprising a log operable to maintain a record of the predetermined activity of the server application user over the first and second predetermined times.

15. The system of claim 13, wherein the predetermined activity comprises a server application request.

16. The system of claim 13, wherein the predetermined activity comprises failed login attempts.

17. The system of claim 13, wherein the predetermined activity comprises login time.

18. The system of claim 13, wherein the web page requests are hypertext transfer protocol (HTTP) requests.

19. The system of claim 13, wherein the second measurement is an average count of web page requests for communication sessions between the server application user and a server application.

20. The system of claim 13, wherein the second measurement is an average count of web page requests between the server application user and a server application during a time interval.

21. The system of claim 13, wherein the predetermined activity comprises failed web page requests.

22. The system of claim 21, wherein the second measurement is an average count of failed web page requests for communication sessions between the server application user and a server application.

23. The system of claim 13, wherein the predetermined activity comprises session duration.

24. A system for detecting abnormal activity of a server application user, the system comprising:
    (a) a network interface for receiving communication data of a predetermined activity of a server application user over a first and second predetermined time, respectively; and
    (b) a detector operable to generate a first and second measurement of the predetermined activity for the first and second predetermined times, respectively, and operable to determine whether the first and second measurements deviate a predetermined amount to detect abnormal activity for the server application user,
    wherein the predetermined activity comprises a server application request, and
    wherein the server application request is a hypertext transfer protocol (HTTP) request.

25. A computer program product comprising computer-executable instructions embodied in a computer-readable medium for performing steps comprising:
 (a) measuring a predetermined activity of a server application user over a first predetermined time for generating a first measurement;
 (b) measuring the predetermined activity of the server application user over a second predetermined time for generating a second measurement; and
 (c) determining whether the first and second measurements deviate a predetermined amount to detect abnormal activity for the server application user,
  wherein the predetermined activity comprises web page requests.

26. The computer program product of claim 25, comprising maintaining a log of the predetermined activity of the server application user over the first and second predetermined times.

27. The computer program product of claim 25, wherein the predetermined activity comprises a server application request.

28. The computer program product of claim 25, wherein the predetermined activity comprises failed login attempts.

29. The computer program product of claim 25, wherein the predetermined activity comprises login time.

30. The computer program product of claim 25, wherein the web page requests are hypertext transfer protocol (HTTP) requests.

31. The computer program product of claim 25, wherein the second measurement is an average count of web page requests for communication sessions between the server application user and a server application.

32. The computer program product of claim 25, wherein the second measurement is an average count of web page requests between the server application user and a server application during a time interval.

33. The computer program product of claim 25, wherein the predetermined activity comprises failed web page requests.

34. The computer program product of claim 33, wherein the second measurement is an average count of failed web page requests for communication sessions between the server application user and a server application.

35. The computer program product of claim 25, wherein the predetermined activity comprises session duration.

36. A computer program product comprising computer-executable instructions embodied in a computer-readable medium for performing steps comprising:
 (a) measuring a predetermined activity of a server application user over a first predetermined time for generating a first measurement;
 (b) measuring the predetermined activity of the server application user over a second predetermined time for generating a second measurement; and
 (c) determining whether the first and second measurements deviate a predetermined amount to detect abnormal activity for the server application user,
  wherein the predetermined activity comprises a server application request, and
  wherein the server application request is a hypertext transfer protocol (HTTP) request.

37. A method for detecting abnormal activity of a server application user, the method comprising:
 (a) measuring a predetermined activity of a plurality of server application users over a first predetermined time for generating a first measurement;
 (b) measuring the predetermined activity of a first server application user over a second predetermined time for generating a second measurement; and
 (c) determining whether the first and second measurements deviate a predetermined amount to detect abnormal activity for the first server application user,
  wherein the predetermined activity comprises web page requests.

38. The method of claim 37, comprising maintaining a log of the predetermined activity over the first and second predetermined times.

39. The method of claim 37, wherein the web page requests are hypertext transfer protocol (HTTP) requests.

40. The method of claim 37, wherein the second measurement is average count of web page requests for communication sessions between the server application user and a plurality of server applications.

41. The method of claim 37, wherein the predetermined activity comprises session duration.

42. The method of claim 37, wherein the second measurement is average session duration for communication sessions between the server application user and a plurality of server applications.

43. A system for detecting abnormal activity of a server application user, the system comprising:
 (a) a network interface for receiving communication data of a predetermined activity of a first server application user and a selected plurality of server application users over a first and second predetermined time, respectively; and
 (b) a detector operable to generate a first and second measurement of the predetermined activity for the first and second predetermined times, respectively, and operable to determine whether the first and second measurements deviate a predetermined amount to detect abnormal activity for the first server application user,
  wherein the predetermined activity comprises web page requests.

44. The system of claim 43, comprising a log for recording the predetermined activity over the first and second predetermined times.

45. The system of claim 43, wherein the web page requests are hypertext transfer protocol (HTTP) requests.

46. The system of claim 43, wherein the second measurement is average count of web page requests for communication sessions between the server application user and a plurality of server applications.

47. The system of claim 43, wherein the predetermined activity comprises session duration.

48. The system of claim 43, wherein the second measurement is average session duration for communication sessions between the server application user and a plurality of server applications.

49. A computer program product comprising computer-executable instructions embodied in a computer-readable medium for performing steps comprising:
 (a) measuring a predetermined activity of a plurality of server application users over a first predetermined time for generating a first measurement;
 (b) measuring the predetermined activity of a first server application user over a second predetermined time for generating a second measurement; and
 (c) determining whether the first and second measurements deviate a predetermined amount to detect abnormal activity for the first server application user wherein the predetermined activity comprises web page requests.

50. The computer program product of claim 49, comprising maintaining a log of the predetermined activity over the first and second predetermined times.

51. The computer program product of claim 49, wherein the web page requests are hypertext transfer protocol (HTTP) requests.

52. The computer program product of claim 49, wherein the second measurement is average count of web page requests for communication sessions between the server application user and a plurality of server applications.

53. The computer program product of claim 49, wherein the predetermined activity comprises session duration.

54. The computer program product of claim 49, wherein the second measurement is average session duration for communication sessions between the server application user and a plurality of server applications.

* * * * *